US012468883B2

(12) United States Patent
Edwards et al.

(10) Patent No.: US 12,468,883 B2
(45) Date of Patent: Nov. 11, 2025

(54) GENERATING OR MODIFYING TEXT USING A DIGITAL ASSISTANT AND/OR LANGUAGE MODEL

(71) Applicant: Apple Inc., Cupertino, CA (US)

(72) Inventors: Dylan R. Edwards, San Jose, CA (US); Robert W. Hanley, Walnut Creek, CA (US); Jennifer A. Laplaca, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/009,771

(22) Filed: Jan. 3, 2025

(65) Prior Publication Data

US 2025/0298972 A1  Sep. 25, 2025

Related U.S. Application Data

(60) Provisional application No. 63/671,700, filed on Jul. 15, 2024, provisional application No. 63/657,888, filed on Jun. 9, 2024, provisional application No. 63/657,782, filed on Jun. 7, 2024, provisional application No. 63/646,720, filed on May 13, 2024, provisional application No. 63/631,416, filed on Apr. 8, 2024, provisional application No. 63/569,088, filed on Mar. 22, 2024.

(51) Int. Cl.
*G10L 15/22* (2006.01)
*G06F 3/04842* (2022.01)
*G06F 40/20* (2020.01)

(52) U.S. Cl.
CPC .......... *G06F 40/20* (2020.01); *G06F 3/04842* (2013.01)

(58) Field of Classification Search
None
See application file for complete search history.

(56) References Cited

U.S. PATENT DOCUMENTS 5,880,731 A   3/1999  Liles et al.
6,014,136 A   1/2000  Ogasawara et al.
(Continued)

FOREIGN PATENT DOCUMENTS

CN   1248744 A    3/2000
CN   1413008 A    4/2003
(Continued)

OTHER PUBLICATIONS

Applicant-Initiated Interview Summary received for U.S. Appl. No. 18/408,424, mailed on Mar. 18, 2025, 3 pages.
(Continued)

*Primary Examiner* — Seong-Ah A Shin
(74) *Attorney, Agent, or Firm* — DLA Piper LLP (US)

(57) ABSTRACT

The present disclosure generally relates to generating and/or modifying text using a digital assistant. This disclosure encompasses a system for requesting information before generating text using models based on the type of information needed. This disclosure further encompasses a system for a remote model requesting additional information before generating text. This disclosure encompasses user interfaces for text generation/modification. This disclosure encompasses a system for proofreading text using a model. This disclosure encompasses a system for generating a response to a received communication with operations for updating the generated response.

55 Claims, 50 Drawing Sheets

(56) References Cited

U.S. PATENT DOCUMENTS

| | | |
|---|---|---|
| 6,760,410 B1 | 7/2004 | Lee |
| 7,219,302 B1 | 5/2007 | Oshaughnessy et al. |
| 7,752,553 B2 | 7/2010 | Pennington et al. |
| 7,814,155 B2 | 10/2010 | Buchheit et al. |
| 7,890,996 B1 | 2/2011 | Chauhan et al. |
| 8,005,663 B2 | 8/2011 | Scott et al. |
| 8,032,470 B1 | 10/2011 | Heidenreich et al. |
| 8,078,978 B2 | 12/2011 | Perry et al. |
| 8,185,841 B2 | 5/2012 | Rainisto |
| 8,502,856 B2 | 8/2013 | Jeong et al. |
| 8,538,895 B2 | 9/2013 | Greenberg et al. |
| 8,832,584 B1 | 9/2014 | Killalea et al. |
| 8,903,718 B2 | 12/2014 | Akuwudike |
| 8,996,639 B1 | 3/2015 | Faaborg et al. |
| 9,304,675 B2 | 4/2016 | Lemay et al. |
| 9,697,822 B1 | 7/2017 | Naik et al. |
| 10,573,312 B1* | 2/2020 | Thomson ............... G10L 15/22 |
| 11,314,942 B1 | 4/2022 | Selfridge et al. |
| 11,532,301 B1 | 12/2022 | Hajebi et al. |
| 2001/0048449 A1 | 12/2001 | Baker |
| 2002/0059098 A1 | 5/2002 | Sazawa et al. |
| 2002/0123359 A1 | 9/2002 | Wei et al. |
| 2002/0130904 A1 | 9/2002 | Becker et al. |
| 2003/0030670 A1 | 2/2003 | Duarte et al. |
| 2003/0065721 A1 | 4/2003 | Roskind |
| 2003/0088623 A1 | 5/2003 | Kusuda |
| 2003/0090518 A1 | 5/2003 | Chien et al. |
| 2003/0105815 A1 | 6/2003 | Gusler et al. |
| 2003/0187925 A1 | 10/2003 | Inala et al. |
| 2004/0021691 A1 | 2/2004 | Dostie et al. |
| 2004/0078446 A1 | 4/2004 | Daniell et al. |
| 2004/0181586 A1 | 9/2004 | Morreale et al. |
| 2005/0080855 A1 | 4/2005 | Murray |
| 2005/0114789 A1 | 5/2005 | Chang et al. |
| 2005/0204306 A1 | 9/2005 | Kawahara et al. |
| 2005/0210181 A1 | 9/2005 | Depke et al. |
| 2006/0025091 A1 | 2/2006 | Buford |
| 2006/0031772 A1 | 2/2006 | Valeski |
| 2006/0149558 A1* | 7/2006 | Kahn ................. G10L 15/063 704/278 |
| 2006/0267931 A1 | 11/2006 | Vainio et al. |
| 2007/0113181 A1 | 5/2007 | Blattner et al. |
| 2007/0125860 A1 | 6/2007 | Lapstun et al. |
| 2008/0009300 A1 | 1/2008 | Vuong |
| 2008/0040683 A1 | 2/2008 | Walsh |
| 2008/0055269 A1 | 3/2008 | Lemay et al. |
| 2008/0126075 A1 | 5/2008 | Thorn |
| 2008/0126314 A1 | 5/2008 | Thorn et al. |
| 2008/0129469 A1 | 6/2008 | Sumner et al. |
| 2008/0140523 A1 | 6/2008 | Mahoney et al. |
| 2008/0168366 A1 | 7/2008 | Kocienda et al. |
| 2008/0201638 A1 | 8/2008 | Nair |
| 2008/0209339 A1 | 8/2008 | Macadaan et al. |
| 2008/0209351 A1 | 8/2008 | Macadaan et al. |
| 2008/0235242 A1 | 9/2008 | Swanburg et al. |
| 2008/0270559 A1 | 10/2008 | Milosavljevic et al. |
| 2008/0281643 A1 | 11/2008 | Wertheimer et al. |
| 2009/0063995 A1 | 3/2009 | Baron et al. |
| 2009/0106695 A1 | 4/2009 | Perry et al. |
| 2009/0149204 A1 | 6/2009 | Riley et al. |
| 2009/0174667 A1 | 7/2009 | Kocienda et al. |
| 2009/0313299 A1 | 12/2009 | Bonev et al. |
| 2010/0088302 A1 | 4/2010 | Block |
| 2010/0123724 A1 | 5/2010 | Moore et al. |
| 2010/0125811 A1 | 5/2010 | Moore et al. |
| 2010/0138304 A1 | 6/2010 | Boyarsky et al. |
| 2010/0149565 A1 | 6/2010 | Mori |
| 2010/0205541 A1 | 8/2010 | Rapaport et al. |
| 2010/0225599 A1 | 9/2010 | Danielsson et al. |
| 2010/0248757 A1 | 9/2010 | Baek et al. |
| 2010/0287241 A1 | 11/2010 | Swanburg et al. |
| 2010/0291948 A1 | 11/2010 | Wu et al. |
| 2010/0312838 A1 | 12/2010 | Lyon et al. |
| 2010/0323730 A1 | 12/2010 | Karmarkar |
| 2011/0083079 A1 | 4/2011 | Farrell et al. |
| 2011/0105190 A1 | 5/2011 | Cha et al. |
| 2011/0111730 A1 | 5/2011 | Mcevoy |
| 2011/0154220 A1 | 6/2011 | Rathod |
| 2011/0201387 A1 | 8/2011 | Paek et al. |
| 2011/0202876 A1 | 8/2011 | Badger et al. |
| 2011/0246575 A1 | 10/2011 | Murayama et al. |
| 2011/0249073 A1 | 10/2011 | Cranfill et al. |
| 2011/0271205 A1 | 11/2011 | Jones et al. |
| 2011/0288867 A1* | 11/2011 | Chengalvarayan ......................... G10L 15/1815 704/251 |
| 2011/0302249 A1 | 12/2011 | Orr et al. |
| 2012/0016678 A1* | 1/2012 | Gruber ................. G06F 40/279 704/E21.001 |
| 2012/0079373 A1 | 3/2012 | Kocienda et al. |
| 2012/0173222 A1 | 7/2012 | Wang et al. |
| 2012/0278765 A1 | 11/2012 | Kuwahara et al. |
| 2013/0046544 A1 | 2/2013 | Kay et al. |
| 2013/0198296 A1 | 8/2013 | Roy et al. |
| 2013/0253906 A1 | 9/2013 | Archer et al. |
| 2013/0285926 A1 | 10/2013 | Griffin et al. |
| 2013/0297317 A1 | 11/2013 | Lee et al. |
| 2013/0325987 A1 | 12/2013 | Lee et al. |
| 2013/0339283 A1 | 12/2013 | Grieves et al. |
| 2014/0025371 A1 | 1/2014 | Min et al. |
| 2014/0033071 A1 | 1/2014 | Gruber et al. |
| 2014/0040406 A1 | 2/2014 | Ollila et al. |
| 2014/0104177 A1 | 4/2014 | Ouyang et al. |
| 2014/0108004 A1 | 4/2014 | Sternby et al. |
| 2014/0123065 A1 | 5/2014 | Bos |
| 2014/0163981 A1* | 6/2014 | Cook ................. G10L 15/26 704/235 |
| 2014/0215397 A1 | 7/2014 | Bilinsky et al. |
| 2014/0229888 A1 | 8/2014 | Ko et al. |
| 2014/0278379 A1 | 9/2014 | Coccaro et al. |
| 2014/0317502 A1 | 10/2014 | Brown et al. |
| 2014/0344675 A1 | 11/2014 | Chang |
| 2014/0365949 A1 | 12/2014 | Xia et al. |
| 2015/0100537 A1 | 4/2015 | Grieves et al. |
| 2015/0188861 A1 | 7/2015 | Esplin et al. |
| 2015/0220774 A1 | 8/2015 | Ebersman et al. |
| 2015/0350118 A1 | 12/2015 | Yang et al. |
| 2019/0147880 A1 | 5/2019 | Booker et al. |
| 2020/0314039 A1 | 10/2020 | Yang et al. |
| 2022/0284013 A1 | 9/2022 | Panuganty et al. |
| 2022/0383879 A1* | 12/2022 | Agarwal ................. G06F 3/14 |
| 2023/0123574 A1 | 4/2023 | Guberman et al. |
| 2023/0325725 A1 | 10/2023 | Lester et al. |
| 2023/0353514 A1 | 11/2023 | Yang et al. |
| 2024/0146669 A1 | 5/2024 | Pagallo et al. |

FOREIGN PATENT DOCUMENTS

| | | |
|---|---|---|
| CN | 101247366 A | 8/2008 |
| CN | 101326523 A | 12/2008 |
| CN | 101377713 A | 3/2009 |
| CN | 101895623 A | 11/2010 |
| CN | 102055832 A | 5/2011 |
| CN | 102289431 A | 12/2011 |
| CN | 102929473 A | 2/2013 |
| CN | 103079008 A | 5/2013 |
| CN | 103377276 A | 10/2013 |
| CN | 205038557 U | 2/2016 |
| EP | 0987641 A2 | 3/2000 |
| EP | 2393046 A1 | 12/2011 |
| EP | 2688014 A1 | 1/2014 |
| EP | 2713323 A1 | 4/2014 |
| EP | 2770762 A1 | 8/2014 |
| GB | 2412546 A | 9/2005 |
| GB | 2470585 A | 12/2010 |
| JP | 2005-32160 A | 2/2005 |
| TW | 200837575 A | 9/2008 |

(56) References Cited

FOREIGN PATENT DOCUMENTS

| WO | 99/16181 A1 | 4/1999 |
|---|---|---|
| WO | 2015/183699 A1 | 12/2015 |

OTHER PUBLICATIONS

Final Office Action received for U.S. Appl. No. 18/408,424, mailed on Mar. 3, 2025, 17 pages.
Invitation to Pay Additional Fees received for PCT Patent Application No. PCT/US2025/019130, mailed on May 6, 2025, 4 pages.
Notice of Allowance received for U.S. Appl. No. 18/408,424, mailed on Apr. 16, 2025, 12 pages.
Applicant-Initiated Interview Summary received for U.S. Appl. No. 16/875,836, mailed on Jul. 1, 2022, 4 pages.
Applicant-Initiated Interview Summary received for U.S. Appl. No. 16/875,836, mailed on Mar. 18, 2022, 4 pages.
Applicant-Initiated Interview Summary received for U.S. Appl. No. 16/875,836, mailed on Sep. 22, 2022, 4 pages.
Applicant-Initiated Interview Summary received for U.S. Appl. No. 18/408,424, mailed on Jan. 22, 2025, 3 pages.
Corrected Notice of Allowance received for U.S. Appl. No. 18/106,349, mailed on Nov. 8, 2023, 4 pages.
Decision of Rejection received for Chinese Patent Application No. 201510291041.5, mailed on Feb. 27, 2019, 14 pages (3 pages of English Translation and 11 pages of Official Copy).
Decision on Appeal received for U.S. Appl. No. 14/719,163, mailed on Mar. 18, 2020, 14 pages.
Decision to Grant received for Danish Patent Application No. PA201570316, mailed on Jul. 7, 2016, 2 pages.
Decision to Grant received for Danish patent Application No. PA201670430, mailed on Jul. 18, 2017, 2 pages.
Examiner's Answer to Appeal Brief received for U.S. Appl. No. 14/719,163, mailed on May 17, 2018, 48 pages.
Final Office Action received for U.S. Appl. No. 14/719,163, mailed on Apr. 20, 2017, 36 pages.
Final Office Action received for U.S. Appl. No. 14/719,163, mailed on Feb. 26, 2016, 37 pages.
Final Office Action received for U.S. Appl. No. 16/875,836, mailed on May 20, 2022, 26 pages.
Intention to Grant received for Danish Patent Application No. PA201570316, mailed on Feb. 19, 2016, 3 pages.
Intention to Grant received for Danish Patent Application No. PA201670430, mailed on May 8, 2017, 2 pages.
International Preliminary Report on Patentability received for PCT Patent Application No. PCT/US2015/032055, mailed on Dec. 15, 2016, 15 pages.
International Search Report and Written Opinion received for PCT Patent Application No. PCT/US2015/032055, mailed on Oct. 15, 2015, 21 pages.
Invitation to Pay Additional Fees received for PCT Patent Application No. PCT/US2015/032055, mailed on Aug. 6, 2015, 9 pages.
Iphoneblog, "[iPhone-Game] The Secret of Monkey Island: Special Edition", Available at <https://www.youtube.com/watch?v=2YuxCWA0sEg>, Jul. 23, 2009, 2 pages.
Non-Final Office Action received for U.S. Appl. No. 14/719,163, mailed on Oct. 20, 2016, 36 pages.
Non-Final Office Action received for U.S. Appl. No. 14/719,163, mailed on Sep. 25, 2015, 37 pages.
Non-Final Office Action received for U.S. Appl. No. 16/875,836, mailed on Feb. 7, 2022, 30 pages.
Non-Final Office Action received for U.S. Appl. No. 16/875,836, mailed on Jul. 29, 2022, 27 pages.
Non-Final Office Action received for U.S. Appl. No. 18/408,424, mailed on Dec. 19, 2024, 22 pages.
Notice of Allowance received for Chinese Patent Application No. 201520364899.5, mailed on Jan. 12, 2016, 5 pages (3 pages of English Translation and 2 pages of Official Copy).
Notice of Allowance received for Taiwanese Patent Application No. 104117505, mailed on Jun. 30, 2017, 3 pages (Official Copy Only) {See Communication Under Rule 37 CFR § 1.98(a) (3)}.
Notice of Allowance received for U.S. Appl. No. 16/875,836, mailed on Nov. 17, 2022, 27 pages.
Notice of Allowance received for U.S. Appl. No. 18/106,349, mailed on Dec. 26, 2023, 12 pages.
Notice of Allowance received for U.S. Appl. No. 18/106,349, mailed on Sep. 1, 2023, 11 pages.
Office Action received for Australian Patent Application No. 2015100705, mailed on Jan. 13, 2016, 3 pages.
Office Action received for Australian Patent Application No. 2015100705, mailed on Jul. 20, 2015, 6 pages.
Office Action received for Chinese Patent Application No. 201510291041.5, mailed on Jul. 24, 2017, 22 pages (6 pages of English Translation and 16 pages of Official Copy).
Office Action received for Chinese Patent Application No. 201510291041.5, mailed on Jul. 31, 2020, 14 pages (3 pages of English Translation and 11 pages of Official Copy).
Office Action received for Chinese Patent Application No. 201510291041.5, mailed on May 24, 2018, 18 pages (3 pages of English Translation and 15 pages of Official Copy).
Office Action received for Chinese Patent Application No. 202010883767.9, mailed on Jan. 22, 2024, 18 pages (5 pages of English Translation and 13 pages of Official Copy).
Office Action received for Chinese Patent Application No. 202010883767.9, mailed on Jun. 1, 2023, 22 pages (6 pages of English Translation and 16 pages of Official Copy).
Office Action received for Chinese Patent Application No. 202010883767.9, mailed on Sep. 21, 2023, 16 pages (3 pages of English Translation and 13 pages of Official Copy).
Office Action received for Danish Patent Application No. PA201570316, mailed on Aug. 28, 2015, 8 pages.
Office Action received for Danish Patent Application No. PA201670430, mailed on Oct. 27, 2016, 7 pages.
Office Action received for Netherlands Patent Application No. 2014870, mailed on Feb. 1, 2016, 13 pages.
Office Action received for Netherlands Patent Application No. 2016997, mailed on Feb. 6, 2017, 12 pages.
Office Action received for Taiwanese Patent Application No. 104117505, mailed on Sep. 23, 2016, 17 pages (7 pages of English Translation and 10 pages of Official Copy).
"Quick Starter Guide", Rogerthat Enterprise, available at <http://www.rogerthat.net/guide/quick-starter-guide/>, 2014, 4 pages.
Record of Oral Hearing received for U.S. Appl. No. 14/719,163, mailed on Mar. 24, 2020, 15 pages.
Search Report and Opinion received for Netherlands Patent Application No. 2016996, issued on Jun. 23, 2017, 8 pages.
Search Report and Opinion received for Netherlands Patent Application No. 2017005, issued on Sep. 5, 2018, 13 pages (Official Copy Only) {See Communication Under Rule 37 CFR § 1.98(a) (3)}.
Search Report and Opinion received for Netherlands Patent Application No. 2017011, issued on Jun. 23, 2017, 8 pages.
Search Report and Opinion received for Netherlands Patent Application No. 2017012, issued on Jun. 23, 2017, 9 pages.
Search Report received for Netherlands Patent Application No. 2017002, mailed on Apr. 30, 2021, 14 pages (6 pages of English Translation and 8 pages of Official Copy).
Search Report received for Netherlands Patent Application No. 2017003, mailed on Apr. 23, 2021, 27 pages (19 pages of English Translation and 8 pages of Official Copy).
Search Report received for Netherlands Patent Application No. 2017007, mailed on Jan. 8, 2019, 15 pages (5 pages of English Translation and 10 pages of Official Copy).
Search Report received for Netherlands Patent Application No. 2017009, mailed on Jan. 8, 2019, 12 pages (2 pages of English Translation and 10 pages of Official Copy).
Shangjun, Chen, "English Grammar Vocabulary Explanation for Junior High School", Published by Southeast University, Mar. 2013, 8 pages (1 page of English Translation and 7 pages of Official Copy).

(56) References Cited

OTHER PUBLICATIONS

Smith, Shamblesguru, "Handwrite a Google Search on an iPad", Available at <https://www.youtube.com/watch?v=2zIQ20whYak>, Jul. 28, 2012, 2 pages.
"WhatsApp", available at <http://web.archive.org/web/20140122054942/http://www.whatsapp.com/>, Jan. 22, 2014, 2 pages.
International Search Report and Written Opinion received for PCT Patent Application No. PCT/US2025/019130, mailed on Jul. 21, 2025, 24 pages.
Extended European Search Report received for European Patent Application No. 25163518.1, mailed on Aug. 28, 2025, 9 pages.

\* cited by examiner

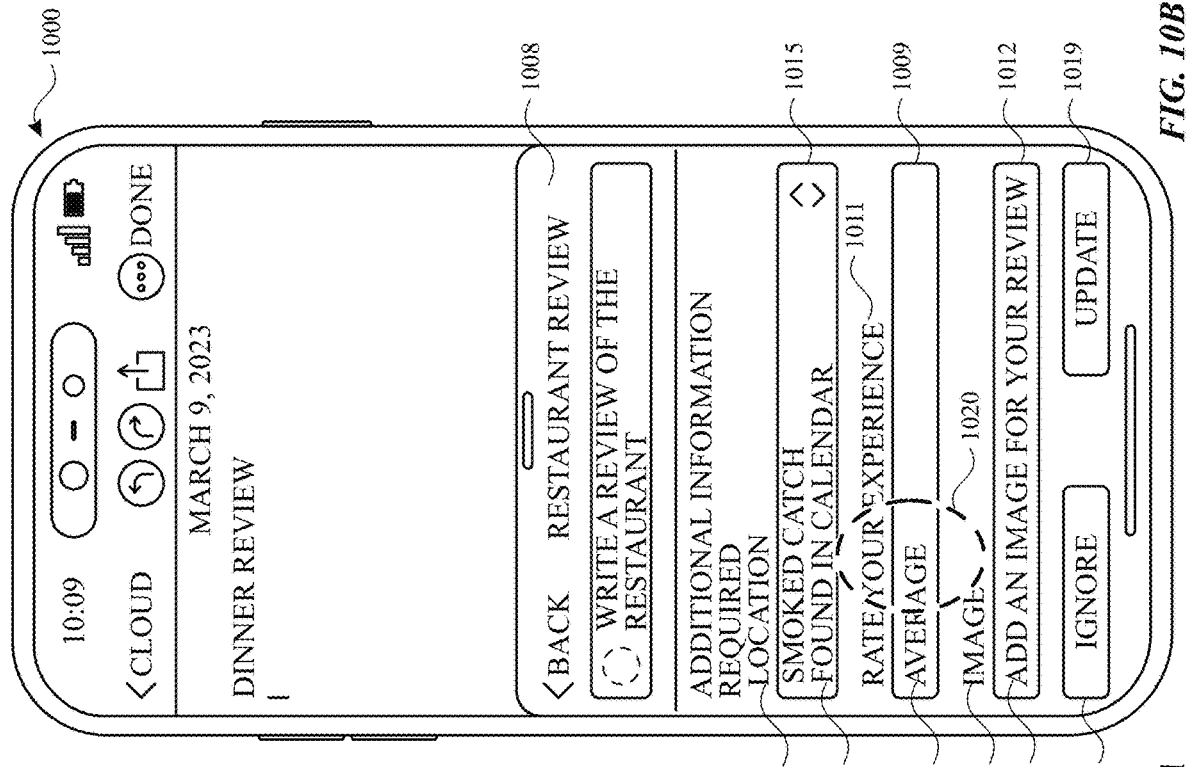
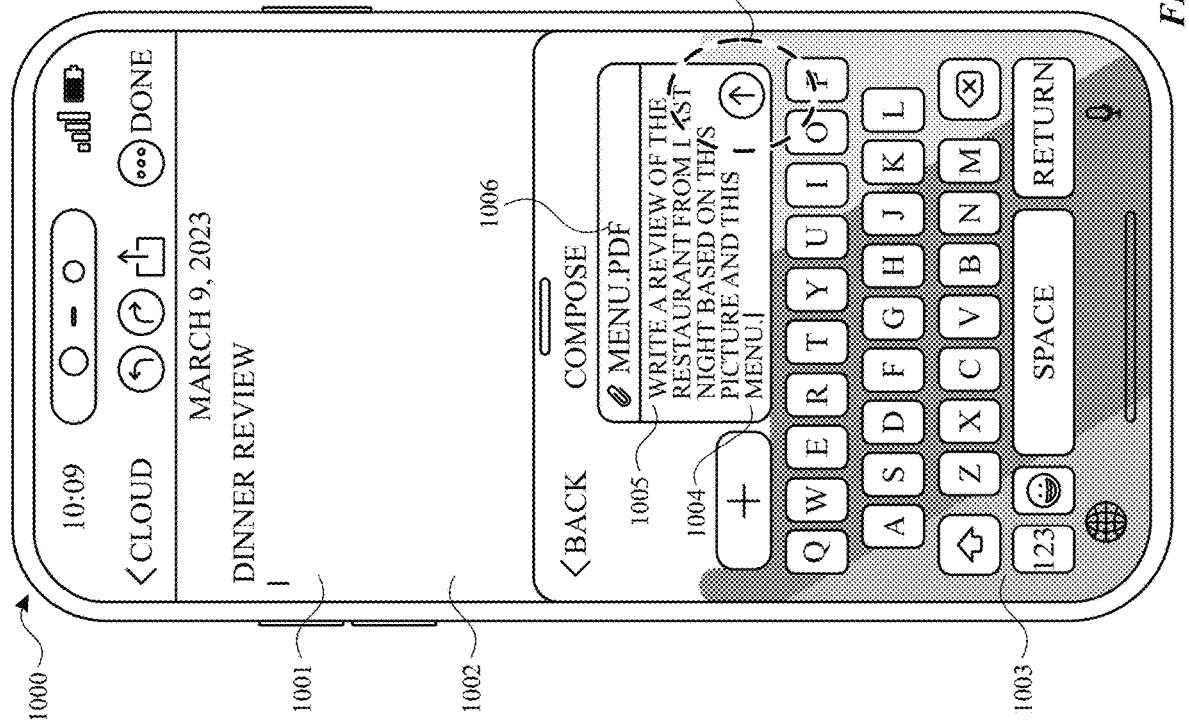
FIG. 10A
FIG. 10B

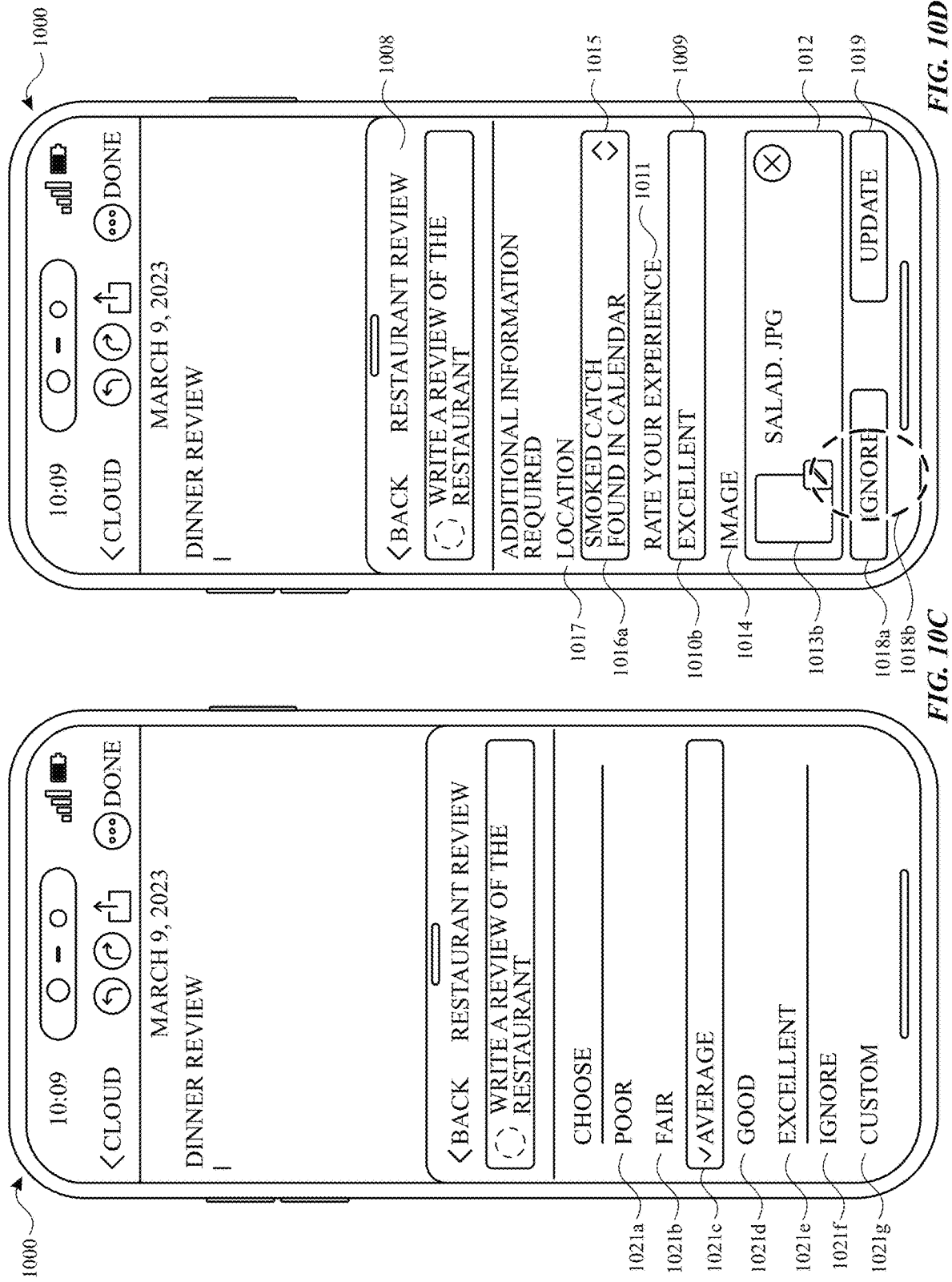

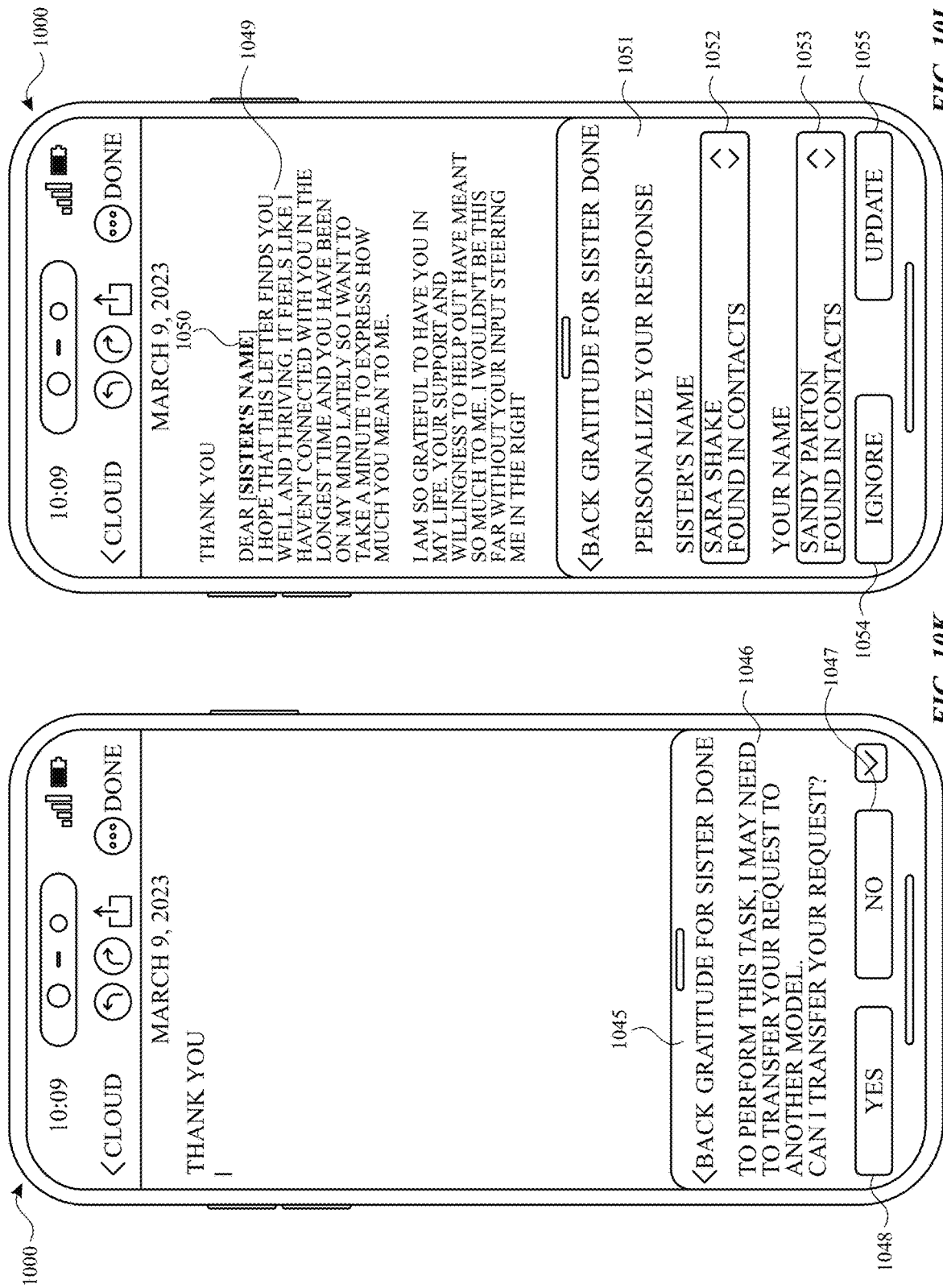

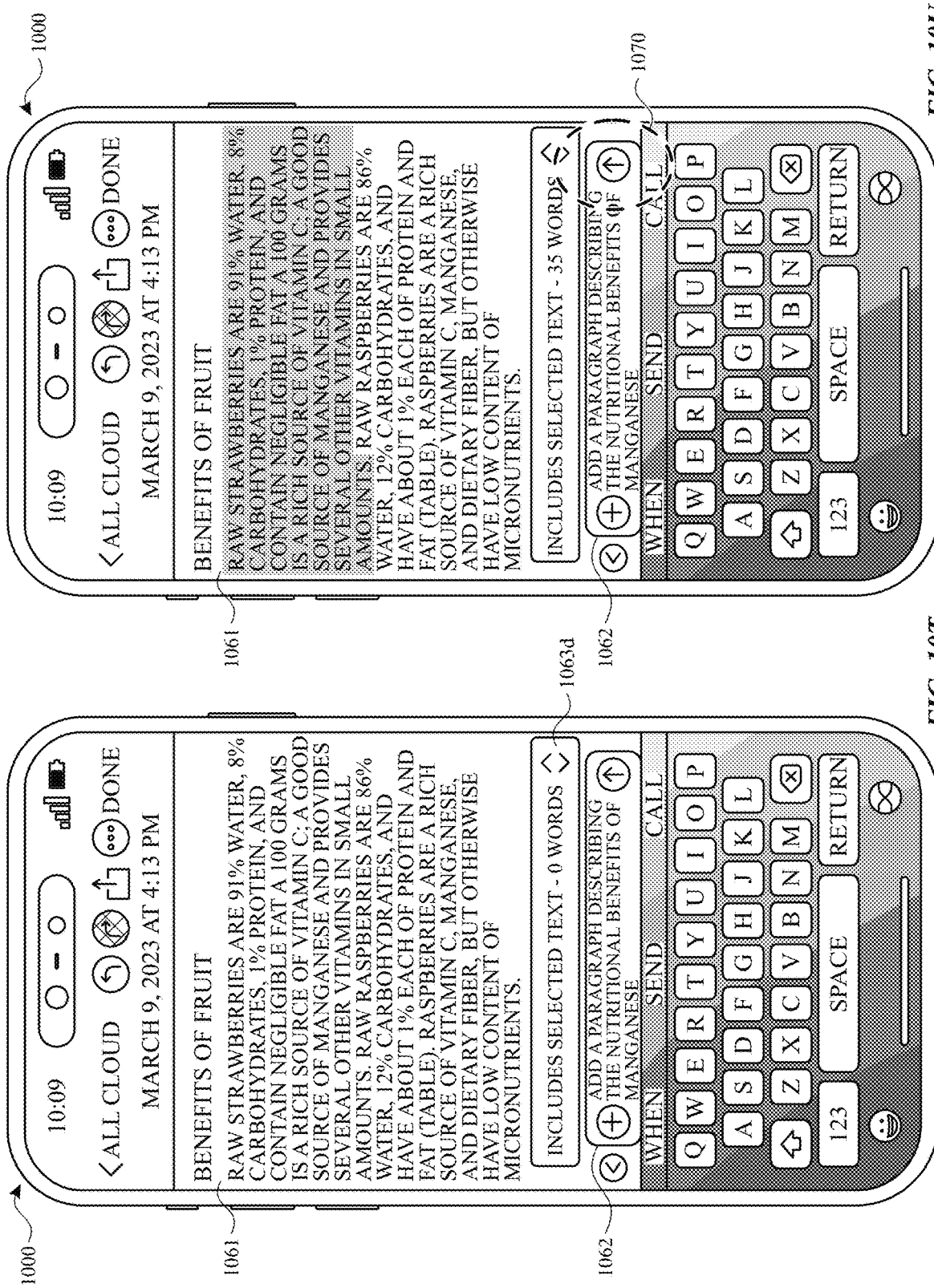

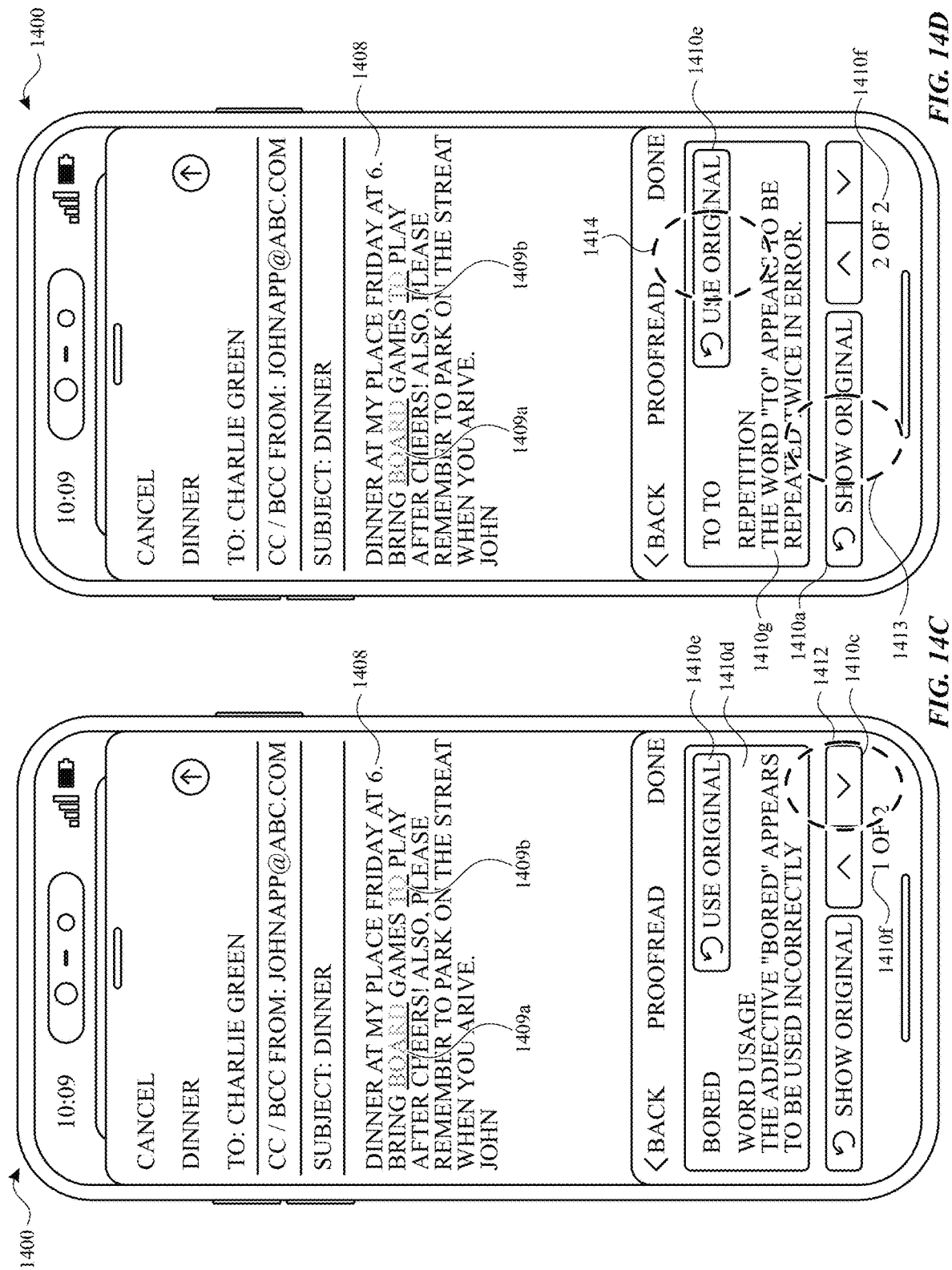

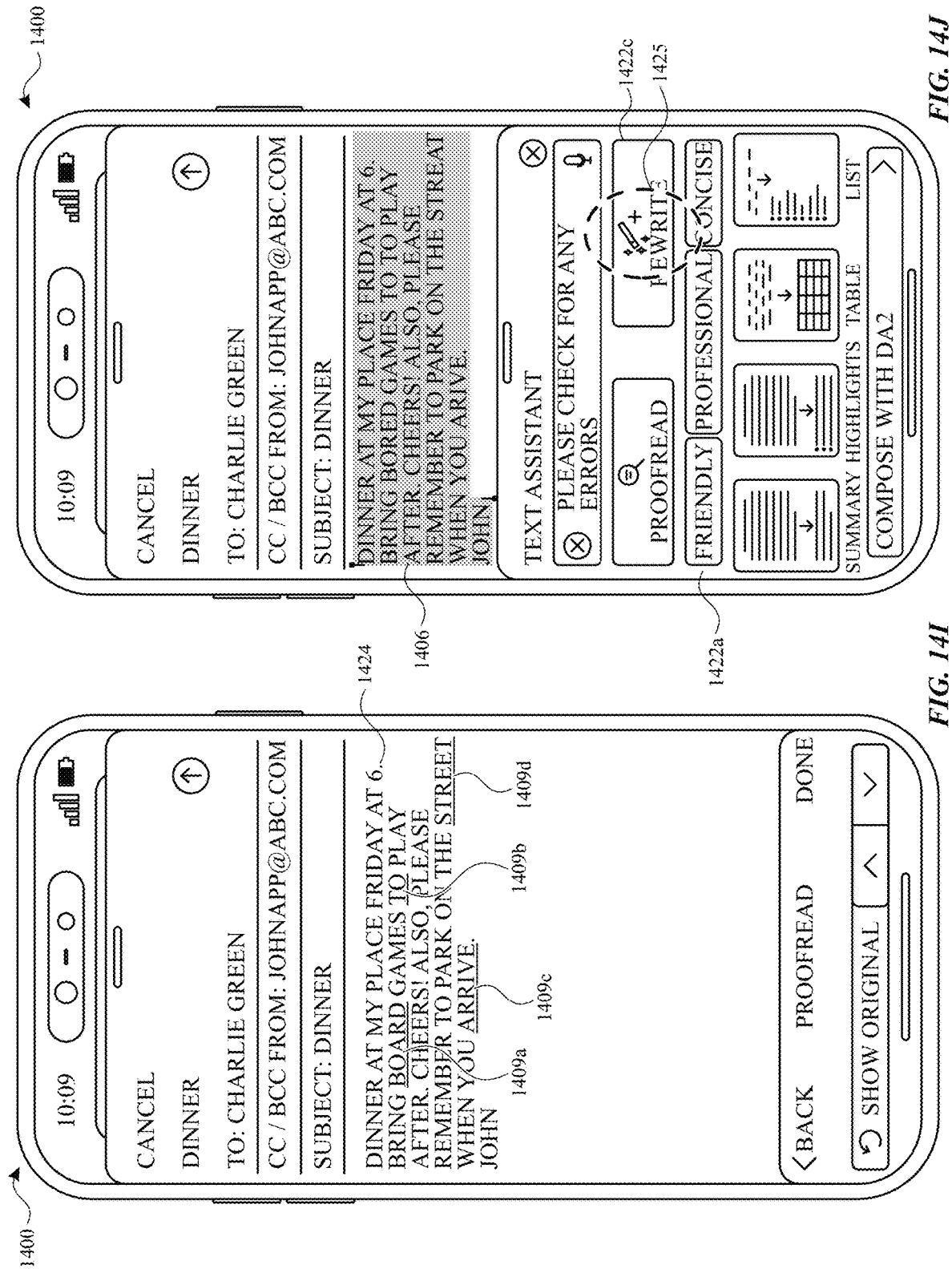

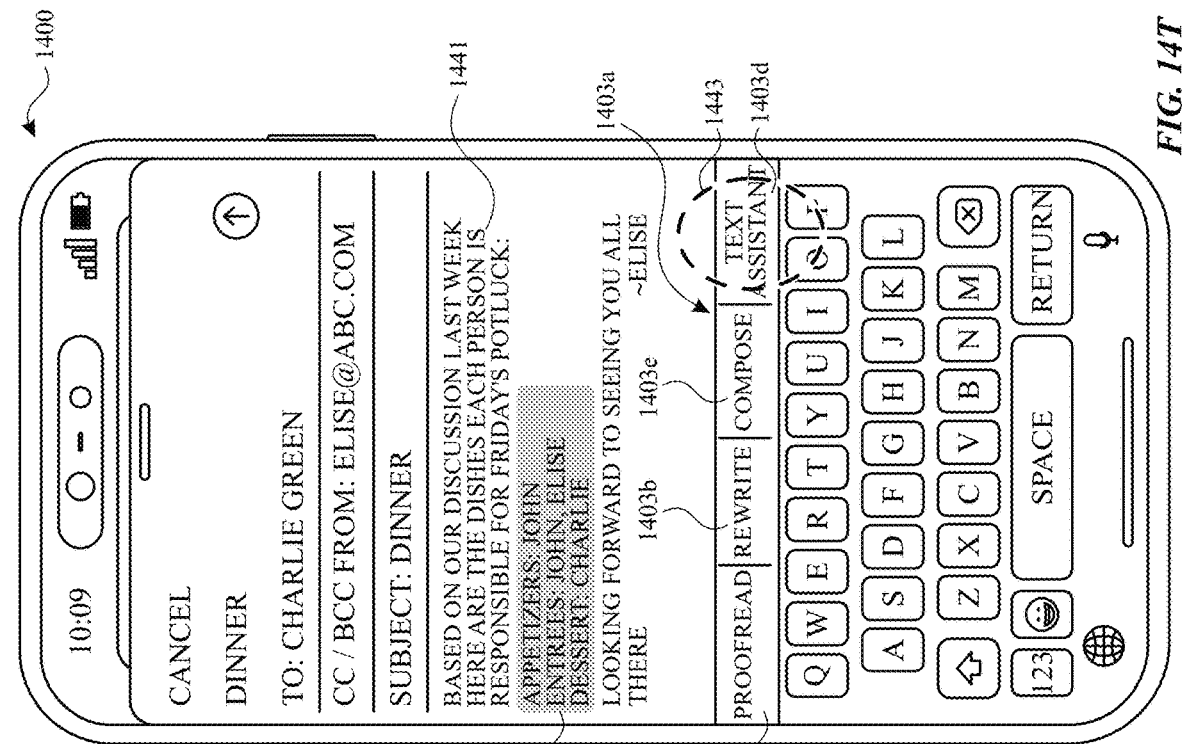
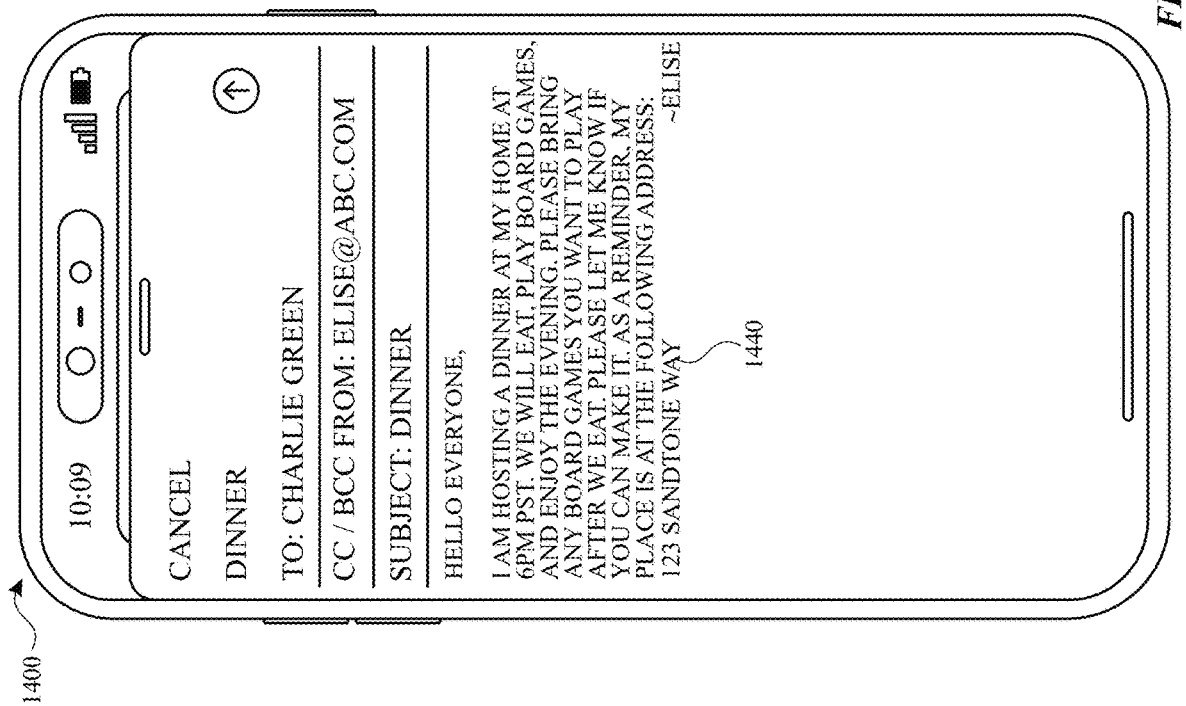
FIG. 14S
FIG. 14T

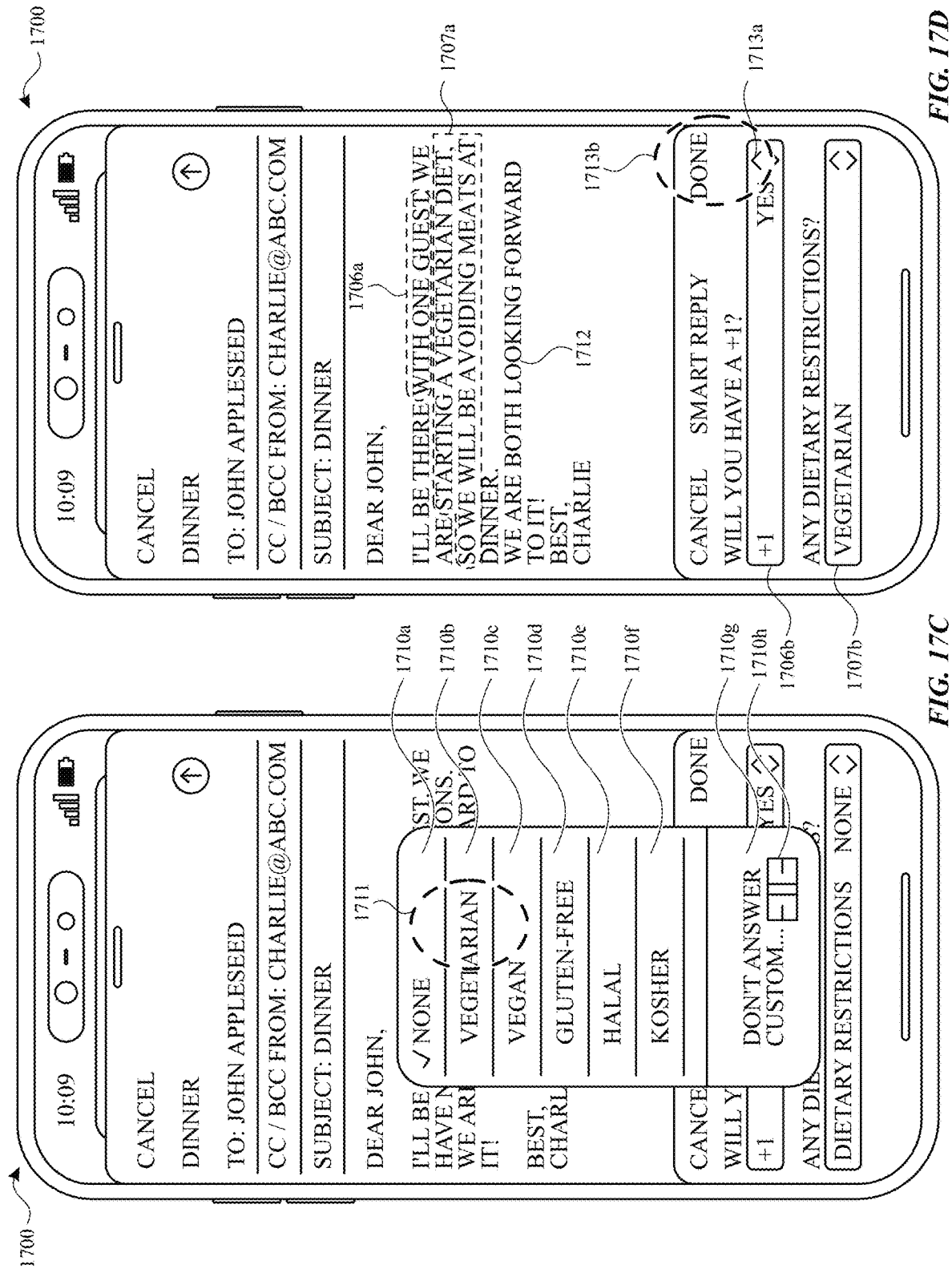

GENERATING OR MODIFYING TEXT USING A DIGITAL ASSISTANT AND/OR LANGUAGE MODEL

CROSS-REFERENCE TO RELATED APPLICATIONS

This application claims priority to (1) U.S. Provisional Patent Application Ser. No. 63/569,088, filed on Mar. 22, 2024, entitled "TECHNIQUES FOR GENERATING OR MODIFYING TEXT USING A DIGITAL ASSISTANT," (2) U.S. Provisional Patent Application Ser. No. 63/631,416, filed on Apr. 8, 2024, entitled "GENERATING OR MODIFYING TEXT USING A DIGITAL ASSISTANT AND/OR LANGUAGE MODEL," (3) U.S. Provisional Patent Application Ser. No. 63/646,720, filed on May 13, 2024, entitled "GENERATING OR MODIFYING TEXT USING A DIGITAL ASSISTANT AND/OR LANGUAGE MODEL," (4) U.S. Provisional Patent Application Ser. No. 63/657,782, filed on Jun. 7, 2024, entitled "GENERATING OR MODIFYING TEXT USING A DIGITAL ASSISTANT AND/OR LANGUAGE MODEL," (5) U.S. Provisional Patent Application Ser. No. 63/671,700, filed on Jul. 15, 2024, entitled "GENERATING OR MODIFYING TEXT USING A DIGITAL ASSISTANT AND/OR LANGUAGE MODEL," and (6) U.S. Provisional Patent Application Ser. No. 63/657,888, filed on Jun. 9, 2024, entitled "SMART REPLIES," all of which are hereby incorporated by reference in their entirety for all purposes.

FIELD

The present disclosure relates generally to computer user interfaces, and more specifically to techniques for generating and/or editing text using a digital assistant and/or language model.

BACKGROUND

The development of digital assistants and language models has grown in recent years. Example language model and digital assistants can recognize inputs and perform tasks based on the input. Example tasks include generating text based on an input (e.g., "write a letter to my grandmother").

BRIEF SUMMARY

Some techniques for generating and/or editing text using a digital assistant and/or language model using computer systems, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, there is a need for computer systems with improved methods and interfaces for generating and/or editing text using a digital assistant and/or a language model. Such methods and interfaces optionally complement or replace conventional methods for generating/editing text using a digital assistant and/or a language model. Such methods and interfaces reduce the number, extent, and/or nature of the inputs from a user by helping the user to understand the connection between provided inputs and device responses to the inputs, thereby creating a more efficient human-machine interface.

Accordingly, the present technique provides electronic devices with faster, more efficient methods and interfaces for generating and/or editing text using a digital assistant and/or a language model. Such methods and interfaces optionally complement or replace other methods for generating and/or editing text. Such methods and interfaces reduce the cognitive burden on a user and produce a more efficient human-machine interface. For battery-operated computing devices, such methods and interfaces conserve power and increase the time between battery charges.

The present technique also includes processes for reduces processing power and memory usage by relying on remote language models to generate and/or edit text (as seen in FIG. 9).

In some embodiments, a method is disclosed. The method comprises: at a computer system that is in communication with a display generation component and one or more input devices: receiving, via the one or more input devices, a first input, wherein the first input corresponds to a request for a language model to generate generated text; and in response to receiving the first input: in accordance with a determination that additional information of a first type is to be included in the generated text, outputting, via the display generation component, a request for additional information without generating the generated text via the language model; and in accordance with a determination that additional information of a second type is to be included in the generated text: generating, via the language model, the generated text, wherein the generated text includes at least one placeholder associated with the additional information of the second type; and displaying, via the display generation component, the generated text with the at least one placeholder.

In some embodiments, a non-transitory computer-readable storage medium is disclosed. The non-transitory computer-readable storage medium stores one or more programs configured to be executed by one or more processors of a computer system that is in communication with a display generation component and one or more input devices, the one or more programs including instructions for: receiving, via the one or more input devices, a first input, wherein the first input corresponds to a request for a language model to generate generated text; and in response to receiving the first input: in accordance with a determination that additional information of a first type is to be included in the generated text, outputting, via the display generation component, a request for additional information without generating the generated text via the language model; and in accordance with a determination that additional information of a second type is to be included in the generated text: generating, via the language model, the generated text, wherein the generated text includes at least one placeholder associated with the additional information of the second type; and displaying, via the display generation component, the generated text with the at least one placeholder.

In some embodiments, a transitory computer-readable storage medium is disclosed. The transitory computer-readable storage medium stores one or more programs configured to be executed by one or more processors of a computer system that is in communication with a display generation component and one or more input devices, the one or more programs including instructions for: receiving, via the one or more input devices, a first input, wherein the first input corresponds to a request for a language model to generate generated text; and in response to receiving the first input: in accordance with a determination that additional information of a first type is to be included in the generated text, outputting, via the display generation component, a request for additional information without generating the generated text via the language model; and in accordance with a determination that additional information of a second type is to be included in the generated text: generating, via the language model, the generated text, wherein the generated text includes at least one placeholder associated with the additional information of the second type; and displaying, via the display generation component, the generated text with the at least one placeholder.

In some embodiments, a computer system is disclosed. The computer system is configured to communication with a display generation component and one or more input devices. The computer system comprises: one or more processors; and memory storing one or more programs configured to be executed by the one or more processors, the one or more programs including instructions for: receiving, via the one or more input devices, a first input, wherein the first input corresponds to a request for a language model to generate generated text; and in response to receiving the first input: in accordance with a determination that additional information of a first type is to be included in the generated text, outputting, via the display generation component, a request for additional information without generating the generated text via the language model; and in accordance with a determination that additional information of a second type is to be included in the generated text: generating, via the language model, the generated text, wherein the generated text includes at least one placeholder associated with the additional information of the second type; and displaying, via the display generation component, the generated text with the at least one placeholder.

In some embodiments, a computer system is disclosed. The computer system is configured to communicate with a display generation component and one or more input devices. The computer system comprises: means for receiving, via the one or more input devices, a first input, wherein the first input corresponds to a request for a language model to generate generated text; and means for in response to receiving the first input: in accordance with a determination that additional information of a first type is to be included in the generated text, outputting, via the display generation component, a request for additional information without generating the generated text via the language model; and in accordance with a determination that additional information of a second type is to be included in the generated text: generating, via the language model, the generated text, wherein the generated text includes at least one placeholder associated with the additional information of the second type; and displaying, via the display generation component, the generated text with the at least one placeholder.

In some embodiments, a computer program product is disclosed. The computer program product comprises one or more programs configured to be executed by one or more processors of a computer system that is in communication with a display generation component and one or more input devices, the one or more programs including instructions for: receiving, via the one or more input devices, a first input, wherein the first input corresponds to a request for a language model to generate generated text; and in response to receiving the first input: in accordance with a determination that additional information of a first type is to be included in the generated text, outputting, via the display generation component, a request for additional information without generating the generated text via the language model; and in accordance with a determination that additional information of a second type is to be included in the generated text: generating, via the language model, the generated text, wherein the generated text includes at least one placeholder associated with the additional information of the second type; and displaying, via the display generation component, the generated text with the at least one placeholder.

In some embodiments, a method is disclosed. The method comprises: at a computer system that is in communication with a display generation component and one or more input devices: receiving, via the one or more input devices, a first request at a first language model installed on the computer system, wherein the first request corresponds to a request for generated text; transmitting the first request to a second language model, wherein the second language model is different from the first language model and is not installed on the computer system; receiving, from the second language model, a request for additional information for generating the generated text; outputting, via the first language model, the request for additional information.

In some embodiments, a non-transitory computer-readable storage medium is disclosed. The non-transitory computer-readable storage medium stores one or more programs configured to be executed by one or more processors of a computer system that is in communication with a display generation component and one or more input devices, the one or more programs including instructions for: receiving, via the one or more input devices, a first request at a first language model installed on the computer system, wherein the first request corresponds to a request for generated text; transmitting the first request to a second language model, wherein the second language model is different from the first language model and is not installed on the computer system; receiving, from the second language model, a request for additional information for generating the generated text; outputting, via the first language model, the request for additional information.

In some embodiments, a transitory computer-readable storage medium is disclosed. The transitory computer-readable storage medium stores one or more programs configured to be executed by one or more processors of a computer system that is in communication with a display generation component and one or more input devices, the one or more programs including instructions for: receiving, via the one or more input devices, a first request at a first language model installed on the computer system, wherein the first request corresponds to a request for generated text; transmitting the first request to a second language model, wherein the second language model is different from the first language model and is not installed on the computer system; receiving, from the second language model, a request for additional information for generating the generated text; outputting, via the first language model, the request for additional information.

In some embodiments, a computer system is disclosed. The computer system is configured to communicate with a display generation component and one or more input devices. The computer system comprises: one or more processors; and memory storing one or more programs configured to be executed by the one or more processors, the one or more programs including instructions for: receiving, via the one or more input devices, a first request at a first language model installed on the computer system, wherein the first request corresponds to a request for generated text; transmitting the first request to a second language model, wherein the second language model is different from the first language model and is not installed on the computer system; receiving, from the second language model, a request for additional information for generating the generated text; outputting, via the first language model, the request for additional information.

In some embodiments, a computer system is disclosed. The computer system is configured to communicate with a display generation component and one or more input devices. The computer system comprises: means for receiving, via the one or more input devices, a first request at a first language model installed on the computer system, wherein the first request corresponds to a request for generated text; means for transmitting the first request to a second language model, wherein the second language model is different from the first language model and is not installed on the computer system; means for receiving, from the second language model, a request for additional information for generating the generated text; and means for outputting, via the first language model, the request for additional information.

In some embodiments, a computer program product is disclosed. The computer program product comprises one or more programs configured to be executed by one or more processors of a computer system that is in communication with a display generation component and one or more input devices, the one or more programs including instructions for: receiving, via the one or more input devices, a first request at a first language model installed on the computer system, wherein the first request corresponds to a request for generated text; transmitting the first request to a second language model, wherein the second language model is different from the first language model and is not installed on the computer system; receiving, from the second language model, a request for additional information for generating the generated text; and outputting, via the first language model, the request for additional information.

In some embodiments, a method is disclosed. The method comprises: at a computer system that is in communication with a display generation component and one or more input devices: receiving a first input, via the one or more input devices; in accordance with a determination that the first input is a first type of input, displaying, via the display generation component, a first user interface that includes a first user interface object and a second user interface object, wherein: the first user interface object corresponds to a request to perform a first function, wherein performing the first function includes correcting a plurality of textual errors in a first text; the second user interface object corresponds to a request to perform a second function, wherein performing the second function includes generating a second text; and in accordance with a determination that the first input is a second type of input, displaying, via the display generation component, a second user interface that includes a third user interface object, a fourth user interface object, and a fifth user interface object, wherein: the third user interface object corresponds to a request to perform the first function; the fourth user interface object corresponds to a request to perform the second function; the fifth user interface object corresponds to a request to perform a third function, wherein: the third function is different from the first function and the second function; performing the third function includes generating a third text based on a first parameter; and the first user interface does not include a user interface object that corresponds to the third function.

In some embodiments, a non-transitory computer-readable storage medium is disclosed. The non-transitory computer-readable storage medium stores one or more programs configured to be executed by one or more processors of a computer system that is in communication with a display generation component and one or more input devices, the one or more programs including instructions for: receiving a first input, via the one or more input devices; in accordance with a determination that the first input is a first type of input, displaying, via the display generation component, a first user interface that includes a first user interface object and a second user interface object, wherein: the first user interface object corresponds to a request to perform a first function, wherein performing the first function includes correcting a plurality of textual errors in a first text; the second user interface object corresponds to a request to perform a second function, wherein performing the second function includes generating a second text; and in accordance with a determination that the first input is a second type of input, displaying, via the display generation component, a second user interface that includes a third user interface object, a fourth user interface object, and a fifth user interface object, wherein: the third user interface object corresponds to a request to perform the first function; the fourth user interface object corresponds to a request to perform the second function; the fifth user interface object corresponds to a request to perform a third function, wherein: the third function is different from the first function and the second function; performing the third function includes generating a third text based on a first parameter; and the first user interface does not include a user interface object that corresponds to the third function.

In some embodiments, a transitory computer-readable storage medium is disclosed. The non-transitory computer-readable storage medium stores one or more programs configured to be executed by one or more processors of a computer system that is in communication with a display generation component and one or more input devices, the one or more programs including instructions for: receiving a first input, via the one or more input devices; in accordance with a determination that the first input is a first type of input, displaying, via the display generation component, a first user interface that includes a first user interface object and a second user interface object, wherein: the first user interface object corresponds to a request to perform a first function, wherein performing the first function includes correcting a plurality of textual errors in a first text; the second user interface object corresponds to a request to perform a second function, wherein performing the second function includes generating a second text; and in accordance with a determination that the first input is a second type of input, displaying, via the display generation component, a second user interface that includes a third user interface object, a fourth user interface object, and a fifth user interface object, wherein: the third user interface object corresponds to a request to perform the first function; the fourth user interface object corresponds to a request to perform the second function; the fifth user interface object corresponds to a request to perform a third function, wherein: the third function is different from the first function and the second function; performing the third function includes generating a third text based on a first parameter; and the first user interface does not include a user interface object that corresponds to the third function.

In some embodiments, a computer system is disclosed. The computer system is configured to communicate with a display generation component and one or more input devices. The computer system comprises: one or more processors; and memory storing one or more programs configured to be executed by the one or more processors, the one or more programs including instructions for: receiving a first input, via the one or more input devices; in accordance with a determination that the first input is a first type of input, displaying, via the display generation component, a first user interface that includes a first user interface object and a second user interface object, wherein: the first user interface object corresponds to a request to perform a first function, wherein performing the first function includes correcting a plurality of textual errors in a first text; the second user interface object corresponds to a request to perform a second function, wherein performing the second function includes generating a second text; and in accordance with a determination that the first input is a second type of input, displaying, via the display generation component, a second user interface that includes a third user interface object, a fourth user interface object, and a fifth user interface object, wherein: the third user interface object corresponds to a request to perform the first function; the fourth user interface object corresponds to a request to perform the second function; the fifth user interface object corresponds to a request to perform a third function, wherein: the third function is different from the first function and the second function; performing the third function includes generating a third text based on a first parameter; and the first user interface does not include a user interface object that corresponds to the third function.

In some embodiments, a computer system is disclosed. The computer system is configured to communicate with a display generation component and one or more input devices. The computer system comprises: means for receiving a first input, via the one or more input devices; means for in accordance with a determination that the first input is a first type of input, displaying, via the display generation component, a first user interface that includes a first user interface object and a second user interface object, wherein: the first user interface object corresponds to a request to perform a first function, wherein performing the first function includes correcting a plurality of textual errors in a first text; the second user interface object corresponds to a request to perform a second function, wherein performing the second function includes generating a second text; and means for in accordance with a determination that the first input is a second type of input, displaying, via the display generation component, a second user interface that includes a third user interface object, a fourth user interface object, and a fifth user interface object, wherein: the third user interface object corresponds to a request to perform the first function; the fourth user interface object corresponds to a request to perform the second function; the fifth user interface object corresponds to a request to perform a third function, wherein: the third function is different from the first function and the second function; performing the third function includes generating a third text based on a first parameter; and the first user interface does not include a user interface object that corresponds to the third function.

In some embodiments, a computer program product is disclosed. The computer program product comprises one or more programs configured to be executed by one or more processors of a computer system that is in communication with a display generation component and one or more input devices, the one or more programs including instructions for: receiving a first input, via the one or more input devices; in accordance with a determination that the first input is a first type of input, displaying, via the display generation component, a first user interface that includes a first user interface object and a second user interface object, wherein: the first user interface object corresponds to a request to perform a first function, wherein performing the first function includes correcting a plurality of textual errors in a first text; the second user interface object corresponds to a request to perform a second function, wherein performing the second function includes generating a second text; and in accordance with a determination that the first input is a second type of input, displaying, via the display generation component, a second user interface that includes a third user interface object, a fourth user interface object, and a fifth user interface object, wherein: the third user interface object corresponds to a request to perform the first function; the fourth user interface object corresponds to a request to perform the second function; the fifth user interface object corresponds to a request to perform a third function, wherein: the third function is different from the first function and the second function; performing the third function includes generating a third text based on a first parameter; and the first user interface does not include a user interface object that corresponds to the third function.

In some embodiments, a method is disclosed. The method comprises: at a computer system that is in communication with a display generation component and one or more input devices: displaying, via the display generation component, a first text; receiving a first input, via the one or more input devices, wherein the first input corresponds to a request to correct a plurality of textual errors in the first text, wherein the plurality of textual errors includes a first textual error and a second textual error; and in response to the first input, updating the first text, wherein updating the first text includes: correcting the plurality of textual errors, wherein correcting the plurality of textual errors includes: correcting the first textual error with a first correction; correcting the second textual error with a second correction; marking the first correction in the first text; and marking the second correction in the first text.

In some embodiments, a non-transitory computer-readable storage medium is disclosed. The non-transitory computer-readable storage medium stores one or more programs configured to be executed by one or more processors of a computer system that is in communication with a display generation component and one or more input devices, the one or more programs including instructions for: displaying, via the display generation component, a first text; receiving a first input, via the one or more input devices, wherein the first input corresponds to a request to correct a plurality of textual errors in the first text, wherein the plurality of textual errors includes a first textual error and a second textual error; and in response to the first input, updating the first text, wherein updating the first text includes: correcting the plurality of textual errors, wherein correcting the plurality of textual errors includes: correcting the first textual error with a first correction; correcting the second textual error with a second correction; marking the first correction in the first text; and marking the second correction in the first text.

In some embodiments, a transitory computer readable storage medium is disclosed. The transitory computer-readable storage medium stores one or more programs configured to be executed by one or more processors of a computer system that is in communication with a display generation component and one or more input devices, the one or more programs including instructions for: displaying, via the display generation component, a first text; receiving a first input, via the one or more input devices, wherein the first input corresponds to a request to correct a plurality of textual errors in the first text, wherein the plurality of textual errors includes a first textual error and a second textual error; and in response to the first input, updating the first text, wherein updating the first text includes: correcting the plurality of textual errors, wherein correcting the plurality of textual errors includes: correcting the first textual error with a first correction; correcting the second textual error with a second correction; marking the first correction in the first text; and marking the second correction in the first text.

In some embodiments, a computer system is disclosed. The computer system is configured to communicate with a display generation component and one or more input devices. The computer system comprises: one or more processors; and memory storing one or more programs configured to be executed by the one or more processors, the one or more programs including instructions for: displaying, via the display generation component, a first text; receiving a first input, via the one or more input devices, wherein the first input corresponds to a request to correct a plurality of textual errors in the first text, wherein the plurality of textual errors includes a first textual error and a second textual error; and in response to the first input, updating the first text, wherein updating the first text includes: correcting the plurality of textual errors, wherein correcting the plurality of textual errors includes: correcting the first textual error with a first correction; correcting the second textual error with a second correction; marking the first correction in the first text; and marking the second correction in the first text.

In some embodiments, a computer system is disclosed. The computer system is configured to communicate with a display generation component and one or more input devices. The computer system comprises: means for displaying, via the display generation component, a first text; means for receiving a first input, via the one or more input devices, wherein the first input corresponds to a request to correct a plurality of textual errors in the first text, wherein the plurality of textual errors includes a first textual error and a second textual error; and means for in response to the first input, updating the first text, wherein updating the first text includes: means for correcting the plurality of textual errors, wherein correcting the plurality of textual errors includes: correcting the first textual error with a first correction; correcting the second textual error with a second correction; marking the first correction in the first text; and marking the second correction in the first text.

In some embodiments, a computer program product is disclosed. The computer program product comprises: one or more programs configured to be executed by one or more processors of a computer system that is in communication with a display generation component and one or more input devices, the one or more programs including instructions for: displaying, via the display generation component, a first text; receiving a first input, via the one or more input devices, wherein the first input corresponds to a request to correct a plurality of textual errors in the first text, wherein the plurality of textual errors includes a first textual error and a second textual error; and in response to the first input, updating the first text, wherein updating the first text includes: correcting the plurality of textual errors, wherein correcting the plurality of textual errors includes: correcting the first textual error with a first correction; correcting the second textual error with a second correction; marking the first correction in the first text; and marking the second correction in the first text.

In some embodiments, a method is disclosed. The method comprises: at a computer system that is in communication with a display generation component and one or more input devices: receiving an incoming communication; receiving a first input, via the one or more input devices, wherein the first input corresponds to a request to display a first generated text based on the incoming communication; in response to receiving the first input, displaying, via the display generation component, the first generated text concurrently with a first user interface object, wherein the first generated text includes a first generated element and wherein the first user interface object corresponds to the first generated element; receiving a first set of one or more inputs, via the one or more input devices, wherein first set of one or more inputs includes a second input that corresponds to the first user interface object and wherein the first set of one or more inputs provides a first parameter for updating the first generated element; and in response to receiving the first set of one or more inputs, updating the first generated element in the first generated text with an updated first generated element, wherein the updated first generated element is based on at least the first parameter.

In some embodiments, a non-transitory computer-readable storage medium is disclosed. The non-transitory computer-readable storage medium stores one or more programs configured to be executed by one or more processors of a computer system that is in communication with a display generation component and one or more input devices, the one or more programs including instructions for: receiving an incoming communication; receiving a first input, via the one or more input devices, wherein the first input corresponds to a request to display a first generated text based on the incoming communication; in response to receiving the first input, displaying, via the display generation component, the first generated text concurrently with a first user interface object, wherein the first generated text includes a first generated element and wherein the first user interface object corresponds to the first generated element; receiving a first set of one or more inputs, via the one or more input devices, wherein first set of one or more inputs includes a second input that corresponds to the first user interface object and wherein the first set of one or more inputs provides a first parameter for updating the first generated element; and in response to receiving the first set of one or more inputs, updating the first generated element in the first generated text with an updated first generated element, wherein the updated first generated element is based on at least the first parameter.

In some embodiments, a transitory computer-readable storage medium is disclosed. The transitory computer-readable storage medium stores one or more programs configured to be executed by one or more processors of a computer system that is in communication with a display generation component and one or more input devices, the one or more programs including instructions for: receiving an incoming communication; receiving a first input, via the one or more input devices, wherein the first input corresponds to a request to display a first generated text based on the incoming communication; in response to receiving the first input, displaying, via the display generation component, the first generated text concurrently with a first user interface object, wherein the first generated text includes a first generated element and wherein the first user interface object corresponds to the first generated element; receiving a first set of one or more inputs, via the one or more input devices, wherein first set of one or more inputs includes a second input that corresponds to the first user interface object and wherein the first set of one or more inputs provides a first parameter for updating the first generated element; and in response to receiving the first set of one or more inputs, updating the first generated element in the first generated text with an updated first generated element, wherein the updated first generated element is based on at least the first parameter.

In some embodiments, a computer system is disclosed. The computer system is configured to communicate with a display generation component and one or more input devices. The computer system comprises: one or more processors; and memory storing one or more programs configured to be executed by the one or more processors, the one or more programs including instructions for: receiving an incoming communication; receiving a first input, via the one or more input devices, wherein the first input corresponds to a request to display a first generated text based on the incoming communication; in response to receiving the first input, displaying, via the display generation component, the first generated text concurrently with a first user interface object, wherein the first generated text includes a first generated element and wherein the first user interface object corresponds to the first generated element; receiving a first set of one or more inputs, via the one or more input devices, wherein first set of one or more inputs includes a second input that corresponds to the first user interface object and wherein the first set of one or more inputs provides a first parameter for updating the first generated element; and in response to receiving the first set of one or more inputs, updating the first generated element in the first generated text with an updated first generated element, wherein the updated first generated element is based on at least the first parameter.

In some embodiments, a computer system is disclosed. The computer system is configured to communicate with a display generation component and one or more input devices. The computer system comprises: one or more processors; and memory storing one or more programs configured to be executed by the one or more processors, the one or more programs including instructions for: means for receiving an incoming communication; means for receiving a first input, via the one or more input devices, wherein the first input corresponds to a request to display a first generated text based on the incoming communication; means for in response to receiving the first input, displaying, via the display generation component, the first generated text concurrently with a first user interface object, wherein the first generated text includes a first generated element and wherein the first user interface object corresponds to the first generated element; means for receiving a first set of one or more inputs, via the one or more input devices, wherein first set of one or more inputs includes a second input that corresponds to the first user interface object and wherein the first set of one or more inputs provides a first parameter for updating the first generated element; and means for in response to receiving the first set of one or more inputs, updating the first generated element in the first generated text with an updated first generated element, wherein the updated first generated element is based on at least the first parameter.

In some embodiments, a computer program product is disclosed. The computer program product comprises: receiving an incoming communication; receiving a first input, via the one or more input devices, wherein the first input corresponds to a request to display a first generated text based on the incoming communication; in response to receiving the first input, displaying, via the display generation component, the first generated text concurrently with a first user interface object, wherein the first generated text includes a first generated element and wherein the first user interface object corresponds to the first generated element; receiving a first set of one or more inputs, via the one or more input devices, wherein first set of one or more inputs includes a second input that corresponds to the first user interface object and wherein the first set of one or more inputs provides a first parameter for updating the first generated element; and in response to receiving the first set of one or more inputs, updating the first generated element in the first generated text with an updated first generated element, wherein the updated first generated element is based on at least the first parameter.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for generating and/or editing text using a digital assistant and/or a language model, thereby increasing the effectiveness, efficiency, and user satisfaction with such devices. Such methods and interfaces may complement or replace other methods for generating and/or editing text.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 17A-17E illustrate exemplary user interfaces for generating text based on an incoming communication using a digital assistant and/or a language model, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for computer systems that provide efficient methods and interfaces for generating and/or editing text. For example, a user may have to provide multiple key strokes and inputs to write a letter to their grandmother, which would be cumbersome. Such techniques can reduce the cognitive burden on a user who generates and/or edits text, thereby enhancing productivity. Further, such techniques can reduce processor and battery power otherwise wasted on redundant user inputs.

Figure 11:
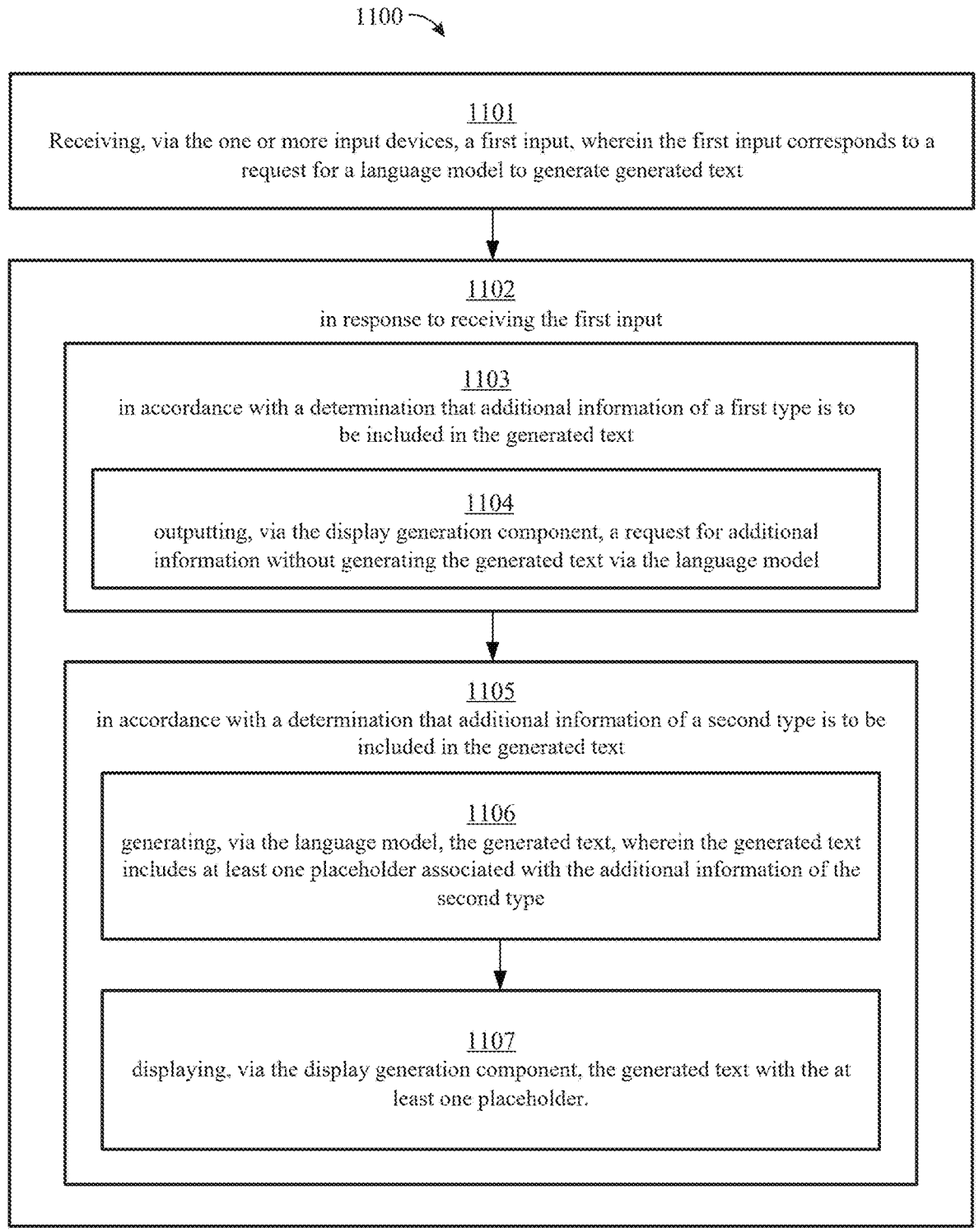
FIG. 11 is a flow diagram illustrating a method for generating or editing text using a digital assistant and/or a language model, in accordance with some embodiments.
Figure 12A:
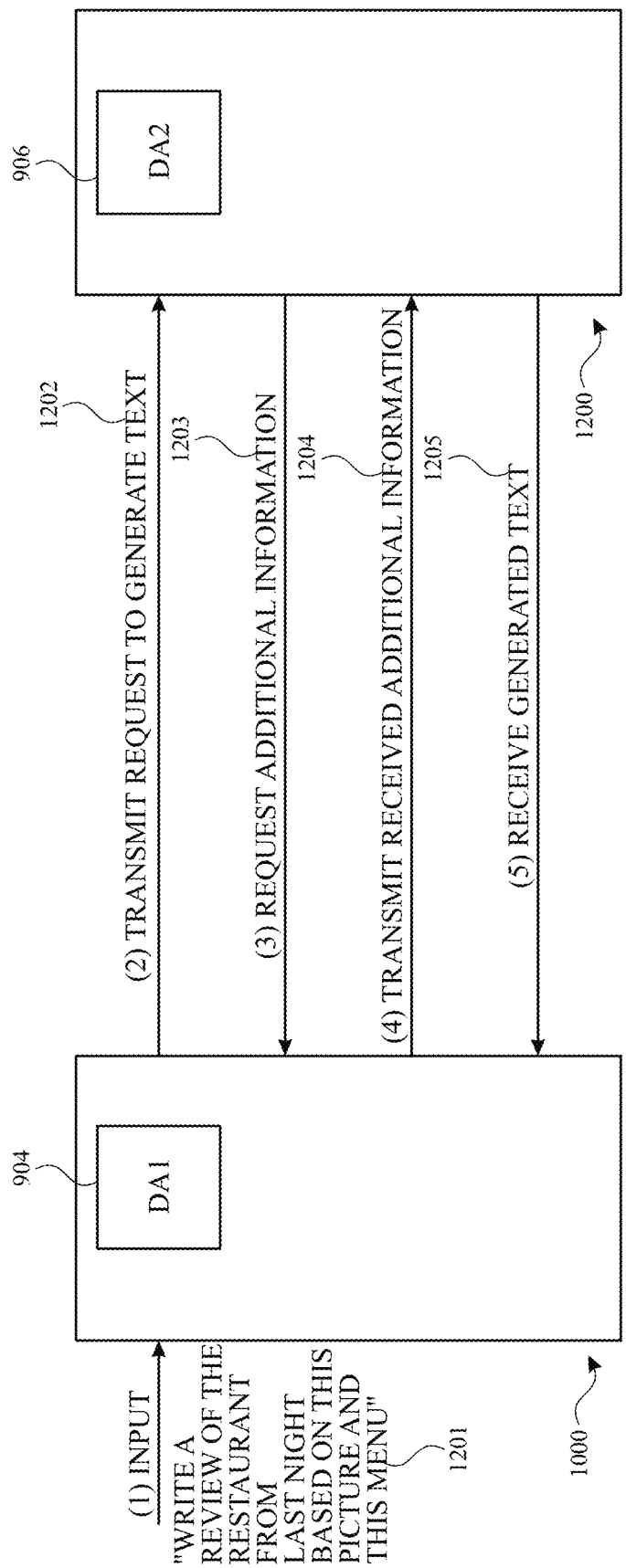
FIGS. 12A-12B illustrates a system for generating text using a digital assistant and/or a language model, in accordance with some embodiments.
Figure 12B:
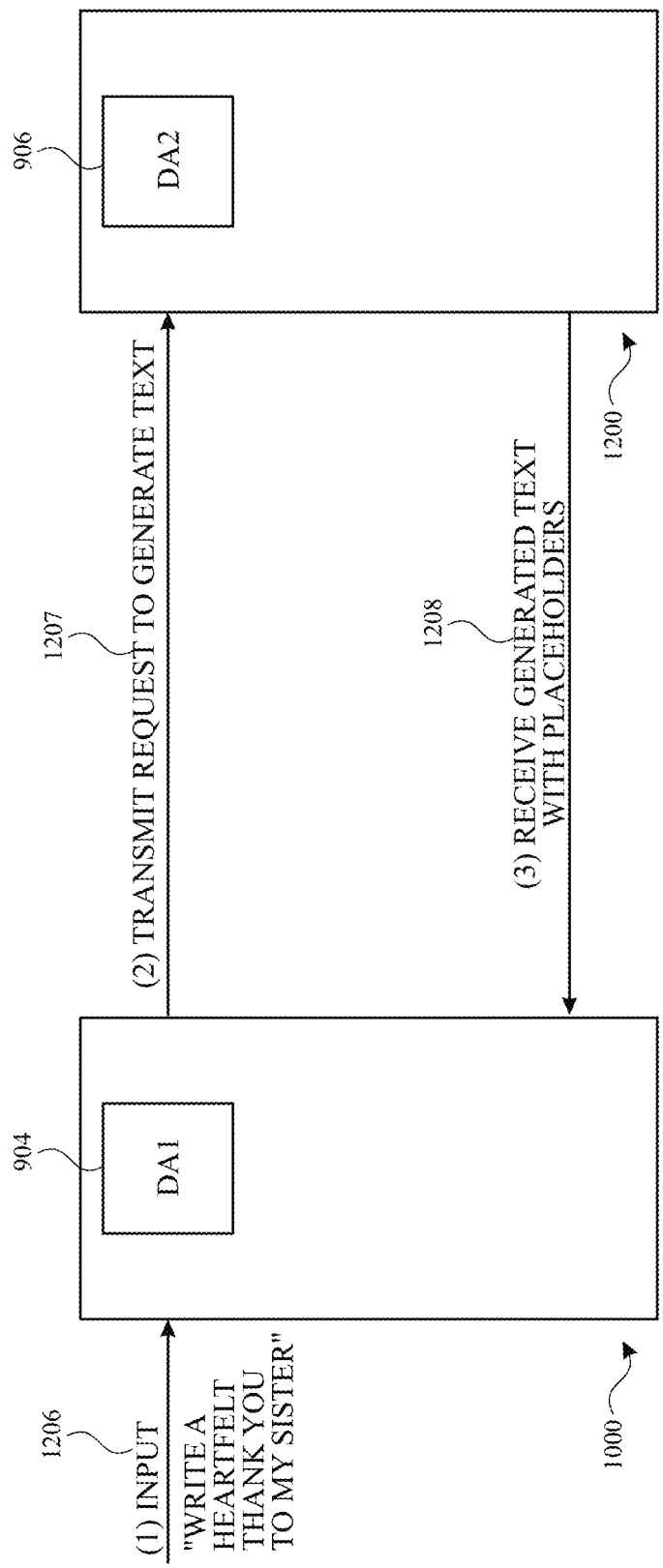
Figure 13:
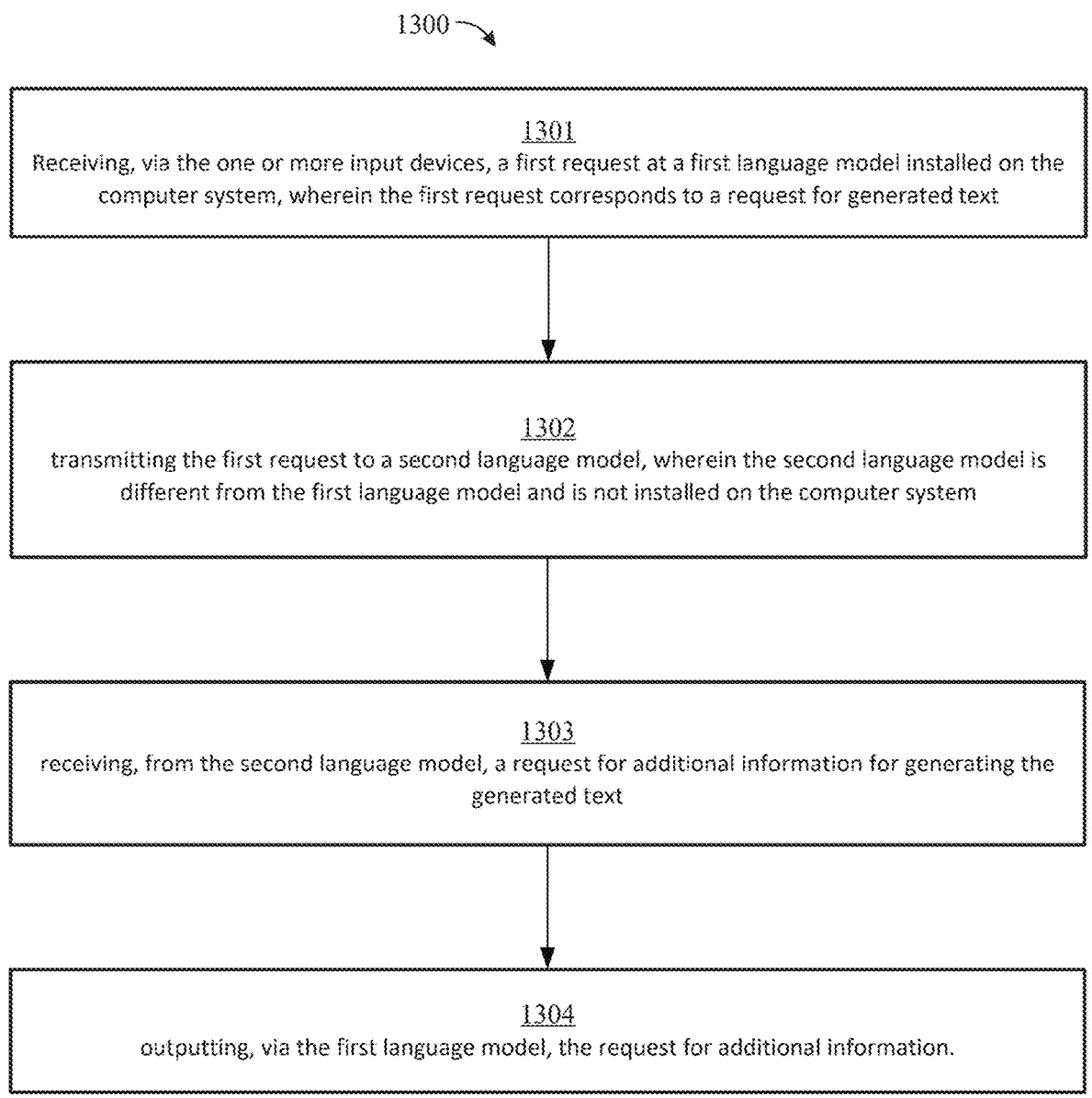
FIG. 13 is a flow diagram of an exemplary method 1300 for generating text using a digital assistant and/or a language model, in accordance with some embodiments.
Figure 14B:
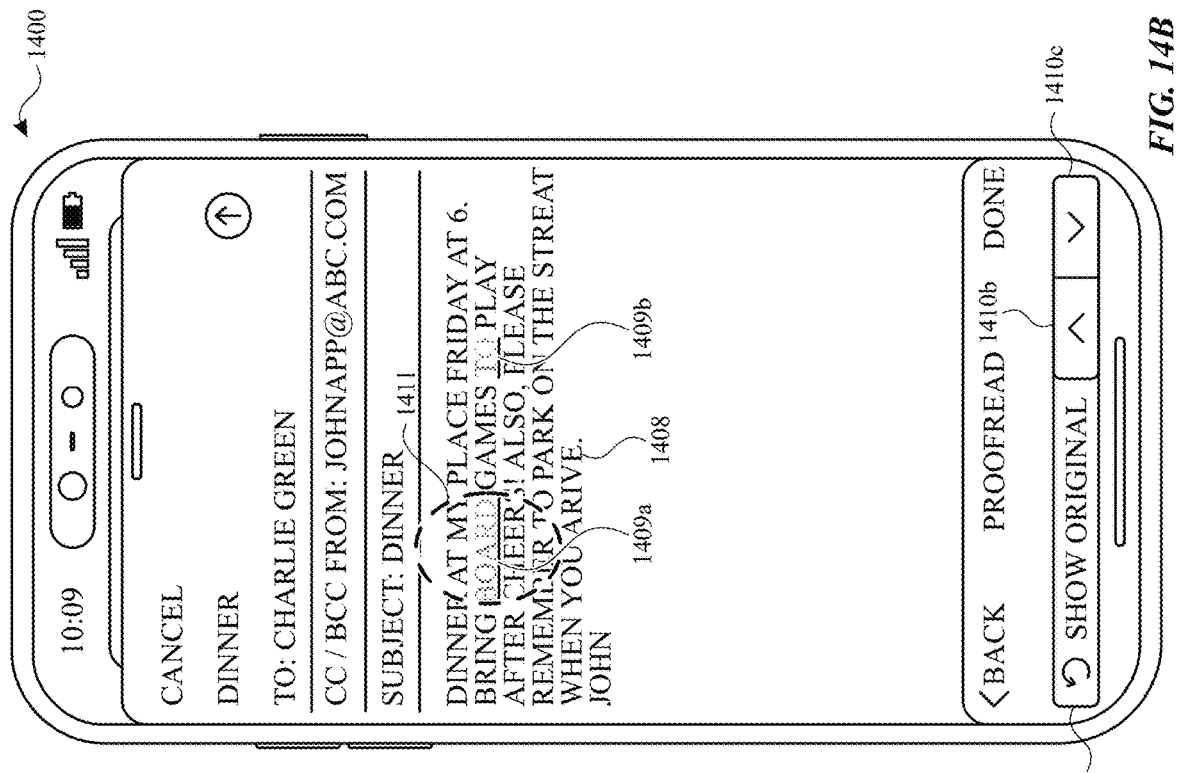
FIGS. 14A-14V illustrate exemplary user interfaces for generating and/or editing text using a digital assistant and/or a language model, in accordance with some embodiments.
Figure 14A:
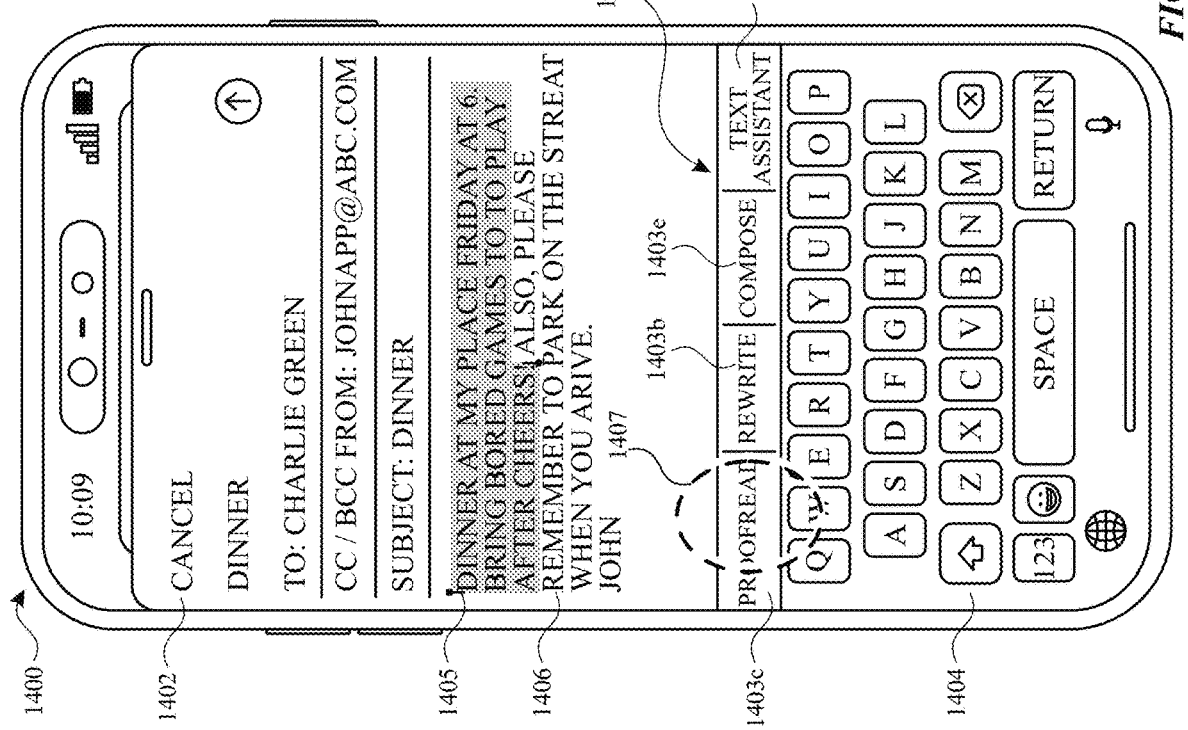
Figure 14F:
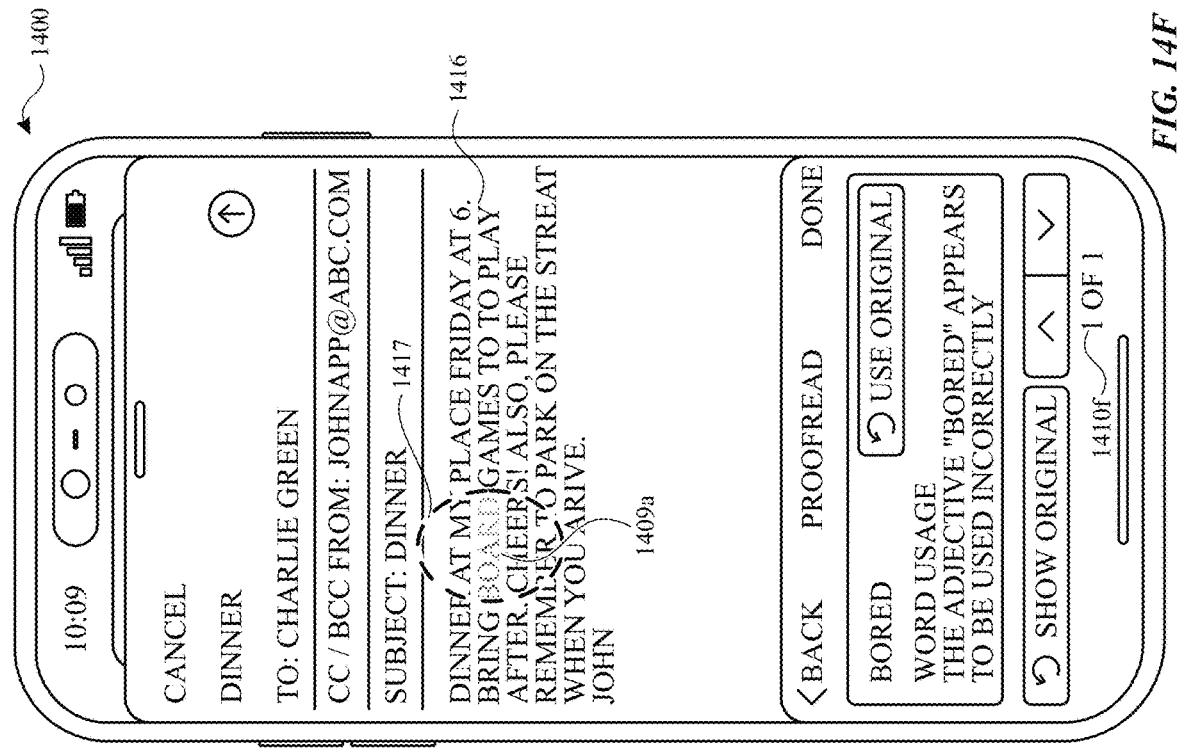

Below, FIGS. 1A-1B, 2, 3A-3G, 4A-4B, and 5A-5B provide a description of exemplary devices for performing the techniques for managing event notifications. FIGS. 6, 7A-7C, and 8 describe exemplary systems for implementing a digital assistant and/or language model. FIG. 9 illustrates system 900 for generating or editing text using a digital assistant and/or a language model, in accordance with some embodiments. The user interfaces in FIGS. 10A-10V are used to illustrate the processes described below, including the processes in FIGS. 11, 12A-12B, and 13. FIGS. 12A-12B illustrates a system for generating text using a digital assistant and/or a language model, in accordance with some embodiments. The user interfaces in FIGS. 14A-14V are used to illustrate the processes described below, including the processes in FIGS. 15-16. The user interfaces in FIG. 17 are used to illustrate the processes described below, including the processes in FIG. 18.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, preserving user's privacy and security of the user's data, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including,"

"comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
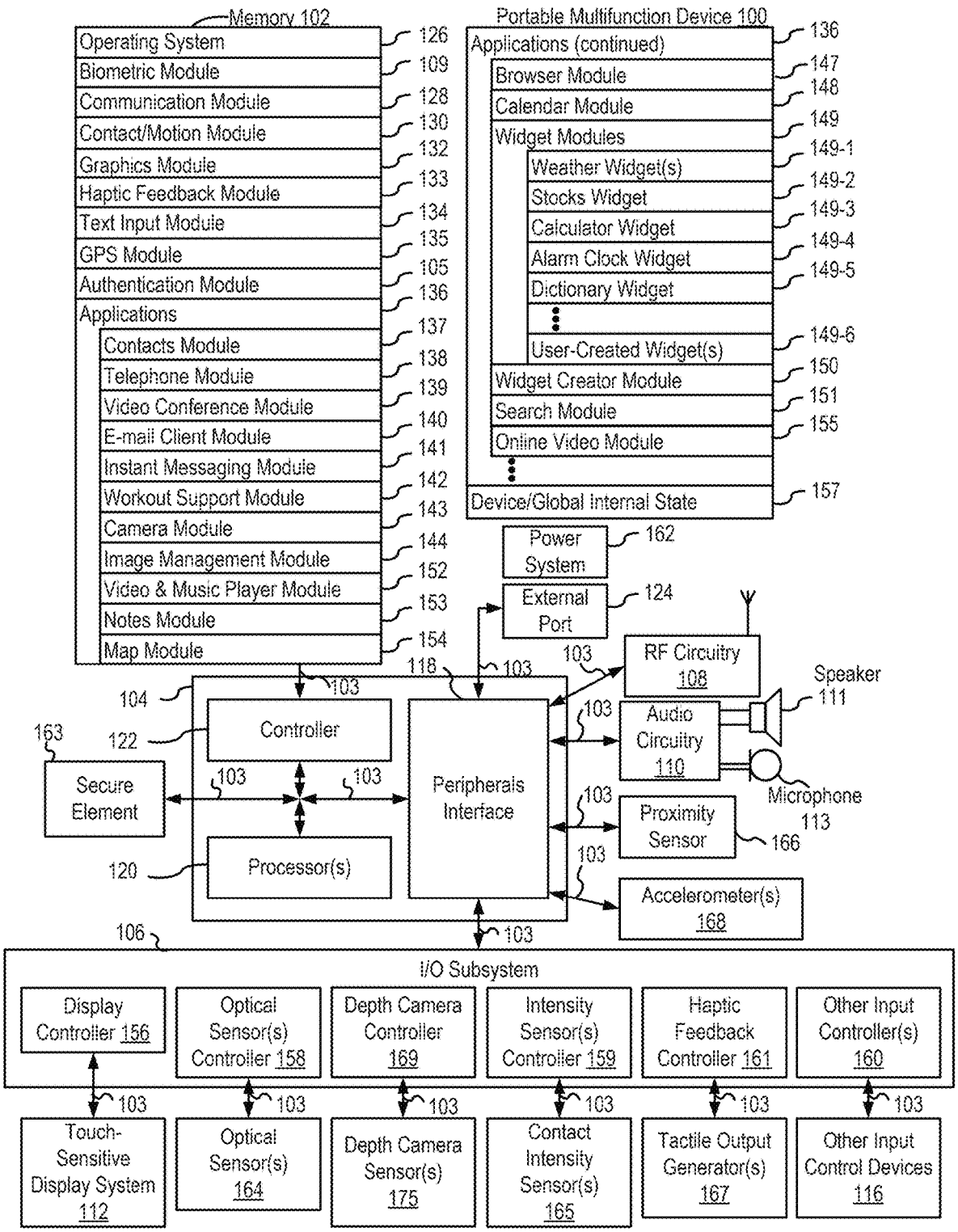
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,1032 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/1003,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 200501100059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3A:
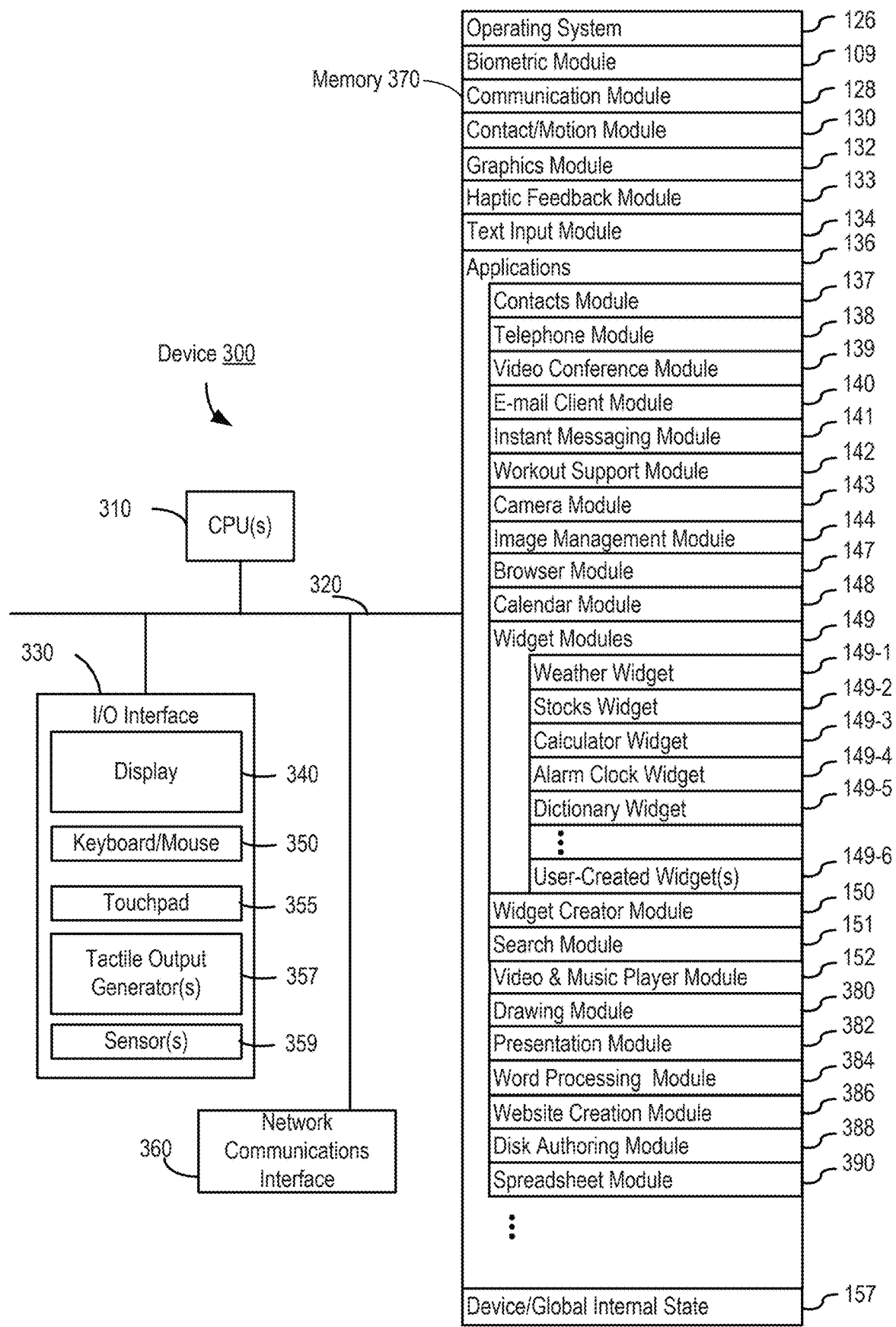
FIG. 3A is a block diagram of an exemplary multifunction device with a display and a touch-sensitive surface in accordance with some embodiments.

In some embodiments, the software components stored in memory 102 include operating system 126, biometric module 109, communication module (or set of instructions) 128, contact/motion module (or set of instructions) 130, graphics module (or set of instructions) 132, text input module (or set of instructions) 134, Global Positioning System (GPS) module (or set of instructions) 135, authentication module 105, and applications (or sets of instructions) 136. Furthermore, in some embodiments, memory 102 (FIG. 1A) or 370 (FIG. 3A) stores device/global internal state 157, as shown in FIGS. 1A and 3A. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Biometric module 109 optionally stores information about one or more enrolled biometric features (e.g., fingerprint feature information, facial recognition feature information, eye and/or iris feature information) for use to verify whether received biometric information matches the enrolled biometric features. In some embodiments, the information stored about the one or more enrolled biometric features includes data that enables the comparison between the stored information and received biometric information without including enough information to reproduce the enrolled biometric features. In some embodiments, biometric module 109 stores the information about the enrolled biometric features in association with a user account of device 100. In some embodiments, biometric module 109 compares the received biometric information to an enrolled biometric feature to determine whether the received biometric information matches the enrolled biometric feature.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Authentication module 105 determines whether a requested operation (e.g., requested by an application of applications 136) is authorized to be performed. In some embodiments, authentication module 105 receives for an operation to be perform that optionally requires authentication. Authentication module 105 determines whether the operation is authorized to be performed, such as based on a series of factors, including the lock status of device 100, the location of device 100, whether a security delay has elapsed, whether received biometric information matches enrolled biometric features, and/or other factors. Once authentication module 105 determines that the operation is authorized to be performed, authentication module 105 triggers performance of the operation.

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/1036,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
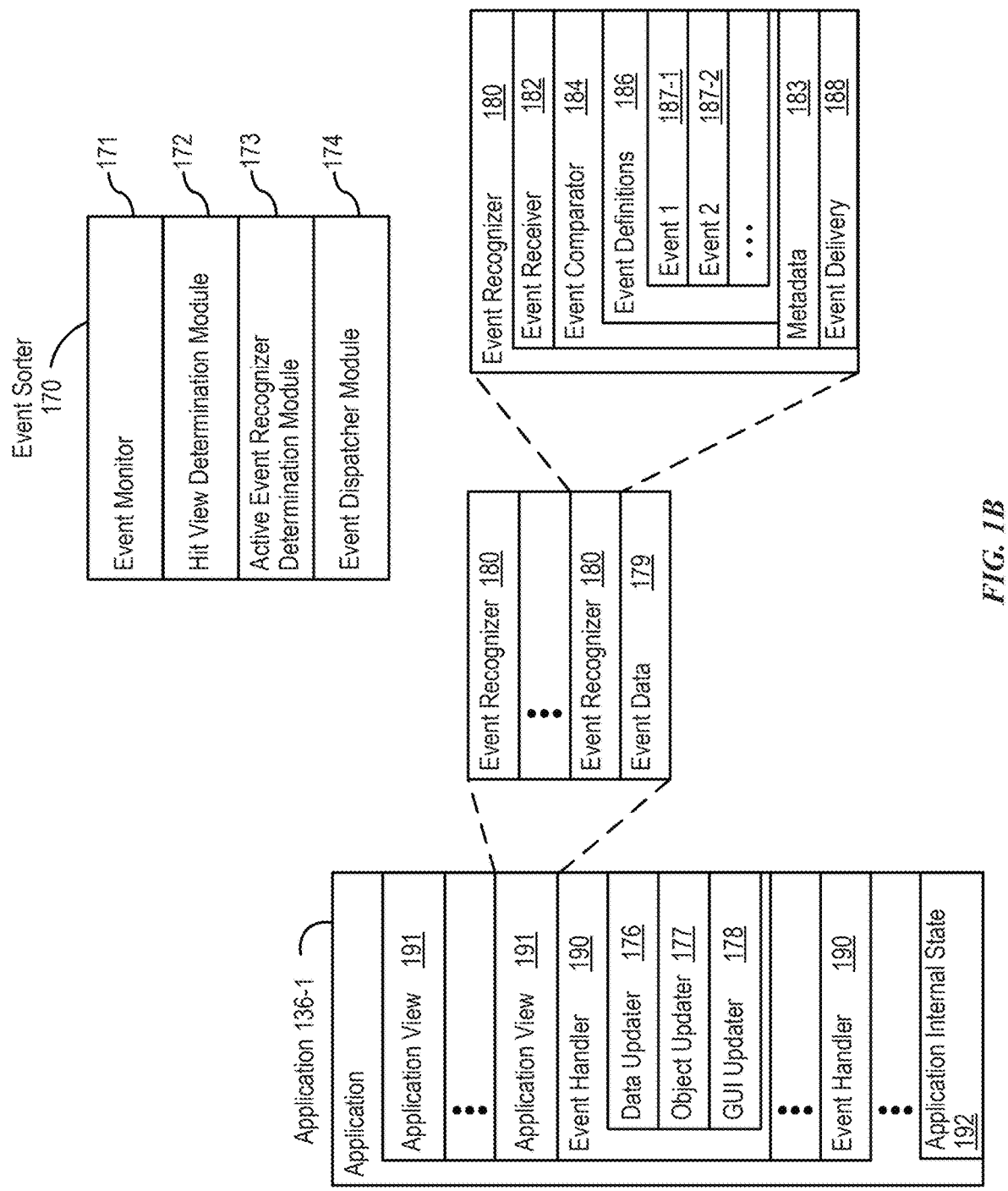
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3A) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
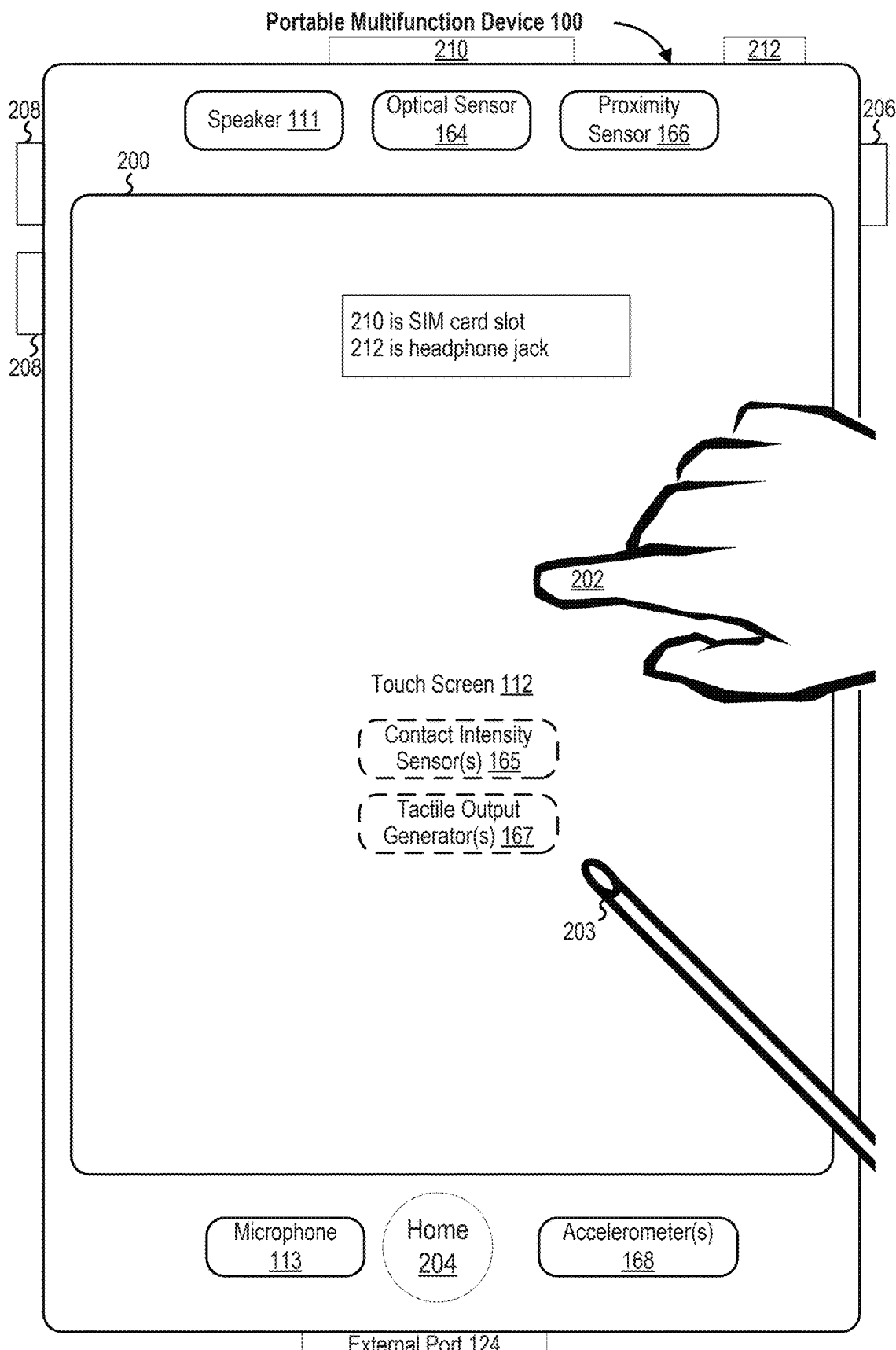
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3A is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3A is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Implementations within the scope of the present disclosure can be partially or entirely realized using a tangible computer-readable storage medium (or multiple tangible computer-readable storage media of one or more types) encoding one or more computer-readable instructions. It should be recognized that computer-readable instructions can be organized in any format, including applications, widgets, processes, software, and/or components.

Figure 3B:
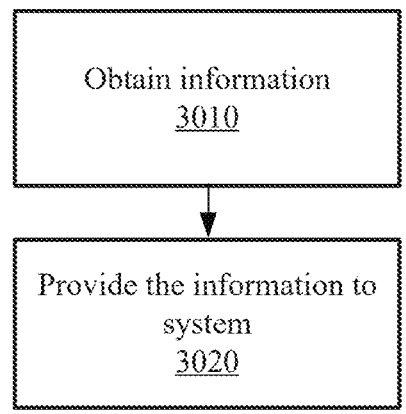
FIGS. 3B-3G illustrate the use of Application Programming Interfaces (APIs) to perform operations.
Figure 3C:
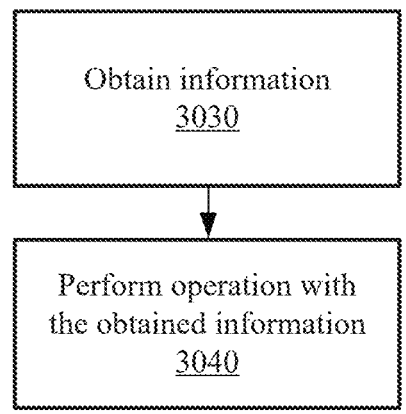

Implementations within the scope of the present disclosure include a computer-readable storage medium that encodes instructions organized as an application (e.g., application 3160) that, when executed by one or more processing units, control an electronic device (e.g., device 3150) to perform the method of FIG. 3B, the method of FIG. 3C, and/or one or more other processes and/or methods described herein.

It should be recognized that application 3160 (shown in FIG. 3D) can be any suitable type of application, including, for example, one or more of: a browser application, an application Ser. No. 16/156,05365 that functions as an execution environment for plug-ins, widgets or other applications, a fitness application, a health application, a digital payments application, a media application, a social network application, a messaging application, and/or a maps application. In some embodiments, application 3160 is an application that is pre-installed on device 3150 at purchase (e.g., a first-party application). In some embodiments, application 3160 is an application that is provided to device 3150 via an operating system update file (e.g., a first-party application or a second-party application). In some embodiments, application 3160 is an application that is provided via an application store. In some embodiments, the application store can be an application store that is pre-installed on device 3150 at purchase (e.g., a first-party application store). In some embodiments, the application store is a third-party application store (e.g., an application store that is provided by another application store, downloaded via a network, and/or read from a storage device).

Figure 3D:
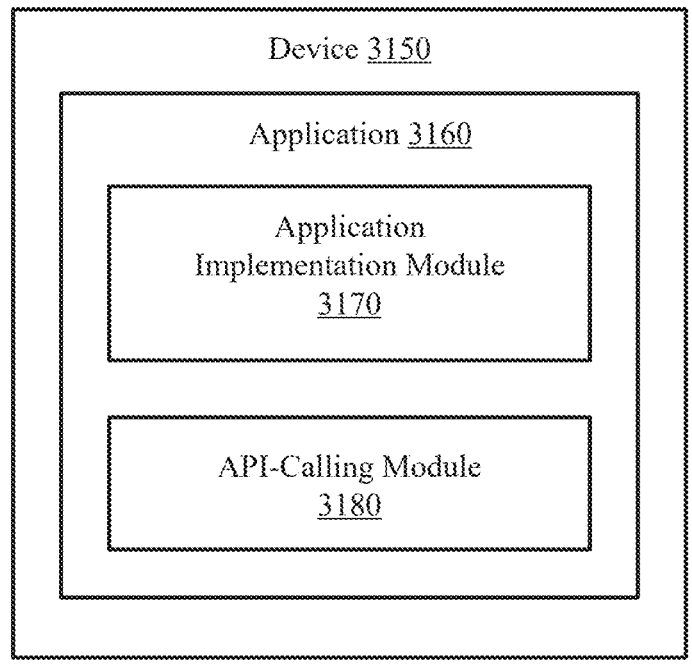
Figure 3E:
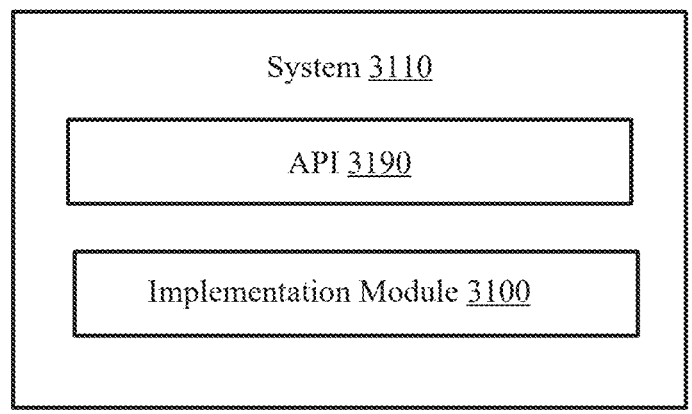
Figure 3F:
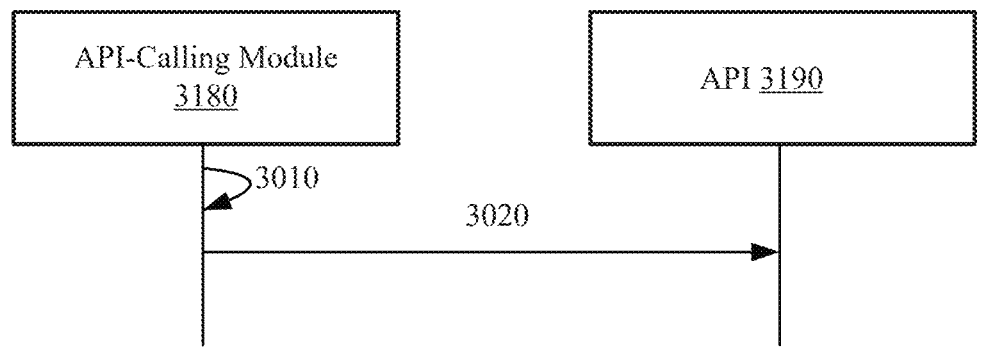

Referring to FIG. 3B and FIG. 3D, application 3160 obtains information (e.g., 3010). In some embodiments, at 3010, information is obtained from at least one hardware component of device 3150. In some embodiments, at 3010, information is obtained from at least one software module of device 3150. In some embodiments, at 3010, information is obtained from at least one hardware component external to device 3150 (e.g., a peripheral device, an accessory device, and/or a server). In some embodiments, the information obtained at 3010 includes positional information, time information, notification information, user information, environment information, electronic device state information, weather information, media information, historical information, event information, hardware information, and/or motion information. In some embodiments, in response to and/or after obtaining the information at 3010, application 3160 provides the information to a system (e.g., 3020).

In some embodiments, the system (e.g., 3110 shown in FIG. 3E) is an operating system hosted on device 3150. In some embodiments, the system (e.g., 3110 shown in FIG. 3E) is an external device (e.g., a server, a peripheral device, an accessory, and/or a personal computing device) that includes an operating system.

Figure 3G:
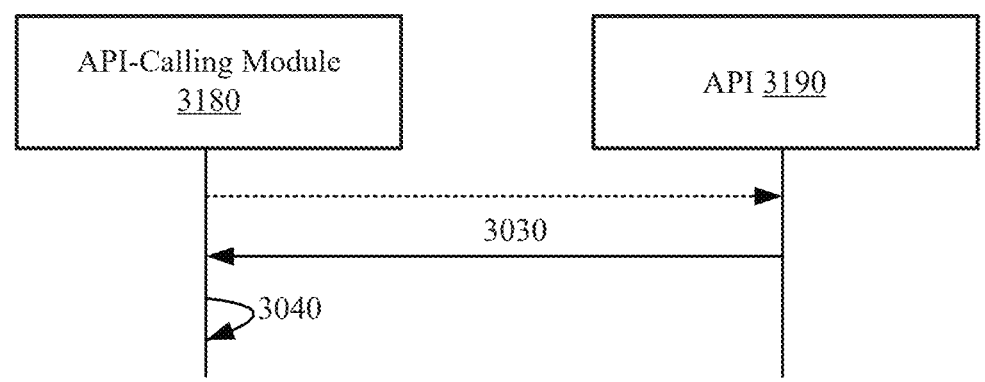

Referring to FIG. 3C and FIG. 3G, application 3160 obtains information (e.g., 3030). In some embodiments, the information obtained at 3030 includes positional information, time information, notification information, user information, environment information electronic device state information, weather information, media information, historical information, event information, hardware information, and/or motion information. In response to and/or after obtaining the information at 3030, application 3160 performs an operation with the information (e.g., 3040). In some embodiments, the operation performed at 3040 includes: providing a notification based on the information, sending a message based on the information, displaying the information, controlling a user interface of a fitness application based on the information, controlling a user interface of a health application based on the information, controlling a focus mode based on the information, setting a reminder based on the information, adding a calendar entry based on the information, and/or calling an API of system 3110 based on the information.

In some embodiments, one or more steps of the method of FIG. 3B and/or the method of FIG. 3C is performed in response to a trigger. In some embodiments, the trigger includes detection of an event, a notification received from system 3110, a user input, and/or a response to a call to an API provided by system 3110.

In some embodiments, the instructions of application 3160, when executed, control device 3150 to perform the method of FIG. 3B and/or the method of FIG. 3C by calling an application programming interface (API) (e.g., API 3190) provided by system 3110. In some embodiments, application 3160 performs at least a portion of the method of FIG. 3B and/or the method of FIG. 3C without calling API 3190.

In some embodiments, one or more steps of the method of FIG. 3B and/or the method of FIG. 3C includes calling an API (e.g., API 3190) using one or more parameters defined by the API. In some embodiments, the one or more parameters include a constant, a key, a data structure, an object, an object class, a variable, a data type, a pointer, an array, a list or a pointer to a function or method, and/or another way to reference a data or other item to be passed via the API.

Referring to FIG. 3D, device 3150 is illustrated. In some embodiments, device 3150 is a personal computing device, a smart phone, a smart watch, a fitness tracker, a head mounted display (HMD) device, a media device, a communal device, a speaker, a television, and/or a tablet. As illustrated in FIG. 3D, device 3150 includes application 3160 and an operating system (e.g., system 3110 shown in FIG. 3E). Application 3160 includes application implementation module 3170 and API-calling module 3180. System 3110 includes API 3190 and implementation module 3100. It should be recognized that device 3150, application 3160, and/or system 3110 can include more, fewer, and/or different components than illustrated in FIGS. 3D and 3E.

In some embodiments, application implementation module 3170 includes a set of one or more instructions corresponding to one or more operations performed by application 3160. For example, when application 3160 is a messaging application, application implementation module 3170 can include operations to receive and send messages. In some embodiments, application implementation module 3170 communicates with API-calling module 3180 to communicate with system 3110 via API 3190 (shown in FIG. 3E).

In some embodiments, API 3190 is a software module (e.g., a collection of computer-readable instructions) that provides an interface that allows a different module (e.g., API-calling module 3180) to access and/or use one or more functions, methods, procedures, data structures, classes, and/or other services provided by implementation module 3100 of system 3110. For example, API-calling module 3180 can access a feature of implementation module 3100 through one or more API calls or invocations (e.g., embodied by a function or a method call) exposed by API 3190 (e.g., a software and/or hardware module that can receive API calls, respond to API calls, and/or send API calls) and can pass data and/or control information using one or more parameters via the API calls or invocations. In some embodiments, API 3190 allows application 3160 to use a service provided by a Software Development Kit (SDK) library. In some embodiments, application 3160 incorporates a call to a function or method provided by the SDK library and provided by API 3190 or uses data types or objects defined in the SDK library and provided by API 3190. In some embodiments, API-calling module 3180 makes an API call via API 3190 to access and use a feature of implementation module 3100 that is specified by API 3190. In such embodiments, implementation module 3100 can return a value via API 3190 to API-calling module 3180 in response to the API call. The value can report to application 3160 the capabilities or state of a hardware component of device 3150, including those related to aspects such as input capabilities and state, output capabilities and state, processing capability, power state, storage capacity and state, and/or communications capability. In some embodiments, API 3190 is implemented in part by firmware, microcode, or other low level logic that executes in part on the hardware component.

In some embodiments, API 3190 allows a developer of API-calling module 3180 (which can be a third-party developer) to leverage a feature provided by implementation module 3100. In such embodiments, there can be one or more API-calling modules (e.g., including API-calling module 3180) that communicate with implementation module 3100. In some embodiments, API 3190 allows multiple API-calling modules written in different programming languages to communicate with implementation module 3100 (e.g., API 3190 can include features for translating calls and returns between implementation module 3100 and API-calling module 3180) while API 3190 is implemented in terms of a specific programming language. In some embodiments, API-calling module 3180 calls APIs from different providers such as a set of APIs from an OS provider, another set of APIs from a plug-in provider, and/or another set of APIs from another provider (e.g., the provider of a software library) or creator of the another set of APIs.

Examples of API 3190 can include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, photos API, camera API, and/or image processing API. In some embodiments, the sensor API is an API for accessing data associated with a sensor of device 3150. For example, the sensor API can provide access to raw sensor data. For another example, the sensor API can provide data derived (and/or generated) from the raw sensor data. In some embodiments, the sensor data includes temperature data, image data, video data, audio data, heart rate data, IMU (inertial measurement unit) data, lidar data, location data, GPS data, and/or camera data. In some embodiments, the sensor includes one or more of an accelerometer, temperature sensor, infrared sensor, optical sensor, heartrate sensor, barometer, gyroscope, proximity sensor, temperature sensor, and/or biometric sensor.

In some embodiments, implementation module 3100 is a system (e.g., operating system and/or server system) software module (e.g., a collection of computer-readable instructions) that is constructed to perform an operation in response to receiving an API call via API 3190. In some embodiments, implementation module 3100 is constructed to provide an API response (via API 3190) as a result of processing an API call. By way of example, implementation module 3100 and API-calling module 3180 can each be any one of an operating system, a library, a device driver, an API, an application program, or other module. It should be understood that implementation module 3100 and API-calling module 3180 can be the same or different type of module from each other. In some embodiments, implementation module 3100 is embodied at least in part in firmware, microcode, or hardware logic.

In some embodiments, implementation module 3100 returns a value through API 3190 in response to an API call from API-calling module 3180. While API 3190 defines the syntax and result of an API call (e.g., how to invoke the API call and what the API call does), API 3190 might not reveal how implementation module 3100 accomplishes the function specified by the API call. Various API calls are transferred via the one or more application programming interfaces between API-calling module 3180 and implementation module 3100. Transferring the API calls can include issuing, initiating, invoking, calling, receiving, returning, and/or responding to the function calls or messages. In other words, transferring can describe actions by either of API-calling module 3180 or implementation module 3100. In some embodiments, a function call or other invocation of API 3190 sends and/or receives one or more parameters through a parameter list or other structure.

In some embodiments, implementation module 3100 provides more than one API, each providing a different view of or with different aspects of functionality implemented by implementation module 3100. For example, one API of implementation module 3100 can provide a first set of functions and can be exposed to third-party developers, and another API of implementation module 3100 can be hidden (e.g., not exposed) and provide a subset of the first set of functions and also provide another set of functions, such as testing or debugging functions which are not in the first set of functions. In some embodiments, implementation module 3100 calls one or more other components via an underlying API and thus is both an API-calling module and an implementation module. It should be recognized that implementation module 3100 can include additional functions, methods, classes, data structures, and/or other features that are not specified through API 3190 and are not available to API-calling module 3180. It should also be recognized that API-calling module 3180 can be on the same system as implementation module 3100 or can be located remotely and access implementation module 3100 using API 3190 over a network. In some embodiments, implementation module 3100, API 3190, and/or API-calling module 3180 is stored in a machine-readable medium, which includes any mechanism for storing information in a form readable by a machine (e.g., a computer or other data processing system). For example, a machine-readable medium can include magnetic disks, optical disks, random access memory; read only memory, and/or flash memory devices.

An application programming interface (API) is an interface between a first software process and a second software process that specifies a format for communication between the first software process and the second software process. Limited APIs (e.g., private APIs or partner APIs) are APIs that are accessible to a limited set of software processes (e.g., only software processes within an operating system or only software processes that are approved to access the limited APIs). Public APIs that are accessible to a wider set of software processes. Some APIs enable software processes to communicate about or set a state of one or more input devices (e.g., one or more touch sensors, proximity sensors, visual sensors, motion/orientation sensors, pressure sensors, intensity sensors, sound sensors, wireless proximity sensors, biometric sensors, buttons, switches, rotatable elements, and/or external controllers). Some APIs enable software processes to communicate about and/or set a state of one or more output generation components (e.g., one or more audio output generation components, one or more display generation components, and/or one or more tactile output generation components). Some APIs enable particular capabilities (e.g., scrolling, handwriting, text entry, image editing, and/or image creation) to be accessed, performed, and/or used by a software process (e.g., generating outputs for use by a software process based on input from the software process). Some APIs enable content from a software process to be inserted into a template and displayed in a user interface that has a layout and/or behaviors that are specified by the template.

Many software platforms include a set of frameworks that provides the core objects and core behaviors that a software developer needs to build software applications that can be used on the software platform. Software developers use these objects to display content onscreen, to interact with that content, and to manage interactions with the software platform. Software applications rely on the set of frameworks for their basic behavior, and the set of frameworks provides many ways for the software developer to customize the behavior of the application to match the specific needs of the software application. Many of these core objects and core behaviors are accessed via an API. An API will typically specify a format for communication between software processes, including specifying and grouping available variables, functions, and protocols. An API call (sometimes referred to as an API request) will typically be sent from a sending software process to a receiving software process as a way to accomplish one or more of the following: the sending software process requesting information from the receiving software process (e.g., for the sending software process to take action on), the sending software process providing information to the receiving software process (e.g., for the receiving software process to take action on), the sending software process requesting action by the receiving software process, or the sending software process providing information to the receiving software process about action taken by the sending software process. Interaction with a device (e.g., using a user interface) will in some circumstances include the transfer and/or receipt of one or more API calls (e.g., multiple API calls) between multiple different software processes (e.g., different portions of an operating system, an application and an operating system, or different applications) via one or more APIs (e.g., via multiple different APIs). For example, when an input is detected the direct sensor data is frequently processed into one or more input events that are provided (e.g., via an API) to a receiving software process that makes some determination based on the input events, and then sends (e.g., via an API) information to a software process to perform an operation (e.g., change a device state and/or user interface) based on the determination. While a determination and an operation performed in response could be made by the same software process, alternatively the determination could be made in a first software process and relayed (e.g., via an API) to a second software process, that is different from the first software process, that causes the operation to be performed by the second software process. Alternatively, the second software process could relay instructions (e.g., via an API) to a third software process that is different from the first software process and/or the second software process to perform the operation. It should be understood that some or all user interactions with a computer system could involve one or more API calls within a step of interacting with the computer system (e.g., between different software components of the computer system or between a software component of the computer system and a software component of one or more remote computer systems). It should be understood that some or all user interactions with a computer system could involve one or more API calls between steps of interacting with the computer system (e.g., between different software components of the computer system or between a software component of the computer system and a software component of one or more remote computer systems).

In some embodiments, the application can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application.

In some embodiments, the application is an application that is pre-installed on the first computer system at purchase (e.g., a first-party application). In some embodiments, the application is an application that is provided to the first computer system via an operating system update file (e.g., a first-party application). In some embodiments, the application is an application that is provided via an application store. In some embodiments, the application store is pre-installed on the first computer system at purchase (e.g., a first-party application store) and allows download of one or more applications. In some embodiments, the application store is a third-party application store (e.g., an application store that is provided by another device, downloaded via a network, and/or read from a storage device). In some embodiments, the application is a third-party application (e.g., an app that is provided by an application store, downloaded via a network, and/or read from a storage device). In some embodiments, the application controls the first computer system to perform methods 1100, 1300, 1500, 1600, and/or 1800 (FIGS. 11, 13, 15,16, and/or 18) by calling an application programming interface (API) provided by the system process using one or more parameters.

In some embodiments, exemplary APIs provided by the system process include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, a photos API, a camera API, and/or an image processing API.

In some embodiments, at least one API is a software module (e.g., a collection of computer-readable instructions) that provides an interface that allows a different module (e.g., API-calling module 3180) to access and use one or more functions, methods, procedures, data structures, classes, and/or other services provided by an implementation module of the system process. The API can define one or more parameters that are passed between the API-calling module and the implementation module. In some embodiments, API 3190 defines a first API call that can be provided by API-calling module 3180. The implementation module is a system software module (e.g., a collection of computer-readable instructions) that is constructed to perform an operation in response to receiving an API call via the API. In some embodiments, the implementation module is constructed to provide an API response (via the API) as a result of processing an API call. In some embodiments, the implementation module is included in the device (e.g., 3150) that runs the application. In some embodiments, the implementation module is included in an electronic device that is separate from the device that runs the application.

Attention is now directed towards embodiments of user interfaces that are, optionally, implemented on, for example, portable multifunction device 100.

Figure 4A:
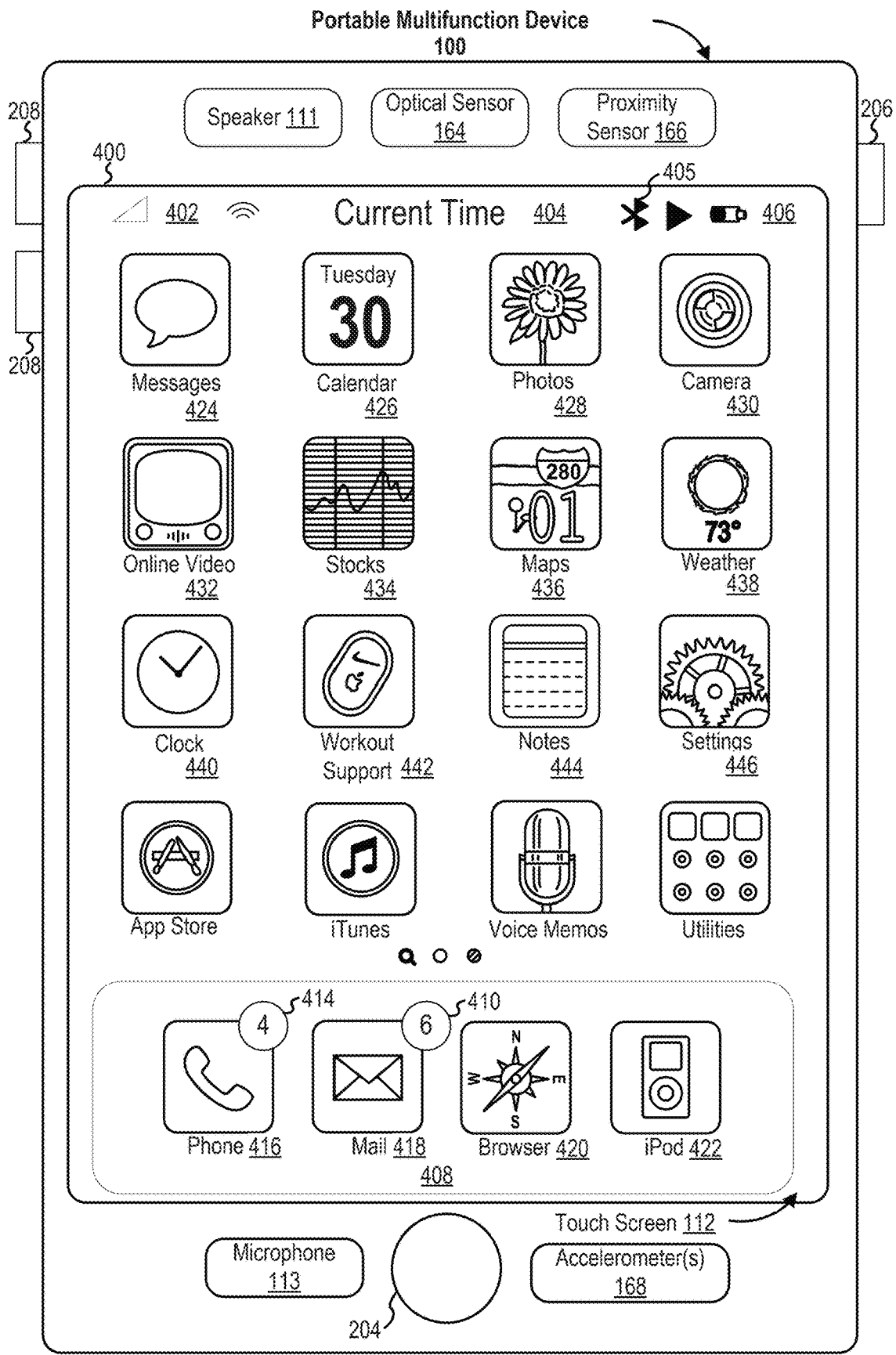
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof: · Signal strength indicator(s) 402 for wireless communication(s), such as cellular and Wi-Fi signals;

Time 404;
Bluetooth indicator 405;
Battery status indicator 406;
Tray 408 with icons for frequently used applications, such as:
   Icon 416 for telephone module 138, labeled "Phone," which optionally includes an indicator 414 of the number of missed calls or voicemail messages;
   Icon 418 for e-mail client module 140, labeled "Mail," which optionally includes an indicator 410 of the number of unread e-mails;
   Icon 420 for browser module 147, labeled "Browser;" and
   Icon 422 for video and music player module 152, also referred to as iPod (trademark of Apple Inc.) module 152, labeled "iPod;" and
Icons for other applications, such as:
   Icon 424 for IM module 141, labeled "Messages;"
   Icon 426 for calendar module 148, labeled "Calendar;"
   Icon 428 for image management module 144, labeled "Photos;"
   Icon 430 for camera module 143, labeled "Camera;"
   Icon 432 for online video module 155, labeled "Online Video;"
   Icon 434 for stocks widget 149-2, labeled "Stocks;"
   Icon 436 for map module 154, labeled "Maps;"
   Icon 438 for weather widget 149-1, labeled "Weather;"
   Icon 440 for alarm clock widget 149-4, labeled "Clock;"
   Icon 442 for workout support module 142, labeled "Workout Support;"
   Icon 444 for notes module 153, labeled "Notes;" and
   Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
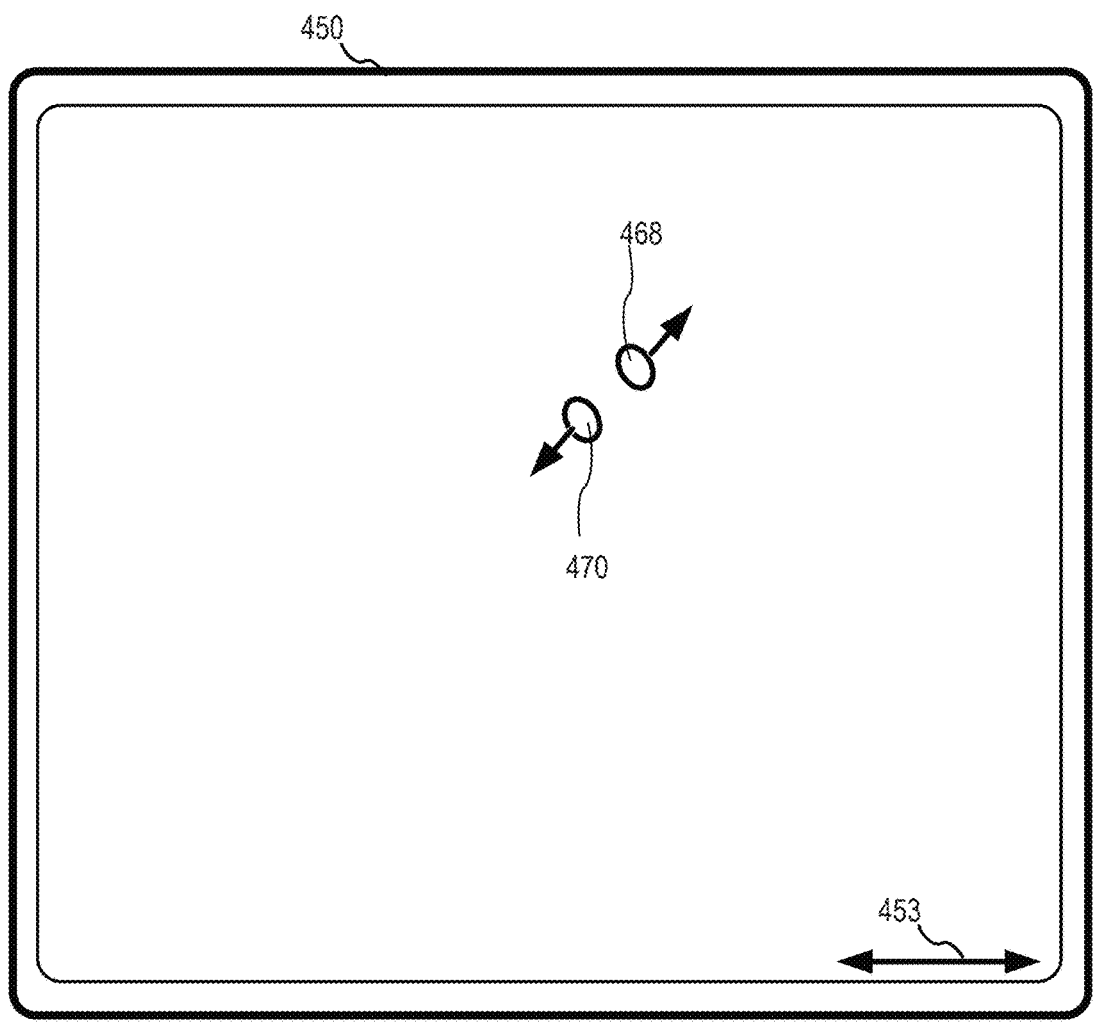
FIG. 4B illustrates an exemplary user interface for a multifunction device with a touch-sensitive surface that is separate from the display in accordance with some embodiments.
Figure 4B:
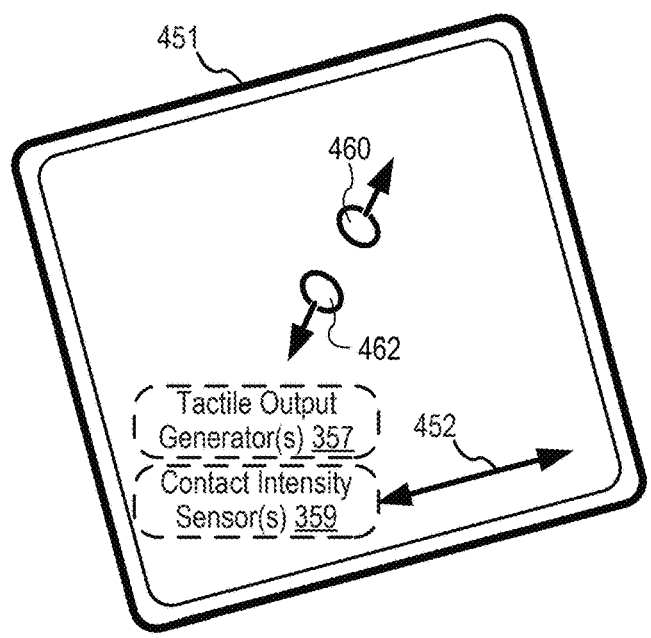

FIG. 4B illustrates an exemplary user interface on a device (e.g., device 300, FIG. 3A) with a touch-sensitive surface 451 (e.g., a tablet or touchpad 355, FIG. 3A) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
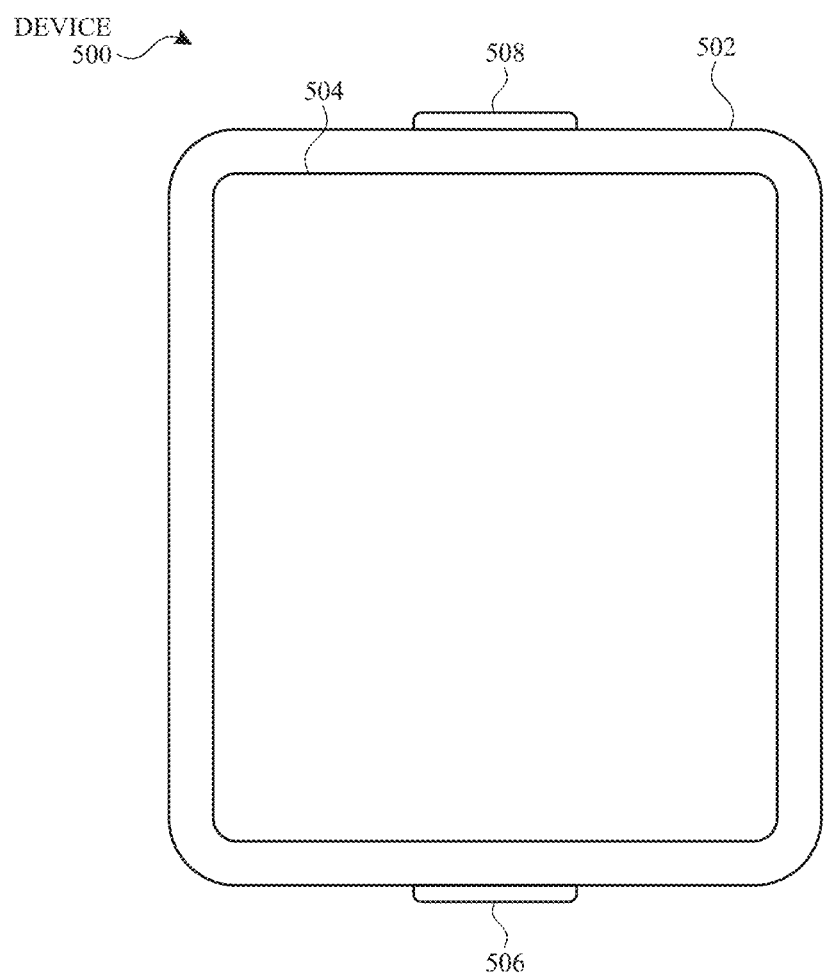
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/0610483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
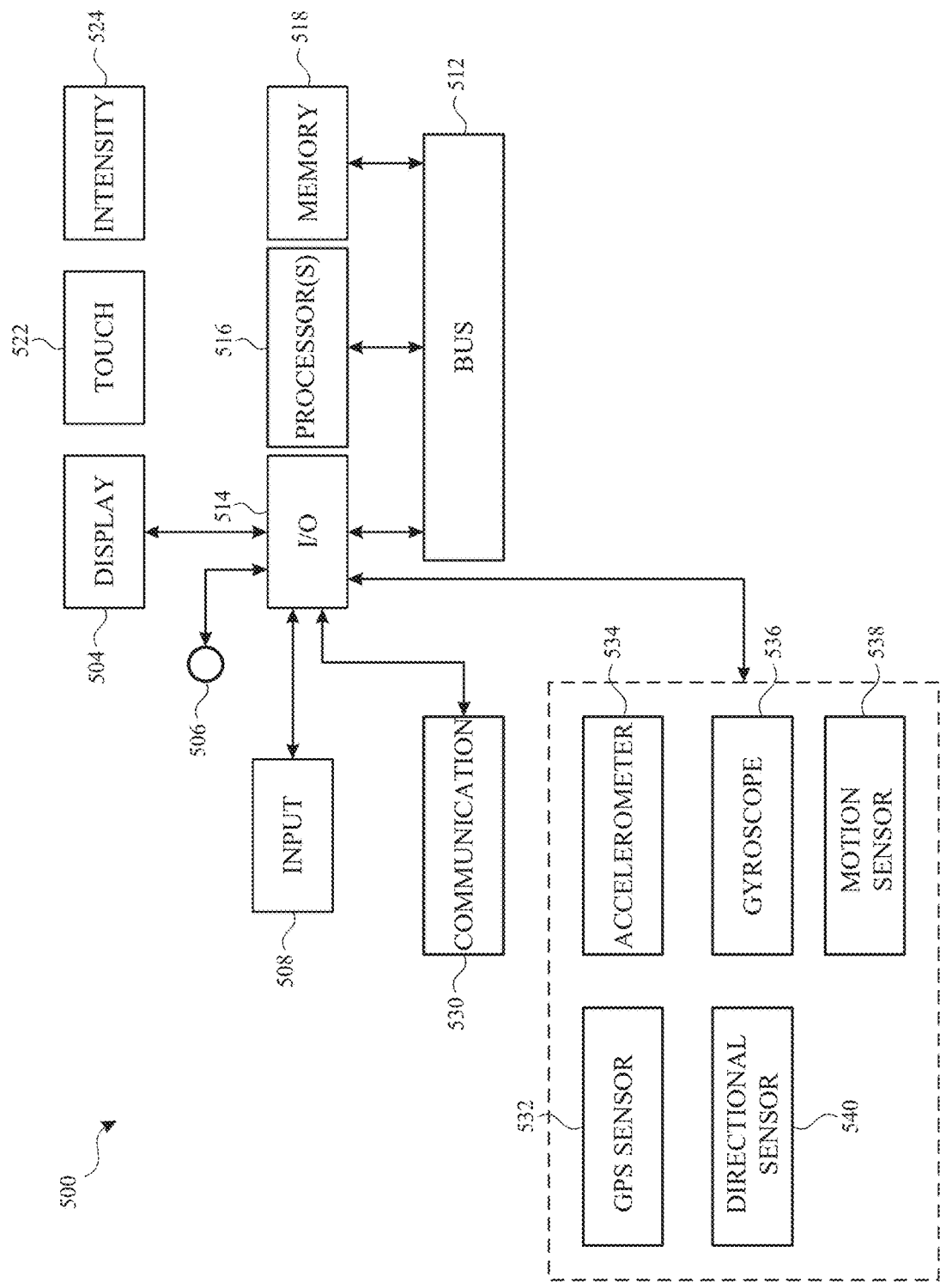
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3A. Device 500 has bus 512 that operatively couples I/O section 514 with one or more computer processors 516 and memory 518. I/O section 514 can be connected to display screen 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 1100, 1300, 1500, 1600, and 1800 (FIGS. 11, 13, 15, 16, and 18). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3A, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3A or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:
- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Figure 6:
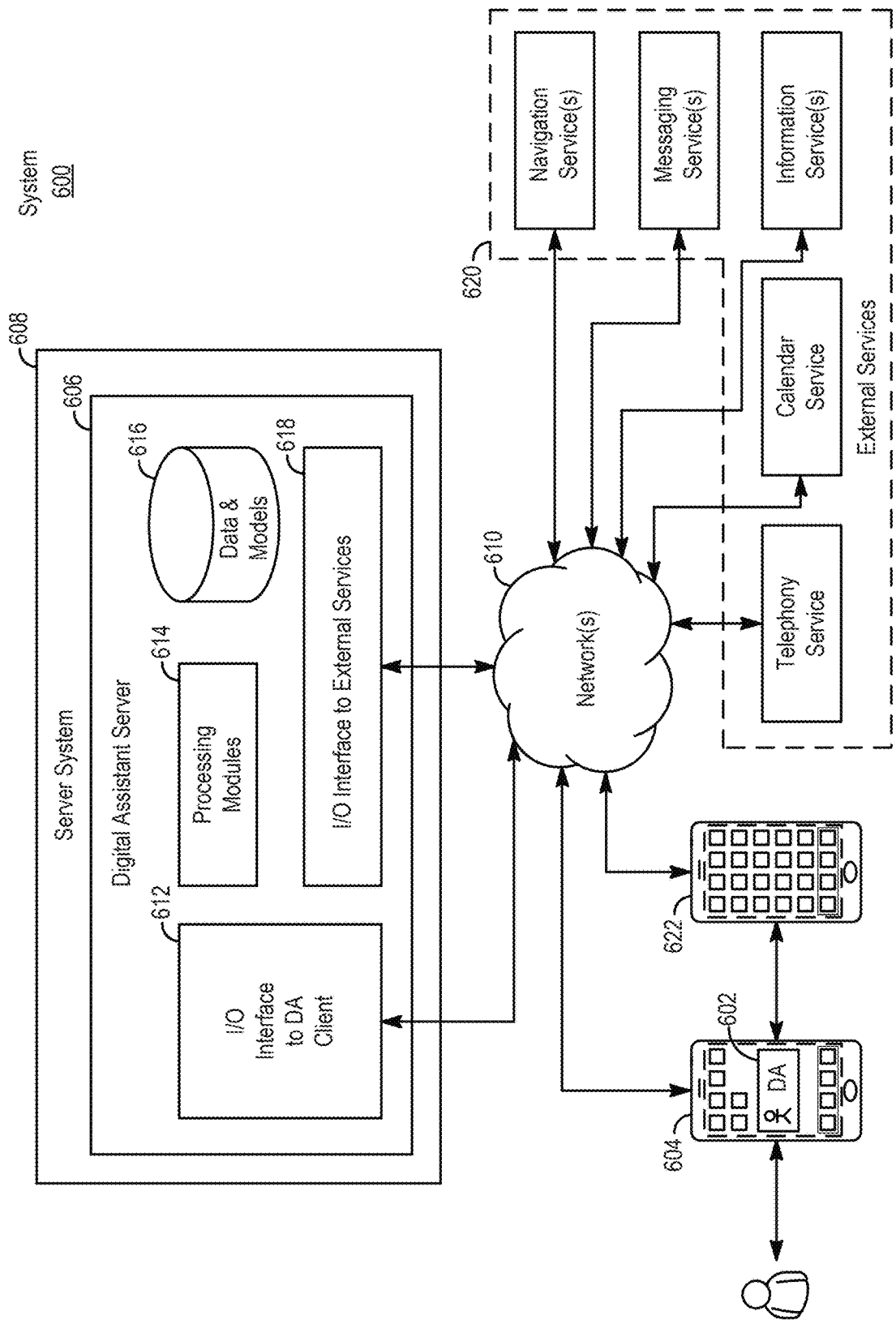
FIG. 6 is a block diagram illustrating a system and environment for implementing a digital assistant, according to various examples.

FIG. 6 illustrates a block diagram of system 600 according to various examples. In some examples, system 600 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 6, in some examples, a digital assistant is implemented according to a client-server model. The digital assistant includes client-side portion 602 (hereafter "DA client 602") executed on user device 604 and server-side portion 606 (hereafter "DA server 606") executed on server system 608. DA client 602 communicates with DA server 606 through one or more networks 610. DA client 602 provides client-side functionalities such as user-facing input and output processing and communication with DA server 606. DA server 606 provides server-side functionalities for any number of DA clients 602 each residing on a respective user device 604.

In some examples, DA server 606 includes client-facing I/O interface 612, one or more processing modules 614, data and models 616, and I/O interface to external services 618. The client-facing I/O interface 612 facilitates the client-facing input and output processing for DA server 606. One or more processing modules 614 utilize data and models 616 to process speech input and determine the user's intent based on natural language input. Further, one or more processing modules 614 perform task execution based on inferred user intent. In some examples, DA server 606 communicates with external services 620 through network(s) 610 for task completion or information acquisition. I/O interface to external services 618 facilitates such communications.

User device 604 can be any suitable electronic device (e.g., 1000, 1400, and/or 1700). In some examples, user device 604 is a portable multifunctional device (e.g., device 100, described above with reference to FIG. 1A), a multifunctional device (e.g., device 300, described above with reference to FIG. 3A), or a personal electronic device (e.g., device 500, described above with reference to FIGS. 5A-5B) In some examples, user device 604 is a non-portable multifunctional device. In particular, user device 604 is a desktop computer, a game console, a speaker, a television, or a television set-top box. In some examples, user device 604 includes a touch-sensitive surface (e.g., touch screen displays and/or touchpads). Further, user device 604 optionally includes one or more other physical user-interface devices, such as a physical keyboard, a mouse, and/or a joystick. Various examples of electronic devices, such as multifunctional devices, are described below in greater detail.

Examples of communication network(s) 610 include local area networks (LAN) and wide area networks (WAN), e.g., the Internet. Communication network(s) 610 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 608 is implemented on one or more standalone data processing apparatus or a distributed network of computers. In some examples, server system 608 also employs various virtual devices and/or services of third-party service providers (e.g., third-party cloud service providers) to provide the underlying computing resources and/or infrastructure resources of server system 608.

In some examples, user device 604 communicates with DA server 606 via second user device 622. Second user device 622 is similar or identical to user device 604. For example, second user device 622 is similar to devices 100, 300, or 500 described above with reference to FIGS. 1A-1B, 3A, and 5A-5B. User device 604 is configured to communicatively couple to second user device 622 via a direct communication connection, such as Bluetooth, NFC, BTLE, or the like, or via a wired or wireless network, such as a local Wi-Fi network. In some examples, second user device 622 is configured to act as a proxy between user device 604 and DA server 106. For example, DA client 602 of user device 604 is configured to transmit information (e.g., a user request received at user device 604) to DA server 606 via second user device 622. DA server 606 processes the information and returns relevant data (e.g., data content responsive to the user request) to user device 604 via second user device 622.

In some examples, user device 604 is configured to communicate abbreviated requests for data to second user device 622 to reduce the amount of information transmitted from user device 604. Second user device 622 is configured to determine supplemental information to add to the abbreviated request to generate a complete request to transmit to DA server 606. This system architecture can advantageously allow user device 604 having limited communication capabilities and/or limited battery power (e.g., a watch or a similar compact electronic device) to access services provided by DA server 606 by using second user device 622, having greater communication capabilities and/or battery power (e.g., a mobile phone, laptop computer, tablet computer, or the like), as a proxy to DA server 606. While only two user devices 604 and 622 are shown in FIG. 6, it should be appreciated that system 600, in some examples, includes any number and type of user devices configured in this proxy configuration to communicate with DA server system 606.

Although the digital assistant shown in FIG. 6 includes both a client-side portion (e.g., DA client 602) and a server-side portion (e.g., DA server 606), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

Figure 7A:
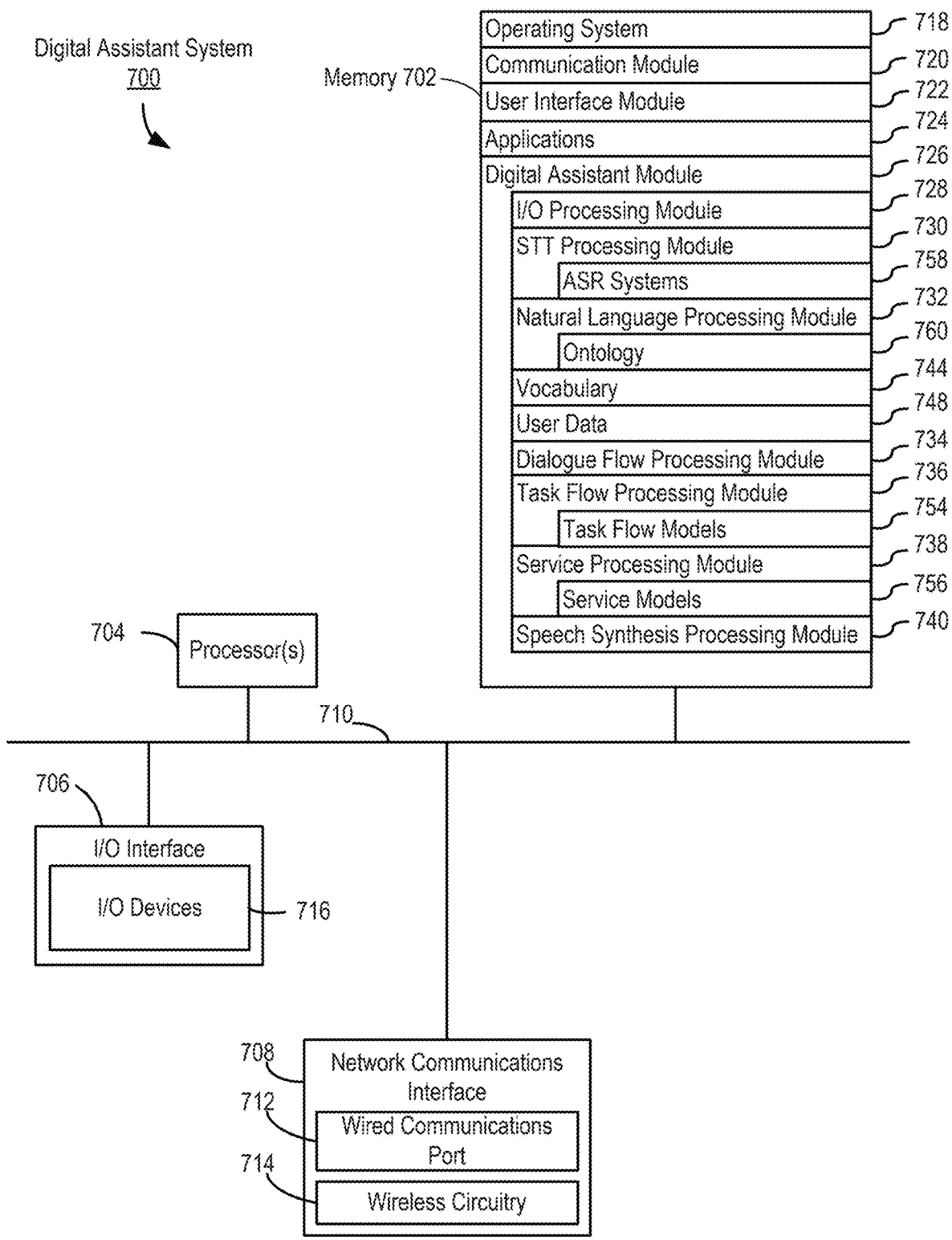
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system (e.g., device 100, 300, 500, 604, 1000, 1400, and/or 1700). In some examples, digital assistant system 700 is distributed across multiple computers. In some examples, some of the modules and functions of the digital assistant are divided into a server portion and a client portion, where the client portion resides on one or more user devices (e.g., devices 100, 300, 500, 604, 1000, 1400, and/or 1700) and communicates with the server portion (e.g., server system 608) through one or more networks, e.g., as shown in FIG. 1A. In some examples, digital assistant system 700 is an implementation of server system 608 (and/or DA server 606) shown in FIG. 6. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 100, 300, 500, or 600 in FIGS. 1A-1B, 3A, 5A-5B, and 6 respectively. In some examples, digital assistant system 700 represents the server portion of a digital assistant implementation, and can interact with the user through a client-side portion residing on a user device (e.g., devices 100, 300, 500, or 604).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 100, 300, and 500 shown in FIGS. 1A-1B, 3A, 5A-5B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following sub-modules, or a subset or superset thereof: input/output processing module 728, speech-to-text (STT) processing module 730, natural language processing module 732, dialogue flow processing module 734, task flow processing module 736, service processing module 738, and speech synthesis processing module 740. Each of these modules has access to one or more of the following systems or data and models of the digital assistant module 726, or a subset or superset thereof: ontology 760, vocabulary index 744, user data 748, task flow models 754, service models 756, and ASR systems 758.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
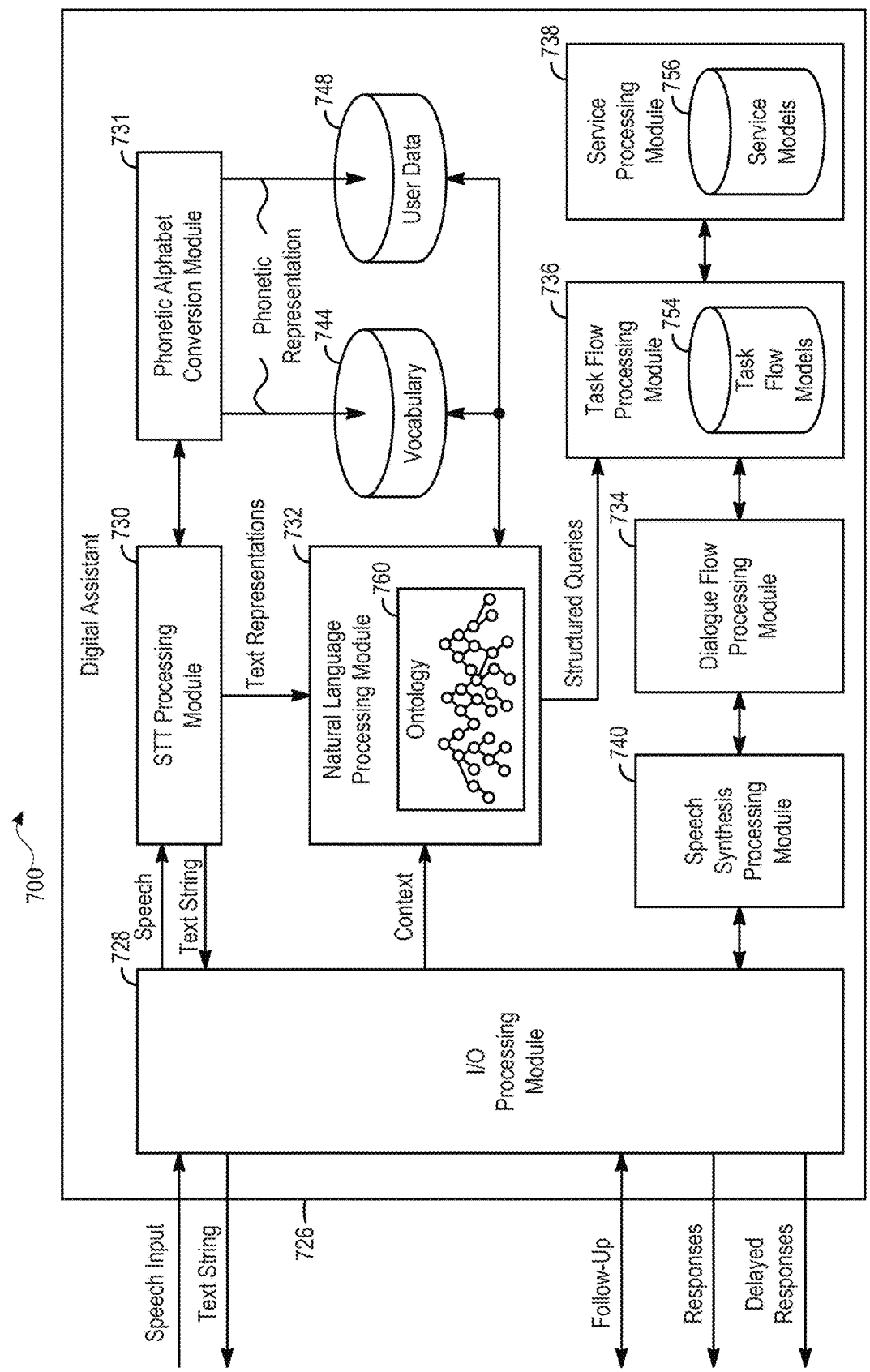
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 100, 300, 500, or 604) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems 758. The one or more ASR systems 758 can process the speech input that is received through I/O processing module 728 to produce a recognition result. Each ASR system 758 includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system 758 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 100, 300, 500, or 604) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /təˈmeɪɾoʊ/ and /təˈmɑtoʊ/. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /təˈmeɪɾoʊ/ is ranked higher than /təˈmɑtoʊ/, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation /təˈmeɪɾoʊ/ is associated with the United States, whereas the candidate pronunciation /təˈmɑtoʊ/ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /təˈmeɪɾoʊ/ (associated with the United States) is ranked higher than the candidate pronunciation /təˈmɑtoʊ/ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes /təˈmeɪɾoʊ/ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes /təˈmeɪɾoʊ/ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

Figure 7C:
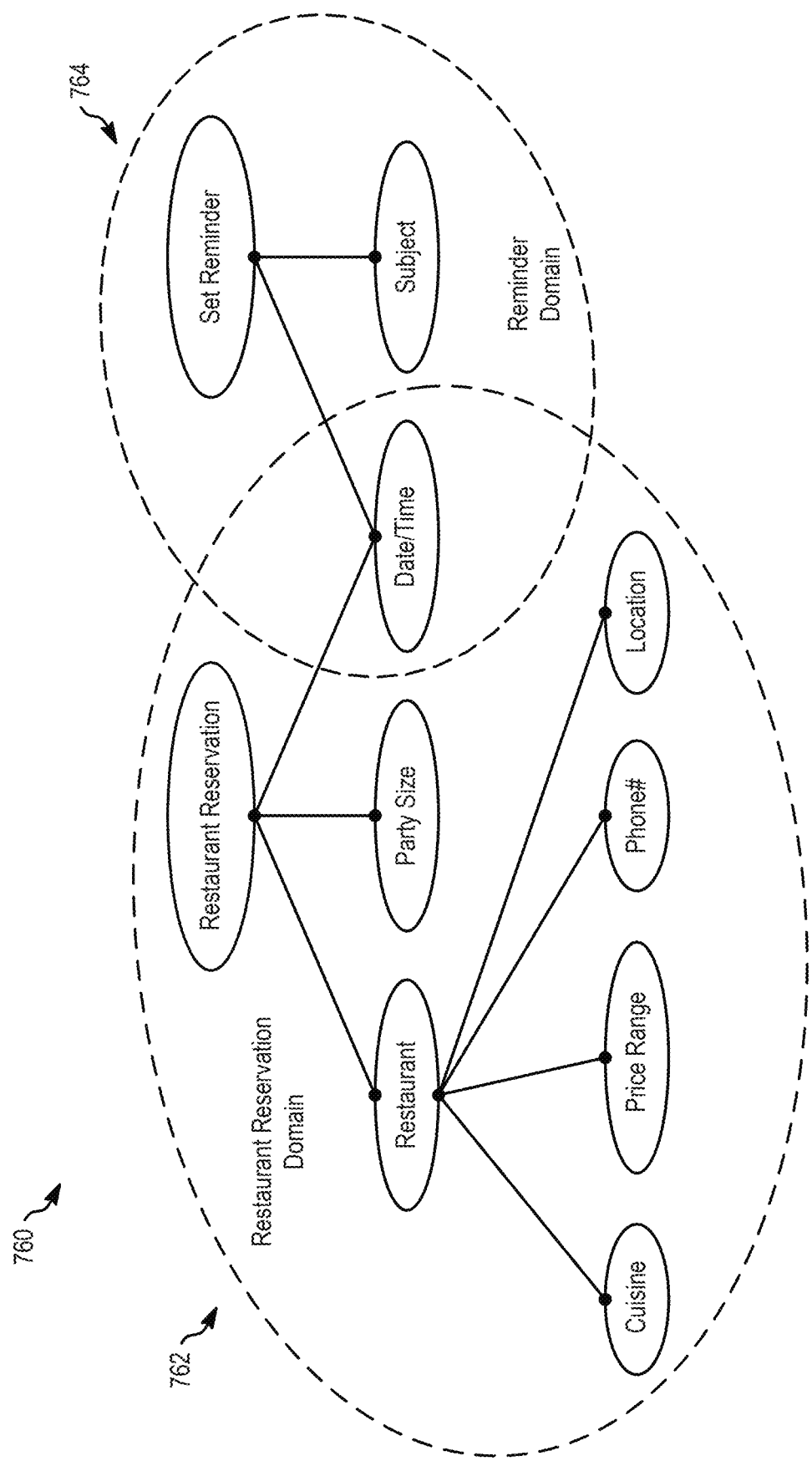
FIG. 7C illustrates a portion of an ontology, according to various examples.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked property nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanisms are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string are described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generates requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and sends the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis processing module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis processing module 740 is configured to synthesize speech outputs for presentation to the user. Speech synthesis processing module 740 synthesizes speech outputs based on text provided by the digital assistant. For example, the generated dialogue response is in the form of a text string. Speech synthesis processing module 740 converts the text string to an audible speech output. Speech synthesis processing module 740 uses any appropriate speech synthesis technique in order to generate speech outputs from text, including, but not limited to, concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis processing module 740 is configured to synthesize individual words based on phonemic strings corresponding to the words. For example, a phonemic string is associated with a word in the generated dialogue response. The phonemic string is stored in metadata associated with the word. Speech synthesis processing module 740 is configured to directly process the phonemic string in the metadata to synthesize the word in speech form.

In some examples, instead of (or in addition to) using speech synthesis processing module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

Figure 8:
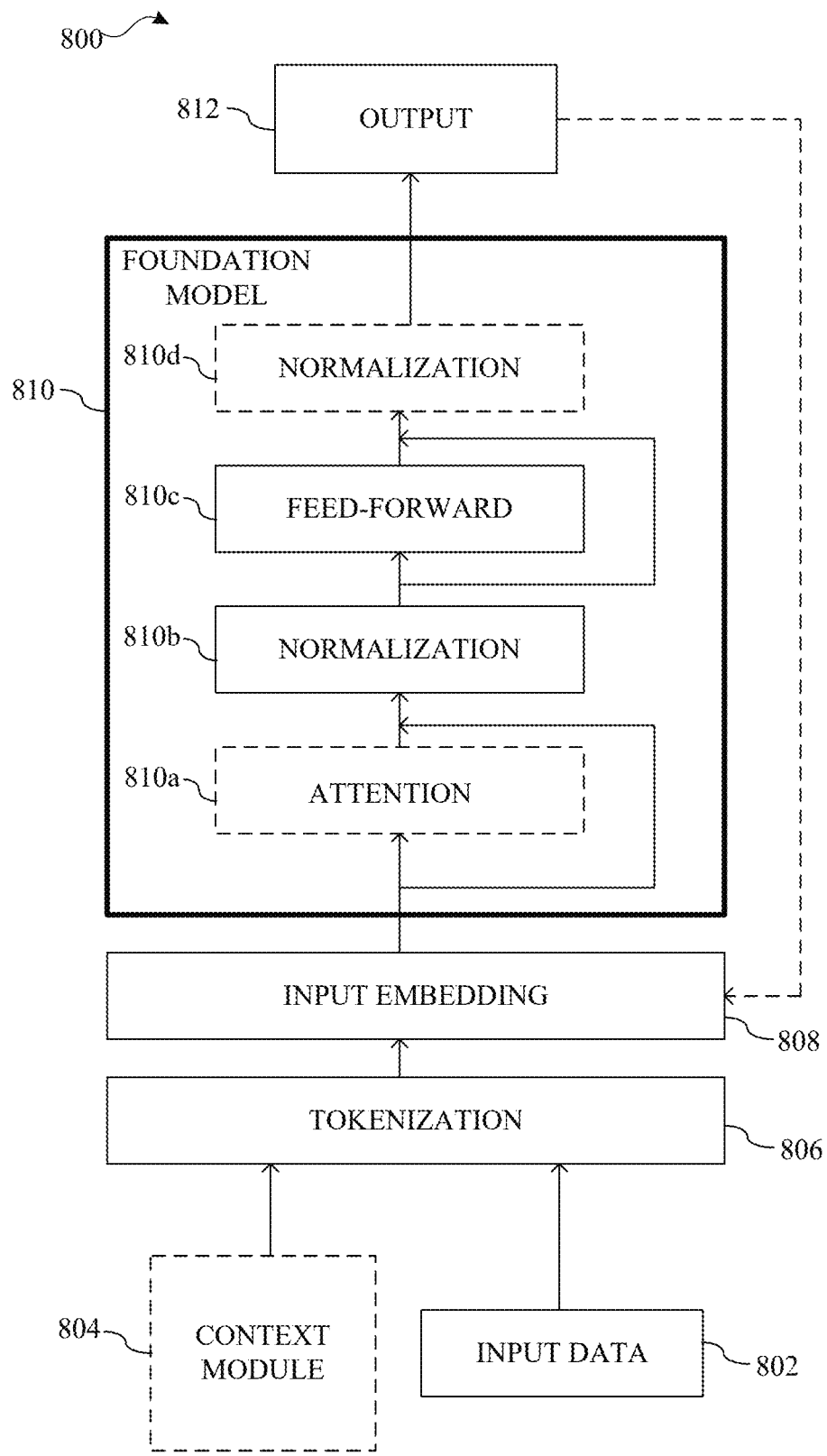
FIG. 8 illustrates exemplary foundation system 800 including foundation model 810, according to some embodiments.
Figure 9:
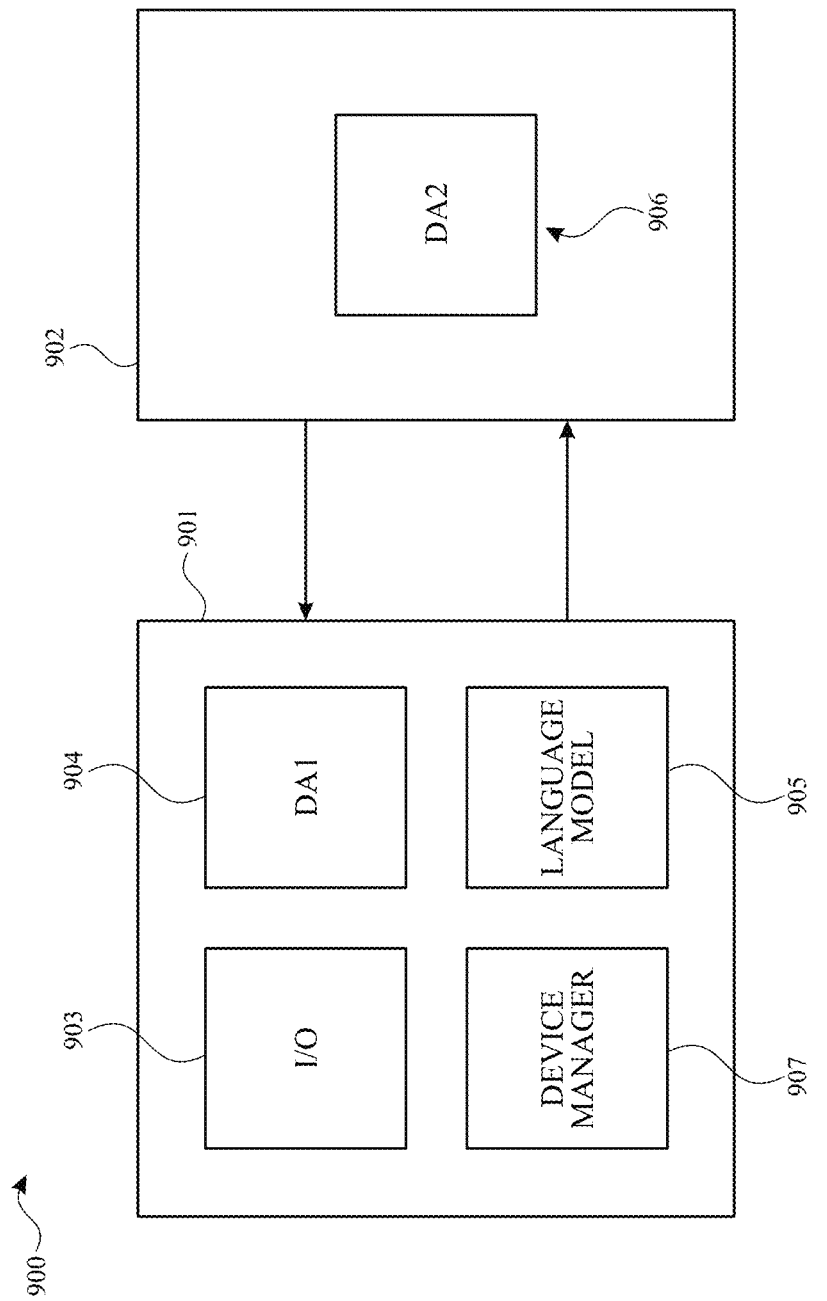
FIG. 9 illustrates system 900 for generating or editing text using a digital assistant and/or a language model, in accordance with some embodiments.

FIG. 8 illustrates exemplary foundation system 800 including foundation model 810, according to some embodiments. In some embodiments, the blocks of foundation system 800 are combined, the order of the blocks is changed, and/or blocks of foundation system 800 are removed.

Foundation system 800 includes tokenization module 806, input embedding module 808, and foundation model 810 which use input data 802 and, optionally, context module 804 to train foundation model 810 to process input data 802 to determine output 812.

In some examples, the various components of digital assistant system 700 include and/or are implemented using generative artificial intelligence (AI) such as foundation model 810. In some examples, foundation model 810 include a subset of machine learning models that are trained to generate text, images, and/or other media based on sets of training data that include large amounts of a particular type of data. Foundation model 810 is then integrated into the components of digital assistant system 700 (or otherwise available to digital assistant system 700, operating system 718, and/or software applications (e.g., 136 and/or 724) installed on device 100, 300, 500, 604, 1000, 1400, and/or 1700 via an API) to provide text, images, and/or other media that digital assistant system 700 uses to determine tasks, perform tasks, and/or provide the outputs of tasks.

Foundation models are generally trained using large sets of unlabeled data first and then later adapted to a specific task within the architecture of digital assistant system 700 and/or operating system 718. Thus, a specific task or type of output is not encoded into the foundation models, rather the trained foundation model emerges based on the self-supervised training using the unlabeled data. The trained foundation model is then adapted to a variety of tasks based on the needs of the digital assistant system 700 to efficiently perform tasks for a user.

Generative AI models, such as foundation model 810, are trained on large quantities of data with self-supervised or semi-supervised learning to be adapted to a specific downstream task. For example, foundation model 810 is trained with large sets of different images and corresponding text or metadata to determine the description of newly captured image data as output 812. These descriptions can then be used by digital assistant system 700 to determine user intent, tasks, and/or other information that can be used to perform tasks. For example, generative AI models such as Midjourney, DALL-E, and stable diffusion are trained on large sets of images and are able to convert text to a generated image.

Large language models (LLM) are a type of foundation model that provide text output after being trained on large sets of input text data. As with other foundation models, LLM's can be trained in a self-supervised manner and thus the output of different LLM's trained on the same large set of input text can be different. These LLM's can then be adapted for use with digital assistant system 700 to specific types of text. Thus, in some examples, the LLM is trained to determine a summary of text provided to the LLM as an input while in other examples, the LLM is trained to predict text based on the set of input text. Thus, the LLM can efficiently process large amounts of input text to provide the digital assistant with text that can be used to determine and/or perform tasks. For example, ChatGPT, Copilot, and LLAMA are exemplary large language models that process large amounts of input text and/or speech and generates text that can be used by a digital assistant, a software application, and/or an operating system.

In some examples, the LLM may be trained in a semi-supervised manner and/or provided human feedback to refine the output of the LLM. In this way, the LLM may be adapted to provide the specific output required for a particular task of digital assistant system 700, such as a summary of large amounts of text or a task for digital assistant system 700 to perform. Further, the input provided to the LLM can be adapted such that the LLM processes data as or more efficiently than digital assistant system 700 could without the use of the LLM.

Once foundation model 810 (e.g., a LLM) has been fully trained, foundation model 810 can process input data 802 as discussed below to determine output 812 which may be used to further train foundation model 810 or can be processed by digital assistant 700 to perform a task and/or provide an output to the user.

Specifically, input data 802 is received and provided to tokenization module 806 which converts input data 802 into a token and/or a series of tokens which can be processed by input embedding module 808 into a format that is understood by foundation model 810. Tokenization module 806 converts input data into a series of characters that has a specific semantic meaning to foundation model 810.

In some examples, tokenization module 806 tokenizes contextual data from context module 804 to add further information to input data 802 for processing by foundation model 810. For example, context module 804 can provide information related to input data 802 such as a location that input data 802 was received, a time that input data 802 was received, other data that was received contemporaneously with input data 802, and/or other contextual information that relates to input data 802. Tokenization module 806 can then tokenize this contextual data with input data 802 to be provided to foundation model 810.

After input data 802 has been tokenized, input data 802 is provided to input embedding module 808 to convert the tokens to a vector representation that can be processed by foundation model 810. In some examples, the vector representation includes information provided by context module 804. In some examples, the vector representation includes information determined from output 812. Accordingly, input embedding module 808 converts the various data provided as an input into a format that foundation model 810 can parse and process.

For example, when foundation model 810 is a large language model (LLM) tokenization module 806 converts input data 802 into text which is then converted into a vector representation by input embedding module 808 that can be processed by foundation model 810 to determine a response to input data 802 as output 812 or to determine a summary of input data 802 as output 812. As another example, when foundation model 810 is a model that has been trained to determine descriptions of images, input data 802 of images can be tokenized into characters and then converted into a vector representation by input embedding module 808 that is processed by foundation model 810 to determine a description of the images as output 812.

Foundation model 810 processes the received vector representation using a series of layers including, in some embodiments, attention layer 810a, normalization layer 810b, feed-forward layer 810c, and/or normalization layer 810d. In some examples, foundation model 810 includes additional layers similar to theses layers to further process the vector representation. Accordingly, foundation model 810 can be customized based on the specific task that foundation model 810 has been trained to perform. Each of the layers of foundation model 810 perform a specific task to process the vector representation into output 812.

Attention layer 810a provides access to all portions of the vector representation at the same time, increasing the speed at which the vector representation can be processed and ensuring that the data is processed equally across the portions of the vector representation. Normalization layer 810*b* and normalization layer 810*d* scale the data that is being processed by foundation model 810 up or down based on the needs of the other layers of foundation model 810. This allows foundation model 810 to manipulate the data during processing as needed. Feed-forward layer 810*c* assigns weights to the data that is being processed and provides the data for further processing within foundation model 810. These layers work together to process the vector representation provided to foundation model 810 to determine the appropriate output 812.

For example, as discussed above, when foundation model 810 is a large language model (LLM) foundation model 810 processes input text to determine a summary and/or further follow-up text as output 812. As another example, as discussed above, when foundation model 810 is a model trained to determine descriptions of images, foundation model 810 processes input images to determine a description of the image and/or tasks that can be performed based on the content of the images as output 812.

In some examples, output 812 is further processed by digital assistant system 700, operating system (e.g., 126 or 718), and/or a software application installed on device 100, 300, 500, and/or 604 to provide an output or execute a task. For example, when output 812 is a sentence describing a task that digital assistant system 700 has performed, digital assistant system 700 can use the text to create a visual or audio output to be provided to a user. As another example, when output 812 is text that includes a function and a parameter for the function, digital assistant system 700 can perform a function call to execute the function with the provided parameter.

In some examples, digital assistant system 700 includes multiple generative AI (e.g., foundation) models that work together to process data in an efficient manner. In some examples, components of digital assistant system 700 may be replaced with generative AI (e.g., foundation) models trained to perform the same function as the component. In some examples, these generative AI models are more efficient than traditional components and/or provide more flexible processing and/or outputs for digital assistant system 700 to utilize.

As described herein, content is automatically generated by one or more computers in response to a request to generate the content. The automatically-generated content is optionally generated on-device (e.g., generated at least in part by a computer system at which a request to generate the content is received) and/or generated off-device (e.g., generated at least in part by one or more nearby computers that are available via a local network or one or more computers that are available via the internet). This automatically-generated content optionally includes visual content (e.g., images, graphics, and/or video), audio content, and/or text content.

In some embodiments, novel automatically-generated content that is generated via one or more artificial intelligence (AI) processes is referred to as generative content (e.g., generative images, generative graphics, generative video, generative audio, and/or generative text). Generative content is typically generated by an AI process based on a prompt that is provided to the AI process. An AI process typically uses one or more AI models to generate an output based on an input. An AI process optionally includes one or more pre-processing steps to adjust the input before it is used by the AI model to generate an output (e.g., adjustment to a user-provided prompt, creation of a system-generated prompt, and/or AI model selection). An AI process optionally includes one or more post-processing steps to adjust the output by the AI model (e.g., passing AI model output to a different AI model, upscaling, downscaling, cropping, formatting, and/or adding or removing metadata) before the output of the AI model used for other purposes such as being provided to a different software process for further processing or being presented (e.g., visually or audibly) to a user. An AI process that generates generative content is sometimes referred to as a generative AI process.

A prompt for generating generative content can include one or more of: one or more words (e.g., a natural language prompt that is written or spoken), one or more images, one or more drawings, and/or one or more videos. AI processes can include machine learning models including neural networks. Neural networks can include transformer-based deep neural networks such as large language models (LLMs). Generative pre-trained transformer models are a type of LLM that can be effective at generating novel generative content based on a prompt. Some AI processes use a prompt that includes text to generate either different generative text, generative audio content, and/or generative visual content. Some AI processes use a prompt that includes visual content and/or an audio content to generate generative text (e.g., a transcription of audio and/or a description of the visual content). Some multi-modal AI processes use a prompt that includes multiple types of content (e.g., text, images, audio, video, and/or other sensor data) to generate generative content. A prompt sometimes also includes values for one or more parameters indicating an importance of various parts of the prompt. Some prompts include a structured set of instructions that can be understood by an AI process that include phrasing, a specified style, relevant context (e.g., starting point content and/or one or more examples), and/or a role for the AI process.

Generative content is generally based on the prompt but is not deterministically selected from pre-generated content and is, instead, generated using the prompt as a starting point. In some embodiments, pre-existing content (e.g., audio, text, and/or visual content) is used as part of the prompt for creating generative content (e.g., the pre-existing content is used as a starting point for creating the generative content). For example, a prompt could request that a block of text be summarized or rewritten in a different tone, and the output would be generative text that is summarized or written in the different tone. Similarly, a prompt could request that visual content be modified to include or exclude content specified by a prompt (e.g., removing an identified feature in the visual content, adding a feature to the visual content that is described in a prompt, changing a visual style of the visual content, and/or creating additional visual elements outside of a spatial or temporal boundary of the visual content that are based on the visual content). In some embodiments, a random or pseudo-random seed is used as part of the prompt for creating generative content (e.g., the random or pseud-random seed content is used as a starting point for creating the generative content). For example, when generating an image from a diffusion model, a random noise pattern is iteratively denoised based on the prompt to generate an image that is based on the prompt. While specific types of AI processes have been described herein, it should be understood that a variety of different AI processes could be used to generate generative content based on a prompt.

Attention is now directed towards embodiments of user interfaces ("UI") and associated processes that are implemented on an electronic device, such as portable multifunction device 100, device 300, device 500, or device 604.

FIG. 9 illustrates system 900 for generating or editing text using a digital assistant and/or a language model, in accordance with some embodiments. Specifically, FIG. 9 illustrates computer system 901 (e.g., device 100, 300, 500, and/or 604) and computer system 902 (e.g., a server). Computer system 901 includes input/output module 903, digital assistant module "DA1" 904, language model 905, language model "DA2" 906, and device manager 907.

In some embodiments, input/output module 903 enables computer system 901 to accept inputs from a user and can output requests using a display on computer system 901. In some embodiments, device manager 907 enables computer system 901 to obtain context information related to computer system 901. For example, device manager 907 may have access to a location of computer system 901, contacts stored on computer system 901, messaging history stored on computer system 901, light levels detected by computer system 901, etc.

In some embodiments, DA1 904 incorporates one or more features of digital assistant system 700. In some embodiments, language model 905 includes fewer nodes than DA2 906. In some embodiments, DA2 906 is configured to perform at least one text-generation operation that language model 905 is not configured to perform. For example, DA2 906 may have the text generation capacity to generate text describing an image, however, language model 905 may not be configured to generate text describing the image. In some embodiments, one or more functions described herein as being performed by a digital assistant (e.g., 904) can be performed by a language model (e.g., 905 or 906). In some embodiments, language model 905 and/or DA2 906 is a large language model ("LLM"). In some embodiments, language model 905 and/or DA2 906 implements one or more features of foundation model 810.

FIGS. 10A-10V illustrate exemplary user interfaces for generating text using a digital assistant and/or a language model, in accordance with some embodiments. FIG. 11 is a flow diagram of an exemplary method 1100 for generating text using a digital assistant and/or a language model, in accordance with some embodiments. FIG. 12A-12B are system diagrams of an exemplary method 1200 for generating text using a digital assistant and/or a language model. The user interfaces in these figures are used to illustrate the processes described below, including the processes described in FIG. 11, FIG. 12A-12B, and FIG. 13.

FIG. 10A illustrates a computer system that includes one or more features of device 100, 300, 500, and/or computer system 901 and, throughout the discussion of FIGS. 10A-10V and 12A-12B will be referred to as computer system 1000, in accordance with some embodiments. Computer system 1000 includes display 1001. In the embodiment illustrated in FIG. 10A, the computer system is a smart phone. In some embodiments, computer system 1000 is a personal or client electronic device (e.g., a mobile device, a communal device (e.g., a smart speaker and/or digital media player), a tablet computer, a smart watch, a desktop, a laptop, virtual reality headset (e.g., VR headset and/or head-mounted device), and/or augmented reality headset (e.g., smart glasses)). In some embodiments, computer system 1000 can be connected to a communications network (e.g., local area networks (LAN) or wide area networks (WAN), e.g., the internet). At FIG. 10A, computer system 1000 displays application user interface 1002. In some embodiments, application user interface 1002 corresponds to a first party software application. For example, first party software applications may include applications not created/distributed by the creator/distributor of computer system 1000. In some embodiments, application user interface 1002 corresponds to a third party software application. For example, third party software applications may include applications created/distributed by the creator/distributor of computer system 1000. In some embodiments, application user interface 1002 is a text editor application. In some embodiments, application user interface 1002 is a web browser application. In FIG. 10A, application user interface 1002 includes keyboard 1003 and text field 1004 embedded in keyboard 1003. In FIG. 10A, the computer system 1000 received textual input 1005 into text field 1004 (e.g., "Write a review of the restaurant from last night based on this picture and this menu"). In some embodiments, computer system 1000 receives a user speech input and a digital assistant (e.g., 904) populates text field 1004 with text based on the speech input.

In FIG. 10A, computer system 1000 received electronic document 1006 (e.g., "menu.pdf") at text field 1004.

As illustrated in FIG. 10A, computer system 1000 receives input 1007 (e.g., a tap on the arrow key in the text field) corresponding to a request for a language model (e.g., DA1 904 or DA2 906) to generate generated text. In some embodiments, generated text is text that is created or generated by DA1 904, language model 905, operating system 718, and/or DA2 906 to satisfy a request to generate text. In some embodiments, generated text does not include text inputted by the user (e.g., textual input 1005). In some embodiments, input 1007 is another type of input such as a swipe, a double tap, a speech input, a keypress, a mouse-click, and/or an air gesture. In some embodiments, other inputs described with reference to FIGS. 10A-10V can be these other types of inputs.

In some embodiments, in response to receiving textual input 1005 and input 1007, a language model (e.g., 906) determines that a request for additional information should be issued. In some embodiments, the language model determines whether the additional information is a first type or a second type of additional information. In some embodiments, additional information of the first type is information required to generate the generated text. For example, if an input included only the keyword "write," the language model would require additional information to generate any text because the term "write" alone is too vague to generate text. In some embodiments, additional text of the first type is not available at the computer system 1000. For example, if the language model (e.g., 906) requires additional information to disambiguate a keyword (e.g., "this picture" (as seen in FIG. 10A)) and the disambiguation information is not available on computer system 1000 (e.g., computer system 1000 does not have any images stored prior to and after receiving the input) then the additional information is a first type and the user will need to provide details manually. In some embodiments, additional information of the first type is information for determining a syntax and/or structure of the generated text. For example, if the input is "write a retirement notice in a certain form" and the input does not specify what kind of form to use, then the additional information is a first type and computer system 1000 will need to prompt a user for details on what kind of form to use (e.g., letter, announcement, and speech). In some embodiments, additional information of the first type is information for generating at least a plurality of words of the generated text. For example, if the input is "Write me an essay about my favorite place" then the language model may not be able to generate text because the nature of the request requires a threshold amount of specific information related to the request. For instance, "favorite place" is not known to the model and the model cannot generate placeholders for missing information because each city, country, continent will have unique attributes that cannot be presume. In some embodiments, additional information of the first type is information that cannot be genericized. For example, if the input is "write a shopping list based on this recipe" where the elements of the recipe cannot be genericized since each recipe has unique and specialized elements from other recipes, then the model can request additional information of the first type.

In some embodiments, additional information of the second type is information for generating a predetermined type of object (e.g., a single word, a single concept, a name type, and/or a date type (e.g., Jul. 4, 2024)) for the generated text. For example, "Write a thank you card to my sister" may only need the sister's name in the greeting portion of the generated text (as illustrated in FIG. 10L). So, the language model can determine the name of the sister is only required for a name type of object in the text and thus can be replaced with a blank or other placeholder indication. In some examples, additional information of the second type is information that can be genericized. In some examples, information can be genericized when the attributes of the information are not unique to the information. For instance, "Write a thank you card to my sister" does not require the name of the sister since the name of the sister can be genericized to the term "sister" or "Sister's name" (as depicted in FIG. 10L).

At FIG. 10B, in response to textual input 1005 and input 1007 received in FIG. 10A, a language model (e.g., 906) determines that additional information should be requested because additional information is required to generate the requested text. Specifically, computer system 1000 determines that a location, a quality of the experience, and a missing image are necessary to generate the requested text (e.g., because textual input 1005 explicitly references a "picture" and "this menu") and displays FIG. 10B.

FIG. 10B illustrates outputting request 1008 at computer system 1000. FIG. 10B further illustrates computer system 1000 forgoing generating or displaying any text in application user interface 1002 other than the text in request 1008. For example, FIG. 10B does not display the restaurant review text (e.g., 1025) of FIG. 10F in application user interface 1002. FIG. 10B illustrates computer system 1000 notifying the user that additional information is required in request 1008 (e.g., "Additional Information Required"). In some embodiments, request 1008 includes a notification indicating that the additional information will be shared with a remote language model (e.g., 906) (e.g., "DA2 requires additional information"). FIG. 10B illustrates request 1009 for rating 1011 of the experience. At FIG. 10B, request 1009 is prepopulated with an "average" attribute 1010a of rating 1011. FIG. 10B further illustrates request 1012 for an image information 1014. At FIG. 10B, request 1012 includes an empty attribute 1013a for image information 1014. FIG. 10B further illustrates request 1015 for location information 1017 of the restaurant. At FIG. 10B, request 1015 is prepopulated with "Smoked Catch" location 1016a based on calendar information on computer system 1000. In some embodiments, attributes are prepopulated based on context data. In some embodiments, context data includes calendar information, image files on computer system 1000, text files on computer system 1000, contact information on computer system 1000, emails, text messages, relationships between contacts, data in software applications (e.g., installed on computer system 1000), location, and/or types of electronic devices (speaker type, television type, desktop device, etc.) connected to computer system 1000. For example, if computer system 1000 receives an input "write an essay about my most used devices," computer system 1000 may determine additional information is needed (e.g., computer system 1000 may need to first determine the type of device that is used the most because the input request references "my most used devices" and it would be difficult to generate text without knowing what type of device is used the most) and may prepopulate the attribute associated with the information with a "television type" since computer system 1000 is connected to a smart television and computer system 1000 determines that the smart television is the device that is most active device of the user's devices. In some embodiments, request 1009 includes a text field.

FIG. 10B illustrates ignore button 1018a. When computer system 1000 receives an input at ignore button 1018a, computer system 1000 forgoes providing additional information (e.g., 1011, 1014, and/or 1017) to a language model (e.g., 906). FIG. 10B further illustrates update button 1019. As illustrated in FIG. 10B, in response to receiving an input at update button 1019, computer system 1000 provides additional information (e.g., 1011, 1014, and/or 1017) to a language model (e.g., 906).

FIG. 10B further illustrates computer system 1000 receiving tap input 1020 at request 1009. In response to receiving tap input 1020, computer system 1000 displays a plurality of options that are specifically relevant to request 1009 (e.g., specific to a quality rating for the dining experience) as depicted in FIG. 10C.

In some examples, computer system 1000 receives an input at empty attribute 1013a. In some examples, in response to receiving an input at empty attribute 1013a, computer system 1000 displays a collection of images stored on computer system 1000. In some examples, computer system 1000 receives an input selecting an image from the collection of images. For example, a user may tap on empty attribute 1013a and in response to the tap, computer system 1000 will launch a photos application displaying a collection of images stored on computer system 1000. Continuing the example, the user may select an image "salad.jpg" from the collection of images. In response to selecting the "salad.jpg" image, computer system populates empty attribute 1013a with "salad.jpg" at attribute 1013b as depicted in FIG. 10D.

FIG. 10C illustrates computer system 1000 displaying a plurality of options (e.g., "poor" option 1021a, "fair" option 1021b, "average" option 1021c, "good" option 1021d, "excellent" option 1021e, "ignore" option 1021f, "custom" option 1021g), where "average" option 1021c has been preselected. In some embodiments, the language model (e.g., 906) determines a preselected option based on context information (e.g., calendar information, contact information, messaging history, etc.). FIG. 10C illustrates "custom" option 1021g which upon selection causes computer system 1000 to open a text field where computer system 1000 can receive a textual input to be used for populating request 1009.

Figure 10E:
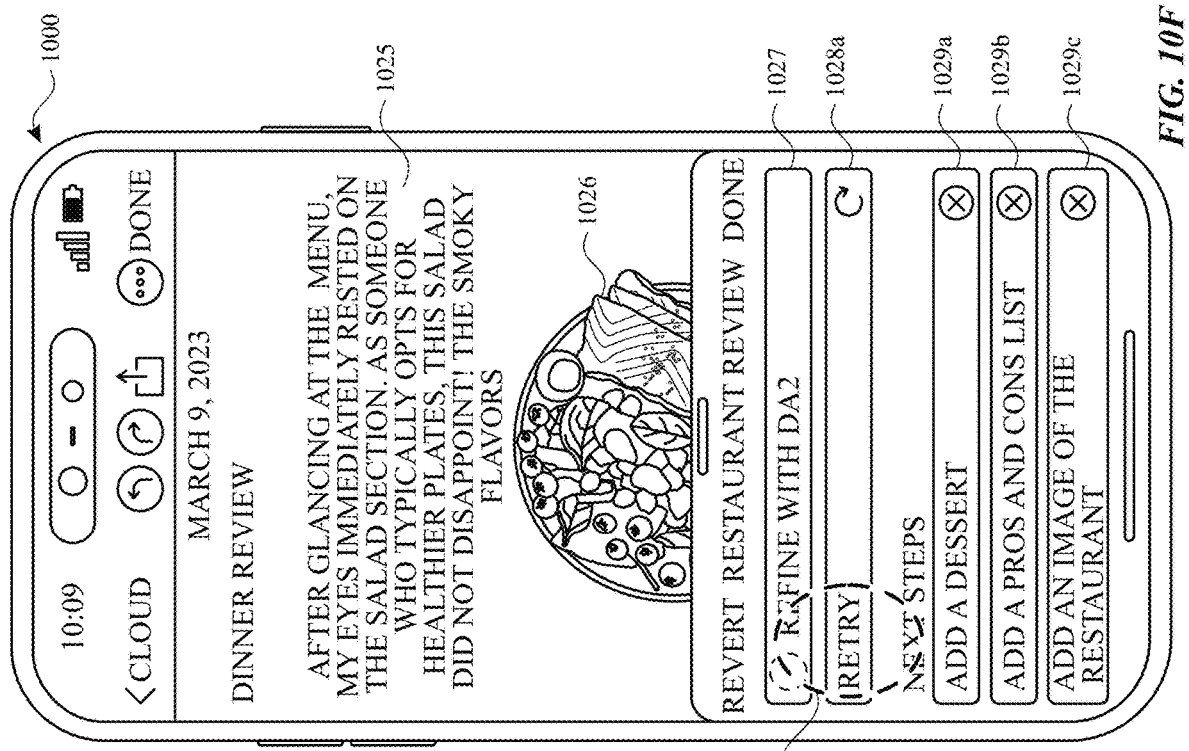
FIGS. 10A-10V illustrate exemplary user interfaces for generating text using a digital assistant and/or a language model, in accordance with some embodiments.

FIG. 10D illustrates an update to "average" attribute 1010a based on a received input selecting 1021e in FIG. 10C. FIG. 10D further illustrates an update to empty attribute 1013a based on an additionally received input (not depicted) adding a "SALAD.JPG" attribute 1013b. FIG. 10D illustrates computer system 1000 displaying request 1008, request 1009 (with rating 1011 and "excellent" attribute 1010b), request 1012 (with image information 1014 and an image attribute 1013b), and request 1015 (with location information 1017 and "Smoked Catch" location 1016a). At FIG. 10D, computer system 1000 detects input 1018b selecting ignore button 1018a, and in response to receiving input 1018b, computer system 1000 displays FIG. 10E.

At FIG. 10E, in response to receiving input 1018b, computer system 1000 displays notification 1022, that explains that the requested generated text cannot be generated (e.g., because the requested information was not provided to the language model and/or because textual input 1005 indicated that a "picture" would be included). In some embodiments, in response to receiving an input 1018b selecting ignore button 1018a, computer system 1000 determines whether the language model (e.g., 906) can generate the requested generated text without additional information. In some embodiments, computer system 1000 displays FIG. 10E when the language model (e.g., 906) cannot generate the requested text without additional information.

FIG. 10E illustrates text field 1023. In some embodiments, computer system 1000 receives a textual input at text field 1023 to generate text using a language model (e.g., 906) (which can initiate processes described with respect to FIGS. 10A-10D). FIG. 10E further illustrates suggestion prompt 1024a, suggestion prompt 1024b, suggestion prompt 1024c, and suggestion prompt 1024d which upon selection cause computer system 1000 to generate text. For example, in response to receiving an input selecting suggestion prompt 1024a, computer system 1000 generates text for a thank you card. In some embodiments, suggestion prompt 1024a, suggestion prompt 1024b, suggestion prompt 1024c, and suggestion prompt 1024d are displayed based on requests previously received at computer system 1000.

Figure 10F:
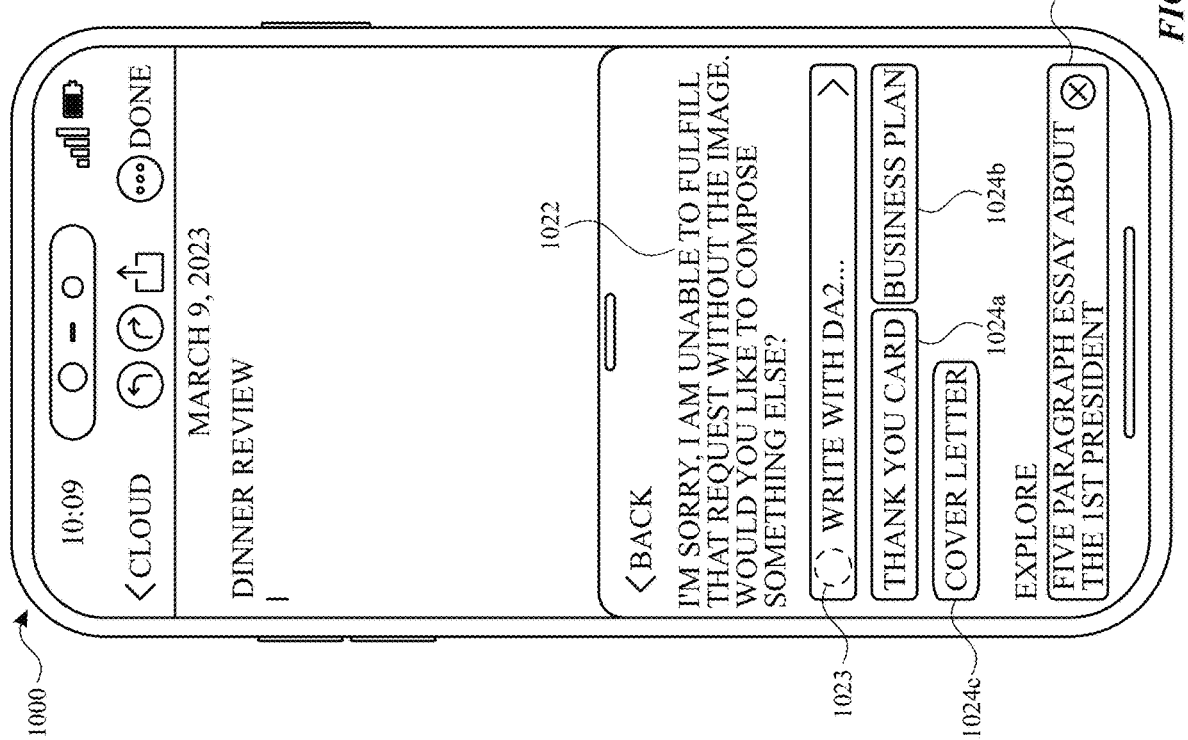
Figure 10H:
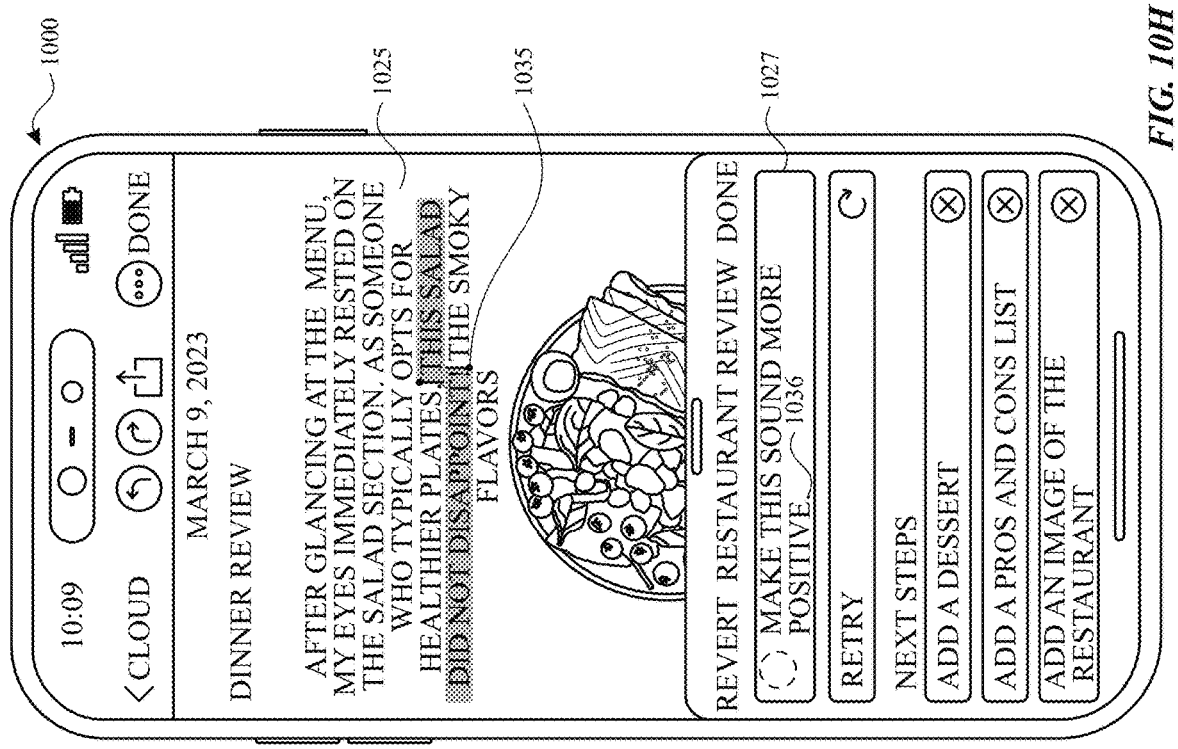

FIG. 10F illustrates, in response to receiving an input selecting update button 1019 (as described with respect to FIG. 10D), the language model (e.g., 906) generates and displays text 1025 which describes a restaurant review about the "Smoked Catch" and the salad the user ate at the "Smoked Catch." As illustrated in FIG. 10F, text 1025 includes salad image 1026 that was added as additional information (e.g., 1013b). FIG. 10F further illustrates text field 1027. In some embodiments, computer system 1000 receives a textual input at text field 1027 and computer system generates text in response to receiving the textual input. For example, if a user were to provide a textual input "add a pun" to text field 1027, the computer system would add a pun to text 1025. FIG. 10F further illustrates retry button 1028a that upon selection causes computer system 1000 to retry generating text for a restaurant review using a different seed (e.g., computer system 1000 generates new text using the same inputs, but because of the different seed, computer system 1000 generates a different variation of text 1025 (e.g., 1030).

At FIG. 10F, computer system 1000 displays refinement button 1029a, refinement button 1029b, and refinement button 1029c. In some embodiments, refinement buttons 1029a-1029c are generated and displayed by computer system 1000 based on context information. For example, refinement button 1029a is displayed based on the analysis of a stored receipt from the "Smoked Catch" showing the user bought a dessert. In another example, refinement button 1029a is displayed based on a restaurant reviewing application's data that indicates many reviews discussing the desserts at "Smoked Catch." In another example, refinement button 1029b is displayed because the user commonly requests (e.g., computer system 1000 determines the user has previously requested a threshold number of times) to generate a pros and cons list when generating reviews. In another example, refinement button 1029c is displayed based on detected images stored on computer system 1000 that are associated with (e.g., tagged) the same location as "Smoked Catch."

As illustrated in FIG. 10F, in response to receiving an input selecting refinement button 1029a (or refinement button 1029b or refinement button 1029c), computer system 1000 updates and/or supplements text 1025. For example, in response to receiving an input selecting refinement button 1029a, computer system 1000 adds text about desserts at "Smoked Catch" to text 1025. In another example, in response to receiving an input selecting refinement button 1029c, computer system 1000 adds an image of the "Smoked Catch" to the restaurant review. At FIG. 10F, computer system 1000 receives input 1028b at retry button 1028a.

Figure 10G:
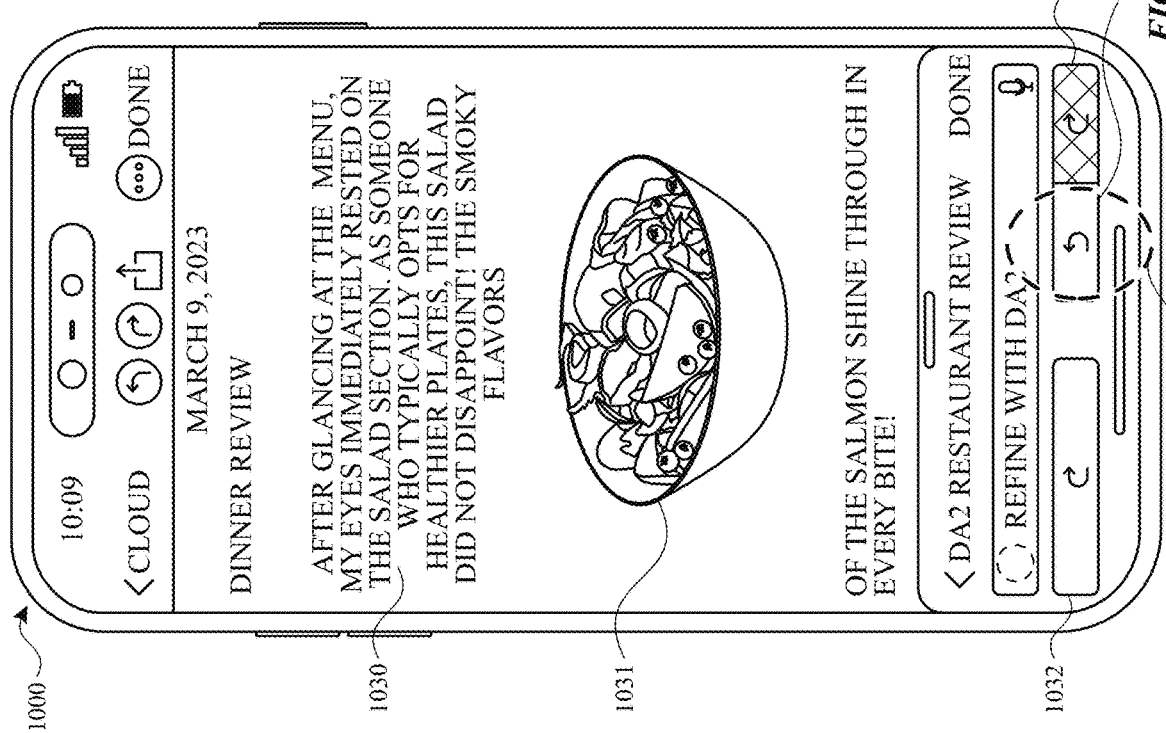
Figure 10J:
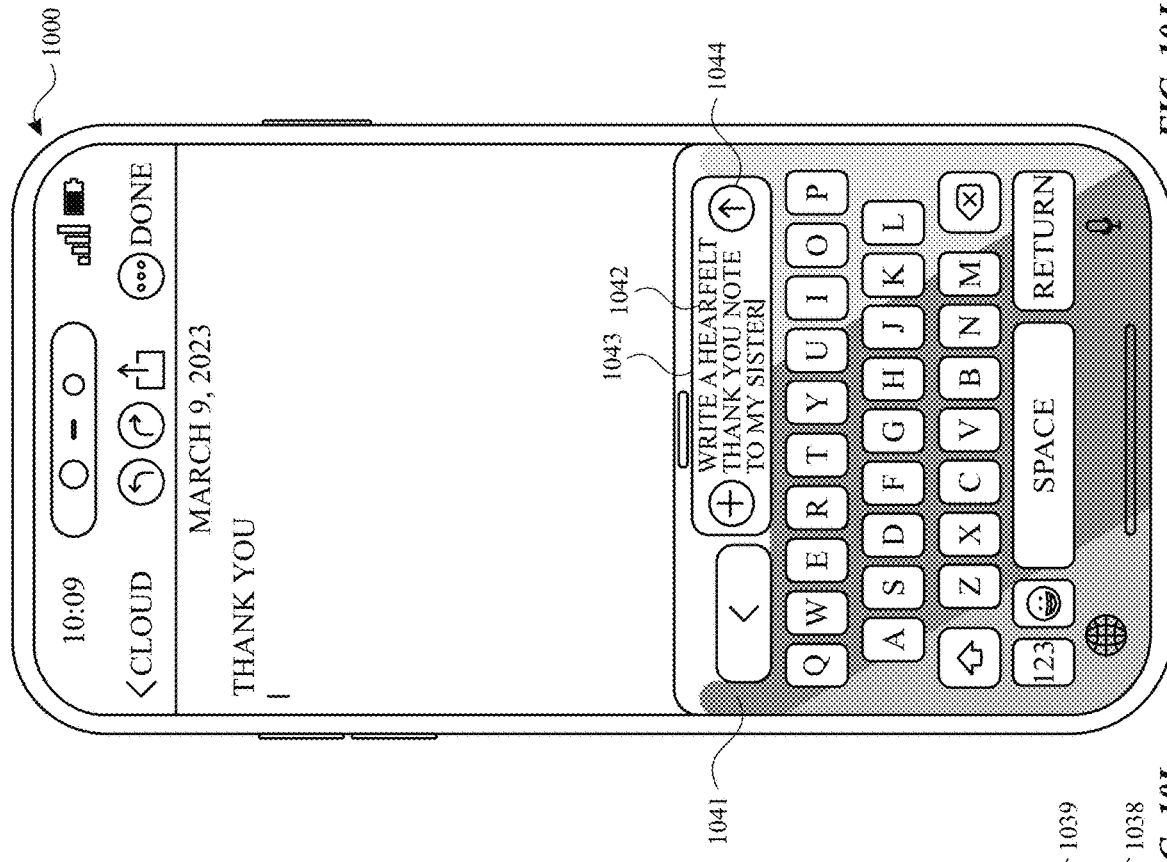

At FIG. 10G, in response to receiving input 1028b selecting retry button 1028a in FIG. 10F, computer system 1000 generates text for a restaurant review a second time using a seed different from the seed used to generate text 1025. For example, text 1025 may have been generated using a first seed to satisfy the request of generating a restaurant review, and text 1030 may have been generated to satisfy the same request to generate a restaurant review using a second seed different from the first seed. For instance, text 1025 and text 1030 both satisfy the request to generate a restaurant review, however, the texts 1025 and 1030 use different vernacular to satisfy the same request (because of the different seeds used to generate the texts). In some embodiments, a seed includes a randomly generated value (e.g., using a random number generator) that functions as a starting point for how operating system 718, DA1 904, language model 905, and/or DA2 906 generates text. At FIG. 10G, computer system 1000 displays text 1030 where text 1030 corresponds to a second attempt at generating text for a restaurant review. For instance, computer system 1000 generated text 1030 with image 1031 (which is different than image 1026). In some embodiments, image 1031 is generated or selected by the language model (e.g., 906). In some embodiments, selecting an image by a language model includes obtaining an image from a network. At FIG. 10G, after generating text 1030, computer system 1000 displays retry button 1032, where selecting retry button 1032 causes computer system 1000 to retry generating the requested generated text based on a seed different from the seed used to generate text 1030.

At FIG. 10G, computer system 1000 displays cycle button 1033a, where selecting cycle button 1033a causes computer system 1000 to revert text 1030 to text 1025. In some embodiments, cycle button 1033a causes computer system 1000 to cycle backwards through generated texts (e.g., 1025 and 1030). At FIG. 10G, computer system 1000 displays cycle button 1034, where selecting cycle button 1034 causes computer system 1000 to cycle forwards through generated texts. FIG. 10G further illustrates, computer system 1000 receiving input 1033b corresponding to a selection of cycle button 1033a and in response to receiving input 1033b, computer system 1000 displays FIG. 10H.

FIG. 10H illustrates, in response to receiving input 1033b, computer system 1000 cycles back to displaying text 1025 with image 1026. FIG. 10H further illustrates computer system 1000 receiving input 1035, where input 1035 is a selection of a subportion of text 1025 (e.g., "this salad did not disappoint"). FIG. 10H further illustrates a user providing textual input 1036 (e.g., "make this sound more positive") at text field 1027. At FIG. 10H, in response to receiving input 1035 and textual input 1036, computer system 1000 displays FIG. 10I.

Figure 10I:
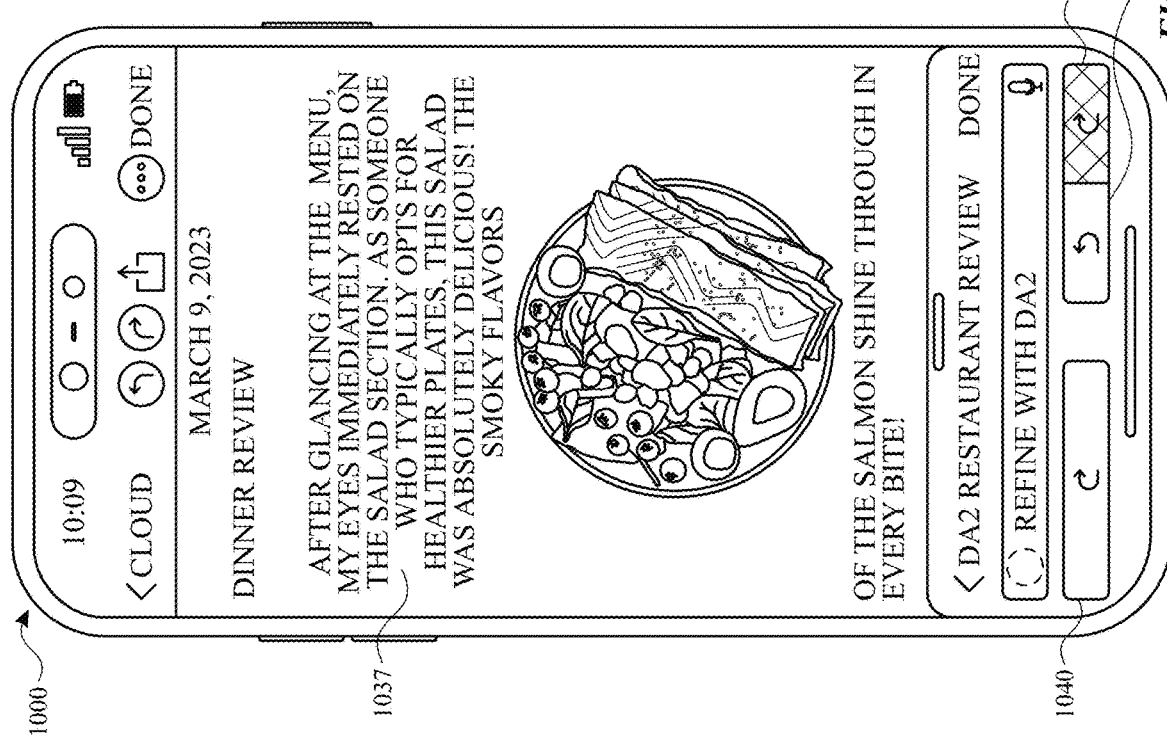

FIG. 10I illustrates, in response to receiving input 1035 and textual input 1036, computer system 1000 generates text 1037 where the selected portion "this salad did not disappoint" is more positive (e.g., "this salad was absolutely delicious") while the rest of text 1037 mirrors text 1025. In some embodiments, text 1037 was generated by the language model (e.g., 906).

FIG. 10I further illustrates cycle button 1038, where selecting cycle button 1038 causes computer system 1000 to revert text 1037 to text 1025. In some embodiments, cycle button 1038 causes computer system 1000 to cycle backwards through generated texts (e.g., 1037 and 1025). At FIG. 10I, computer system 1000 displays cycle button 1039, where selecting cycle button 1039 causes computer system 1000 to cycle forward through generated texts. As illustrated in FIG. 10I, in response to receiving an input selecting cycle button 1039, computer system 1000 displays FIG. 10H. At FIG. 10I, computer system 1000 displays retry button 1040, where selecting retry button 1040 causes computer system 1000 to generate a text based on text 1025.

FIG. 10J illustrates computer system 1000 and composition user interface 1041 where composition user interface 1041 includes text field 1042. As illustrated in FIG. 10J, computer system 1000 receives textual input 1043 (e.g., "write a heartfelt thank you card to my sister") at text field 1042 and input 1044 (e.g., a tap input at arrow key) requesting the language model (e.g., 906) to generate generated text. In response to textual input 1043 and input 1044, computer system 1000 displays FIG. 10K.

FIG. 10K illustrates, in response to receiving textual input 1043 and input 1044, computer system 1000 displaying transfer user interface 1045 to signal to the user that the request may need to be transferred to a remote language model (e.g., 906). FIG. 10K further illustrates request 1046. As illustrated in FIG. 10K, request 1046 is a request for permission to transmit the request to generate text and/or the set of one or more inputs (e.g., 1043) to DA2 906 (e.g., a language model).

FIG. 10K further illustrates deny button 1047. In response to receiving an input selecting deny button 1047, computer system 1000 forgoes transmitting the request to generate text to DA2 906. In some embodiments, when computer system 1000 forgoes transmitting the request to generate text to DA2 906, DA1 904 determines whether DA1 904 can generate the requested text. In some embodiments, if DA1 904 determines DA1 904 cannot generate the requested text, computer system 1000 displays a notification (e.g., 1022) that the requested generated text cannot be generated. FIG. 10K further illustrates approval button 1048. When computer system 1000 receives an input selecting approval button 1048, computer system 1000 displays FIG. 10L.

FIG. 10L illustrates, in response to receiving an input selecting approval button 1048, computer system 1000 displays generated text 1049 with placeholder 1050 for the sister's name. FIG. 10L illustrates placeholder 1050 is marked from generated text 1049 since placeholder 1050 is placed between brackets. In some embodiments, the marking of placeholder 1050 includes highlighting, changing the color of, underlining, changing the font of, changing the font size of, and/or adding brackets to placeholder 1050. In some embodiments, computer system 1000 displays generated text 1049 with placeholder 1050 when the additional information is not required to generate the requested generated text (as described with respect to FIGS. 10A-10B).

FIG. 10L further illustrates request 1051 for information including placeholder button 1052. In some embodiments, when computer system 1000 receives an input selecting placeholder button 1052, computer system 1000 provides a user with a plurality of options for populating placeholder 1050 (as described with respect to FIG. 10C). In some embodiments, placeholder 1050 is initially populated in generated text 1049 based on contextual information related to the computer system 1000. For example, if the user refers to their sister as "sister" consistently in text messages, computer system 1000 may initially populate placeholder 1050 as "Sister" based on the text messaging history. FIG. 10L further illustrates placeholder button 1053. In some embodiments, in response to receiving an input selecting placeholder button 1053, computer system 1000 displays a plurality of options for populating the second placeholder (e.g., "Your Name").

FIG. 10L further illustrates ignore button 1054. When computer system 1000 receives an input selecting ignore button 1054, computer system 1000 ceases to display request 1051 for information, and computer system 1000 removes any visual distinguishments/markings from placeholder 1050 (e.g., removing brackets from placeholder 1050). For example, if computer system 1000 receives an input selecting ignore button 1054, "[Sister's name]" would be replaced with "Sister's name." FIG. 10L further illustrates update button 1055. When computer system 1000 receives an input selecting update button 1055, computer system 1000 displays FIG. 10M.

Figure 10M:
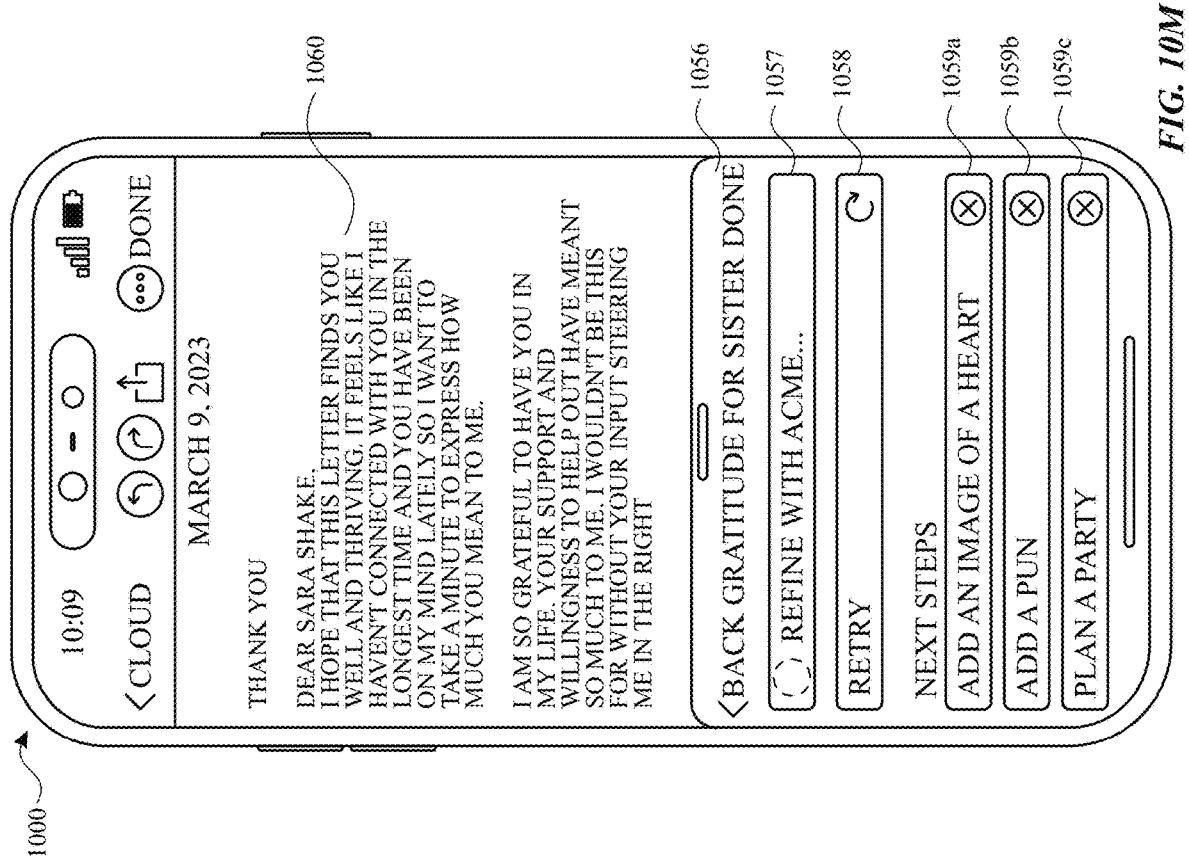

As illustrated by FIG. 10M, in response to receiving an input selecting update button 1055, computer system 1000 generates replaces placeholder 1050 with "Sara Shake" as selected in placeholder button 1052. FIG. 10M illustrates computer system 1000 displaying refinement user interface 1056 which includes text field 1057, retry button 1058, refinement button 1059a, refinement button 1059b, and refinement button 1059c. In some embodiments, refinement button 1059a, refinement button 1059b, and refinement button 1059c operate in a similar manner as refinement button 1029a, refinement button 1029b, refinement button 1029c, and/or refinement button 1029d. In some examples, refinement buttons 1059a-1059c are generated and displayed by computer system 1000 based on context information. For example, refinement button 1059a is displayed based on messages detected between the user and Sara Shake (e.g., the user often uses heart emojis/images when speaking to Sara Shake). In another example, refinement button 1059b is displayed based on the user's internet browsing history (e.g., the user recently searched for puns on a web browser application). In another example, refinement button 1059c is displayed based on the user's calendar application (e.g., the user planned a party for the sister around the time of drafting this letter the year before.

Figure 10N:
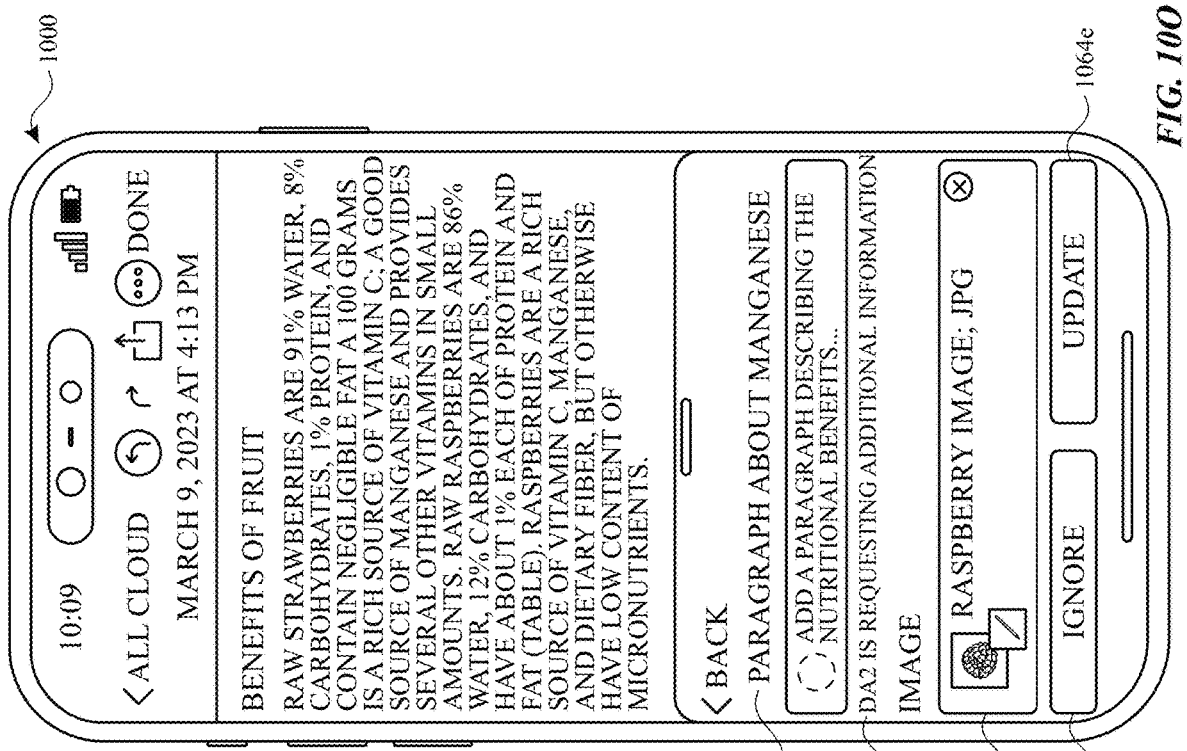

At FIG. 10N, computer system 1000 displays text 1061 describing the properties of strawberries and raspberries. At FIG. 10N, computer system 1000 receives a textual input 1062 requesting a language model to "add a paragraph describing the nutritional benefits of manganese" in a composition user interface (similar to FIGS. 10A and 10J). At FIG. 10N, computer system 1000 displays a selection context button 1063a. In some embodiments, context button 1063a informs the user how many words in text 1061 are selected to be used as context when the language model (e.g., DA1 904 and/or DA2 906) satisfies the request to "add a paragraph describing the nutritional benefits of manganese." For example, in FIG. 10N, context button 1063a indicates that all of text 1061 is selected as context (which includes a total of 72 words).

In response to receiving textual input 1062 (and in some embodiments receiving an additional input (e.g., 1007 in FIG. 10A)), a language model (e.g., DA1 904 and/or DA2 906) determines additional information can supplement the request to "add a paragraph describing the nutritional benefits of manganese." In some embodiments, DA1 904 transmits the request and the context (e.g., all of text 1061) to DA2 906 prior to DA2 906 determining additional information is necessary to satisfy the request. In some embodiments, DA1 904 determines additional information can supplement the request before transmitting the request and context to DA2 906.

Figure 10O:
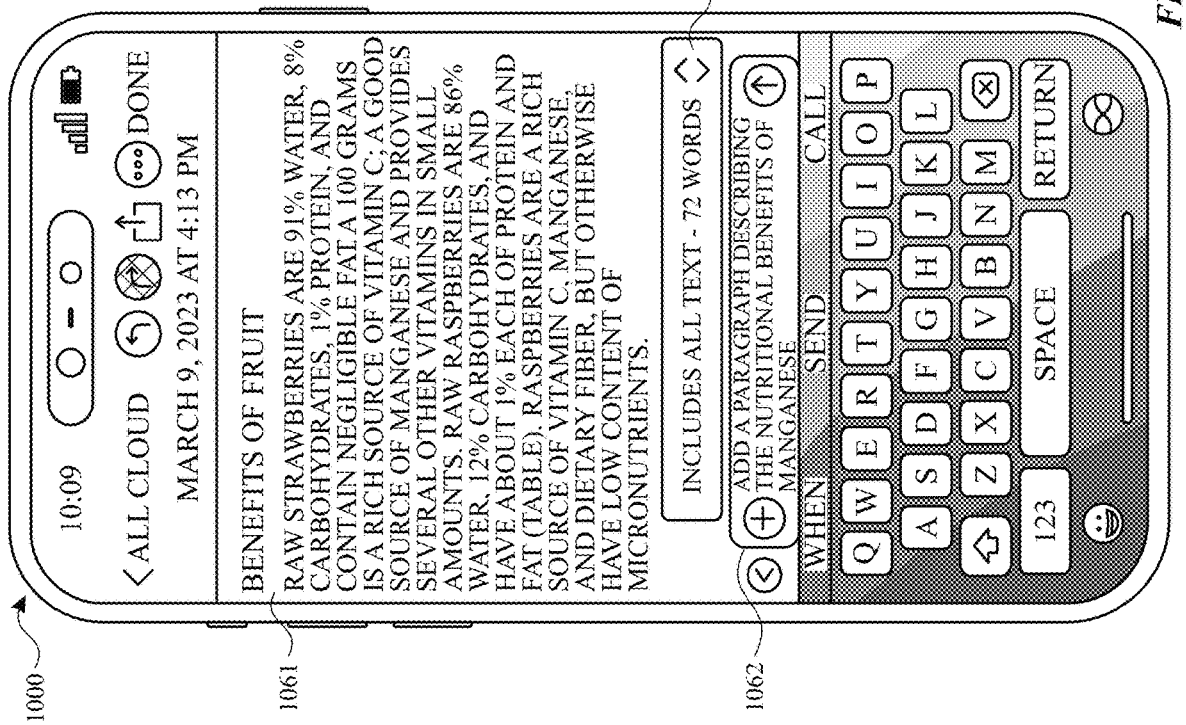

In accordance with determining that additional information can supplement the request (e.g., 1062), computer system 1000 displays request 1064a (similar to request for additional information 1008 in FIG. 10B) for additional information as illustrated in FIG. 10O. At FIG. 10O, request 1064a includes indication 1064b indicating that a remote model (e.g., DA2 906) is requesting additional information to satisfy the request. In some embodiments, DA1 904 requests additional information prior to transmitting the request to DA2 906 and indication 1064b can indicate no information has been transferred to DA2 906 at this time. At FIG. 10O, request 1064a includes photo 1064c. In some embodiments, in response to receiving a request for additional information, DA1 904 detects information installed on/downloaded on/available to computer system 1000 to prepopulate the request for additional information (e.g., 1064c). For example, as depicted in FIG. 10O, DA1 904 detects a photo of a raspberry on computer system 1000 and accordingly prepopulates the request with the photo of a raspberry since the photo can supplement (or is necessary for) the request. In some embodiments, DA1 904 detects other types of data to prepopulate the request such as: photos, calendar information, contact information, emails, messages, installed applications, connected devices, and/or browsing history.

At FIG. 10O, request 1064a includes ignore button 1064d and update button 1064e. In some embodiments, in response to receiving an input selecting ignore button 1064d, computer system 1000 forgoes providing the additional information to the remote model (e.g., 906) and remote model subsequently attempts to satisfy the request without the additional information. In some embodiments, if the remote model cannot satisfy the request, computer system 1000 displays an error user interface (e.g., as seen in FIG. 10E). In some embodiments, if the remote model can satisfy the request without the additional information, the remote model generates the requested paragraph about manganese without the image of a raspberry.

Figure 10P:
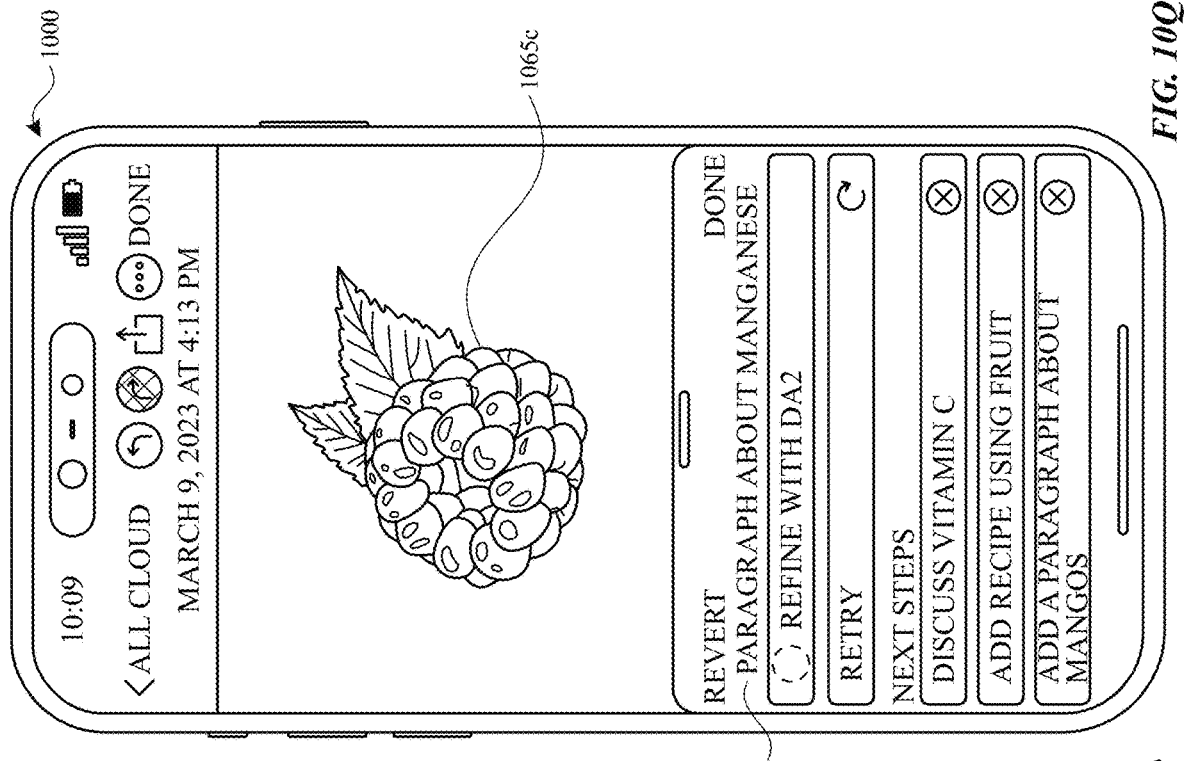

At FIG. 10P, in response to receiving an input selecting update button 1064e, computer system 1000 generates text 1065a about manganese based on context. For example, as depicted in FIG. 10P, sentence 1065b (e.g., a sentence in text 1065a) recommends eating raspberries to increase manganese intake. Continuing the example, text 1065b is generated based on the context of text 1061 because text 1061 discusses strawberries and raspberries, so DA1 904 and/or DA2 906 is able to determine that raspberries have a higher manganese value than strawberries.

At FIG. 10P, computer system 1000 displays refinement user interface 1066a. At FIG. 10P, refinement user interface 1066a includes text field 1066b, retry button 1066c, and refinement buttons 1066d-1066f. In some embodiments, refinement user interface 1066a mirrors the functionality of the refinement user interface described in FIG. 10F.

Figure 10Q:
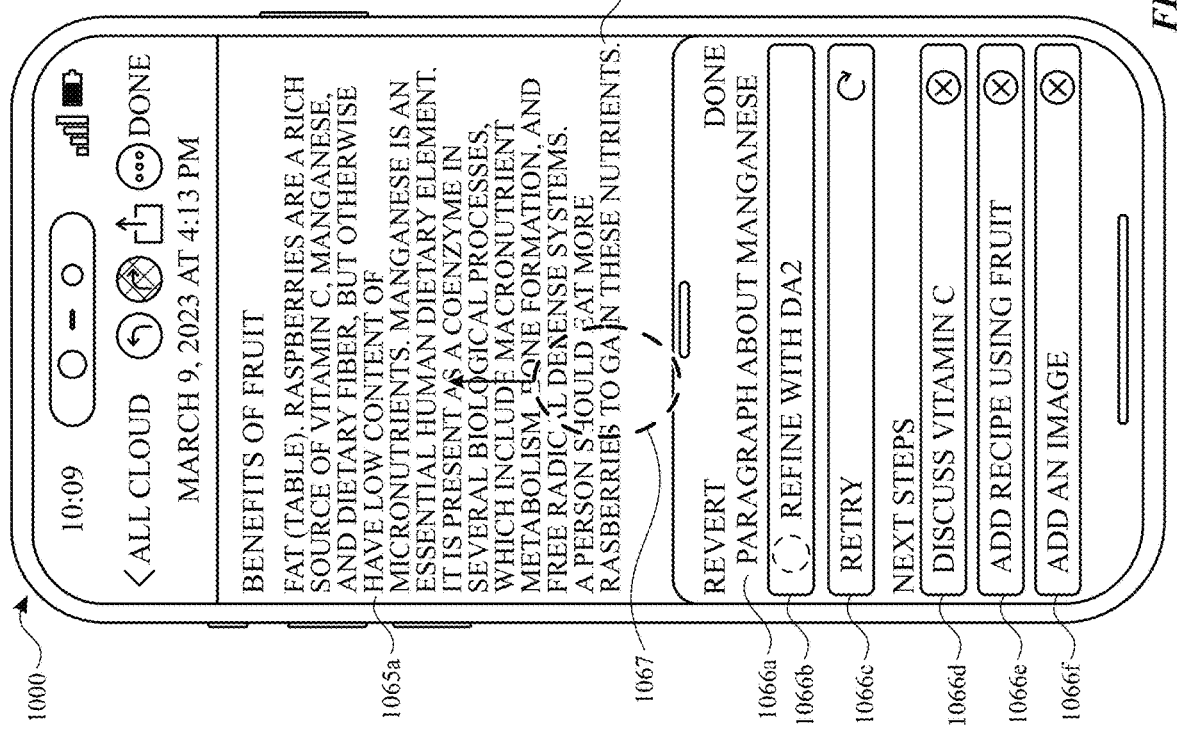
Figure 10S:
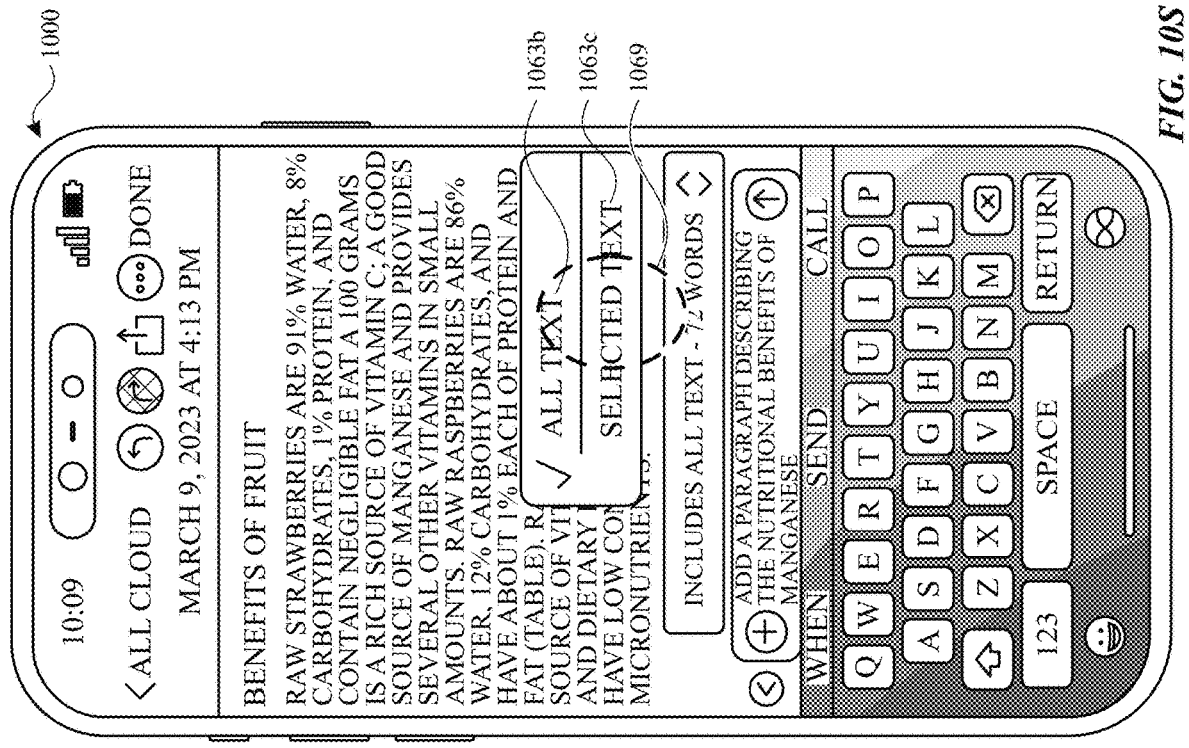

In response to receiving scrolling input 1067 in FIG. 10P, computer system 1000 displays FIG. 10Q. At FIG. 10Q, computer system 1000 displays raspberry image 1065c which is included in text 1065a concurrently with refinement user interface 1066a. At FIG. 10Q, raspberry image 1065c is included in text 1065a because text 1065a was generated based on request 1064a for additional information including image 1064c.

Figure 10R:
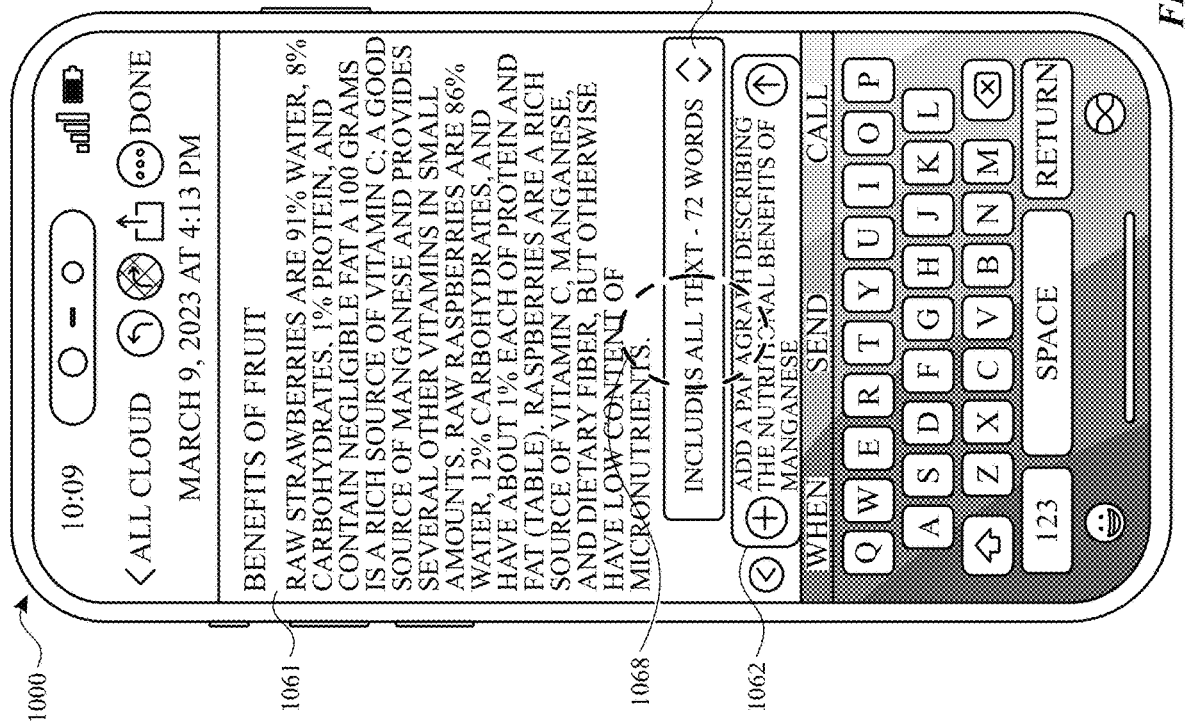
Figure 10V:
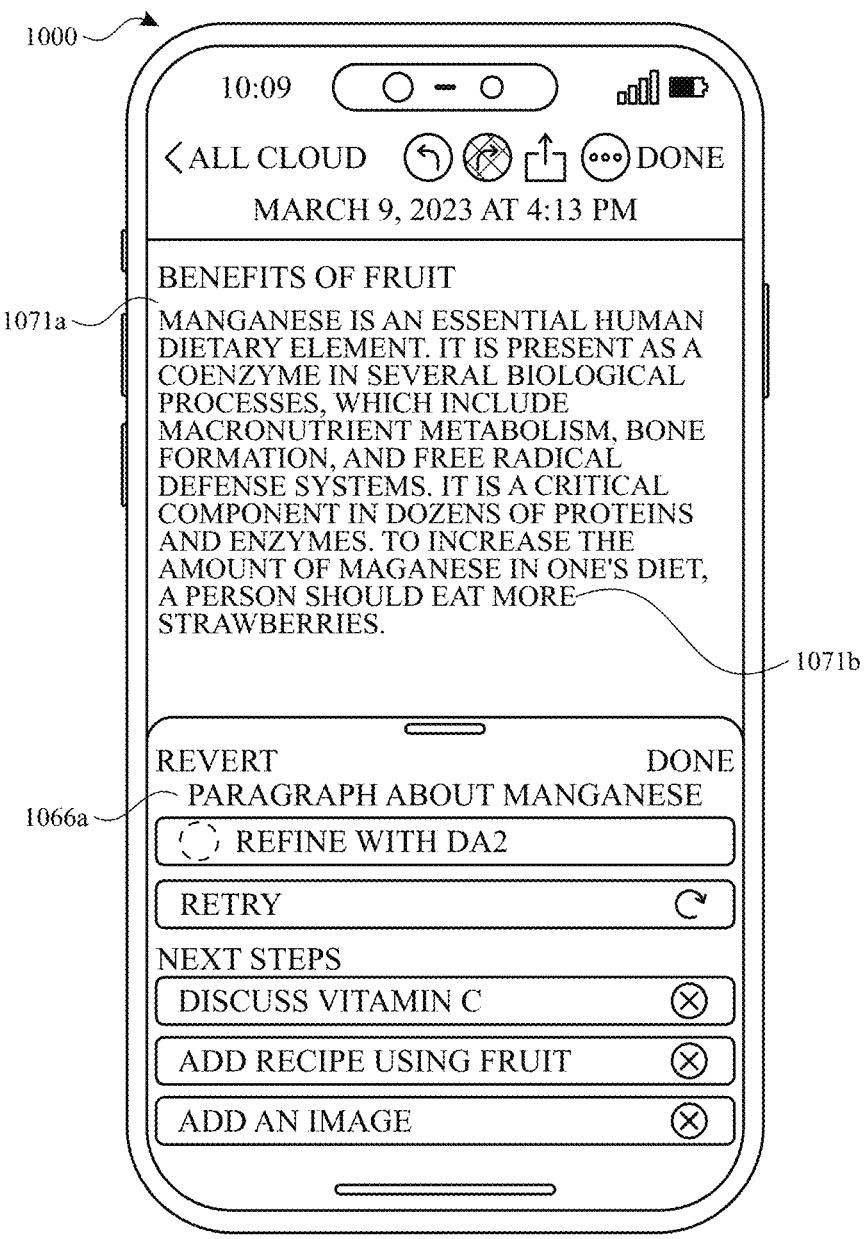

At FIG. 10R, computer system 1000 displays text 1061 with textual input 1062 in a composition user interface (similar to FIGS. 10A, 10J, and 10N). At FIG. 10R, computer system 1000 receives input 1068 selecting context button 1063a.

In response to input 1068 at FIG. 10R, computer system 1000 displays FIG. 10S. At FIG. 10S, computer system 1000 displays context option 1063b and context option 1063c. At FIG. 10S, context option 1063b is preselected because context button 1063a in FIG. 10R was set to including all text as context. At FIG. 10S, in response to receiving an input selecting context option 1063b, computer system 1000 includes all of text 1061 as context when satisfying the request (e.g., 1062). At FIG. 10S, in response to receiving input 1069 selecting context option 1063c, computer system 1000 displays FIG. 10T and includes only selected text in text 1061 as context when satisfying the request.

At FIG. 10T, computer system 1000 displays an updated context button 1063d. At FIG. 10T, updated context button 1063d indicates no text has been selected. At FIG. 10T, if computer system 1000 receives an input (e.g., 1007) requesting computer system 1000 generate text based on textual input 1062, computer system 1000 would generate text 1065a without sentence 1065b because the remote language model (and DA1 904) would not have the paragraphs about strawberries and raspberries as context.

In response to receiving a selection input at FIG. 10T selecting the text related to strawberries in text 1061, computer system 1000 displays FIG. 10U. At FIG. 10U, updated context button 1064d indicates that 35 words have been selected and will be used as context when generating text.

In response to receiving textual input 1062 and input 1070 requesting generated text at FIG. 10U, computer system 1000 displays FIG. 10V. At FIG. 10V, computer system 1000 displays text 1071a where text 1071a discusses the benefits of manganese in a diet concurrently with refinement user interface 1066a. At FIG. 10V, text 1071a includes sentence 1071b which recommends eating strawberries to increase manganese intake. At FIG. 10V, sentence 1071b is generated and included with text 1071a because the sentences in text 1061 relating to strawberries were selected as context (e.g., based on the selection of context option 1063c in FIG. 10S).

FIG. 11 is a flow diagram illustrating a method for generating or editing text using a digital assistant, in accordance with some embodiments. Method 1100 is performed at a computer system (e.g., 100, 300, 500, 604, 901, 1000, 1400, and/or 1700) (e.g., a smartphone, a smartwatch, a head-mounted device, a tablet computer, or a personal computer) that is in communication with a display generation component (e.g., a display or a projector) (e.g., 1001, 1401, and/or 1701) and one or more input devices (e.g., a touch-sensitive surface, a mouse, a keyboard, a microphone, and/or inputs and outputs module 903). In some embodiments, method 1100 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1100 are, optionally, combined, the orders of some operations are, optionally, changed, and some operations are, optionally, omitted.

As described below, method 1100 provides an intuitive way for generating or editing text using a digital assistant. The method reduces the cognitive burden on a user for generating/editing text, thereby creating a more efficient human-machine interface. For battery-operated computing devices, enabling a user to generate/edit text faster and more efficiently conserves power and increases the time between battery charges.

The computer system (e.g., 901, 1000, 1400, and/or 1700) receives (e.g., 1101), via the one or more input devices (e.g., a touch-sensitive surface, a mouse, a keyboard, a microphone, and/or inputs and outputs module 903), a first input (e.g., speech, click, tap, and/or text) (e.g., 1005, 1007, 1043, and/or 1044,), wherein the first input (in some embodiments, the first input is associated with a textual intent, and the textual intent is associated with the request for generated text) corresponds to a request for a language model (e.g., a large language model, an artificial intelligence model, a neural network, and/or a machine learning model) (e.g., 904, 905, or 906) to generate (e.g., using an AI process and/or a generative AI process) generated text (e.g., 1025 and/or 1049) (e.g., automatically-generated text content and/or generative text content).

In response to receiving the first input (e.g., 1102) (in some embodiments, determining, using a language model, to request additional information) and in accordance with a determination that additional information (e.g., 1011, 1014, and/or 1017) of a first type is to be included in the generated text (1103), computer system outputs (1104), via the display generation component, a request (e.g., 1008 and/or 1051) for additional information (e.g., 1011, 1014, and/or 1017) without generating the generated text (as depicted in FIGS. 10B-10D) via the language model (e.g., 810, 904, 905, and/or 906). Outputting a request for additional information without generating the generated text when additional information of a first type is to be included in the generated text provides the user with feedback about the accuracy of the input and assists the user in identifying shortcomings/lack of detail in the first input to ensure the requested generated output is accurate.

In response to receiving the first input and in accordance with a determination that additional information of a second type is to be included in the generated text (1105), computer system generates (1106) (e.g., using an AI process and/or a generative AI process), via the language model, the generated text, wherein the generated text includes at least one placeholder (e.g., 1050) associated with the additional information of the second type. Generating (e.g., using an AI process and/or a generative AI process) text (e.g., automatically-generated text content and/or generative text content) with the at least one placeholder (e.g., automatically-generated text content and/or generative text content) when additional information of a second type is requested by the language model allows the user to quickly identify inaccuracies in the generated text while simultaneously enabling the user to visualize and send a requested generated text.

In response to receiving the first input and in accordance with a determination that the additional information of a second type is to be included in the generated text, computer system displays (1107), via the display generation component, the generated text with the at least one placeholder (e.g., 1050 at FIG. 10L).

In some embodiments, the additional information (e.g., 1011, 1014, and/or 1017) of the first type is information required to generate the generated text (e.g., 1025) (e.g., if the input was "write," the model would be unable to generate any text using that input alone since the input is too vague) (as described with respect to FIGS. 10A-10B). Outputting a request for additional information from a language model when the additional information is required to generate requested generated text provides the user with feedback about the accuracy of the input and assists the user in identifying shortcomings/lack of detail in the first input to ensure the requested generated output is accurate.

In some embodiments, the additional information (e.g., 1011, 1014, and/or 1017) of the first type is not available at the computer system prior to receiving the first input (e.g., 1005, 1007, 1043, and/or 1044) (e.g., if the remote model needs to know information to disambiguate "write a review of the restaurant from last night based on this picture and this menu" without attaching an image (as depicted in FIG. 10A) and the disambiguation information is not available to the local model (e.g., the image is not stored on the computer system at the time of receiving the first input) then the additional information is a first type and the user will need to provide details manually as depicted in FIG. 10B and FIG. 10D). Outputting a request for additional information from a language model when the additional information is not available at the computer system provides the user with feedback about the accuracy of the input and assists the user in identifying shortcomings/lack of detail in the first input to ensure the requested generated output is accurate.

In some embodiments, the additional information (e.g., 1011, 1014, and/or 1017) of the first type is information for determining a syntax and/or structure (e.g., adding image 1013*b*) of the generated text (e.g., if the input is "write a retirement notice in a certain form" and the user does not specify what kind of form to use, then the additional information is a first type and user will need to provide details on what kind of form to use (e.g., letter, announcement, speech, etc.)) (e.g., if the input is "write a review of the restaurant from last night based on this picture and this menu" and the input does not include a picture (as depicted in FIG. 10A), then the additional information is a first type and user will need to provide an image since the image is necessary to determine structure in the generated text). Outputting a request for additional information from a language model when the additional information is used to determine syntax and/or structure of the generated text provides the user with feedback about the accuracy of the input and assists the user in identifying shortcomings/lack of detail in the first input to ensure the requested generated output is accurate.

In some embodiments, the additional information of the first type is information for generating at least a plurality of words of the generated text (e.g., 1025) (e.g., if the input is "write a review of the restaurant from last night based on this picture and this menu" then the remote model may not be able to generate text because the nature of the request requires a threshold amount of specific information related to the request) (e.g., "this picture" is too ambiguous and the remote model cannot generate placeholders for missing information because each image will have unique attributes that cannot be presumed) (as described with respect to FIGS. 10A-10B). Outputting a request for additional information from a language model when the additional information is for generating a plurality of words of the generated text provides the user with feedback about the accuracy of the input and assists the user in identifying shortcomings/lack of detail in the first input to ensure the requested generated output is accurate and reducing the number of inputs the user would have to use to correct multiple words in the generated text.

In some embodiments, the additional information (e.g., 1011, 1014, and/or 1017) of the first type is information that cannot be genericized (e.g., an input (e.g., 1005) of "write a review of the restaurant from last night based on this picture and this menu" cannot be genericized since each restaurant has unique and specialized elements from other restaurants) (as described with respect to FIGS. 10A-10B). Outputting a request for additional information from a language model when the additional information cannot be genericized provides the user with feedback about the accuracy of the input and assists the user in identifying shortcomings/lack of detail in the first input to reduce the number of inputs the user would have to use to correct inaccurate terms that would be generated in the generated text otherwise.

In some embodiments, the additional information of the second type is information that can be genericized (e.g., information can be genericized when the attributes of the information are not unique to the information. e.g., "Write a thank you card to my sister" does not require the name of the sister since the name of the sister can be genericized to the term "sister" or "sister's name") (as depicted in FIGS. 10J-10L). Generating text with a placeholder when the additional information can be genericized assists the user in identifying shortcomings/lack of detail in the generated text and reduces the number of inputs the user would have to use to correct inaccurate terms by providing a generic term to supplement inaccuracies in the generated text.

In some embodiments, additional information of the second type is information for generating (e.g., using an AI process and/or a generative AI process) a predetermined type of object for the generated text (e.g., "Write a thank you card to my sister" may only need the sister's name (e.g., name type of object) in the greeting portion of the generated text) (e.g., the remote model can determine the name of the sister (e.g., Sara in FIG. 10M) is only required for a name type of object in the text and thus can be replaced with a blank or other placeholder (e.g., 1050)). Generating text with a placeholder when the additional information is required to generate a predetermined type of object for the generated text assists the user in identifying shortcomings/lack of detail in the generated text while also reducing the necessary number of inputs the user would have to use to correct inaccurate words in the generated text by providing placeholder predetermined types of objects for the generated texts.

In some embodiments, outputting the request for additional information of the first type includes: displaying a request (e.g., 1008, 1009, 1012, and/or 1015) for first information (e.g., 1011, 1014, and/or 1017) of the first type that corresponds to a first requested attribute (e.g., 1010a, 1010b, 1013a, 1013b, 1016a, and/or 1016b) of the generated text (e.g., 1025), and displaying a request (e.g., 1008, 1009, 1012, and/or 1015) for second information (e.g., 1011, 1014, and/or 1017) of the first type that corresponds to a second requested attribute (1010a, 1010b, 1013a, 1013b, and/or 1016a) of the generated text that is different from the first requested attribute (in some examples, attributes can include: location related to the request, a date, a name, a contact, a calendar date, a disambiguation of a term in the input) (in some examples, displaying each attribute can include displaying affordances and/or text fields associated with each attribute). Displaying each attribute of the additional information in a request to the user provides the user with visual feedback that enables the user to swiftly identify any shortcomings/lack of detail in the input while also ensuring the language model generates an accurate generated text.

In some embodiments, after outputting the request (e.g., 1008, 1009, 1012, and/or 1015) for additional information (e.g., 1011, 1014, and/or 1017) of the first type, receiving a second input (e.g., 1018b), wherein the second input is an indication of a refusal to provide the additional information of the first type (e.g., FIG. 10D). In response to receiving the input request: computer system determines whether the language model can generate the requested generated text. In accordance with a determination that the language model can generate the requested generated text, generating the requested generated text without the additional information of the first type (as described with respect to FIGS. 10D-10E) (e.g., using an AI process and/or a generative AI process). In accordance with a determination that the language model cannot generate the requested generated text, the computer system displays, via the display generation component, an indication (e.g., 1022) that the requested generated text cannot be generated (e.g., "I'm sorry, but I am unable to do that without more information") (as described with respect to FIG. 10E). Receiving a refusal to provide the additional information of the first type protects user privacy and enhances the operability of the device by providing a user greater control over the transmission of personal data. Generating the text using the language model without the additional information of the first type when the receives an input refusing to provide additional information improves the operability of the device by preserving user privacy while still enabling the language model to complete the task of generating text as instructed by the user.

In some embodiments, after generating the generated text (e.g., 1025), the computer system receives a third input (e.g., 1028b, 1029a, 1029b, 1029c, and/or 1036)) that corresponds to a request to update or supplement (e.g., using an AI process and/or a generative AI process) the generated text. In response to the third input, the computer system displays a second generated text (e.g., 1030 and/or 1037) (e.g., automatically-generated text content and/or generative text content) that has been updated or supplemented based on the third input. Displaying a second generated text that has been updated or supplemented based on the third input improves the accuracy and completeness of the generated text and reduces the necessary number of inputs a user would have to provide to refine, supplement, and/or update the generated text manually.

In some embodiments, the third input (e.g., 1028b and/or 1029c) is a request to add an image and the second generated text includes an image selected based on the third input (as described with respect to FIG. 10F). Displaying a second generated text that has been updated or supplemented and the second generated text includes an image selected based on the third input reduces the necessary number of inputs a user would have to provide to incorporate an image into a text by leveraging the automated nature of the language model.

In some embodiments, after generating the generated text (e.g., 1025), the computer system receives a fourth input (e.g., 1036) that corresponds to a request to generate a first subportion (e.g., 1035) (e.g., automatically-generated text content and/or generative text content) of the generated text (e.g., without requesting to re-generate a second portion of the generated text) (e.g., using an AI process and/or a generative AI process) (in some embodiments, the first subportion is a currently selected portion of the generated text) (in some embodiments, re-generating the text includes generating text based on the same inputs used to generate the generated text, but using a new seed). In some embodiments, in response to the fourth input, the computer system regenerates the first subportion of the generated text (as described with respect to FIGS. 10H-10I) (e.g., using an AI process and/or a generative AI process). Re-generating the first subportion of the generated text reduces the necessary battery power a language model or device would require to re-generate an entire generated text while ensuring accuracy of the re-generated text by only re-generating a subportion that the user identifies as inaccurate which would also reduce the necessary number of inputs a user would have to provide to correct the subportion manually.

In some embodiments, the first input (e.g., 1005) includes an electronic document (e.g., 1006), and the generated text (e.g., 1025) is based on the electronic document (e.g., image, spreadsheet, word document, etc.) (in some embodiments, a user can drag and drop a file into a displayed text field associated with the remote or local model to associate a refinement input with the file). Generating the generated text based on the electronic document ensures accuracy of the generated text while also reducing the necessary number of inputs a user would have to provide in the input to describe the electronic document otherwise.

In some embodiments, at least one placeholder (e.g., 1050) includes a first placeholder (e.g., 1050) (e.g., automatically-generated text content and/or generative text content) and a second placeholder (e.g., "My Name" as described with respect to FIG. 10L) (e.g., automatically-generated text content and/or generative text content) and wherein displaying the generated text (e.g., 1049) with the at least one placeholder includes: the computer system displaying a first selectable user interface object (e.g., an affordance, such as a button) (e.g., 1052) that, when selected, initiates a process for populating the first placeholder (e.g., using an AI process and/or a generative AI process), and the computer system displaying a second selectable user interface object (e.g., 1053) that, when selected, initiates a process for populating the second placeholder (as described with respect to FIGS. 10L-10M) (e.g., using an AI process and/or a generative AI process). Displaying a first selectable user interface object that initiates a process for populating the first placeholder reduces the number of inputs a user would have to provide to manually correct any inaccuracies or genericized terms in the generated text. Displaying a second selectable user interface object that initiates a process for populating the second placeholder reduces the number of inputs a user would have to provide to manually correct any inaccuracies or genericized terms in the generated text and provides the user with greater control over the generated text.

In some embodiments, the at least one placeholder (e.g., 1050) includes a third placeholder that is prepopulated (e.g., using an AI process and/or a generative AI process) based on contextual information corresponding to a current context of the computer system (e.g., context includes: contacts, calendar, messages, conversation history, and other information available on the electronic device) (in some embodiments, the current context of the computer system is identified via a local digital assistant and/or local language model of the computer system that also manages/handles prepopulation of the third placeholder) (as described with respect to FIGS. 10L-10M).

In some embodiments, displaying the generated text (e.g., 1049) with the at least one placeholder (e.g., 1050) includes visually distinguishing the at least one placeholder within the generated text (e.g., brackets, highlight, different color than generated text, smaller font, larger font, all capitalized letters, and/or placeholder is underscored) (as described with respect to FIG. 10L). Visually distinguishing placeholders from the rest of the generated text provides the user with visual feedback that allows the user to swiftly identify and correct any genericized or inaccurate terms used in the generated text.

In some embodiments, after generating the generated text (e.g., 1025 and/or 1049), the computer system displays a re-generate selectable user interface object (e.g., 1028a and/or 1058) that, when selected (e.g., 1028b), causes the generated text to be replaced with third generated text (e.g., 1030) (e.g., automatically-generated text content and/or generative text content) that is based on the first input (e.g., 1005, 1007, 1043, and/or 1044) (e.g., also can include an undo button after selecting the retry button) (in some embodiments, generating the third generated text includes generating text based on the same inputs used to generate the generated text, but using a new seed). Displaying a re-generate selectable user interface object that when selected causes the generated text to be replaced with third generated text based on the first input minimizes the necessary inputs required for a user to rewrite or re-generate the text using a language model (e.g., the user would not need to provide the same input again to re-generate the text).

In some embodiments, the first input is received at a displayed composition user interface (e.g., FIG. 10A), and the generated text is displayed in a displayed application user interface (e.g., 1002). In some embodiments, composition user interface is displayed concurrently with the application user interface. In some embodiments, composition user interface ceases to be displayed in response to receiving the first user input (e.g., FIG. 10A-10B).

In some embodiments, the displayed application user interface corresponds to a first party software application (e.g., digital assistant application and/or operating system application). In some embodiments first party software applications includes applications not created/distributed by the creator/distributor of the computer system.

In some embodiments, the application user interface corresponds to a third party software application (e.g., messaging application, web browser application, and/or video game application). For example, third party software applications may include applications created/distributed by the creator/distributor of the computer system. In some embodiments, the application user interface is a text editor application. In some embodiments, the application user interface is a web browser application.

In some embodiments, in response to receiving the first input, an operating system (e.g., 718) of the computer system determines additional information of a first type is to be included in the generated text or additional information of a second type is to be included in the generated text. Determining additional information of a first type or additional information of a second type are to be included in the generated text by the operating system improves the usability of the computer system by allowing software applications and digital assistants to utilize features of the text assistant. For example, by integrating the text assistant features into the operating system of the computer system, users are able to modify/generate text in software applications outside of digital assistant applications, thereby expanding the usability of the computer system.

In some embodiments, the composition user interface (e.g., 1041, 106) (e.g., as seen in FIGS. 10A, 10J, 10N, and 10R) includes a third selectable user interface object (e.g., 1063a and 1063d), wherein the composition user interface is displayed concurrently with the application user interface, wherein generating the generated text (e.g., 1065a and 1071a) is based on context (e.g., using an AI process and/or a generative AI process) (e.g., all text in displayed application user interface (e.g., FIG. 10N) or only selected text in displayed application user interface (e.g., FIGS. 10T-10U)). While displaying the composition user interface concurrently with the application user interface: the computer system receives a fifth input (e.g., tap, click, or speech input) (e.g., 1068) at the third selectable user interface object; in response to receiving the fifth input at the third selectable user interface object, the computer system displays a first selectable option (e.g., "select all") (e.g., 1063*b*) and a second selectable option (e.g., "select some") (e.g., 1063*c*); while displaying the first selectable option and the second selectable option, the computer system receives a sixth input (e.g., tap, click, or speech input) (e.g., 1069). In response to receiving the sixth input and in accordance with a determination that the sixth input corresponds to the first selectable option, including all text (e.g., 1061) in the displayed application user interface in the context. In response to receiving the sixth input and in accordance with a determination that the sixth input corresponds to the second selectable option, the computer system includes only selected text (e.g., as seen in FIG. 10U-10V) in the displayed application user interface in the context.

Note that details of the processes described above with respect to method 1100 (e.g., FIG. 11) are also applicable in an analogous manner to the methods described below. For example, methods 1300, 1500, 1600, and 1800 optionally includes one or more of the characteristics of the various methods described above with reference to method 1100. For example, FIGS. 12A-12B exemplify a system for how the additional information of method 1100 is transmitted and received. For brevity, these details are not repeated below.

FIGS. 12A-12B illustrates a system for generating text using a digital assistant and/or a language model, in accordance with some embodiments. FIG. 12A is a system diagram exemplifying the processes described with respect to FIGS. 10A-10I. FIG. 12B is a system diagram exemplifying the processes described with respect to FIGS. 10H-10M. FIG. 13 is a flow diagram of an exemplary method 1300 for generating text using a digital assistant and/or a language model, in accordance with some embodiments. FIGS. 12A-12B are used to illustrate the processes described below, including the processes described in FIG. 13.

FIG. 12A illustrates computer system 1000 (as illustrated in FIGS. 10A-10V where computer system 1000 is in communication with computer system 1200. In some embodiments, computer system 1200 incorporates one or more features of computer system 902 of FIG. 9. DA1 904 is installed on computer system 1000 (as illustrated in FIG. 9). DA2 906 is installed on computer system 1200 (as illustrated in FIG. 9). In some embodiments, DA1 904 implements one or more features of digital assistant system 700. In some embodiments, DA2 906 implements one or more features of foundation model 810. In some embodiments, computer system 1200 is an external device separate from computer system 1000 (as illustrated in FIG. 9).

At FIG. 12A, step 1201 is performed. Step 1201 includes computer system 1000 receiving an input (e.g., 1005 or 1007 as discussed in FIG. 10A) "write a review of the restaurant from last night based on this picture and this menu." In some embodiments, the input in step 1201 is another type of input such as a swipe, a double tap, a speech input, a keypress, a mouse-click, and/or an air gesture. In some embodiments, other inputs described with reference to FIGS. 12A-12B can be these other types of inputs.

In some embodiments, the input is received as a textual input (e.g., 1005) at a text field (e.g., 1004). In some embodiments, the input is a speech input. In some embodiments, if the text field is a DA1 text field, the textual input received at said DA1 text field would cause DA1 904 to determine if DA1 904 can generate text based on the textual input. For example, if text field 1004 (as illustrated in FIG. 10A) were associated with DA1 904, then receiving the textual input, (e.g., 1005) "write a review of the restaurant . . . ", would cause DA1 904 to first determine if it can generate the review of the restaurant, and if DA1 904 can generate the review, DA1 904 will generate the review and forgo transmitting any information to DA2 906. In some embodiments, DA1 904 determines if it can generate the review of the restaurant based on the capabilities of DA1 904. For example, if the generation of the review of the restaurant requires less than a threshold amount of processing power, DA1 904 may determine DA1 904 can handle the request. In another example, if the generation of the review of the restaurant corresponds to a request that is recognized as a predetermined type of request corresponding to DA2 906, then DA1 904 may determine DA2 906 should handle the request. In some embodiments, the text field is a DA2 text field. In some embodiments, the input includes an electronic document (e.g., 1006).

At FIG. 12A, step 1202 is performed. Step 1202 includes DA1 904 (e.g., installed on computer system 1000) transmitting the request to generate text (e.g., "write a review of the restaurant from last night based on this picture and this menu") to DA2 906 on computer system 1200 (as discussed with respect to FIGS. 10A-10B). In some embodiments, transmitting the request occurs when the first language model cannot handle the request. For example, if the input to write a restaurant review is input into a text field associated with DA1, computer system 1000 may determine whether DA1 904 can or cannot handle the request. Continuing the example, if DA1 904 cannot handle the request because such a request requires greater than a threshold amount of processing power, DA1 904 transmits the request to DA2 906, but if DA1 904 can handle the request, computer system 1000 forgoes transmitting the request to DA2 906 (and DA1 904 generates the requested restaurant review). In some embodiments, DA2 906 determines whether to request additional information or not. As illustrated in FIG. 12A, DA2 906 determines that additional information should be requested from DA1 904.

At FIG. 12A, step 1203 is performed. Step 1203 includes DA1 904 receiving a request (e.g., 1008) for additional information from DA2 906 (as described with respect to FIG. 10B). In some embodiments, in response to receiving the request (e.g., 1008) for additional information, DA1 904 outputs the request for additional information (e.g., 1008 as illustrated in FIG. 10B). In some embodiments, displaying the request for additional information includes displaying an attribute (e.g., 1010, 1013, or 1016) of the additional information. In some embodiments, the attribute (e.g., 1010, 1013, or 1016) is prepopulated based on context data determined by DA1 904. In some embodiments, context data includes calendar information, contact information, types of electronic devices connected to computer system 1000, and/or a location of computer system 1000. For example, FIG. 10B shows DA1 904 prepopulating attribute 1016 with "Smoked Catch" and shows DA1 904 populated attribute 1016 using calendar information (e.g., "Found in Calendar" in FIG. 10B).

In some embodiments, DA1 904 receives an input (e.g., 1018) refusing to share the additional information with DA2 906, and in response to receiving the input refusing to share the additional information, DA1 904 outputs an indication (e.g., 1022) that the request cannot be performed. In some embodiments, DA1 904 receives an input providing additional information (e.g., selecting update button 1019 in FIG. 10B) and permitting the sharing of the additional information with DA2 906.

At FIG. 12A, step 1204 is performed. Step 1204 includes, in response to receiving the input providing additional information, language model 905 transmitting the additional information to DA2 906 on computer system 1200. In some embodiments, in response to receiving the additional information, DA2 906 generates the requested text based on the additional information.

At FIG. 12A, step 1205 is performed. Step 1205 includes, DA1 904 receiving a generated restaurant review text (e.g., 1025) from DA2 906. In some embodiments, in response to receiving the generated restaurant review text from DA2 906, computer system 1000 displays the restaurant review text (e.g., FIG. 10F).

At FIG. 12B a system diagram is shown exemplifying the processes described with respect to FIGS. 10H-10M. At FIG. 12B, step 1206 is performed. Step 1206 includes DA 904 (installed on computer system 1000) receiving an input (e.g., 1043) "write a heartfelt thank you to my sister."

At FIG. 12B, step 1207 is performed. Step 1207 includes language model 905 transmitting a request to generate text to DA2 906 (installed on computer system 1200). In some embodiments, transmitting the request includes transmitting the input (e.g., 1043). In some embodiments, in response to receiving the request, DA2 906 determines if additional information should be requested. In some embodiments, in response to determining that additional information should be requested, DA2 906 generates text with placeholders based on the additional information (as described with respect to FIGS. 10J-10M).

At FIG. 12B, step 1208 is performed. Step 1208 includes DA1 904 receiving generated text (e.g., 1049) with at least one placeholder (e.g., 1050) from DA2 906. In some embodiments, in response to receiving the generated text with at least one placeholder, computer system 1000 displays the generated text with the at least one placeholder (as illustrated in FIG. 10L).

FIG. 13 is a flow diagram illustrating a method for generating or editing text using a digital assistant and/or a language model, in accordance with some embodiments. Method 1300 is performed at a computer system (e.g., 100, 300, 500, 604, 901, 1000, 1400, and/or 1700) (e.g., a smartphone, a smartwatch, a head-mounted device, a tablet computer, or a personal computer) that is in communication with a display generation component (e.g., a display or a projector) and one or more input devices (e.g., a touch-sensitive surface, a mouse, a keyboard, a microphone, and/or inputs and outputs module 903). In some embodiments, method 1300 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1300 are, optionally, combined, the orders of some operations are, optionally, changed, and some operations are, optionally, omitted.

As described below, method 1300 provides an intuitive way for generating or editing text using a digital assistant. The method reduces the cognitive burden on a user for generating or editing text, thereby creating a more efficient human-machine interface. For battery-operated computing devices, enabling a user to generate or edit text faster and more efficiently conserves power and increases the time between battery charges.

The computer system (e.g., a smartphone, a smart watch, a head-mounted device, a tablet computer, or a personal computer) (e.g., 901, 1000, 1400, and/or 1700) receives (e.g., 1201, 1206, 1301), via the one or more input devices (e.g., 903, a touch-sensitive surface, a mouse, a keyboard, and/or a microphone), a first request (e.g., 1005, 1007, 1043, and/or 1044) at a first language model (e.g., 904 and/or 905) installed on the computer system (as described with respect to FIG. 9 and FIGS. 12A-12B), wherein the first request corresponds to (in some embodiments, the first request is associated with a textual intent, and the textual intent is associated with the request for generated text) a request for generated text (e.g., 1025 and/or 1049) (e.g., automatically-generated text content and/or generative text content).

The computer system (e.g., 901, 1000, 1400, and/or 1700) transmits (e.g., 1202, 1207, and/or 1302) the first request to a second language model (e.g., 810 and/or 906), wherein the second language model is not installed on the computer system (e.g., is installed on an external computer system (e.g., an external server)) (as described with respect to FIG. 9, and FIGS. 12A-12B). Transmitting the first request to a second language model wherein the second language model is not installed on the computer system conserves memory, battery life, and processing power on the computer system by offloading complex tasks to another model on a different device that may be capable of performing different tasks.

The computer system receives (e.g., 1203 and/or 1303) from the second language model, a request (e.g., 1008, 1009, 1012, and/or 1015) for additional information (e.g., 1011, 1014, and/or 1017) for generating (e.g., using an AI process and/or a generative AI process) the generated text (e.g., 1025 and/or 1049).

The computer system outputs (e.g., 1304) (e.g., displaying), via the first language model, the request (1008, 1009, 1012, and/or 1015) for additional information (e.g., 1011, 1014, and/or 1017) (as described with respect to FIG. 10B). Outputting the request for additional information ensures the requested generated text is accurate and also assists the user in identifying shortcomings/lack of detail in the first request so that the user will not have to provide extra unnecessary inputs to correct an inaccurate generated text.

In some embodiments, the second language model is a large-language model (LLM) (e.g., as described with respect to FIG. 9).

In some embodiments, the first language model (e.g., 810, 904, and/or 905) is a neural network that includes fewer nodes than the second language model (e.g., 906) (in some examples, the first language model is smaller (e.g., in size and/or in text-generation capability) than the second language model). Transmitting the first request to a second language model wherein the first language model is a neural network that has fewer nodes than the second language model conserves memory, battery life, and processing power on the computer system by only requiring a lightweight model on the computer system and an ability to offload complex tasks to a more powerful model on a different device.

In some embodiments, the second language model is configured to perform a first text-generation operation that the first language model is not configured to perform (e.g., the second language model has greater text-generation capabilities than the first language model) (as described with respect to FIG. 9). Transmitting the first request to a second language model wherein the second language model is configured to perform a first text generation operation that the first language model is not configured to perform conserves memory, battery life, and processing power on the computer system by only requiring a lightweight model on the computer system and an ability to offload complex tasks to a more powerful model on a different device.

In some embodiments, receiving the request (e.g., 1008, 1009, 1012, 1015, and/or 1051) for additional information includes the computer system receiving (e.g., 1208) generated text (e.g., 1049) (e.g., automatically-generated text content and/or generative text content) with at least one placeholder (e.g., 1050), wherein the at least one placeholder is based on the additional information (e.g., "Sister's name" and/or "Your name" at FIG. 10L), and wherein outputting the request for additional information includes the computer system displaying, via the display generation component (e.g., 1001), the generated text with the at least one placeholder (as described with respect to FIG. 10L). Displaying the generated text with at least one placeholder allows the user to quickly identify inaccuracies in the generated text while simultaneously enabling the user to visualize a complete requested generated text.

In some embodiments, after outputting the request (e.g., 1009, 1012, 1015, and/or 1051) for additional information, the computer system receives, at the first language model, the additional information (e.g., 1011, 1014, and/or 1017 at FIG. 10D), and in response to receiving the additional information, the computer system transmits (e.g., 1204), via the first language model, the received additional information to the second language model (e.g., 906). Transmitting the received additional information to the second language model ensures the second language model generates accurate text which will reduce the necessary number of inputs a user would have to provide to correct any inaccuracies.

In some embodiments, after transmitting the additional information, the computer system receives (e.g., 1205), from the second language model, the generated text (e.g., 1025), wherein the generated text is based on the first request and the additional information. Receiving the generated text from the second language model, wherein the generated text is based on the first request and the additional information improves the accuracy of the generated text by using the additional information to supplement any shortcomings or lack of detail in the first request.

In some embodiments, outputting the request for additional information includes displaying, via the display generation component, an indication (e.g., 1008 and/or 1046) that the additional information will be shared with the second language model (as described with respect to FIG. 10B), and wherein receiving the additional information at the first language model includes receiving a second input (e.g., 1019) corresponding to an intent (e.g., approval) to share the additional information. Displaying an indication that the additional information will be shared with the second language model provides the user with greater transparency of how their data is used which improves the operability of the computer system. Receiving a second input corresponding to an intent to share the additional information enables the user to have control over how their data is handled which protects user privacy.

In some embodiments, the computer system transmits the first request to the second language model in accordance with a determination that a third user input (e.g., 1019 and/or 1048) corresponding to an intent to permit the first language model to transmit the first request. In some embodiments, before transmitting the first request to the second language model, the computer system provides a request (e.g., 1046) for permission to transmit the first request to the second language model (as described with respect to FIG. 10K). In some embodiments, the computer system receives the third user input associated with the request for permission. Transmitting the first request to the second language model in accordance with a determination that a third user input corresponds to an intent to permit the first language model to transmit the first request protects user privacy and conserves processing power by only processing the first request using the second language model when a user permits rather than always processing the first request regardless of user permission.

In some embodiments, outputting the request for additional information includes the computer system displaying, via the display generation component, a first attribute (e.g., 1010a, 1013a, 1016a) of the additional information, and the computer system prepopulates (e.g., assigning first attribute an option (e.g., "average")) (e.g., using an AI process and/or a generative AI process) the first attribute of the additional information using context data.

In some embodiments, the context data includes calendar information (e.g., 1016a) (e.g., dates, events, and/or attendees).

In some embodiments, the context data includes contact information (e.g., 1052) (e.g., addresses, name, phone number, and/or email address).

In some embodiments, the context data includes a type (e.g., speaker type, television type, communal device type, augmented reality device type, desktop type, table type, and/or smartphone type) of at least one device connected (e.g., via Bluetooth connection) to the computer system (as discussed with respect to FIG. 10B).

In some embodiments, the context data includes a location (e.g., 1016a) of the computer system.

In some embodiments, the first request is associated with a third input (e.g., 1043), wherein the third input is a textual input in a text field (e.g., 1042), and wherein the text field is associated with the second language model. Receiving a third input in a text field associated with the second language model conserves processing power and reduces the necessary number of inputs a user would have to provide to invoke the second language model and to specify that the input is to be transmitted to the second language model.

In some embodiments, the first request is associated with a third input (e.g., 1043), wherein the third input is a textual input in a text field (e.g., 1042), and wherein the text field is associated with the first language model, wherein transmitting the first request to the second language model occurs in accordance with a determination that the first language model cannot handle the first request (e.g., 1202). In some embodiments, in accordance with a determination that the third input is the textual input in the text field and the text field is associated with the first language model, the computer system determines whether the first language model can or cannot handle the first request (as described with respect to FIG. 12A). In some embodiments, in accordance with a determination that the first language model can handle the first request, the computer system generates (e.g., using an AI process and/or a generative AI process) text (e.g., automatically-generated text content and/or generative text content) based on the first request and the computer system foregoes transmitting the first request to the second language model (as described with respect to FIG. 12A). Determining whether the first language model can or cannot handle the intent in accordance with a determination that the third input is the textual input in the text field associated with the first language model protects user privacy by ensuring the generated text is accurate to the user's intent since a user providing text at a text field associated with the first language model. Generating text based on the first request and forgoing transmitting the first request to the second language model in accordance with a determination that the first language model can handle the first request. ensures a swift response by the first language model and protects the user's privacy by forgoing sharing any data with the second language model.

Note that details of the processes described above with respect to method 1300 (e.g., FIG. 13) are also applicable in an analogous manner to the methods described below. For example, methods 1100, 1500, 1600, and 1800 optionally includes one or more of the characteristics of the various methods described above with reference to method 1100. For example, FIGS. 10A-10V exemplify user interfaces showing how the additional information of method 1300 is outputted. For brevity, these details are not repeated above nor below.

Figure 14E:
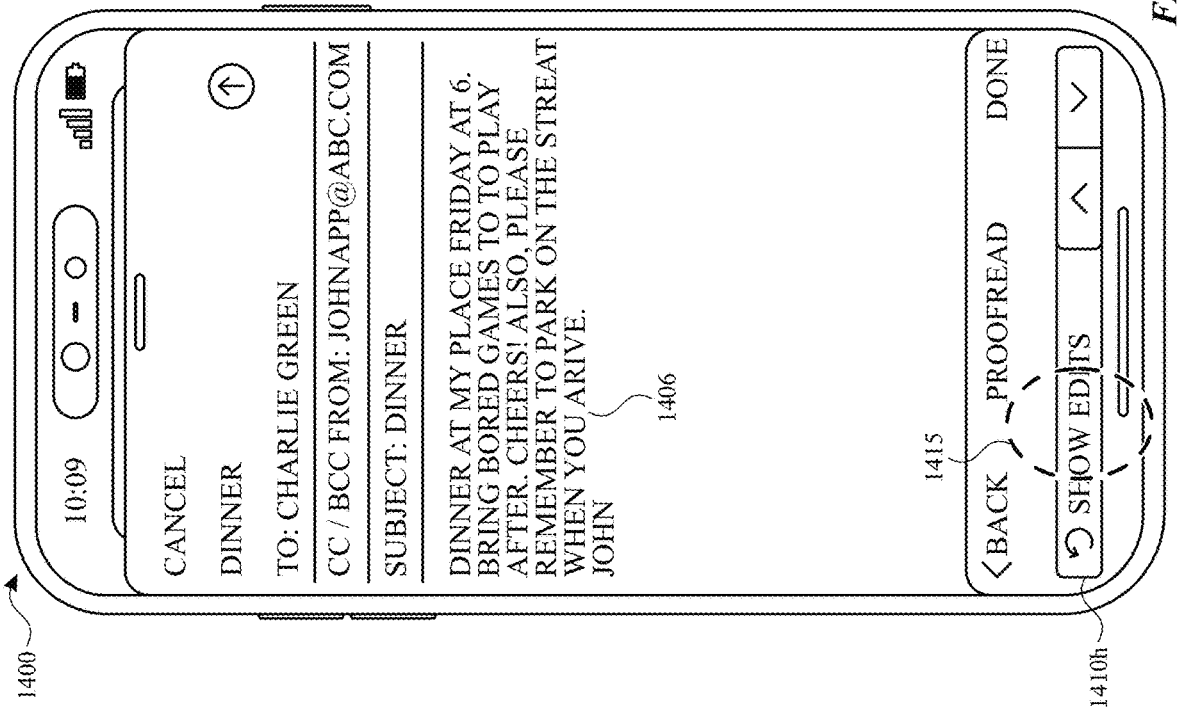
Figure 14H:
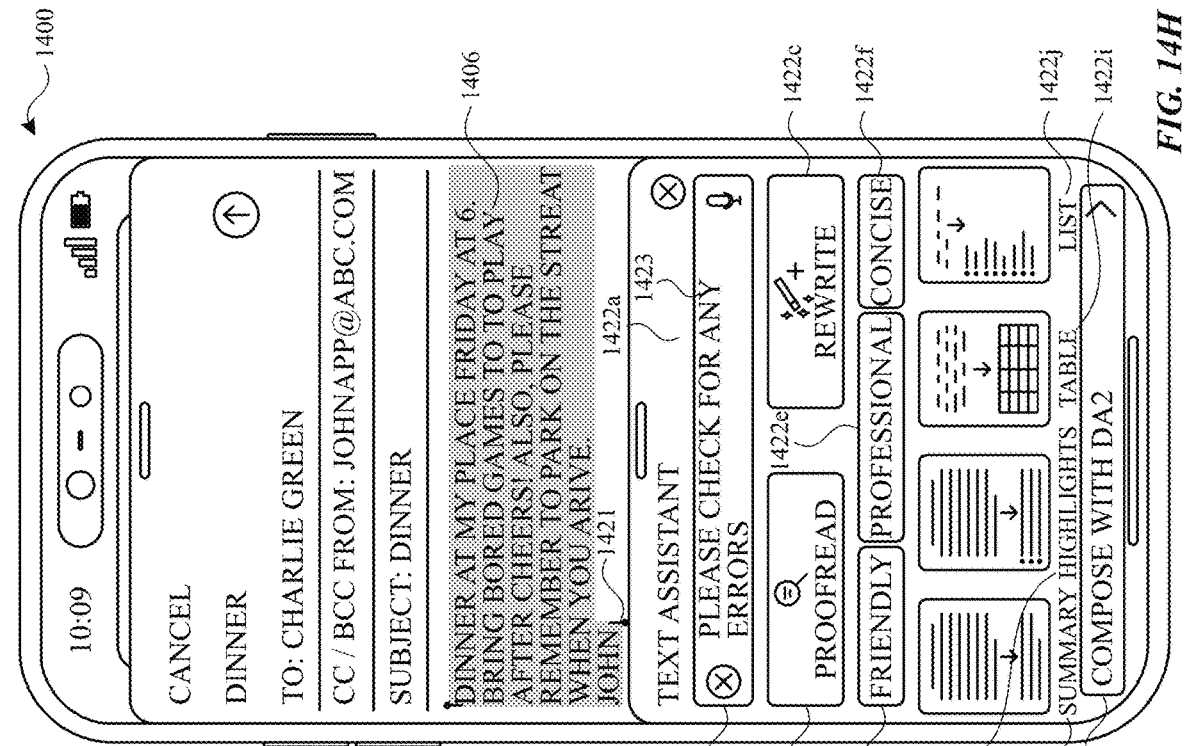
Figure 14G:
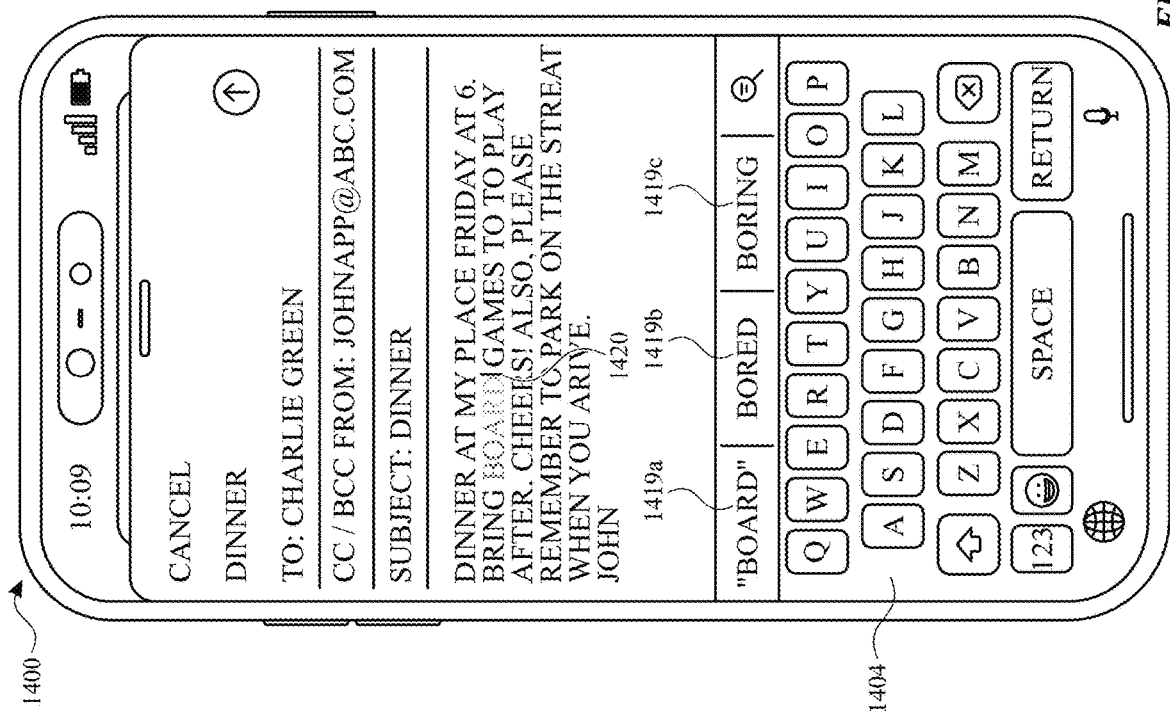
Figure 14L:
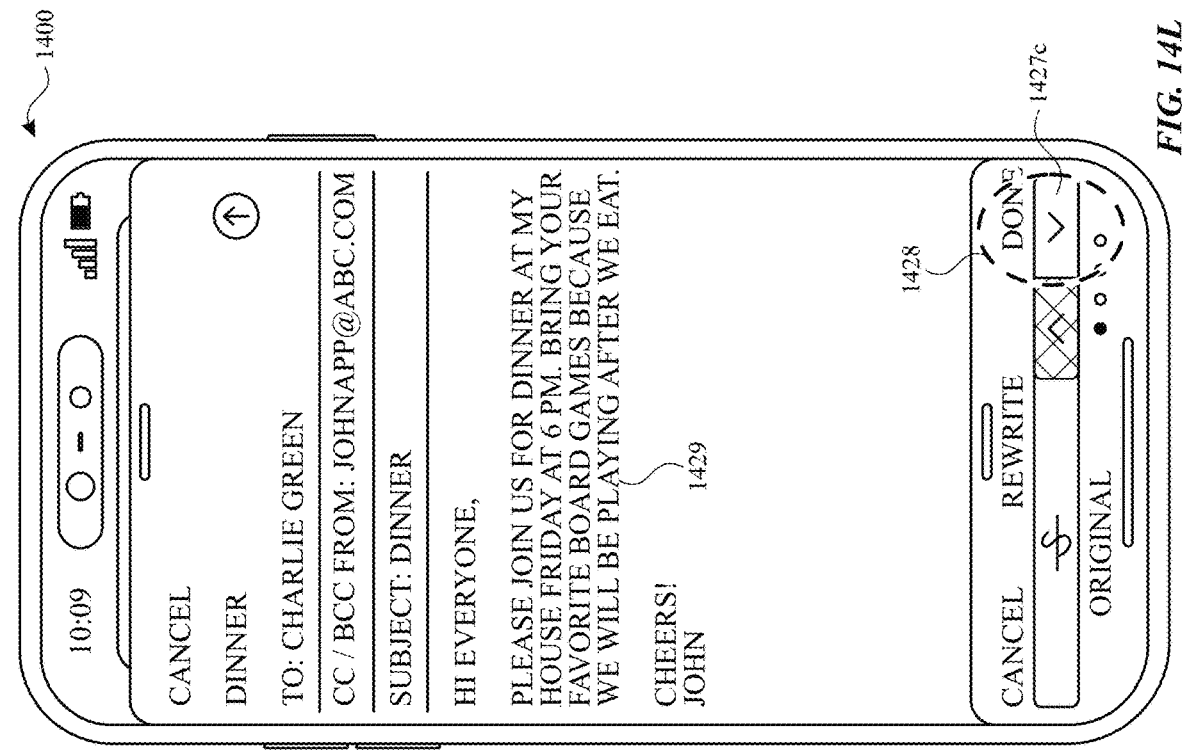
Figure 14K:
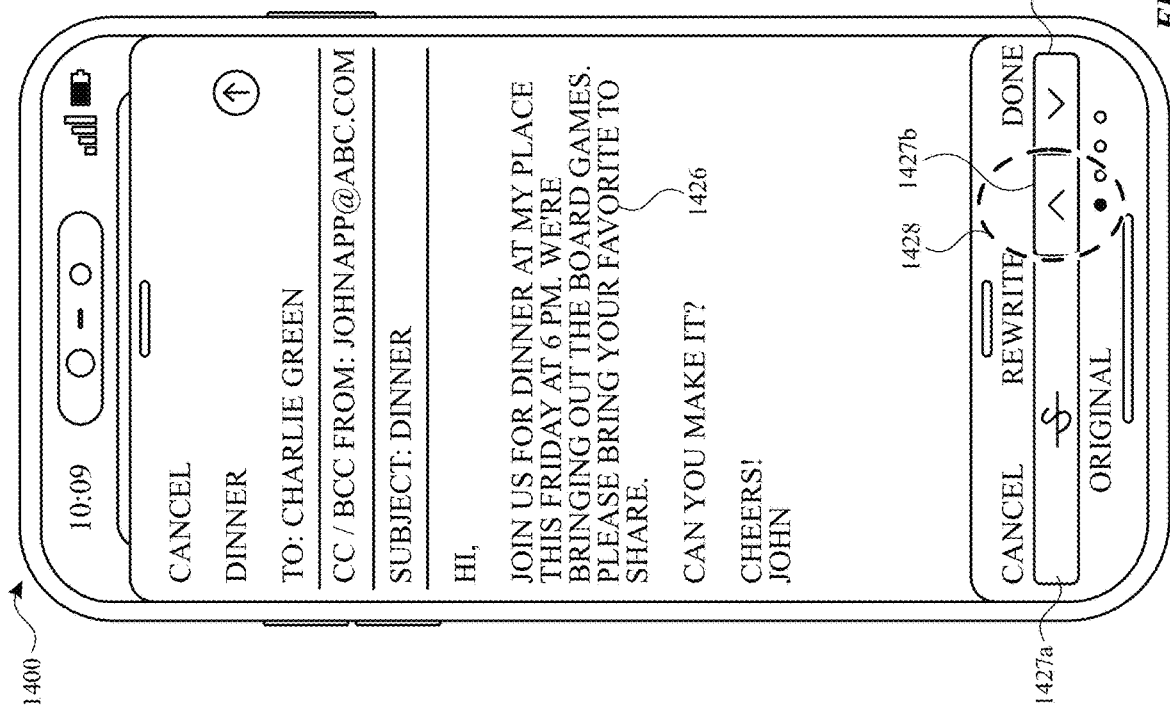
Figure 14N:
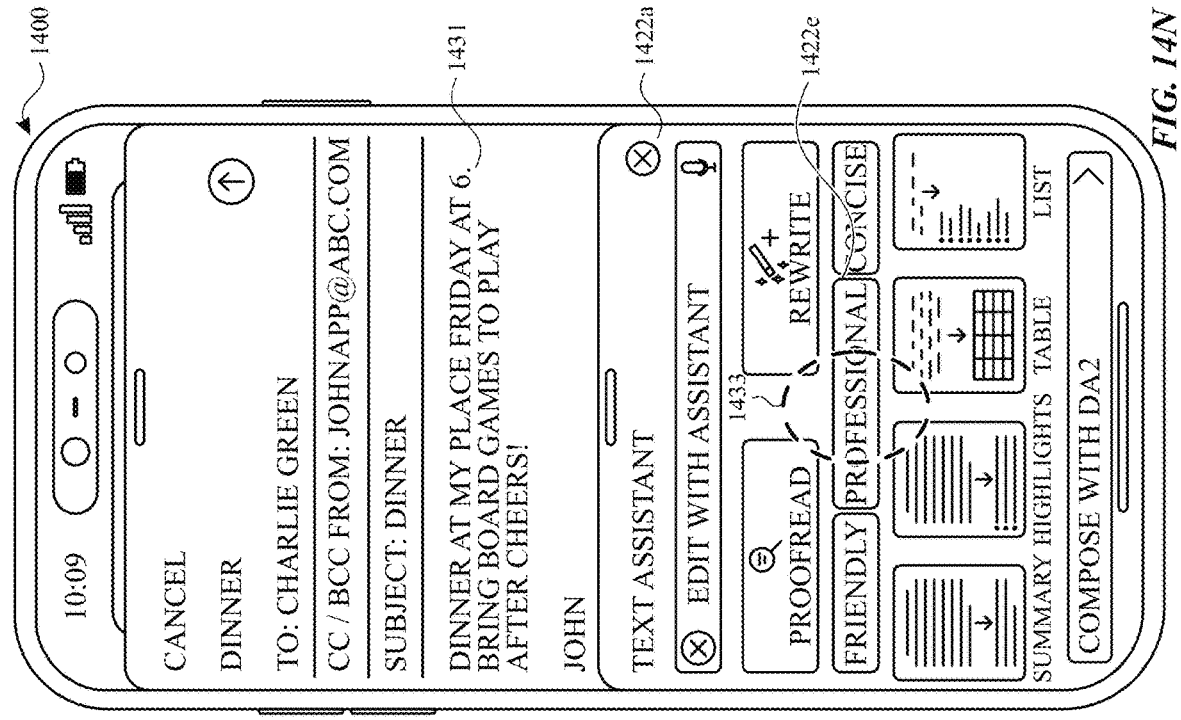
Figure 14M:
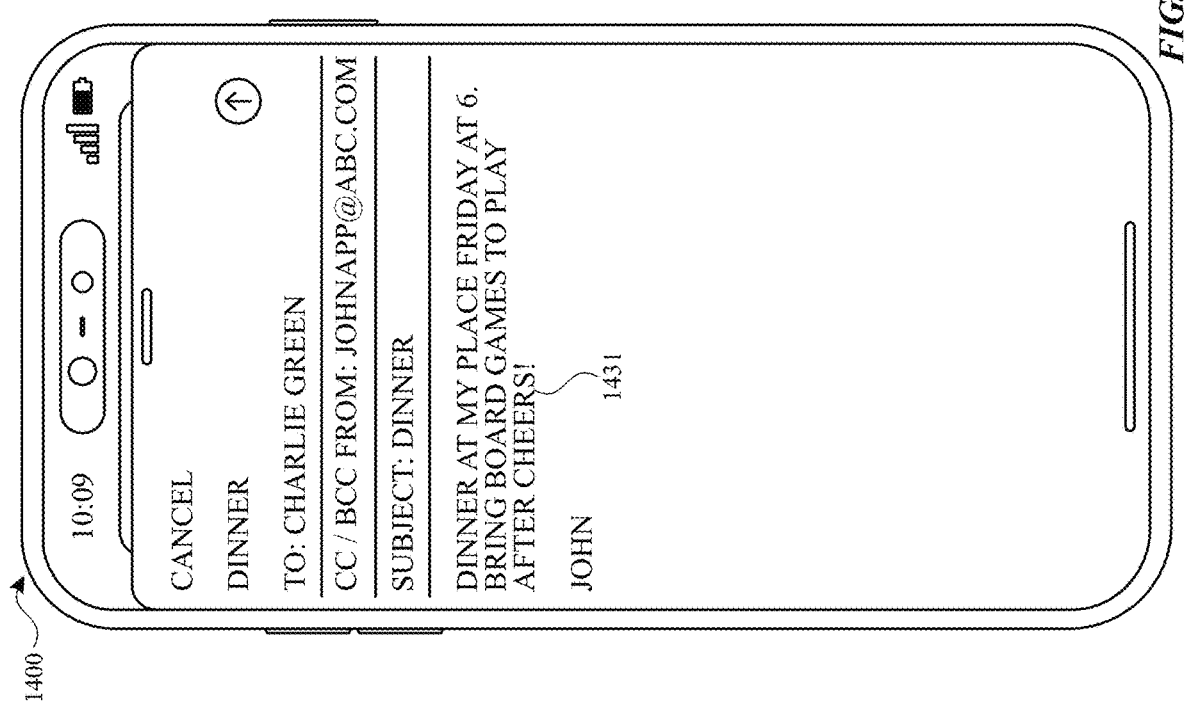
Figure 14O:
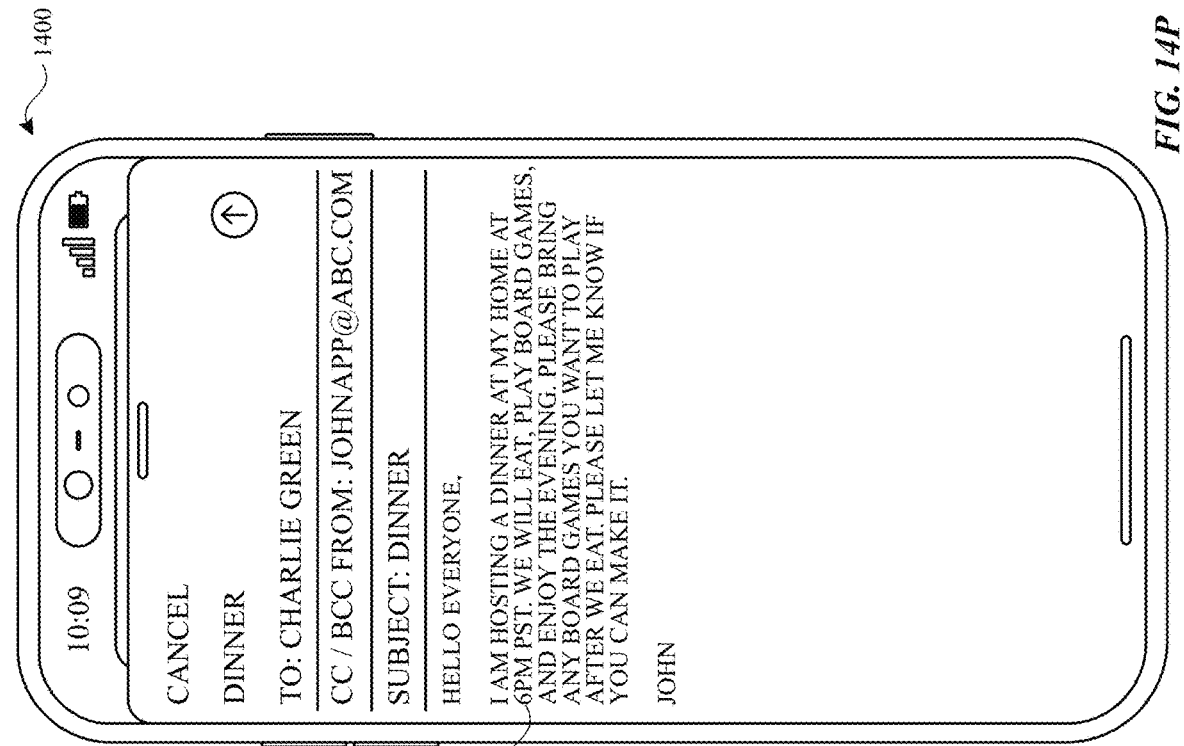
Figure 14P:
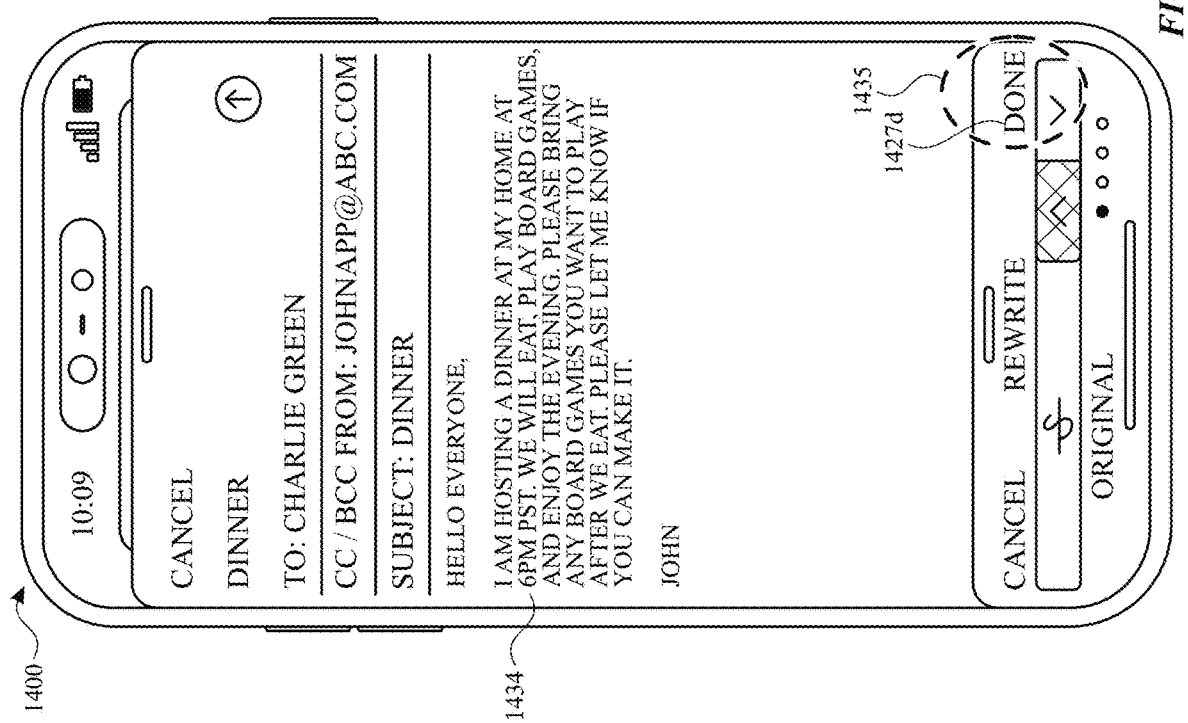
Figure 14Q:
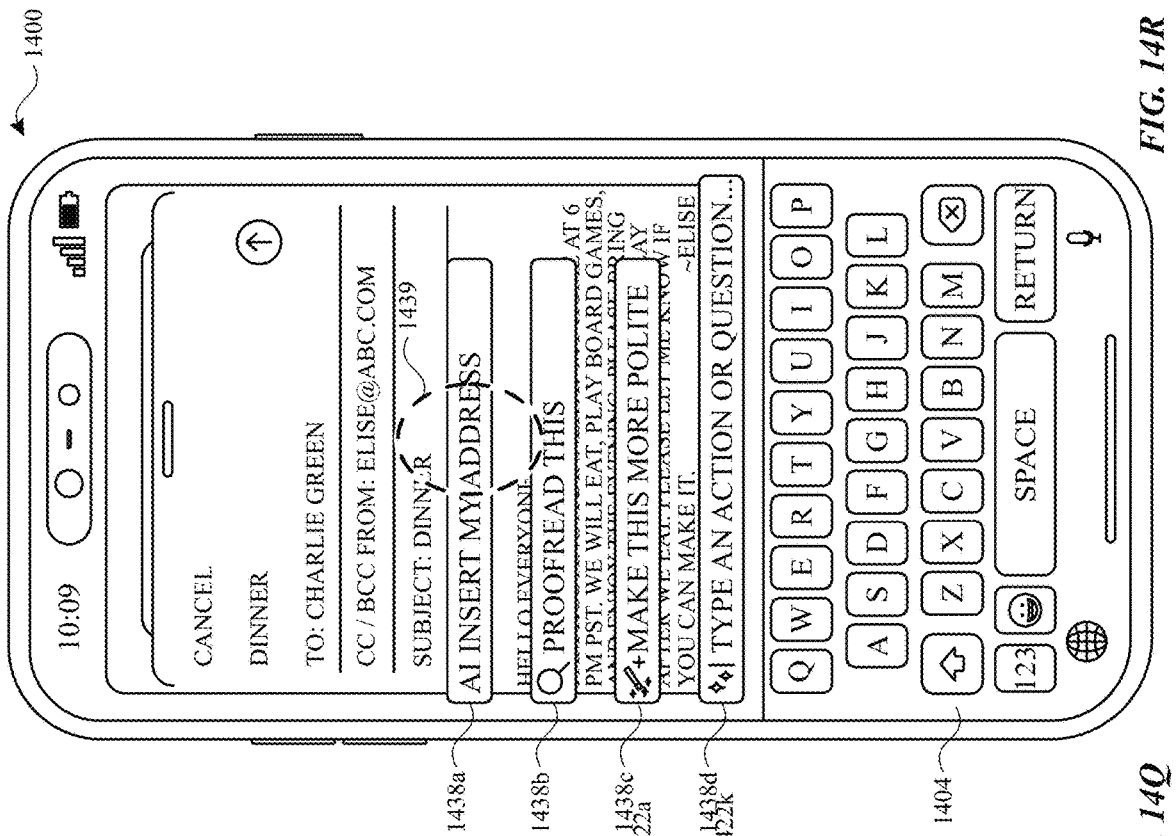
Figure 14R:
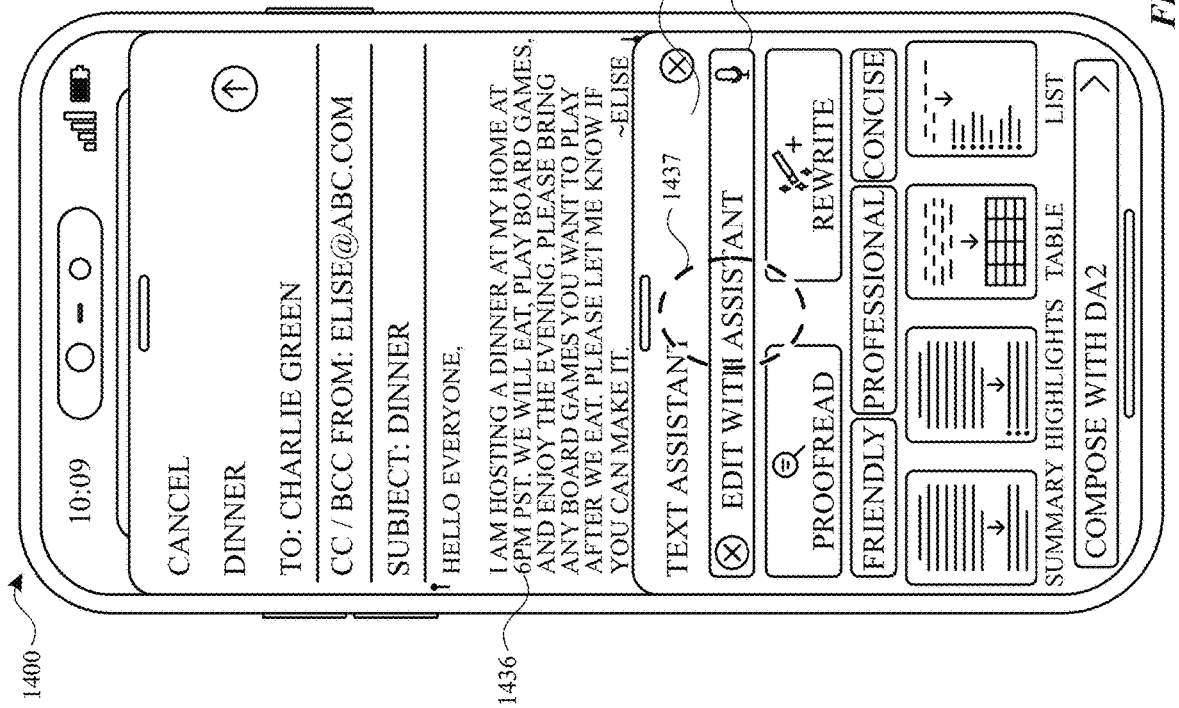
Figures 14U, 14V:
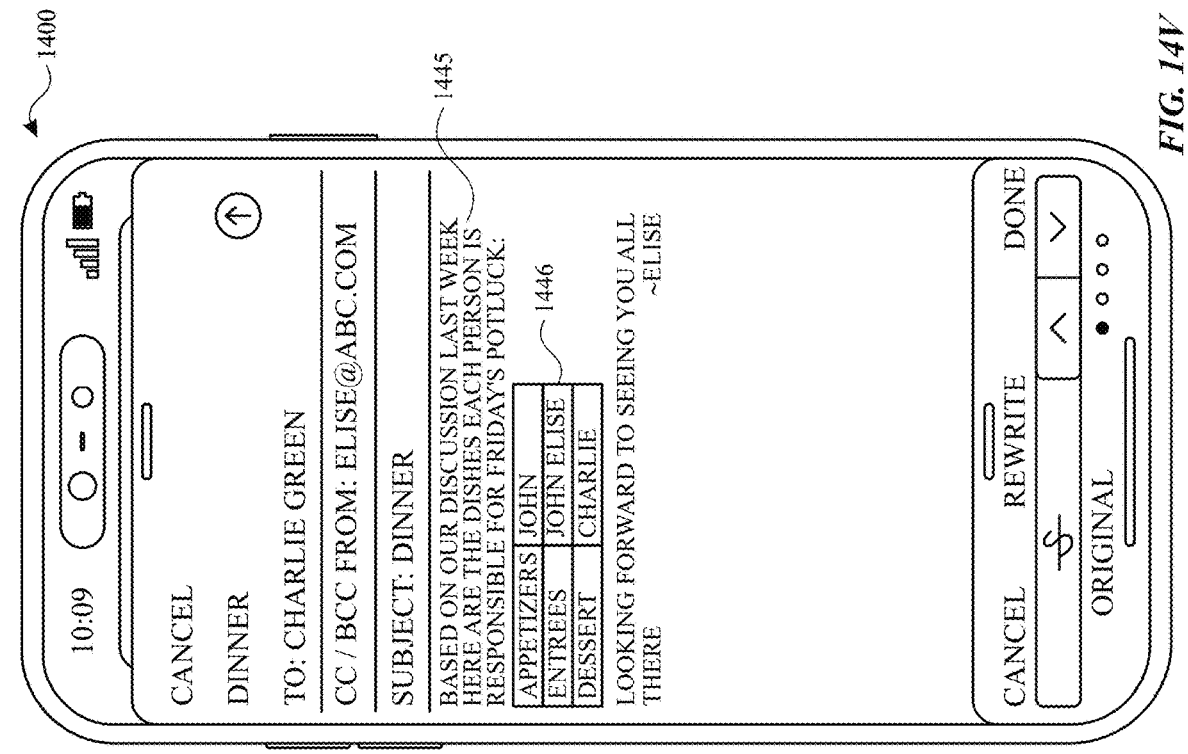
Figure 15:
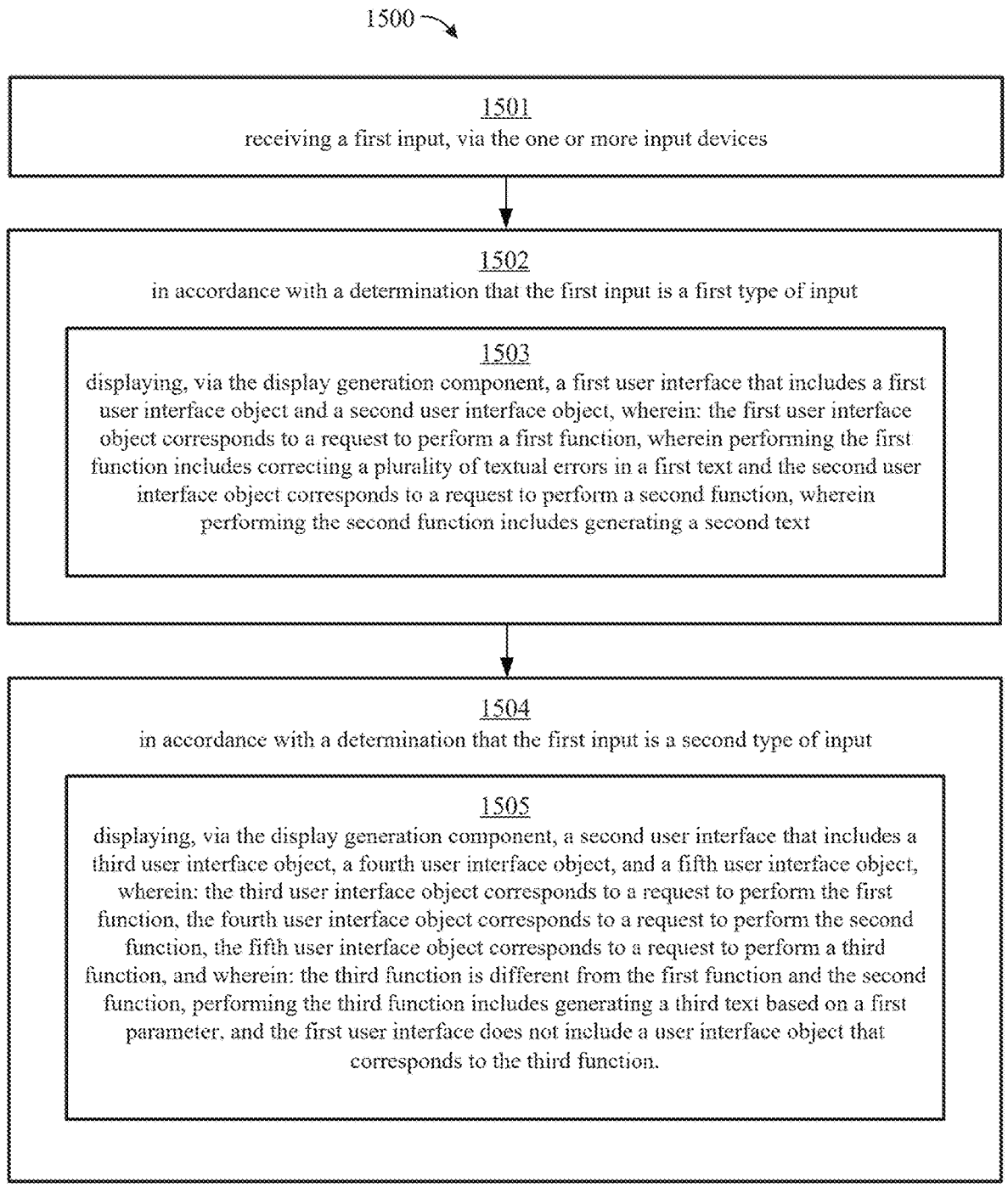
FIG. 15 is a flow diagram of an exemplary method 1500 for generating and/or editing text using a digital assistant and/or a language model, in accordance with some embodiments.
Figure 16:
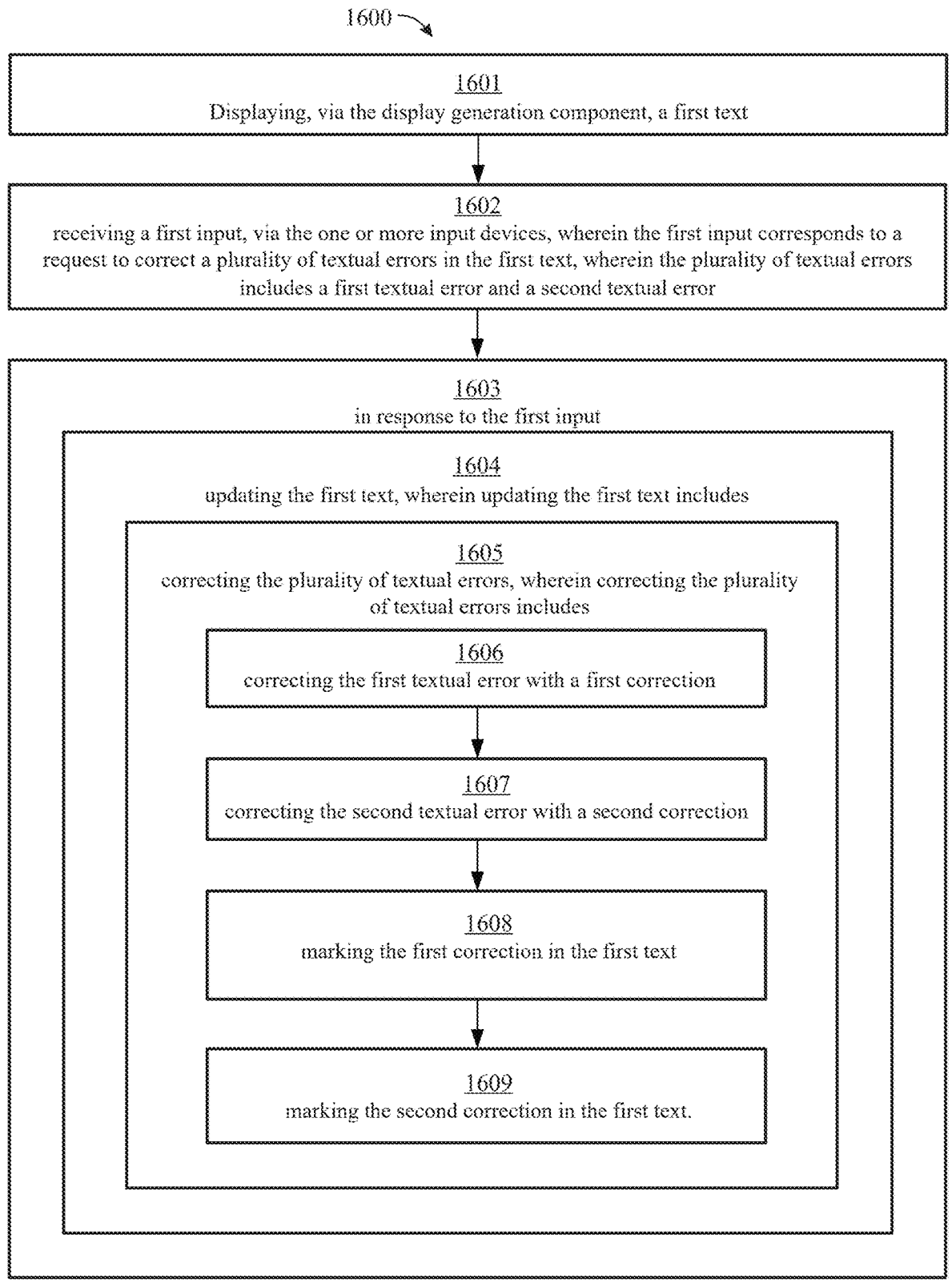
FIG. 16 is a flow diagram illustrating a method for proofreading text using a digital assistant and/or a language model, in accordance with some embodiments.

FIGS. 14A-14V illustrate exemplary user interfaces for generating and/or editing text using a digital assistant and/or a language model, in accordance with some embodiments. FIG. 15 is a flow diagram of an exemplary method 1500 for generating and/or editing text using a digital assistant and/or a language model. FIG. 16 is a flow diagram of an exemplary method 1600 for proofreading text using a digital assistant and/or a language model. The user interfaces in these figures are used to illustrate the processes described below, including the processes described in FIG. 15 and FIG. 16.

FIG. 14A illustrates a computer system that includes one or more features of device 100, 300, 500, computer system 901, and/or computer system 1000 and, throughout the discussion of FIGS. 14A-14V, will be referred to as computer system 1400, in accordance with some embodiments. Computer system 1400 includes display 1401. In the embodiment illustrated in FIG. 14A, the computer system is a smart phone. In some embodiments, computer system 1400 is a personal or client electronic device (e.g., a mobile device, a communal device (e.g., a smart speaker and/or digital media player), a tablet computer, a smart watch, a desktop, a laptop, virtual reality headset (e.g., VR headset and/or head-mounted device), and/or augmented reality headset (e.g., smart glasses)). In some embodiments, the computer system 1400 can be connected to a communications network (e.g., local area networks (LAN) or wide area networks (WAN), e.g., the internet).

At FIG. 14A, computer system 1400 displays text editor user interface 1402 (e.g., word processor, notepad application, email application, messaging application, etc.). At FIG. 14A, computer system 1400 receives input 1405 selecting a subportion of text 1406 in text editor user interface 1402. In some embodiments, input 1405 is a speech input (e.g., "select the first two sentences of this"). In some embodiments, input 1405 is a speech input that includes a trigger word/phrase (e.g., "DA1, select the first two sentences of this" where "DA1" is a trigger word). In some embodiments, input 1405 is another type of input such as a swipe, a tap, a double tap, a keypress, a mouse-click, highlight (e.g., a user clicking and dragging a cursor over text resulting in a selection of a plurality of text), and/or an air gesture. In some embodiments, other inputs described with reference to FIGS. 14A-14V can be these other types of inputs.

At FIG. 14A, computer system 1400 displays compact user interface 1403a with keyboard 1404. In some embodiments, computer system 1400 displays compact user interface 1403a when input 1405 selects less than a threshold number of characters of text 1406. In some embodiments, computer system 1400 displays compact user interface 1403a when input 1405 selects less than a threshold number of semantic objects (e.g., words, sentences, paragraphs, chapters, sections) in text 1406 where each semantic object is the same semantic object type (e.g., word type, sentence type, paragraph type, chapter type, section type). For example, FIG. 14A illustrates that computer system 1400 displays compact user interface 1403a because input 1405 selects fewer than a threshold (e.g., 3) number of sentences. In another example, FIG. 14A illustrates that computer system 1400 displays compact user interface 1403a because input 1405 selects fewer than a threshold (e.g., 20) number of words.

At FIG. 14A, compact user interface 1403a includes rewrite button 1403b, proofread button 1403c, text assistant button 1403d, and compose button 1403e. As illustrated in FIG. 14A, in response to receiving an input selecting rewrite button 1403b, computer system 1400 rephrases text selected by input 1405 (as illustrated in FIG. 14K). In some embodiments, when no text is selected, receiving an input selecting rewrite button 1403b causes computer system 1400 to rephrase text 1406 as a whole. As illustrated in FIG. 14A, in response to receiving an input selecting text assistant button 1403d, computer system 1400 ceases to display compact user interface 1403a and displays text assistant user interface 1422a as depicted in FIGS. 14T-14U. As illustrated in FIG. 14A, in response to receiving an input selecting compose button 1403e, computer system 1400 ceases to display compact user interface 1403a and displays composition user interface (e.g., 1041) as depicted in FIG. 10A and FIG. 10J. As illustrated in FIG. 14A, computer system 1400 receives tap input 1407 selecting proofread button 1403c, computer system 14A displays FIG. 14B.

At FIG. 14B, in response to receiving tap input 1407, computer system 1400 corrects textual errors (e.g., spelling errors, syntax errors, and/or grammatical errors) included in input 1405. For example, the word "bored" was corrected to correction 1409a "board" and the typo "to to" was corrected to correction 1409b "to" in FIG. 14B. Continuing the example, the spelling errors "streat" and "arive" were not corrected in corrected text 1408 because "streat" and "arive" were not included in input 1405. In some embodiments, if none of text 1406 is selected prior to receiving tap input 1407, computer system 1400 corrects all of text 1406 (e.g., including correcting "streat" to "street" and "arive" to "arrive").

At FIG. 14B, computer system 1400 marks correction 1409a (e.g., "board") and marks correction 1409b (e.g., "to"). In some embodiments, marking a correction includes highlighting, coloring (in a different color from updated text 1408), changing the font size of, changing the font type of, underlining, and/or inserting brackets around the correction. For example, FIG. 14B illustrates correction 1409a is marked with a color different than the rest of text 1408, and correction 1409a is marked with an underline.

At FIG. 14B, in response to receiving tap input 1407, computer system 1400 displays "show original" button 1410a, cycle button 1410b, and cycle button 1410c. As illustrated in FIG. 14B, in response to receiving an input selecting "show original" button 1410a, computer system 1400 reverts correction 1409a and reverts correction 1409b (e.g., FIG. 14E). In some embodiments, reverting corrections includes removing markings of the reverted corrections. As illustrated in FIG. 14B, in response to receiving an input selecting cycle button 1410b, computer system 1400 cycles backwards through each correction in corrected text

1408. For example, if computer system 1400 receives an input selecting cycle button 1410*b* at FIG. 14B, computer system 1400 would display FIG. 14D. As illustrated in FIG. 14B, in response to receiving an input selecting cycle button 1410*c*, computer system 1400 cycles forwards through each correction in corrected text 1408. For example, if computer system 1400 receives an input selecting cycle button 1410*c* at FIG. 14B, computer system 1400 would display FIG. 14C. At FIG. 14B, computer system 1400 receives tap input 1411 selecting correction 1409*a* (e.g., "board").

At FIG. 14C, in response to receiving tap input 1411 in FIG. 14B, computer system 1400 concurrently displays cycle button 1410*c*, textual error description 1410*d*, "use original" button 1410*e*, and correction counter 1410*f*. In some embodiments, textual error description 1410*d* explains why computer system 1400 applied correction 1409*a*. For example, textual error description 1410*d* explains that correction 1409*a* was applied because a word usage error was detected (e.g., since the adjective "bored" conflicted with the rest of the sentence). As illustrated in FIG. 14C, in response to receiving an input selecting "use original" button 1410*e*, computer system 1400 reverts only correction 1409*a* (e.g., the selected correction) (e.g., as discussed with respect to FIGS. 14D and 14F). As illustrated in FIG. 14C, computer system 1400 displays correction counter 1410*f* which tracks which correction is selected and a total number of corrections in corrected text 1408 (e.g., "1 of 2"). FIG. 14C further illustrates computer system 1400 receiving tap input 1412 selecting cycle button 1410*c*, and in response to receiving tap input 1412, computer system 1400 cycles to correction 1409*b* (as illustrated in FIG. 14D).

At FIG. 14D, in response to receiving tap input 1412, computer system 1400 cycles to correction 1409*b* and computer system 1400 displays "show original" button 1410*a*, "use original" button 1410*e*, textual error description 1410*g*, and correction counter 1410*f*. As illustrated in FIG. 14D, textual error description 1410*g* explains that correction 1409*b* was applied because of a detected unnecessary repetition of words in text 1406 (e.g., "to" was repeated twice in text 1406 in error). At FIG. 14D, correction counter 1410*f* has incremented once indicating correction 1409*b* is now selected (e.g., "2 of 2" since correction 1409*b* is the second correction of two total corrections in corrected text 1408).

FIG. 14D illustrates computer system 1400 receiving tap input 1413 selecting "show original" button 1410*a*. FIG. 14D illustrates, in response to receiving tap input 1413, computer system 1400 displaying FIG. 14E. FIG. 14D further illustrates computer system 1400 receiving tap input 1414 selecting "use original" button 1410*e*. FIG. 14D illustrates, in response to receiving tap input 1414, computer system 1400 displaying FIG. 14F.

FIG. 14E illustrates, in response to receiving tap input 1413 at FIG. 14D, computer system 1400 displaying text 1406 (e.g., remove correction 1409*a* and correction 1409*b*) and "show edits" button 1410*h*. FIG. 14E illustrates, in response to receiving tap input 1415 selecting "show edits" button 1410*h*, computer system 1400 ceasing to display text 1406 and displays corrected text 1408 (e.g., displaying correction 1409*a* and correction 1409*b*) (e.g., displays FIG. 14D).

FIG. 14F illustrates, in response to receiving tap input 1414 at FIG. 14D, computer system 1400 displaying corrected text 1416 where computer system 1400 replaced correction 1409*b* with the original textual error (e.g., "to to"). FIG. 14F illustrates, computer system 1400 removing correction 1409*b* includes removing markings of correction 1409*b* (e.g., "to to" is the same color as corrected text 1408 and is not underlined). At FIG. 14F, correction counter 1410*f* no longer lists "1 of 2" corrections and instead lists "1 of 1" corrections because correction 1409*b* has been replaced with textual error "to to." FIG. 14F further illustrates computer system 1400 receiving a double tap input 1417 at correction 1409*a*. As illustrated by FIG. 14F, in response to receiving double tap input 1417, computer system 1400 displaying FIG. 14G.

At FIG. 14G, in response to receiving double tap input 1417, computer system 1400 displays corrected text 1416, keyboard 1404, suggestion 1419*a*, suggestion 1419*b*, and suggestion 1419*c*. FIG. 14G illustrates, in response to receiving double tap input 1417, computer system 1400 enabling the user to manually edit text (e.g., displaying keyboard 1404 and a text entry point 1420). FIG. 14G illustrates, in response to receiving an input selecting suggestion 1419*a*, computer system 1400 replacing correction 1409*a* with a word (e.g., "board"), and simultaneously computer system 1400 removes markings of correction 1409*a* (e.g., remove color and underlining). In some embodiments, the word corresponding to suggestion 1419*a* (and suggestion 1419*b* (e.g., "bored") and suggestion 1419*c* (e.g., "boring")) is a suggested word determined by computer system 1400 based on context. In some embodiments, context includes words before and words after correction 1409*a*.

At FIG. 14H, computer system 1400 receives input 1421 selecting the entirety of text 1406. In some embodiments, when input 1421 selects greater than (or equal to) a threshold number of characters of text 1406, computer system 1400 displays text assistant user interface 1422*a*. For example, because input 1421 selects more than a threshold number of characters (e.g., 20), computer system 1400 displays user interface 1422 instead of compact user interface 1403*a*. In some embodiments, when input 1421 selects greater than (or equal to) a threshold number of semantic objects (of the same type) in text 1406, computer system 1400 displays text assistant user interface 1422*a*. For example, because input 1421 selects more than a threshold number of sentences (e.g., 2), computer system 1400 displays text assistant user interface 1422*a* instead of compact user interface 1403*a*.

At FIG. 14H, text assistant user interface 1422*a* includes proofread button 1422*b*, rewrite button 1422*c*, friendly tone button 1422*d*, professional tone button 1422*e*, concise button 1422*f*, summary button 1422*g*, highlights button 1422*h*, table button 1422*i*, list button 1422*j*, text field 1422*k*, and compose button 14221. FIG. 14H illustrates, in response to receiving an input selecting proofread button 1422*b*, computer system 1400 correcting textual errors in text 1406 and marking the corrections of the textual errors (as described with respect to FIG. 14B). In some embodiments, computer system only corrects textual errors that are selected by input 1421 (as described with respect to FIGS. 14A-14B). FIG. 14H illustrates, in response to receiving an input selecting rewrite button 1422*c*, computer system 1400 rephrasing text 1406 (as illustrated in FIGS. 14J-14K). In some embodiments, only text selected by input 1421 is rephrased.

FIG. 14H illustrates, in response to receiving an input selecting friendly tone button 1422*d*, computer system 1400 rephrasing text 1406 to be friendlier. For example, when computer system 1400 receives an input selecting friendly tone button 1422*d*, computer system 1400 will generate friendlier prose than text 1406 while continuing to convey the same message as text 1406. In some embodiments, only text selected by input 1421 is rephrased to be friendlier. FIG. 14H illustrates, in response to receiving an input selecting professional tone button 1422*e*, computer system 1400 rephrasing text 1406 to be more professional (as illustrated in FIGS. 14N-14O). For example, when computer system 1400 receives an input selecting professional tone button 1422e, computer system 1400 will generate a more formal prose than text 1406 while continuing to convey the same message as text 1406. In some embodiments, only text selected by input 1421 is rephrased to be more professional.

FIG. 14H illustrates, in response to receiving an input selecting concise button 1422f, computer system 1400 rephrasing text 1406 to be concise (e.g., rephrase contains fewer than a threshold number of characters). In some embodiments, rephrasing text 1406 to be concise includes removing a portion of text 1406. For example, if computer system 1400 receives an input selecting concise button 1422f, computer system may generate the following text: "Dinner at my place Friday at 6. Bring board games and park on the street" which has fewer characters than text 1406. In some embodiments, only text selected by input 1421 is rephrased to be concise.

FIG. 14H illustrates, in response to receiving an input selecting summary button 1422g, computer system 1400 generating a summary of text 1406 (e.g., summary contains fewer than a threshold percentage of characters in text 1406 and the summary emphasizes the key points of text 1406). For example, if computer system 1400 receives an input selecting summary button 1422g, computer system 1400 may generate the following text: "Dinner at John's place on Friday at 6 pm. Bring board games and park on the street" which conveys the same key points of text 1406 and has fewer number of characters than text 1406. In some embodiments, only text selected by input 1421 is summarized.

FIG. 14H illustrates, in response to receiving an input selecting highlights button 1422h, computer system 1400 generating text where the generated text rephrases text 1406 by emphasizing the key points conveyed in text 1406. In some embodiments, emphasizing the key points conveyed in text 1406 includes DA1 604 determining key points of text 1406. For example, if computer system 1400 receives an input selecting highlights button 1422h, computer system 1400 may generate "Dinner at John's place. Arrive Friday at 6 pm. Bring board games if you wish. Park on the street when you arrive." In some embodiments, only text selected by input 1421 is rephrased.

FIG. 14H illustrates, in response to receiving a tap input selecting table button 1422i, computer system 1400 generating a table based on text 1406 (e.g., FIGS. 14U-14V). In some embodiments, generating the table includes populating headers based on text 1406 (and/or text selected by input 1421).

FIG. 14H illustrates, in response to receiving a tap input selecting list button 1422j, computer system 1400 generating bullet points based on text 1406. For example, if computer system 1400 receives a tap input selecting list button 1422j, computer system 1400 may generate a list of bullet points noting the key points of text 1406. In some embodiments, the computer system 1400 generates bullet points only for text selected by input 1421.

FIG. 14H illustrates, in response to receiving an input selecting compose button 14221, computer system 1400 ceases to display text assistant user interface 1422a and displays composition user interface (e.g., 1041) as depicted in FIGS. 10A and 10J. For example, if computer system 1400 receives a tap input selecting compose button 14221, computer system 1400 displays the composition user interface (e.g., 1041) in FIG. 10A (FIG. 10J, FIG. 10N, or FIG. 10R), so that the user can provide a request to generate text (e.g., "write a restaurant review . . . ").

FIG. 14H illustrates, computer system 1400 receives textual input 1423 (e.g., "Please check for any errors") at text field 1422k. In some embodiments, text field 1422k corresponds to DA1 904. For example, if text field 1422k corresponds to DA1 904, DA1 904 will determine if DA1 904 can generate/modify text based on textual input 1423 (as described with respect to FIGS. 12A-12B). In some embodiments, text field 1422k corresponds to DA2 906. For example, if text field 1422k corresponds to DA2 906, textual input 1423 will be transmitted to DA2 906 for processing (as described with respect to FIGS. 12A-12B). In some embodiments, computer system 1400 receives a tap input selecting text field 1422k and in response to receiving the tap input selecting text field 1422k, computer system 1400 displays FIG. 14R. FIG. 14H (and FIG. 14B) illustrates, in response to receiving textual input 1423, computer system 1400 corrects textual errors in the selected text (e.g., 1421) as requested by textual input 1423.

At FIG. 14I, in response to receiving textual input 1423, computer system 1400 corrects the textual errors of "bored", "to to", "stret", and "arive" with correction 1409a, correction 1409b, correction 1409c (e.g., "street"), and correction 1409d (e.g., "arrive"), respectively, in corrected text 1424. FIG. 14I further illustrates marking correction 1409a (and correction 1409b, correction 1409c, and correction 1409d) with underlining. In some embodiments, if no text was selected (e.g., computer system 1400 did not receive selection input 1421) prior to receiving textual input 1423, computer system 1400 would correct all textual errors in text 1406 with corrections.

FIG. 14J illustrates computer system 1400 displaying text 1406, text assistant user interface 1422a which includes rewrite button 1422c. FIG. 14J further illustrates computer system 1400 receiving tap input 1425 selecting rewrite button 1422c. FIG. 14J illustrates, in response to receiving tap input 1425, computer system 1400 displays FIG. 14K and rephrases text 1406.

FIG. 14K illustrates, in response to receiving tap input 1425 at FIG. 14J, computer system 1400 displays generated text 1426 which rephrases text 1406. where each generated text rephrases text 1406 in a different manner. FIG. 14K illustrates "show original" button 1427a, cycle button 1427b, and cycle button 1427c. As illustrated by FIG. 14K, in response to receiving an input selecting "show original" button 1427a, computer system 1400 ceases to display generated text 1426 and displays text 1406. FIG. 14K further illustrates, in response to receiving an input selecting cycle button 1427b, computer system 1400 cycles forward through a plurality of generated texts. In some embodiments, the plurality of generated texts are generated by computer system 1400 in response to receiving tap input 1425 at FIG. 14J (e.g., generated text 1426 and generated text 1429 in FIG. 14L). In some embodiments, computer system 1400 generates a new text and cycles to the newly generated text in response to receiving a tap input at cycle button 1427b. FIG. 14K illustrates, in response to receiving an input selecting cycle button 1427c, computer system 1400 cycles backwards through the plurality of generated texts. FIG. 14K illustrates, computer system receives tap input 1428 selecting cycle button 1427b.

At FIG. 14L, in response to receiving tap input 1428 at FIG. 14K, computer system 1400 cycles from displaying generated text 1426 to displaying generated text 1429 which rephrases text 1406 in a different manner than how generated text 1426 rephrased text 1406. In some embodiments, generated text 1429 was rephrased using a different seed than the seed used to generate generated text 1426. In some embodiments, a seed includes a randomly generated value (e.g., using a random number generator) that functions as a starting point for how operating system 718, DA1 904, language model 905, and/or DA2 906 generates text. FIG. 14L illustrates, computer system 1400 receives tap input 1430 selecting cycle button 1427*c* and in response to receiving tap input 1430, computer system 1400 displays FIG. 14K since computer system 1400 is cycles backwards through previously generated texts in response to selecting cycle button 1427*c*.

At FIG. 14M, computer system 1400 displays text 1431 on an application user interface (e.g., a web browser user interface, a text editor user interface, a video game user interface, a messaging user interface, an email user interface, a digital assistant user interface, and/or a operating system user interface). In some embodiments, the application user interface corresponds to a third party software application. For example, a third party software application may include an application that is created and/or distributed by an entity other than the creator/distributor of computer system 1400 (and/or computer systems 1000, 1400, and 1700). In some embodiments, the application user interface corresponds to a first party software application. For example, a first party application may include an application that is created and/or distributed by the entity that creates and/or distributes computer system 1400 (and/or computer systems 1000, 1400, and 1700). FIG. 14M further illustrates computer system 1400 receiving speech input 1432 (e.g., "How can I make this better?"). In some embodiments, in response to receiving speech input 1432, DA1 904 determines speech input 1432 corresponds to a request to modify text. At FIG. 14M, in response to receiving speech input 1432, computer system 1400 displays FIG. 14N.

At FIG. 14N, in response to receiving speech input 1432, computer system 1400 displays text 1431 and text assistant user interface 1422*a* which includes professional tone button 1422*e*. In some embodiments, computer system 1400 displays text assistant user interface 1422*a* because a user provides a speech input corresponding to a request to modify/generate text. In some embodiments, computer system 1400 displays text assistant user interface 1422*a* when speech input 1432 provides a trigger phrase (e.g., "Text Assistant") corresponding to text assistant user interface 1422*a*. FIG. 14N illustrates, computer system 1400 receives tap input 1433 selecting professional tone button 1422*e*, and in response to receiving tap input 1433, computer system displays FIG. 14O.

FIG. 14O illustrates, in response to receiving tap input 1433, computer system displays text 1434 which rephrases text 1431 using a professional tone. For instance, the language in text 1434 is more formal than the language used in text 1431.

FIG. 14O further illustrates computer system 1400 displaying "show original" button 1427*a*, cycle button 1427*b*, cycle button 1427*c*, and done button 1427*d*. As illustrated in FIG. 14O, computer system 1400 receives tap input 1435 selecting done button 1427*d*, and in response to receiving tap input 1435, computer system 1400 displays FIG. 14P.

FIG. 14P illustrates, in response to receiving tap input 1435, computer system 1400 ceases to display "show original" button 1427*a*, cycle button 1427*b*, cycle button 1427*c*, and done button 1427*d* while continuing to display text 1434. In some embodiments, in response to receiving tap input 1435, computer system 1400 sends text 1434 to at least one recipient. For example, in response to receiving tap input 1435, computer system 1400 may send the email to Charlie Green with text 1434.

At FIG. 14Q, computer system 1400 displays text 1436 and text assistant user interface 1422*a* which includes text field 1422*k*. In some embodiments, computer system 1400 displays text assistant user interface 1422*a* in response to receiving a double tap input (not depicted) at an application user interface (e.g., an email, messaging, social media, web browser, and/or note taking applications). In some embodiments, the double tap input is received at editable text in the application user interface or at a text field in the application user interface. For example, computer system 1400 may have received a double tap input at the text field in the email application user interface displaying an email to Charlie Green to display and/or invoke text assistant user interface 1422*a*. FIG. 14Q illustrates computer system 1400 receiving input 1437 selecting text field 1422*k*, and in response to receiving input 1437, computer system 1400 displays FIG. 14R.

At FIG. 14R, computer system 1400 displays keyboard 1404, refinement suggestion 1438*a*, refinement suggestion 1438*b*, refinement suggestion 1438*c*, and text field 1438*d*. In some embodiments, refinement suggestion 1438*a* (and refinement suggestion 1438*b* and refinement suggestion 1438*c*) are displayed based on context. For instance, computer system 1400 may display refinement suggestion 1438*a* because the context of text 1436 indicates that the term "my place" is ambiguous and adding an address would correct the ambiguity. In another example, computer system 1400 may display refinement suggestion 1438*c* because the user typically (e.g., based on a usage history) requests for text that is polite. As illustrated by FIG. 14R, computer system 1400 may receive textual inputs at text field 1438*d*. For example, a user may provide a textual input "add a pun about dinner" at text field 1438*d* and in response to receiving the textual input, computer system 1400 may add a pun to text 1436. At FIG. 14R, computer system 1400 receives tap input 1439 selecting refinement suggestion 1438*a*, and in response to receiving tap input 1439, computer system 1400 adds an address to text 1436 as illustrated in FIG. 14S.

At FIG. 14S, in response to receiving tap input 1439 at FIG. 14R, computer system 1400 displays text 1440. As illustrated in FIG. 14S, computer system 1400 added John's address to text 1436 (e.g., resulting in text 1440) as specified in selected refinement suggestion 1438*a*.

At FIG. 14T, computer system 1400 displays text 1441 in an application user interface and displays compact user interface 1403*a* which includes rewrite button 1403*b*, proofread button 1403*c*, text assistant button 1403*d*, and compose button 1403*e*. In some embodiments, the application user interface is a first party software application user interface. In some embodiments, the application user interface is a third party software application user interface. FIG. 14T illustrates, computer system 1400 receiving a selection input 1442 selecting the dinner assignments of all guests in text 1441. In some embodiments, in response to receiving selection input 1442, computer system 1400 displays compact user interface 1403*a*. In some embodiments, in response to receiving selection input 1442 and a double tap gesture (not depicted) at the text selected by selection input 1442, computer system 1400 displays compact user interface 1403*a*. At FIG. 14T, computer system 1400 receives tap input 1443 selecting the text assistant button 1403*d*. FIG. 14T illustrates, in response to receiving tap input 1443, computer system 1400 displays FIG. 14U.

At FIG. 14U, in response to receiving tap input 1443 selecting text assistant button 1403, computer system 1400 displays text 1441 and text assistant user interface 1422*a* with table button 1422*i*. In some embodiments, computer system 1400 receives a tap input 1444 selecting table button 1422i, and in response to receiving tap input 1444 selecting table button 1422i, computer system 1400 displays FIG. 14V.

At FIG. 14V, in response to receiving tap input 1444 at FIG. 14U, computer system 1400 displays generated table 1446 with updated text 1445. At FIG. 14V, computer system 1400 populates generated table 1446 based on the selection input 1442 with the dinner assignments for John, Elise, and Charlie.

FIG. 15 is a flow diagram illustrating a method for generating and/or editing text using a digital assistant and/or a language model in accordance with some embodiments. Method 1500 is performed at a computer system (e.g., 100, 300, 500, 604, 901, 1000, 1400, and/or 1700) (e.g., a smartphone, a smartwatch, a head-mounted device, a tablet computer, or a personal computer) that is in communication with a display generation component (e.g., a display or a projector) (e.g., 1001, 1401, and/or 1701) and one or more input devices (e.g., a touch-sensitive surface, a mouse, a keyboard, a microphone, and/or inputs and outputs module 903). In some embodiments, method 1500 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1500 are, optionally, combined, the orders of some operations are, optionally, changed, and some operations are, optionally, omitted.

As described below, method 1500 provides an intuitive way for generating or editing text using a digital assistant and/or a language model. The method reduces the cognitive burden on a user for generating/editing text, thereby creating a more efficient human-machine interface. For battery-operated computing devices, enabling a user to generate/edit text faster and more efficiently conserves power and increases the time between battery charges.

The computer system (e.g., 901, 1000, 1400, and/or 1700) (e.g., a smartphone, a smartwatch, a head-mounted device, a tablet computer, or a personal computer) that is in communication with a display generation component (e.g., a display or a projector) and one or more input devices (e.g., a touch-sensitive surface, a mouse, a keyboard, and/or a microphone) receives (e.g., 1501) a first input (e.g., 1405, 1421, and/or 1432 (e.g., speech, click, tap, press and hold, and/or text), via the one or more input devices.

In accordance with a determination that the first input is a first type of input (e.g., 1502), the computer system displays (e.g., 1503), via the display generation component, a first user interface (e.g., 1403a) that includes a first user interface object (e.g., 1403c) and a second user interface object (e.g., 1403b) where the first user interface object corresponds to a request to perform a first function, wherein performing the first function includes correcting (e.g., using DA1 904, language model 905, and/or DA2 906) (e.g., using an AI process and/or a generative AI process) (in some embodiments, correcting a plurality of errors in a first text includes identifying at least two grammatical, syntax, and/or spelling errors in the first text) (in some embodiments, correcting the plurality of errors in the first text includes replacing the errors with corrected text and flagging the corrected text) a plurality of textual errors (e.g., "to to" and "streat" as depicted in FIG. 14A) (e.g., grammatical, syntactical, and/or spelling) in a first text (e.g., 1406) (in some embodiments, the first text is a text generated by a digital assistant) (in some embodiments, the first text is a text provided by a user), and the second user interface object corresponds to a request to perform a second function, wherein performing the second function includes generating a second text (e.g., 1426) (e.g., automatically-generated text content and/or generative text content) (e.g., "Compose" or "Rewrite") (in some embodiments, generating the second text is performed based on the first text (e.g., "Rewrite")) (e.g., using an AI process and/or a generative AI process). Displaying a first user interface with a first user interface object and a second user interface object in accordance with a determination that the first input is a first type of input reduces clutter in the user interface while still providing a user with greater control over a digital assistant when a user provides a specific type of input. Displaying a first user interface object that performs a first function, wherein performing the first function includes correcting a plurality of errors conserves the necessary number of inputs a user would have to provide to manually identify and correct textual errors. Displaying a second user interface object that performs a second function, wherein performing the second function includes generating a second text reduces the necessary inputs a user would have to provide to generate text manually.

In accordance with a determination that the first input is a second type of input (e.g., 1504), the computer system displays (1505), via the display generation component, a second user interface (e.g., 1422a) (in some embodiments, the second user interface is not displayed concurrently with the first user interface) that includes a third user interface object (e.g., 1422b), a fourth user interface object (e.g., 1422c), and a fifth user interface object (e.g., 1422c, 1422d, 1422e, 1422f, 1442g, 1422h, 1422i, and/or 1422j) (in some embodiments, the fifth user interface object is not included in the first user interface), where the third user interface object corresponds to a request to perform the first function, the fourth user interface object corresponds to a request to perform the second function, and the fifth user interface object corresponds to a request to perform a third function. The third function is different from the first function and the second function, performing the third function includes generating a third text (e.g., 1434 and/or 1446) (e.g., automatically-generated text content and/or generative text content) based on a first parameter (e.g., using an AI process and/or a generative AI process) (in some embodiments, a parameter may include a tone of writing (e.g., "Professional", "Energetic," or "Persuasive"), a constraint on the number of characters in the first text (e.g., less than a threshold percentage of characters), or a format of writing (e.g., "Table" and "Bullet Points"), and the first user interface does not include a user interface object that corresponds to the third function (e.g., 1422e is not included in compact user interface 1403a). Displaying a second user interface with a third user interface object, a fourth user interface object, and a fifth user interface object in accordance with a determination that the first input is a second type of input provides the user with greater control by displaying more user interface objects than the first user interface (thus increasing the user's options for generating/modifying text) when the user provides a specific type of input. Displaying the third user interface object that performs the first function conserves the necessary number of inputs a user would have to provide to manually identify and correct textual errors. Displaying the fourth user interface object that performs the second function reduces the necessary inputs a user would have to provide to generate text manually and provides user greater control over the computer system. Displaying the fifth user interface object that performs a third function, where performing the third function includes generating a third text based on a first parameter reduces the necessary number of inputs a user would have to provide to generate text.

In some embodiments, the first input of the first type of input (e.g., 1405 at FIG. 14A), is a selection of fewer than a threshold (e.g., half of a total number of characters in the first text) number of characters in the first text, and wherein the first input of the second type of input (e.g., 1421 at FIG. 14H)) is a selection of greater than (in some embodiments, or equal to) the threshold number of characters in the first text. Displaying the first user interface when the first input of the first type is a selection of fewer than a threshold number of characters conserves battery power and processing power by only displaying a limited number of user interface objects when a user only plans to modify a limited amount of text. Displaying the second user interface when the first input of the second type is a selection of greater than (or equal to) the threshold number of characters conserves battery power and processing power by providing the user with a greater selection of user interface objects that perform different tasks when the user has indicated a greater amount of text is going to be modified/generated.

In some embodiments, the first input of the first type of input (e.g., 1405 at FIG. 14A) is a selection of fewer than a threshold number of semantic objects of a same semantic object type (e.g., sentence type, word type, paragraph type, header type, section type, and/or chapter type) (e.g., fewer than half of a total number of sentences in the first text), and wherein the first input of the second type of input (e.g., 1421 at FIG. 14H) is a selection of greater than (in some embodiments, or equal to) the threshold number of semantic objects of the same semantic object type. Displaying the first user interface when the first input of the first type of input is a selection of fewer than a threshold semantic objects of the same semantic object type conserves battery power and processing power by only displaying a limited number of user interface objects when a user only plans to modify a limited amount of text. Displaying the second user interface when the first input of the second type of input is a selection of greater than (or equal to) the threshold number of semantic objects of the same semantic object type conserves battery power and processing power by providing the user with a greater selection of user interface objects that perform different tasks when the user has indicated a greater amount of text is going to be modified/generated.

In some embodiments, the semantic object type is a sentence type (e.g., "Dinner at my place Friday at 6." as described with respect to FIG. 14A).

In some embodiments, the semantic object type is a word type (e.g., "Dinner," "at," "my," at FIG. 14A), and wherein the first input is a selection (e.g., 1405) of at least two semantic objects of the semantic object type (e.g., two or more words).

In some embodiments, the first input of the second type of input is an audio input (e.g., 1432) (e.g., "Open Text Assistant" or "How can I edit this text"). Displaying the second user interface when the first input of the second type is an audio input improves operability of the computer system by providing the user greater control by only displaying the second user interface (which has more user interface objects than the first user interface) when the user provides a speech input.

In some embodiments, the audio input includes a trigger corresponding to the digital assistant (as described with respect to FIG. 14M) (e.g., a trigger phrase such as "Assistant, what can I do with this text?"). Displaying the second user interface when the first input of the second type is an audio input including a trigger corresponding to the digital assistant improves operability of the computer system by providing the user greater control by displaying the second user interface (which has more interface objects than the first user interface) when the user specifies they want to see the options a digital assistant is capable of. Such an interaction will allow the user to quickly and efficiently use the computer system and improve the interaction with the digital assistant.

In some embodiments, the first user interface includes a sixth user interface object (e.g., 1403d), wherein the sixth user interface object corresponds to a request to perform a fourth function, and wherein performing the fourth function includes the computer system displaying, via the display generation component, the second user interface (e.g., "Text Assistant"). Displaying a sixth user interface object in the first user interface, wherein the sixth user interface object corresponds to a request to perform a fourth function of displaying the second user interface improves operability of the computer system by providing the user greater control by allowing the user to switch to a greater expanded interface (e.g., the second user interface) when the user wants more options on how to modify/generate text. Displaying the sixth user interface object in the first user interface, wherein the sixth user interface object corresponds to a request to perform a fourth function of displaying the second user interface reduces the necessary number of inputs the user would have to provide to display the second user interface otherwise (e.g., by dismissing the first user interface with a first input and then providing a second input of the second input type).

In some embodiments, the second user interface includes a text field (e.g., 1422k), wherein the text field is associated with a digital assistant (e.g., 904) (e.g., local digital assistant) (in some embodiments, a local digital assistant is a digital assistant installed on the computer system). Displaying a text field associated with the digital assistant in the second user interface provides the user with greater control over the computer system by enabling the user to provide custom textual requests not otherwise present in the second user interface's user interface objects.

In some embodiments, the text field corresponds to a request to perform a fifth function, wherein performing the fifth function includes performing a textual action (e.g., 1438a, 1438b, 1438c, and/or 1438d) (e.g., using an AI process and/or a generative AI process) (e.g., modifying the first text or generating a fourth text) based on a second parameter (in some embodiments, a parameter may include a tone of writing (e.g., "Professional", "Energetic," or "Persuasive"), a constraint on the number of characters in the first text (e.g., less than a threshold percentage of characters), an attached electronic document, or a format of writing (e.g., "Table" and "Bullet Points"), and the second parameter is based on (in some embodiments, parameters includes key words associated in the textual input) a textual input (e.g., 1423) at the text field. Performing a textual action based on a second parameter, wherein the second parameter is based on the textual input at the text field provides the user with greater control over the device and reduces the number of errors the computer system may output by assuming a user's textual input at the text field requires a textual action since the text field is displayed in the second user interface.

In some embodiments, the second user interface includes, a seventh user interface object (e.g., 1422i), wherein the seventh user interface object corresponds to a request to perform a sixth function, and wherein performing the sixth function includes generating a table (e.g., 1446) (e.g., automatically-generated text content and/or generative text content) based on the first text (e.g., 1441) (e.g., using an AI process and/or a generative AI process) (in some embodiments, generating the table is based on a selected portion of the first text) (in some embodiments, generating the table includes prepopulating a legend and/or headers of the generated table based on the first text) (in some embodiments, the seventh user interface object is not displayed in the first user interface). Displaying a seventh user interface object, wherein the seventh user interface object corresponds to a request to perform a sixth function of generating a table based on the first text reduces the necessary number of inputs the user would have to provide to manually create a table and populate the table.

In some embodiments, the second user interface includes, an eighth user interface object (e.g., 1422j), wherein the eighth user interface object corresponds to a request to perform a seventh function, and wherein performing the seventh function includes generating bullet points (e.g., automatically-generated text content and/or generative text content) based on the first text (e.g., using an AI process and/or a generative AI process) (in some embodiments, generating bullet points is based on a selected portion of the first text) (in some embodiments, generating bullet points is based on key concepts of the first text (determined by the digital assistant)) (in some embodiments, the eighth user interface object is not displayed in the first user interface). Displaying an eighth user interface object, wherein the eighth user interface object corresponds to a request to perform a seventh function of generating bullet points based on the first text reduces the necessary number of inputs the user would have to provide to manually create bullet points for the first text.

In some embodiments, the second user interface includes a ninth user interface object (e.g., 1422f), wherein the ninth user interface object corresponds to a request to perform an eighth function, and wherein performing the eighth function includes generating a fourth text (e.g., automatically-generated text content and/or generative text content) based on the first text (e.g., using an AI process and/or a generative AI process). Displaying a ninth user interface object, wherein the ninth user interface object corresponds to a request to perform an eighth function of generating a fourth text based on the first text reduces the necessary number of inputs the user would have to provide to manually create a text that is based on the first text.

In some embodiments, the second user interface includes a tenth user interface object (e.g., 1422d) and an eleventh user interface object (e.g., 1422f), wherein the tenth user interface object corresponds to a request to perform a ninth function, wherein the eleventh user interface object corresponds to a request to perform a tenth function, wherein performing the ninth function includes generating a fifth text (e.g., automatically-generated text content and/or generative text content) based on a third parameter (e.g., using an AI process and/or a generative AI process), wherein performing the tenth function includes generating a sixth text (e.g., automatically-generated text content and/or generative text content) based on a fourth parameter (e.g., using an AI process and/or a generative AI process), wherein the third parameter is based on a tone of writing (e.g., Professional, Energetic, Casual, and/or Somber), wherein the fourth parameter is based on a second tone of writing, and wherein the second tone of writing is different from the first tone of writing (in some embodiments, the tenth user interface object is not displayed in the first user interface. In some embodiments, the eleventh user interface object is not displayed in the first user interface). Displaying a tenth user interface object, wherein the tenth user interface object corresponds to a request to perform a ninth function of generating a fifth text based on a third parameter reduces the necessary number of inputs the user would have to provide to manually generate a text using a parameter. Displaying an eleventh user interface object, wherein the eleventh user interface object corresponds to a request to perform a tenth function of generating a sixth text based on a fourth parameter reduces the necessary number of inputs the user would have to provide to manually generate a text using a parameter.

In some embodiments, the second user interface includes a twelfth user interface object (e.g., 1422f and/or 1422g), wherein the twelfth user interface object corresponds to a request to perform an eleventh function, wherein performing the eleventh function includes generating a seventh text (e.g., automatically-generated text content and/or generative text content) based on the first text (e.g., using an AI process and/or generative AI process), wherein the seventh text includes fewer characters than the first text (e.g., summary), wherein the first text includes a plurality of key concepts (in some embodiments, the digital assistant determines the key concepts of the first text based on identifying key words in the first text) (in some embodiments, the eleventh user interface object is not displayed in the first user interface), and wherein the seventh text includes the plurality of key concepts. Displaying a twelfth user interface object, wherein the twelfth user interface object corresponds to a request to perform an eleventh function of generating a seventh text that includes fewer characters than the first text and the key concepts of the first text assists the user in identifying the main points of a text and generating text that conveys those main points with fewer inputs than a user would typically have to provide to manually perform the same operation.

In some embodiments, the first input corresponds to a selection of a subset of the first text (e.g., 1405 and/or 1442), and wherein generating the seventh text is based on only the subset of the first text (as described with respect to FIG. 14H) Generating the seventh text based on only the subset of the first text minimizes the necessary processing power to generate text while still providing an accurate seventh text to the user's specifications.

In some embodiments, the seventh text includes up to a threshold percentage of a total number of characters included in the first text (as described with respect to FIG. 14H) (e.g., 50%, 60%, 75%, 80%). Generating the seventh text, wherein the seventh text includes up to a threshold percentage of a total number of characters included in the first text minimizes the necessary processing power to generate text by only generating a limited number of characters.

In some embodiments, the second user interface includes a thirteenth user interface object (e.g., 1422h), wherein the thirteenth user interface object corresponds to a request to perform a twelfth function, wherein performing the twelfth function includes generating an eighth text (e.g., automatically-generated text content and/or generative text content) based on key concepts of the first text (e.g., using an AI process and/or a generative AI process) (e.g., "Key Concepts") (in some embodiments, the twelfth user interface object is not displayed in the first user interface). Displaying a thirteenth user interface object, wherein the thirteenth user interface object corresponds to a request to perform a twelfth function of generating an eighth text based on key concepts of the first text reduces the necessary number of inputs a user would have to provide to generate text based on key concepts of the first text.

In some embodiments, the computer system receiving a second input (e.g., 1425), via the one or more input devices, corresponding to the second function (e.g., a selection of the second user interface object or selection of the fourth user interface object) and in response to the second input: the computer system displays, via the display generation component, the generated second text (e.g., 1426). In some embodiments, after displaying the generated second text, the computer system displays, via the display generation component, a fourteenth user interface object (e.g., 1427*b*), wherein the fourteenth user interface object corresponds to a request to perform a twelfth function, and wherein performing the twelfth function includes generating a ninth text (e.g., automatically-generated text content and/or generative text content) based on the first text (e.g., using an AI process and/or a generative AI process) (in some embodiments, generating the ninth text is based on a seed different than a seed used to generate the first text) (in some embodiments, after generating the ninth text, displaying a fifteenth user interface object, wherein the fifteenth user interface object corresponds to a request to perform a thirteenth function, and wherein performing the thirteenth function includes displaying, via the display generation component, the generated second text) (in some embodiments, after displaying the generated second text, displaying, via the display generation component, a sixteenth user interface object, wherein the sixteenth user interface object corresponds to a request to perform a fourteenth function, and wherein performing the thirteenth function includes displaying, via the display generation component, the first text). Displaying a fourteenth user interface object after displaying the generated second text, wherein the fourteenth user interface object corresponds to a request to perform a twelfth function of generating a ninth text based on the first text reduces the necessary number of inputs a user would need to provide to correct inaccurate output.

Note that details of the processes described above with respect to method 1500 (e.g., FIG. 15) are also applicable in an analogous manner to the methods described below. For example, methods 1100, 1300, 1600, and 1800 optionally includes one or more of the characteristics of the various methods described above with reference to method 1500. For example, the generated text in FIGS. 10F-10I and 10M can be used as the first text of method 1500. For brevity, these details are not repeated above nor below.

FIG. 16 is a flow diagram illustrating a method for proofreading text using a digital assistant and/or a language model, in accordance with some embodiments. Method 1500 is performed at a computer system (e.g., 100, 300, 500, 604, 901, 1000, 1400, and/or 1700) (e.g., a smartphone, a smartwatch, a head-mounted device, a tablet computer, or a personal computer) that is in communication with a display generation component (e.g., a display or a projector) (e.g., 1001, 1401, and/or 1701) and one or more input devices (e.g., a touch-sensitive surface, a mouse, a keyboard, a microphone, and/or inputs and outputs module 903). In some embodiments, method 1600 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1600 are, optionally, combined, the orders of some operations are, optionally, changed, and some operations are, optionally, omitted.

As described below, method 1600 provides an intuitive way for proofreading text using a digital assistant and/or a language model. The method reduces the cognitive burden on a user for generating/editing text, thereby creating a more efficient human-machine interface. For battery-operated computing devices, enabling a user to proofread text faster and more efficiently conserves power and increases the time between battery charges.

The computer system (e.g., 901,1000, 1400, and/or 1700) (e.g., a smartphone, a smartwatch, a head-mounted device, a tablet computer, or a personal computer) that is in communication with a display generation component (e.g., a display or a projector) and one or more input devices (e.g., a touch-sensitive surface, a mouse, a keyboard, and/or a microphone) displays (e.g., 1601), via the display generation component, a first text (e.g., 1406).

The computer system receives (e.g., 1602) a first input (e.g., 1405 and/or 1423) (e.g., speech, click, tap, press and hold, and/or text), via the one or more input devices, wherein the first input corresponds to a request (e.g., 1403*c* and/or 1422*b*) to correct a plurality of textual errors (e.g., "bored," "to to," "stret," and/or "arive" as described with respect to FIGS. 14A-14B) (e.g., grammatical, syntactical, and/or spelling errors) in the first text, wherein the plurality of textual errors includes a first textual error (e.g., "bored" in FIG. 14A) and a second textual error ("to to" in FIG. 14A).

In response to the first input (e.g., 1603), the computer system updates (e.g., 1604) (e.g., using DA1 904, language model 905, and/or DA2 906) the first text (e.g., using an AI process and/or a generative AI process).

Updating the first text includes the computer system correcting (1605) the plurality of textual errors. In response to the first input, updating the first text wherein updating the first text includes correcting the plurality of textual errors improves accuracy of the first text and reduces the necessary inputs a user would have to provide to manually identify and correct each textual error.

Correcting the plurality of textual errors includes the computer system correcting (e.g., 1606) the first textual error with a first correction (e.g., 1409*a*).

Correcting the plurality of textual errors includes the computer system correcting (e.g., 1607) the second textual error with a second correction (e.g., 1409*b*).

Correcting the plurality of textual errors includes marking (e.g., 1608) the first correction in the first text (as described with respect to FIG. 14B).

Correcting the plurality of textual errors includes marking (e.g., 1609) the second correction in the first text (as described with respect to FIG. 14B). In response to the first input, marking the first correction and marking the second correction improves the operability of the computer system because a user can more quickly identify the corrections in the text and can quickly identify any mistakes made by the language model.

In some embodiments, after correcting the plurality of textual errors, the computer system displays, via the display generation component, the first text with the marked first correction (e.g., 1409*a*), the marked second correction (e.g., 1409*b*), and a first user interface object (e.g., 1410*a*), wherein the first user interface object corresponds to a request to revert the correcting of the plurality of textual errors (e.g., "Show Original") (e.g., replace the first correction and the second correction with the first textual error and the second textual error respectively). Displaying a first user interface object, wherein the first user interface object corresponds to a request to revert the correcting of the plurality of textual errors provides the user with greater control options and reduces the necessary number of inputs a user would have to provide to revert each correction manually.

In some embodiments, the computer system receives a second input (e.g., 1411 and/or 1417), via the one or more input devices, wherein the second input corresponds to the marked first correction. In some embodiments, in accordance with a determination that the second input is a first type of gesture (e.g., 1411) (e.g., single tap or single click), the computer system performs a first function (e.g., using an AI process and/or a generative AI process). In some embodiments, in accordance with a determination that the second input is a second type of gesture (e.g., 1417) (e.g., double tap or double click), the computer system performs a second function (e.g., using an AI process and/or a generative AI process). In accordance with a determination that the second input is a first type of gesture, performing a first function and in accordance with a determination that the second input is a second type of gesture, performing a second function improves operability of the device while reducing the amount of clutter in the user interface because different interfaces are displayed based on the type of gesture the user provides.

In some embodiments, performing the first function includes the computer system displaying, via the display generation component, a description (e.g., 1410*d* and/or 1410*g*) of the first textual error (in some embodiments, the description includes a modification of the first text (e.g., "yelluow") In some embodiments, the description includes an explanation of why the first textual error is incorrect (e.g., spelling, grammar, syntax)). Displaying a description of the first textual error improves the operability of the computer system because the user is more quickly able to understand how the language model corrected an error and the user is more quickly able to identify any mistakes the language model may have made.

In some embodiments, performing the first function includes the computer system displaying, via the display generation component, a second user interface object (e.g., 1410*e*), wherein the second user interface object corresponds to a request to perform a third function, and wherein performing the third function includes reverting the marked first correction (e.g., replacing the marked first correction with the first textual error and removing the marking). Displaying a second user interface object, wherein the second user interface object corresponds to a request to perform a third function of reverting the marked first correction reduces the necessary number of inputs a user would have to provide to manually revert any inaccurate correction the language model may have made.

In some embodiments, performing the second function includes the computer system enabling (e.g., 1420) a user to provide a textual input at the marked first correction (in some embodiments, enabling the user includes displaying a keyboard affordance on the display, via the display generation component). Enabling a user to provide a textual input at the marked first correction improves the operability of the computer system by minimizing clutter in the UI while expanding the user's control options such as being able to edit text manually using a type of gesture.

In some embodiments, performing the second function includes the computer system displaying, via the display generation component, a plurality of suggested modifications (e.g., 1419*a*, 1419*b*, and/or 1419*c*) (e.g., alternative spellings) to the marked first correction. Displaying a plurality of suggested modifications to the marked first correction improves the operability of the computer system because the user is more quickly able to identify alternatives to the correction that may better suit the user's goals.

In some embodiments, the first input is a textual input (e.g., 1423) (e.g., "Proofread this") in a text field (e.g., 1422*k*), wherein the text field corresponds to a digital assistant (e.g., 904). Receiving a textual input in a text field corresponding to a digital assistant improves the operability of the computer system because it enables a user to provide a more customized input that would not be possible otherwise while minimizing cluttering the UI with user interface objects.

In some embodiments, the first input is a selection (e.g., 1407) of a displayed third user interface object (e.g., 1403*c*), and before receiving the first input, the computer system receives a fourth input (e.g., 1405 and/or 1421), via the one or more input devices, wherein the fourth input corresponds to a selection of the first text. In some embodiments, in response to receiving the fourth input and in accordance with a determination that a first set of criteria are met (e.g., the fourth input selects greater than (or equal to) a threshold number of characters in the first text) (e.g., the fourth input selects greater than (or equal to) a threshold number of semantic objects where the semantic objects are of the same type), the computer system displays, via the display generation component, the third user interface object. In response to receiving the fourth input and in accordance with a determination that a first set of criteria are met, displaying the third user interface object improves the operability of the computer system by displaying the third user interface object when a set of conditions has been met without requiring further input.

In some embodiments, the selection of the first text includes the plurality of textual errors (e.g., "bored" and "to to" are selected by input 1405 in FIG. 14A).

In some embodiments, the first set of criteria includes a criterion that is met when the fourth input includes selecting at least a threshold number of characters in the first text (e.g., 1421) (as described with respect to FIG. 10H). In response to receiving the fourth input and in accordance with a determination that a first set of criteria are met, displaying the third user interface object where the first set of criteria includes a criterion that is met when the fourth user input includes selecting at least a threshold number of characters in the first text improves the operability of the computer system by displaying the third user interface object when a set of conditions has been met without requiring further input.

Note that details of the processes described above with respect to method 1600 (e.g., FIG. 16) are also applicable in an analogous manner to the methods described above and below. For example, methods 1100, 1300, 1500, and 1800 optionally includes one or more of the characteristics of the various methods described above with reference to method 1500. For example, the generated text in FIGS. 10F-10I and 10M can be used as the first text of method 1600. For brevity, these details are not repeated above nor below.

FIGS. 17A-17E illustrate exemplary user interfaces for generating text based on an incoming communication using a digital assistant and/or a language model, in accordance with some embodiments. FIG. 18 is a flow diagram of an exemplary method 1800 for generating text based on an incoming communication using a digital assistant and/or a language model. The user interfaces in these figures are used to illustrate the processes described below, including the processes described in FIG. 18.

Figure 17B:
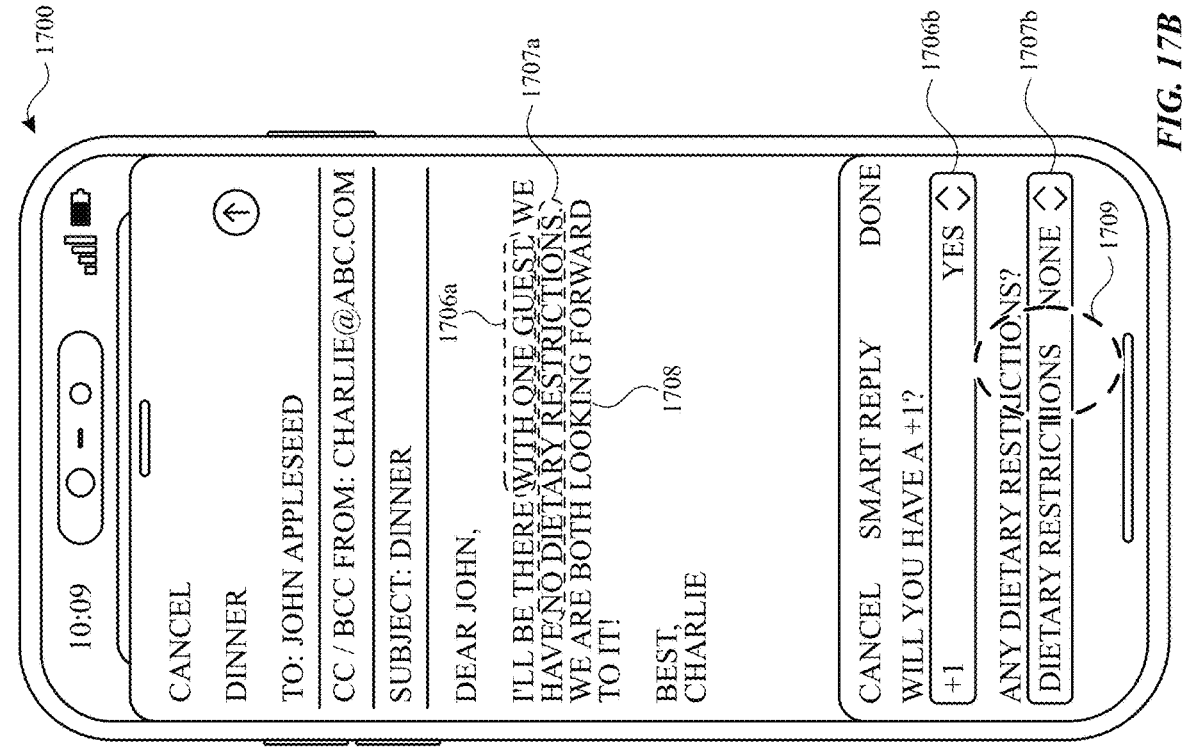
Figure 17A:
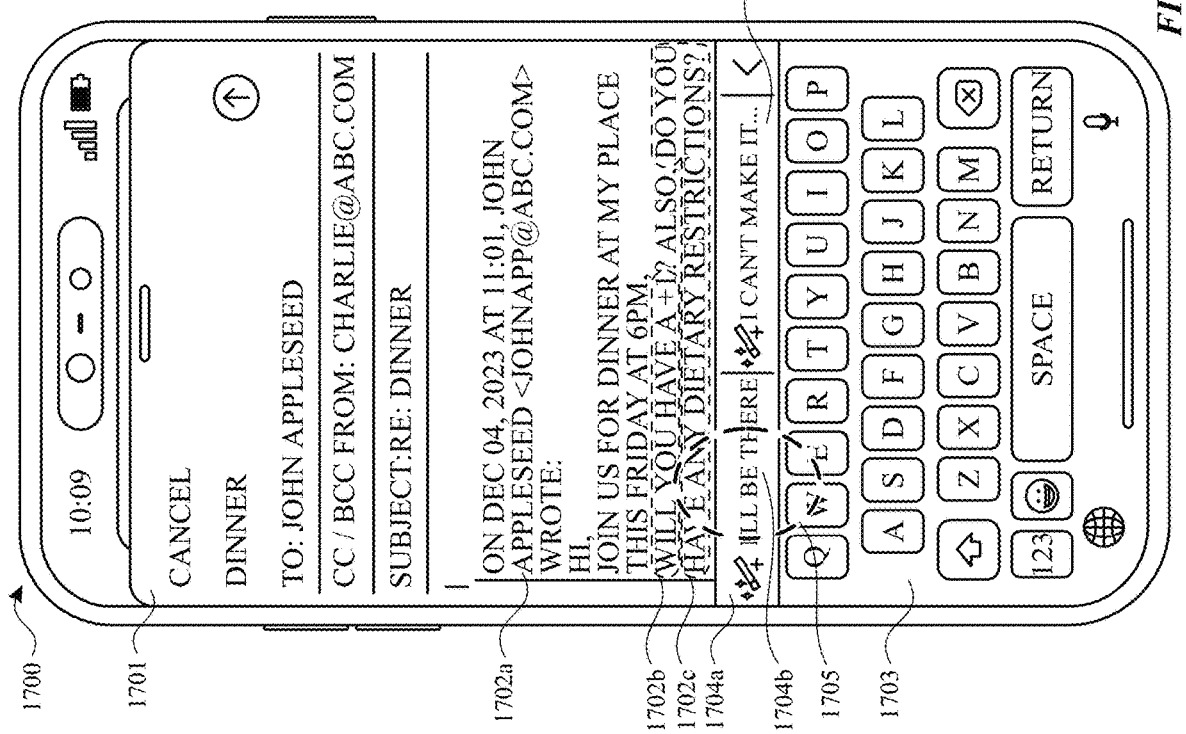

FIG. 17A illustrates computer system 1700 that includes one or more features of device 100, device 300, device 500, computer system 901, computer system 1000, and/or computer system 1400 and, throughout the discussion of FIGS. 17A-17E, will be referred to as computer system 1700, in accordance with some embodiments. Computer system 1700 includes display 1701. In the embodiment illustrated in FIG. 17A, computer system 1700 is a smart phone. In some embodiments, computer system 1700 is a personal or client electronic device (e.g., a mobile device, a communal device (e.g., a smart speaker and/or digital media player), a tablet computer, a smart watch, a desktop, a laptop, virtual reality headset (e.g., VR headset and/or head-mounted device), and/or augmented reality headset (e.g., smart glasses)). In some embodiments, computer system 1700 can be connected to a communications network (e.g., local area networks (LAN) or wide area networks (WAN), e.g., the internet).

FIG. 17A illustrates computer system 1700 displaying an email application user interface on display 1701 where the user is preparing to draft a reply (e.g., computer system 1700 displays keyboard 1703) to received email 1702a from John Appleseed. In some embodiments, computer system 1700 receives an SMS message from John Appleseed instead of email 1702a and computer system 1700 displays a messaging application user interface instead of email application user interface. At FIG. 17A, email 1702a includes question 1702b "will you have a +1?" and question 1702c "Any dietary restrictions?"

At FIG. 17A, computer system 1700 displays suggestions user interface 1704a which includes suggested reply button 1704b and suggested reply button 1704c. In some embodiments, suggestions user interface 1704a is displayed in response to computer system 1700 detecting a received message (e.g., email 1702a) in a text editing application (e.g., email application). At FIG. 17A, suggested reply button 1704b (and suggested reply button 1704c) includes preview text (e.g., "I'll be there . . . ") that is representative of a generated reply to email 1702a. At FIG. 17A, suggested reply button 1704c includes ellipses (e.g.," . . . ") in the preview text to signal to the user that suggested reply button 1704c corresponds to a generated reply.

FIG. 17A illustrates, computer system 1700 receives tap input 1705 at suggested reply button 1704b. In some embodiments, tap input 1705 is another type of input such as a swipe, a double tap, a speech input, a keypress, a mouse-click, and/or an air gesture. In some embodiments, other inputs described with reference to FIGS. 17A-17E can be these other types of inputs. FIG. 17A further illustrates, in response to receiving tap input 1705, computer system 1700 generates generated reply 1708 and displays FIG. 17B.

At FIG. 17B, in response to receiving tap input 1705, computer system 1700 displays generated reply 1708 that includes text indicative of a response to email 1702a. For example, generated reply 1708 answers John's questions (e.g., 1702b and/or 1702c) in email 1702a. In some embodiments, generated reply 1708 is concurrently displayed with email 1702a (including question 1702b and question 1702c). At FIG. 17B, generated reply 1708 includes reply text 1706a (e.g., "with one guest") that corresponds to question 1702b and reply text 1707a (e.g., "we have no dietary restrictions") that corresponds to question 1702c. At FIG. 17B, computer system 1700 displays detected question 1706c (e.g., "Will you have a +1?") that corresponds to question 1702b and detected question 1707c (e.g., "Any dietary restrictions?") that corresponds to question 1702c to signal to the user why reply text 1706a and reply text 1707a was included in generated reply 1708. For instance, detected question 1706c signals to the user that "with one guest" in generated reply 1708 is included to answer John's question of "will you have a +1?" In some embodiments, generated reply 1708 is displayed concurrently with email 1702a. In some embodiments, generated reply 1708 is displayed concurrently with email 1702. For example, email 1702 could be displayed below generated reply 1708 in a manner similar to how email 1702a is displayed in FIG. 17A (e.g., as a conversation thread).

In some embodiments, reply text 1706a and reply text 1707a are populated y (e.g., using DA1 904, language model 905, and/or DA2 906) based on context. In some embodiments, context used to populate reply text 1706a and reply text 1707a includes a location of computer system 1700, calendar information, contact information, messaging history, and/or applications installed on computer system 1700. For example, at FIG. 17B, reply text 1706a is populated with "with one guest" because computer system 1700 detects a calendar item in a calendar application that notes Charlie (e.g., the user) is bringing his spouse to the dinner. In another example, reply text 1707a is populated with "we have no dietary restrictions" because computer system 1700 detects Charlie previously sending a text to John about how Charlie has not started any diets yet.

At FIG. 17B, computer system 1700 displays reply button 1706b that is used to modify reply text 1706a and reply button 1707b that is used to modify reply text 1707a. At FIG. 17B, computer system 1700 receives tap input 1709 selecting reply button 1707b, and in response to receiving tap input 1709, computer system 1700 displays FIG. 17C.

At FIG. 17C, in response to receiving tap input 1709, computer system 1700 displays a list of options for populating reply text 1707a. At FIG. 17C, the list of options includes "none" option 1710a, "vegetarian" option 1710b, "vegan" option 1710c, "gluten-free" option 1710d, "halal" option 1710e, "kosher" option 1710f, ignore option 1710g, and custom option 1710h. FIG. 17C further illustrates, preselecting option 1710a based on context. For example, computer system 1700 preselects "none" option 1710a based on the Charlie's messaging history with John expressing that Charlie has not started any diets. In some embodiments, in response to receiving an input selecting ignore option 1710g, computer system 1700 removes reply text 1707a. For example, if computer system 1700 receives an input selecting ignore option 1710g, computer system 1700 would remove "we have no dietary restrictions" from generated reply 1708. In some embodiments, in response to receiving an input selecting custom option 1710h, computer system 1700 displays a text field where a textual input can be received and used to populate reply text 1707a. For example, if computer system 1700 receives an input selecting custom option 1710g, computers system 1700 displays a text field and subsequently receives a textual input "paleo diet." Continuing the example, in response to receiving the textual input "paleo diet", computer system 1700 replaces reply text 1707a "We have no dietary restrictions" with "We are on a paleo diet."

At FIG. 17C, in response to receiving tap input 1711 selecting "vegetarian" option 1710b, computer system 1700 displays FIG. 17D where generated reply 1708 is updated.

At FIG. 17D, in response to receiving tap input 1711, computer system 1700 displays updated reply 1712 which includes reply text 1706a and reply text 1707a. At FIG. 17D, computer system 1700 populates reply text 1707a with "are starting a vegetarian diet, so we will be avoiding meats at dinner" to reflect the selection of "vegetarian" option 1710b.

At FIG. 17D, in response to receiving tap input 1711, computer system 1700 updates reply button 1707*b* reflecting the selection of "vegetarian" option 1710*b* (e.g., "none" in reply button 1707*b* is replaced with "vegetarian"). At FIG. 17D, reply text 1706*a* is not populated in response to receiving tap input 1711.

At FIG. 17D, reply button 1706*b* includes cycle button 1713*a*. FIG. 17D illustrates, in response to receiving tap input 1713*b* at cycle button 1713*a*, computer system 1700 cycles through options for populating reply text 1706*a* (e.g., displays FIG. 17E).

Figure 17E:
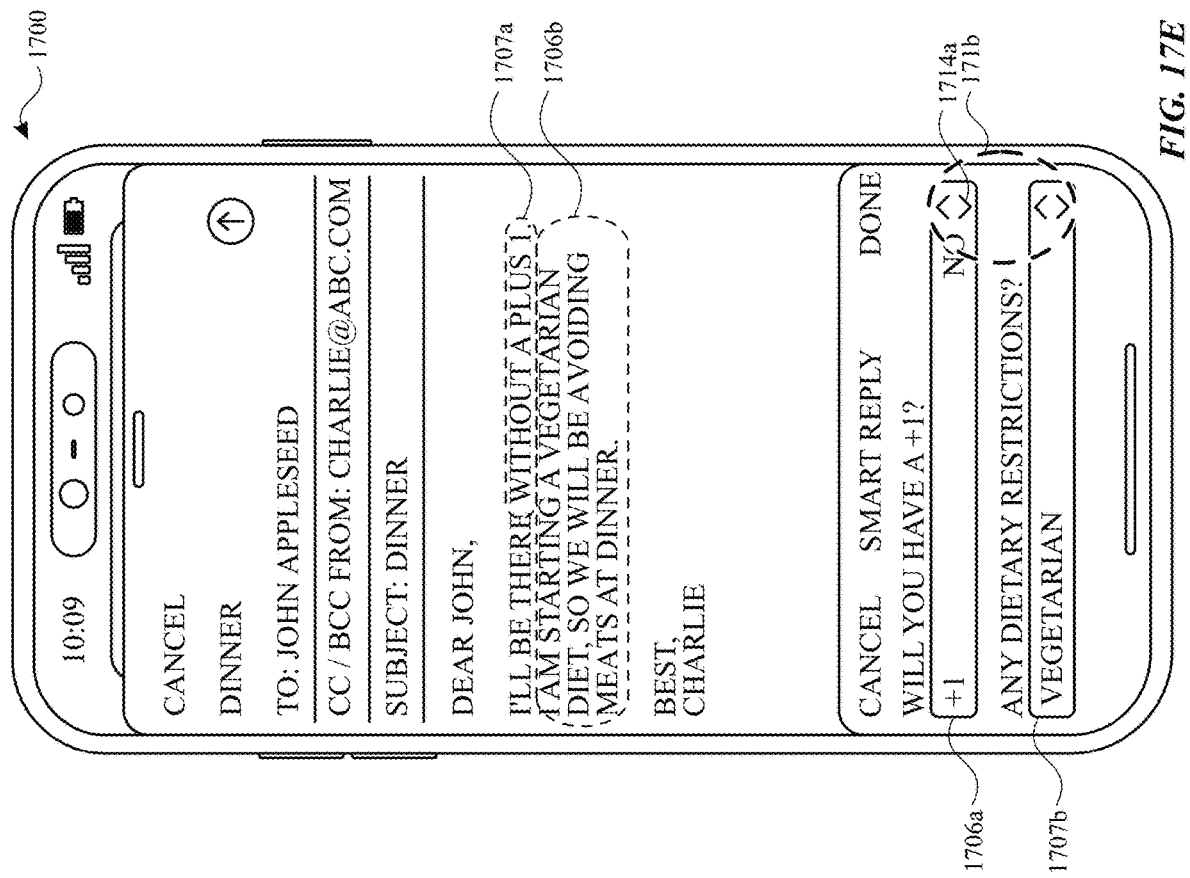
Figure 18:
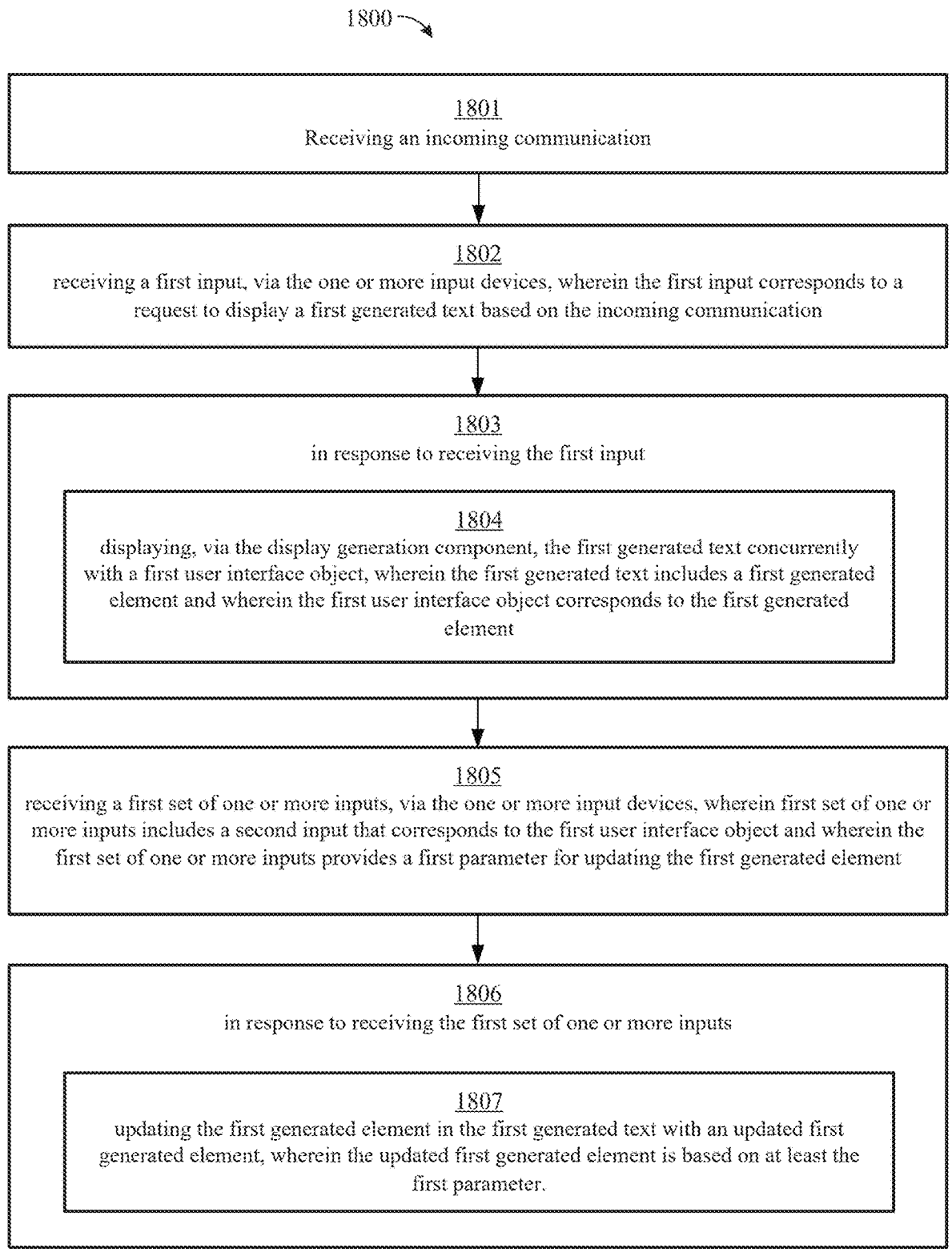
FIG. 18 is a flow diagram illustrating a method 1800 for generating text using a digital assistant and/or a language model based on an incoming communication, in accordance with some embodiments.

At FIG. 17E, in response to receiving tap input 1713*b*, computer system 1700 cycles from "yes" option to "no" option (as seen at reply button 1706*b*) with regard to whether Charlie will have a +1. FIG. 17E further illustrates, in response to receiving tap input 1713*b*, computer system 1700 updates updated reply 1712 by populating reply text 1706*a* with "I'll be there without a plus 1" to reflect the cycling from "yes" option to "no" option.

At FIG. 17E, reply button 1706*b* includes cycle button 1714*a*. FIG. 17E illustrates, in response to receiving tap input 1714*b* at cycle button 1714*a*, computer system 1700 cycles backwards through options for populating reply text 1706*a*. In some embodiments, cycling backwards through options for populating reply text 1706*a* includes reverting the populating of reply text 1706*a* with "I'll be there without a plus 1." For example, if computer system 1700 receives an input selecting cycle button 1714*a*, computer system reverts "I'll be there without a plus one" back to "I'll be there with one guest" (as depicted in FIG. 17D).

FIG. 18 is a flow diagram illustrating a method for generating replies to a received message using a digital assistant in accordance with some embodiments. Method 1800 is performed at a computer system (e.g., 100, 300, 500, 604, 901, 1000, 1400, and/or 1700) (e.g., a smartphone, a smartwatch, a head-mounted device, a tablet computer, or a personal computer) that is in communication with a display generation component (e.g., a display or a projector) (e.g., 1001, 1401, and/or 1701) and one or more input devices (e.g., a touch-sensitive surface, a mouse, a keyboard, a microphone, and/or inputs and outputs module 903). In some embodiments, method 1800 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1800 are, optionally, combined, the orders of some operations are, optionally, changed, and some operations are, optionally, omitted.

As described below, method 1800 provides an intuitive way for proofreading text using a digital assistant and/or a language model. The method reduces the cognitive burden on a user for generating/editing text, thereby creating a more efficient human-machine interface. For battery-operated computing devices, enabling a user to proofread text faster and more efficiently conserves power and increases the time between battery charges.

The computer system (e.g., 901, 1000, 1400, and/or 1700) (e.g., a smartphone, a smartwatch, a head-mounted device, a tablet computer, or a personal computer) that is in communication with a display generation component (e.g., a display or a projector) and one or more input devices (e.g., a touch-sensitive surface, a mouse, a keyboard, and/or a microphone) receives (1801) an incoming communication (e.g., an SMS message and/or e-mail) (e.g., 1702*a*).

The computer system receives (e.g., 1802) a first input (e.g., speech, click, tap, and/or text) (1705), via the one or more input devices, wherein the first input corresponds to a request (e.g., "I'll be there") (e.g., 1704*b* and/or 1704*c*) to display a first generated text (e.g., automatically-generated text content and/or generative text content) based on the incoming communication.

In response to receiving the first input (e.g., 1803), the computer system displays (e.g., 1804), via the display generation component, the first generated text (e.g., 1708) (in some embodiments, before displaying the first generated text, the computer system generates the first generated text based on the first input and based on the incoming communication, wherein the first generated text (e.g., "Dear John . . . ") includes a first generated element (e.g., automatically-generated text content and/or generative text content) (e.g., "One guest")) (in some embodiments, the computer system uses DA1 904, language model 905, and/or DA2 906 to generate the first generated text (e.g., using an AI process and/or a generative AI process)) (in some embodiments, displaying the first generated text includes concurrently displaying the first generated text and the first generated element) concurrently with a first user interface object (e.g., "+1") (e.g., 1706*b* and/or 1707*b*) (as described with respect to FIG. 17B), wherein the first generated text includes a first generated element (e.g., 1706*a*, and/or 1707*a*) and wherein the first user interface object corresponds to the first generated element. In some embodiments, the first user interface object is an affordance associated with updating the first generated element in the first generated text. In response to receiving the first input, displaying the first generated text concurrently with a first user interface object wherein the first generated text includes a first generated element and wherein the first user interface object corresponds to the first generated element improves the operability of the computer system by enabling the user to more quickly identify options to improve the first generated text.

The computer system receives (e.g., 1805) a first set of one or more inputs (e.g., 1709, 1711, 1713*b*, and/or 1714*b*) (e.g., speech, click, tap, and/or text), via the one or more input devices, wherein first set of one or more inputs includes a second input (e.g., 1713*b* and/or 1714*b*) that corresponds to the first user interface object and wherein the first set of one or more inputs provides (e.g., includes, sets, identifies, and/or designates) a first parameter (e.g., a value (e.g., a textual or numeric) and/or a characteristic) for updating the first generated element.

In response to receiving the first set of one or more inputs (e.g., 1806), the computer system updates (e.g., 1807) the first generated element in the first generated text with an updated first generated element (e.g., 1706*a* and/or 1707*a* in updated text 1712 (as described with respect to FIG. 17D)) (e.g., automatically-generated text content and/or generative text content), wherein the updated first generated element is based on at least the first parameter (in some embodiments, updating the first generated element includes replacing the first generated element with the updated first generated element) (in some embodiments, updating the first generated element includes displaying the updated first generated element concurrently with the first generated text) (in some embodiments, updating the first generated element in the first generated text includes ceasing to display the first user interface object). In response to receiving the first set of one or more inputs, updating the first generated element in the first generated text with an updated first generated element, wherein the updated first generated element is based on at least the first parameter improves the operability of the computer system by reducing the necessary number of inputs required to update an element manually.

In some embodiments, the first generated text includes a second generated element (e.g., 1706a and/or 1707a) that is different from the first generated element, wherein displaying the first generated text concurrently with the first user interface object includes displaying, via the display generation component, a second user interface object (e.g., 1706b and/or 1707b) corresponding to the second generated element (e.g., the second user interface object is an affordance associated with updating the second generated element in the first generated text) (e.g., automatically-generated text content and/or generative text content). Displaying a second user interface object corresponding to the second generated element improves the operability of the computer system by allowing a user to more quickly identify options for improving the first generated text by automatically identifying options such as the second generated element.

In some embodiments, updating the first generated element in the first generated text with the updated first generated element does not include updating the second generated element in the first generated text (e.g., updated text 1712 shows 1706a remains the same when 1707a is updated (as described with respect to FIG. 17D)). Updating the first generated element in the first generated text with the updated first generated element not including updating the second generated element improves the operability of the computer system by reducing the necessary number of inputs a user would have to provide to correct any undesired changes when updating a generated element.

In some embodiments, receiving the first set of one or more inputs includes receiving a third input (e.g., 1709) (e.g., speech, click, tap, and/or text) of the first set of one or more inputs and receiving a fourth input (e.g., 1710h and/or 1711) (e.g., speech, click, tap, and/or text) of the first set of one or more inputs. In some embodiments, in response to receiving the third input of the first set of one or more inputs, the computer system displays, via the display generation component, a set of options (e.g., 1710a, 1710b, 1710c, 1710d, 1710e, 1710f, 1710g, 1710h) for the first parameter (in some embodiments, the set of options is determined by a digital assistant) (in some embodiments, the digital assistant determines the set of options based on context) (in some embodiments, context includes calendar information, contact information, browser query history, the incoming communication, outgoing communications, and/or installed applications on the computer system), wherein the set of options for the first parameter includes a first option (e.g., 1710a) for the first parameter and a second option (e.g., 1710b) for the first parameter that is different from the first option. In some embodiments, in response to receiving the fourth input of the first set of one or more inputs and in accordance with a determination that the fourth input corresponds to the first option, the computer system selects the first option as the first parameter. In some embodiments, in response to receiving the fourth input of the first set of one or more inputs and in accordance with a determination that the fourth input corresponds to the second option, the computer system selects the second option as the first parameter. Displaying a set of options for the first parameter, wherein the set of options for the first parameter includes a first option for the first parameter and a second option for the first parameter that is different from the first option improves the operability of the device by allowing a user to more quickly identify options for improving the first generated text.

In some embodiments, the first user interface object is displayed concurrently with a cycling user interface object (e.g., 1713a and/or 1714b) (in some embodiments, the cycling user interface object is a part of the first user interface object) that, when selected (e.g., 1713b and/or 1714b), causes the computer system to cycle through the set of options for the first parameter (e.g., cycle through options as the currently selected option for the first parameter). Displaying a cycling user interface object that when selected causes the computer system to cycle through the set of options for the first parameter improves the operability of the computer system by reducing the necessary number of inputs a user would have to provide to rewrite or re-create updates to the first generated element.

In some embodiments, after updating the first generated element, the computer system receives a fifth input (e.g., 1714b) (e.g., speech, click, tap, and/or text), via the one or more input devices, wherein the fifth input corresponds to a request to revert the update to the first generated element (e.g., "I'll be there without a plus 1" is replaced with "I'll be there with one guest" as described with respect to FIGS. 17D-17E). In some embodiments, in response to receiving the fifth input, the computer system reverts the update to the first generated element (in some embodiments, reverting the update includes ceasing to display the updated first generated element and displaying the first generated element) (e.g., using an AI process and/or a generative AI process). In response to receiving the fifth input, reverting the update to the first generated element improves the operability of the device by reducing the number of necessary inputs a user would have to provide to manually revert any updates to the first generated element.

In some embodiments, the first generated element corresponds to a detected question (e.g., 1702b and/or 1702c) (in some embodiments, detecting a question includes detecting a question mark in the incoming communication) (in some embodiments, detecting a question includes determining a response to the question based on context) (in some embodiments, context includes calendar information, contact information, browser query history, the incoming communication, outgoing communications, and/or installed applications on the computer system) in the incoming communication.

In some embodiments, displaying the first user interface object includes the computer system concurrently displaying, via the display generation component, the first generated element with the corresponding detected question (e.g., 1706c and/or 1707c) (as described with respect to FIG. 17B). Displaying the first generated element with the corresponding detected question improves the operability of the computer system by automatically displaying the factors (e.g., questions) the computer system used to generate the first generated element which allows a user to more quickly correct any inaccuracies in the generated text.

In some embodiments, the first generated element was generated based on at least one outgoing communication previously sent by a user of the computer system (in some embodiments, from a user account associated with the computer system) (in some embodiments, the incoming communication corresponds to a conversation) (in some embodiments, the at least one outgoing communication corresponds to the conversation).

In some embodiments, the first input corresponds to a selection of a displayed second user interface object (e.g., 1704b and/or 1704c), wherein the displayed second user interface object includes a displayed subset of the first generated text (e.g., "I'll be there . . . ") (in some embodiments, the displayed subset of the first generated text includes a visual indication that the displayed affordance causes the computer system to generate text). Displaying a second user interface object including a displayed subset of the first generated text improves the operability of the computer system by providing improved visual feedback that shows examples of generated text that assists the user in identifying options for how to generate text.

In some embodiments, displaying the first generated text includes concurrently displaying, via the display generation component, the first generated text with text corresponding to the incoming communication (as described with respect to FIG. 17B). Displaying the first generated text concurrently with text corresponding to the incoming communication improves the operability of the computer system by providing the user with improved visual feedback so the user can more quickly identify any inaccuracies in the first generated text.

Note that details of the processes described above with respect to method 1800 (e.g., FIG. 18) are also applicable in an analogous manner to the methods described below. For example, methods 1100, 1300, 1500, and 1600 optionally includes one or more of the characteristics of the various methods described above with reference to method 1500. For example, the generated text in FIG. 17E can be used as the first text of method 1100 and/or 1500. For brevity, these details are not repeated above nor below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

Some embodiments described herein can include use of artificial intelligence and/or machine learning systems (sometimes referred to herein as the AI/ML systems). The use can include collecting, processing, labeling, organizing, analyzing, recommending and/or generating data. Entities that collect, share, and/or otherwise utilize user data should provide transparency and/or obtain user consent when collecting such data. The present disclosure recognizes that the use of the data in the AI/ML systems can be used to benefit users. For example, the data can be used to train models that can be deployed to improve performance, accuracy, and/or functionality of applications and/or services. Accordingly, the use of the data enables the AI/ML systems to adapt and/or optimize operations to provide more personalized, efficient, and/or enhanced user experiences. Such adaptation and/or optimization can include tailoring content, recommendations, and/or interactions to individual users, as well as streamlining processes, and/or enabling more intuitive interfaces. Further beneficial uses of the data in the AI/ML systems are also contemplated by the present disclosure.

The present disclosure contemplates that, in some embodiments, data used by AI/ML systems includes publicly available data. To protect user privacy, data may be anonymized, aggregated, and/or otherwise processed to remove or to the degree possible limit any individual identification. As discussed herein, entities that collect, share, and/or otherwise utilize such data should obtain user consent prior to and/or provide transparency when collecting such data. Furthermore, the present disclosure contemplates that the entities responsible for the use of data, including, but not limited to data used in association with AI/ML systems, should attempt to comply with well-established privacy policies and/or privacy practices.

For example, such entities may implement and consistently follow policies and practices recognized as meeting or exceeding industry standards and regulatory requirements for developing and/or training AI/ML systems. In doing so, attempts should be made to ensure all intellectual property rights and privacy considerations are maintained. Training should include practices safeguarding training data, such as personal information, through sufficient protections against misuse or exploitation. Such policies and practices should cover all stages of the AI/ML systems development, training, and use, including data collection, data preparation, model training, model evaluation, model deployment, and ongoing monitoring and maintenance. Transparency and accountability should be maintained throughout. Such policies should be easily accessible by users and should be updated as the collection and/or use of data changes. User data should be collected for legitimate and reasonable uses of the entity and not shared or sold outside of those legitimate uses. Further, such collection and sharing should occur through transparency with users and/or after receiving the informed consent of the users. Additionally, such entities should consider taking any needed steps for safeguarding and securing access to such data and ensuring that others with access to the data adhere to their privacy policies and procedures. Further, such entities should subject themselves to evaluation by third parties to certify, as appropriate for transparency purposes, their adherence to widely accepted privacy policies and practices. In addition, policies and/or practices should be adapted to the particular type of data being collected and/or accessed and tailored to a specific use case and applicable laws and standards, including jurisdiction-specific considerations.

In some embodiments, AI/ML systems may utilize models that may be trained (e.g., supervised learning or unsupervised learning) using various training data, including data collected using a user device. Such use of user-collected data may be limited to operations on the user device. For example, the training of the model can be done locally on the user device so no part of the data is sent to another device. In other implementations, the training of the model can be performed using one or more other devices (e.g., server(s)) in addition to the user device but done in a privacy preserving manner, e.g., via multi-party computation as may be done cryptographically by secret sharing data or other means so that the user data is not leaked to the other devices.

In some embodiments, the trained model can be centrally stored on the user device or stored on multiple devices, e.g., as in federated learning. Such decentralized storage can similarly be done in a privacy preserving manner, e.g., via cryptographic operations where each piece of data is broken into shards such that no device alone (i.e., only collectively with another device(s)) or only the user device can reassemble or use the data. In this manner, a pattern of behavior of the user or the device may not be leaked, while taking advantage of increased computational resources of the other devices to train and execute the ML model. Accordingly, user-collected data can be protected. In some implementations, data from multiple devices can be combined in a privacy-preserving manner to train an ML model.

In some embodiments, the present disclosure contemplates that data used for AI/ML systems may be kept strictly separated from platforms where the AI/ML systems are deployed and/or used to interact with users and/or process data. In such embodiments, data used for offline training of the AI/ML systems may be maintained in secured datastores with restricted access and/or not be retained beyond the duration necessary for training purposes. In some embodiments, the AI/ML systems may utilize a local memory cache to store data temporarily during a user session. The local memory cache may be used to improve performance of the AI/ML systems. However, to protect user privacy, data stored in the local memory cache may be erased after the user session is completed. Any temporary caches of data used for online learning or inference may be promptly erased after processing. All data collection, transfer, and/or storage should use industry-standard encryption and/or secure communication.

In some embodiments, as noted above, techniques such as federated learning, differential privacy, secure hardware components, homomorphic encryption, and/or multi-party computation among other techniques may be utilized to further protect personal information data during training and/or use of the AI/ML systems. The AI/ML systems should be monitored for changes in underlying data distribution such as concept drift or data skew that can degrade performance of the AI/ML systems over time.

In some embodiments, the AI/ML systems are trained using a combination of offline and online training. Offline training can use curated datasets to establish baseline model performance, while online training can allow the AI/ML systems to continually adapt and/or improve. The present disclosure recognizes the importance of maintaining strict data governance practices throughout this process to ensure user privacy is protected.

In some embodiments, the AI/ML systems may be designed with safeguards to maintain adherence to originally intended purposes, even as the AI/ML systems adapt based on new data. Any significant changes in data collection and/or applications of an AI/ML system use may (and in some cases should) be transparently communicated to affected stakeholders and/or include obtaining user consent with respect to changes in how user data is collected and/or utilized.

Despite the foregoing, the present disclosure also contemplates embodiments in which users selectively restrict and/or block the use of and/or access to data. That is, the present disclosure contemplates that hardware and/or software elements can be provided to prevent or block access to data. For example, in the case of some services, the present technology should be configured to allow users to select to "opt in" or "opt out" of participation in the collection of data during registration for services or anytime thereafter. In another example, the present technology should be configured to allow users to select not to provide certain data for training the AI/ML systems and/or for use as input during the inference stage of such systems. In yet another example, the present technology should be configured to allow users to be able to select to limit the length of time data is maintained or entirely prohibit the use of their data for use by the AI/ML systems. In addition to providing "opt in" and "opt out" options, the present disclosure contemplates providing notifications relating to the access or use of personal information. For instance, a user can be notified when their data is being input into the AI/ML systems for training or inference purposes, and/or reminded when the AI/ML systems generate outputs or make decisions based on their data.

The present disclosure recognizes AI/ML systems should incorporate explicit restrictions and/or oversight to mitigate against risks that may be present even when such systems having been designed, developed, and/or operated according to industry best practices and standards. For example, outputs may be produced that could be considered erroneous, harmful, offensive, and/or biased; such outputs may not necessarily reflect the opinions or positions of the entities developing or deploying these systems. Furthermore, in some cases, references to third-party products and/or services in the outputs should not be construed as endorsements or affiliations by the entities providing the AI/ML systems. Generated content can be filtered for potentially inappropriate or dangerous material prior to being presented to users, while human oversight and/or ability to override or correct erroneous or undesirable outputs can be maintained as a failsafe.

The present disclosure further contemplates that users of the AI/ML systems should refrain from using the services in any manner that infringes upon, misappropriates, or violates the rights of any party. Furthermore, the AI/ML systems should not be used for any unlawful or illegal activity, nor to develop any application or use case that would commit or facilitate the commission of a crime, or other tortious, unlawful, or illegal act. The AI/ML systems should not violate, misappropriate, or infringe any copyrights, trademarks, rights of privacy and publicity, trade secrets, patents, or other proprietary or legal rights of any party, and appropriately attribute content as required. Further, the AI/ML systems should not interfere with any security, digital signing, digital rights management, content protection, verification, or authentication mechanisms. The AI/ML systems should not misrepresent machine-generated outputs as being human-generated.

As described above, one aspect of the present technology is the gathering and use of data available from various sources to generate or edit text using a digital assistant and/or language model. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to generate text for the user automatically. Accordingly, use of such personal information data enables users to have calculated control over generated text. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of generating and/or editing text using a digital assistant and/or language model, the present technology can be configured to allow users to select to "opt in" or "opt out" of participation in the collection of personal information data during registration for services or anytime thereafter. In another example, users can select not to provide text generation requests to remote language models. In yet another example, users can limit the amount of context data (e.g., calendar information, contact information, messaging history, and/or applications installed) that is transmitted to remote language models when generating text. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, text can be generated or modified by inferring preferences based on non-personal information data or a bare minimum amount of personal information, such as the content being requested by the device associated with a user, other non-personal information available to the text generation and modification services, or publicly available information.

What is claimed is:

1. A computer system configured to communicate with a display generation component and one or more input devices, comprising:
   one or more processors; and
   memory storing one or more programs configured to be executed by the one or more processors, the one or more programs including instructions for:
      receiving, via the one or more input devices, a first input, wherein the first input corresponds to a request for a language model to generate generated text; and
      in response to receiving the first input:
         in accordance with a determination that additional information of a first type is to be included in the generated text, displaying, via the display generation component, a request for additional information without generating the generated text via the language model; and
         in accordance with a determination that additional information of a second type is to be included in the generated text:
            generating, via the language model, the generated text, wherein the generated text includes at least one placeholder associated with the additional information of the second type; and
            displaying, via the display generation component, the generated text with the at least one placeholder;
      after displaying the request for additional information of the first type, receiving a second input, wherein the second input is an indication of a refusal to provide the additional information of the first type; and
      in response to receiving the second input:
         determining whether the language model can generate the generated text;
         in accordance with a determination that the language model can generate the generated text, generating the generated text without the additional information of the first type; and
         in accordance with a determination that the language model cannot generate the generated text, displaying, via the display generation component, an indication that the generated text cannot be generated.

2. The computer system of claim 1, wherein the additional information of the first type is information required to generate the generated text.

3. The computer system of claim 1, wherein the additional information of the first type is not available at the computer system prior to receiving the first input.

4. The computer system of claim 1, wherein the additional information of the first type is information for determining a syntax and/or structure of the generated text.

5. The computer system of claim 1, wherein the additional information of the first type is information for generating at least a plurality of words of the generated text.

6. The computer system of claim 1, wherein the additional information of the first type is information that cannot be genericized.

7. The computer system of claim 1, wherein the additional information of the second type is information that can be genericized.

8. The computer system of claim 1, wherein the additional information of the second type is information for generating a predetermined type of object for the generated text.

9. The computer system of claim 1, wherein displaying the request for additional information of the first type includes:
displaying a request for first information of the first type that corresponds to a first requested attribute of the generated text; and
displaying a request for second information of the first type that corresponds to a second requested attribute of the generated text that is different from the first requested attribute.

10. The computer system of claim 1, wherein the one or more programs further include instructions for:
after generating the generated text, receiving a third input that corresponds to a request to update or supplement the generated text; and
in response to the third input, displaying a second generated text that has been updated or supplemented based on the third input.

11. The computer system of claim 10, wherein the third input is a request to add an image and the second generated text includes an image selected based on the third input.

12. The computer system of claim 1, wherein the one or more programs further include instructions for:
after generating the generated text, receiving a fourth input that corresponds to a request to generate a first subportion of the generated text; and
in response to the fourth input, re-generating the first subportion of the generated text.

13. The computer system of claim 1, wherein the first input includes an electronic document, and wherein the generated text is based on the electronic document.

14. The computer system of claim 1, wherein the at least one placeholder includes a first placeholder and a second placeholder and wherein displaying the generated text with the at least one placeholder includes:
displaying a first selectable user interface object that, when selected, initiates a process for populating the first placeholder; and
displaying a second selectable user interface object that, when selected, initiates a process for populating the second placeholder.

15. The computer system of claim 1, wherein the at least one placeholder includes a third placeholder that is prepopulated based on contextual information corresponding to a current context of the computer system.

16. The computer system of claim 1, wherein displaying the generated text with the at least one placeholder includes visually distinguishing the at least one placeholder within the generated text.

17. The computer system of claim 1, wherein the one or more programs further include instructions for:
after generating the generated text, displaying a re-generate selectable user interface object that, when selected, causes the generated text to be replaced with third generated text that is based on the first input.

18. The computer system of claim 1, wherein the first input is received at a displayed composition user interface, and wherein the generated text is displayed in a displayed application user interface.

19. The computer system of claim 18, wherein the application user interface corresponds to a first party software application.

20. The computer system of claim 18, wherein the application user interface corresponds to a third party software application.

21. The computer system of claim 18, wherein the composition user interface includes a third selectable user interface object, wherein the composition user interface is displayed concurrently with the application user interface, wherein generating the generated text is based on context, and wherein the one or more programs further include instructions for:
while displaying the composition user interface concurrently with the application user interface:
receiving a fifth input at the third selectable user interface object;
in response to receiving the fifth input at the third selectable user interface object, displaying a first selectable option and a second selectable option;
while displaying the first selectable option and the second selectable option, receiving a sixth input; and
in response to receiving the sixth input:
in accordance with a determination that the sixth input corresponds to the first selectable option, including all text in the displayed application user interface in the context; and
in accordance with a determination that the sixth input corresponds to the second selectable option, including only selected text in the displayed application user interface in the context.

22. The computer system of claim 1, wherein the one or more programs further include instructions for:
in response to receiving the first input, determining, by an operating system of the computer system, additional information of a first type is to be included in the generated text or additional information of a second type is to be included in the generated text.

23. A non-transitory computer-readable storage medium storing one or more programs configured to be executed by one or more processors of a computer system that is in communication with a display generation component and one or more input devices, the one or more programs including instructions for:
receiving, via the one or more input devices, a first input, wherein the first input corresponds to a request for a language model to generate generated text; and
in response to receiving the first input:
in accordance with a determination that additional information of a first type is to be included in the generated text, displaying, via the display generation component, a request for additional information without generating the generated text via the language model; and
in accordance with a determination that additional information of a second type is to be included in the generated text:
generating, via the language model, the generated text, wherein the generated text includes at least one placeholder associated with the additional information of the second type; and displaying, via the display generation component, the generated text with the at least one placeholder;

after displaying the request for additional information of the first type, receiving a second input, wherein the second input is an indication of a refusal to provide the additional information of the first type; and in response to receiving the second input:
  determining whether the language model can generate the generated text;
  in accordance with a determination that the language model can generate the generated text, generating the generated text without the additional information of the first type; and
  in accordance with a determination that the language model cannot generate the generated text, displaying, via the display generation component, an indication that the generated text cannot be generated.

24. The non-transitory computer-readable storage medium of claim 23, wherein the additional information of the first type is information required to generate the generated text.

25. The non-transitory computer-readable storage medium of claim 23, wherein the additional information of the first type is not available at the computer system prior to receiving the first input.

26. The non-transitory computer-readable storage medium of claim 23, wherein the additional information of the first type is information for determining a syntax and/or structure of the generated text.

27. The non-transitory computer-readable storage medium of claim 23, wherein the additional information of the first type is information for generating at least a plurality of words of the generated text.

28. The non-transitory computer-readable storage medium of claim 23, wherein the additional information of the first type is information that cannot be genericized.

29. The non-transitory computer-readable storage medium of claim 23, wherein the additional information of the second type is information that can be genericized.

30. The non-transitory computer-readable storage medium of claim 23, wherein the additional information of the second type is information for generating a predetermined type of object for the generated text.

31. The non-transitory computer-readable storage medium of claim 23, wherein displaying the request for additional information of the first type includes:
  displaying a request for first information of the first type that corresponds to a first requested attribute of the generated text; and
  displaying a request for second information of the first type that corresponds to a second requested attribute of the generated text that is different from the first requested attribute.

32. The non-transitory computer-readable storage medium of claim 23, wherein the one or more programs further include instructions for:
  after generating the generated text, receiving a third input that corresponds to a request to update or supplement the generated text; and
  in response to the third input, displaying a second generated text that has been updated or supplemented based on the third input.

33. The non-transitory computer-readable storage medium of claim 32, wherein the third input is a request to add an image and the second generated text includes an image selected based on the third input.

34. The non-transitory computer-readable storage medium of claim 23, wherein the one or more programs further include instructions for:
  after generating the generated text, receiving a fourth input that corresponds to a request to generate a first subportion of the generated text; and
  in response to the fourth input, re-generating the first subportion of the generated text.

35. The non-transitory computer-readable storage medium of claim 23, wherein the first input includes an electronic document, and wherein the generated text is based on the electronic document.

36. The non-transitory computer-readable storage medium of claim 23, wherein the at least one placeholder includes a first placeholder and a second placeholder and wherein displaying the generated text with the at least one placeholder includes:
  displaying a first selectable user interface object that, when selected, initiates a process for populating the first placeholder; and
  displaying a second selectable user interface object that, when selected, initiates a process for populating the second placeholder.

37. The non-transitory computer-readable storage medium of claim 23, wherein the at least one placeholder includes a third placeholder that is prepopulated based on contextual information corresponding to a current context of the computer system.

38. The non-transitory computer-readable storage medium of claim 23, wherein displaying the generated text with the at least one placeholder includes visually distinguishing the at least one placeholder within the generated text.

39. The non-transitory computer-readable storage medium of claim 23, wherein the one or more programs further include instructions for:
  after generating the generated text, displaying a re-generate selectable user interface object that, when selected, causes the generated text to be replaced with third generated text that is based on the first input.

40. The non-transitory computer-readable storage medium of claim 23, wherein the first input is received at a displayed composition user interface, and wherein the generated text is displayed in a displayed application user interface.

41. The non-transitory computer-readable storage medium of claim 40, wherein the application user interface corresponds to a first party software application.

42. The non-transitory computer-readable storage medium of claim 40, wherein the application user interface corresponds to a third party software application.

43. The non-transitory computer-readable storage medium of claim 40, wherein the composition user interface includes a third selectable user interface object, wherein the composition user interface is displayed concurrently with the application user interface, wherein generating the generated text is based on context, and wherein the one or more programs further include instructions for:
  while displaying the composition user interface concurrently with the application user interface:
    receiving a fifth input at the third selectable user interface object;
    in response to receiving the fifth input at the third selectable user interface object, displaying a first selectable option and a second selectable option;
    while displaying the first selectable option and the second selectable option, receiving a sixth input; and in response to receiving the sixth input:
   in accordance with a determination that the sixth input corresponds to the first selectable option, including all text in the displayed application user interface in the context; and
   in accordance with a determination that the sixth input corresponds to the second selectable option, including only selected text in the displayed application user interface in the context.

44. The non-transitory computer-readable storage medium of claim 23, wherein the one or more programs further include instructions for:
in response to receiving the first input, determining, by an operating system of the computer system, additional information of a first type is to be included in the generated text or additional information of a second type is to be included in the generated text.

45. A method, comprising:
at a computer system that is in communication with a display generation component and one or more input devices:
   receiving, via the one or more input devices, a first input, wherein the first input corresponds to a request for a language model to generate generated text; and
   in response to receiving the first input:
     in accordance with a determination that additional information of a first type is to be included in the generated text, displaying, via the display generation component, a request for additional information without generating the generated text via the language model; and
     in accordance with a determination that additional information of a second type is to be included in the generated text:
       generating, via the language model, the generated text, wherein the generated text includes at least one placeholder associated with the additional information of the second type; and
       displaying, via the display generation component, the generated text with the at least one placeholder;
   after displaying the request for additional information of the first type, receiving a second input, wherein the second input is an indication of a refusal to provide the additional information of the first type; and
   in response to receiving the second input:
     determining whether the language model can generate the generated text;
     in accordance with a determination that the language model can generate the generated text, generating the generated text without the additional information of the first type; and
     in accordance with a determination that the language model cannot generate the generated text, displaying, via the display generation component, an indication that the generated text cannot be generated.

46. The method of claim 45, wherein the additional information of the first type is information required to generate the generated text.

47. The method of claim 45, wherein the additional information of the first type is not available at the computer system prior to receiving the first input.

48. The method of claim 45, wherein the additional information of the first type is information for determining a syntax and/or structure of the generated text.

49. The method of claim 45, wherein the additional information of the first type is information for generating at least a plurality of words of the generated text.

50. The method of claim 45, wherein the additional information of the first type is information that cannot be genericized.

51. The method of claim 45, wherein the additional information of the second type is information that can be genericized.

52. The method of claim 45, further comprising:
after generating the generated text, receiving a third input that corresponds to a request to update or supplement the generated text; and
in response to the third input, displaying a second generated text that has been updated or supplemented based on the third input.

53. The method of claim 45, further comprising:
after generating the generated text, receiving a fourth input that corresponds to a request to generate a first subportion of the generated text; and
in response to the fourth input, re-generating the first subportion of the generated text.

54. The method of claim 45, wherein the at least one placeholder includes a third placeholder that is prepopulated based on contextual information corresponding to a current context of the computer system.

55. The method of claim 45, wherein displaying the generated text with the at least one placeholder includes visually distinguishing the at least one placeholder within the generated text.

* * * * *